United States Patent [19]

Ermolovich et al.

[11] 4,319,323

[45] Mar. 9, 1982

[54] COMMUNICATIONS DEVICE FOR DATA PROCESSING SYSTEM

[75] Inventors: Thomas R. Ermolovich, Lexington; Robert E. Stewart, Stow; Judson S. Leonard, Acton, all of Mass.; David N. Cutler, Nashua, N.H.

[73] Assignee: Digital Equipment Corporation, Maynard, Mass.

[21] Appl. No.: 137,525

[22] Filed: Apr. 4, 1980

[51] Int. Cl.³ .......................... G06F 3/00; G06F 13/00
[52] U.S. Cl. .................................................. 364/200
[58] Field of Search ...................... 364/200 MS File

[56] References Cited

U.S. PATENT DOCUMENTS

| | | | |
|---|---|---|---|
| 3,710,324 | 1/1973 | Cohen et al. | 364/200 |
| 3,893,084 | 7/1975 | Kotok et al. | 364/200 |
| 3,999,163 | 12/1976 | Levy et al. | 364/200 |
| 4,044,334 | 8/1977 | Bachman et al. | 364/200 |
| 4,104,718 | 8/1978 | Poublan et al. | 364/200 |
| 4,177,510 | 12/1979 | Appell et al. | 364/200 |
| 4,232,366 | 11/1980 | Levy et al. | 364/200 |
| 4,236,206 | 11/1980 | Strecker et al. | 364/200 |

OTHER PUBLICATIONS

IBM System/370 Principles of Operation-GA22-70-00-6 Seventh Edition, Mar. 1980-IBM Corp.

Primary Examiner—Harvey E. Springborn
Attorney, Agent, or Firm—Cesari and McKenna

[57] ABSTRACT

A communications device transfers process data between a data processing system and an external device at high speed. The communications device receives command signals from a user process program in the data processing system and from the external device. The communications device generates physical addresses in the data processing system with respect to which process data is to be transferred, the physical addresses being generated in response to virtual addresses supplied in the commands. The communications device and the external device also each include apparatus for signalling the other that data is being transferred at too rapid a rate to be processed, or that data is temporarily not being transferred, to prevent data being lost and an error being sent to the data processing system.

8 Claims, 96 Drawing Figures

| FIG. 6A | FIG. 6B |
|---|---|
| FIG. 6C | FIG. 6D |
| FIG. 6E | FIG. 6F |
| FIG. 6G | FIG. 6H |
| FIG. 6I | FIG. 6J |
| FIG. 6K | FIG. 6L |
| FIG. 6M | FIG. 6N |
| FIG. 6O | FIG. 6P |
| FIG. 6Q | FIG. 6R |

*Fig. 6*

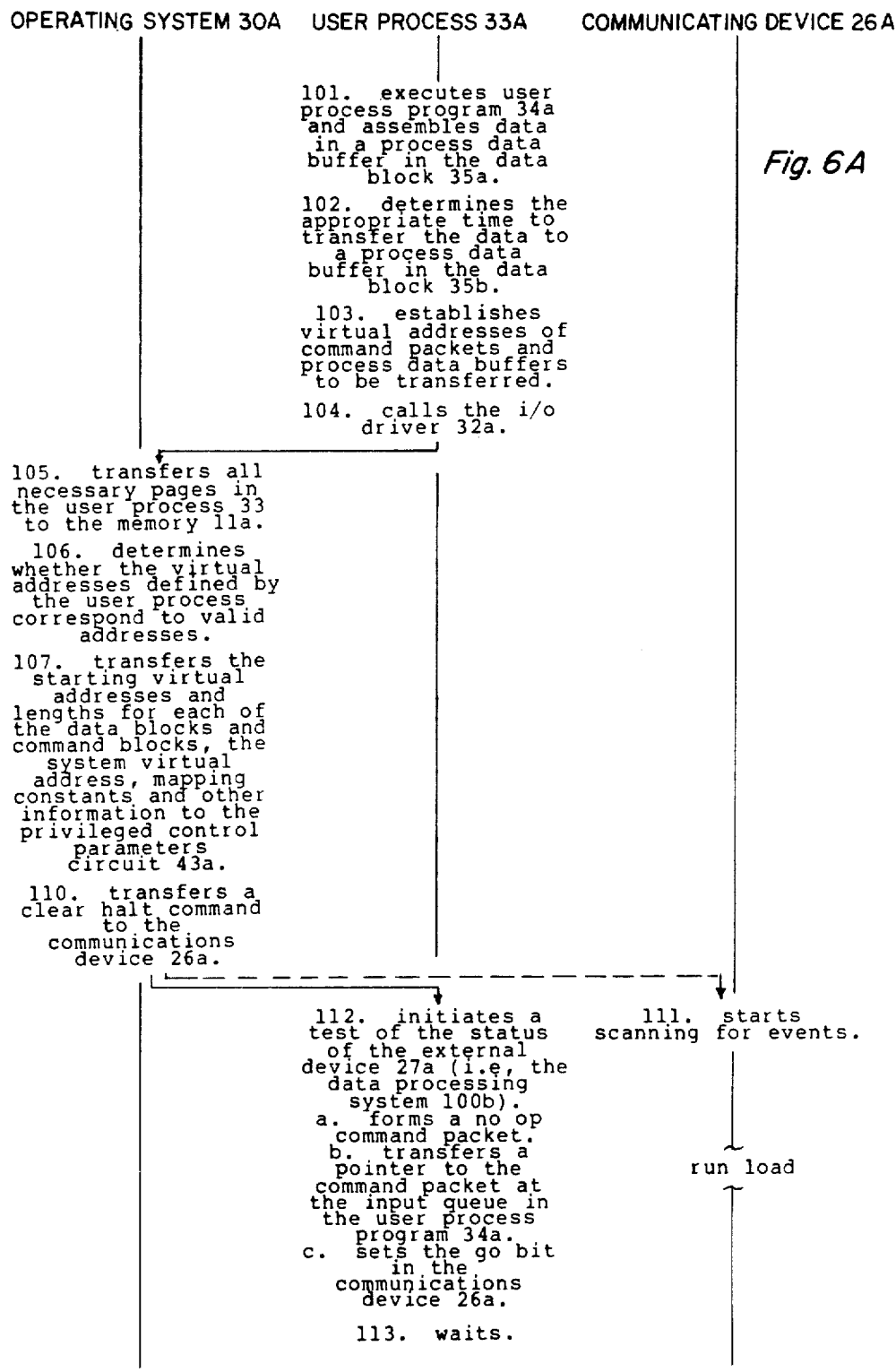

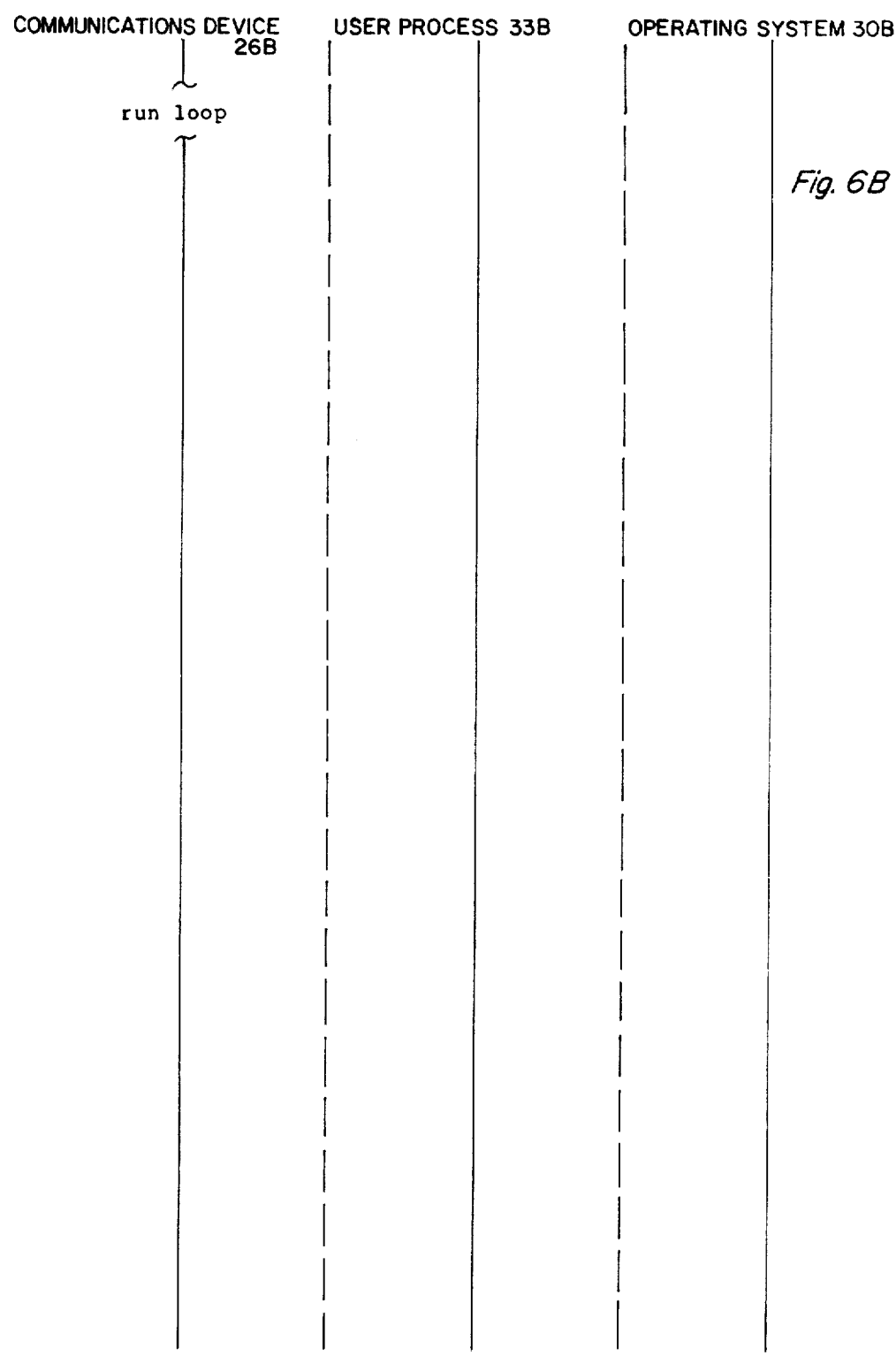

Fig. 6C 114. senses setting of go bit.

115. removes no op command packet from the input queue in the user process program 34 and decodes the command.

116. determines the status of the external device 27 (i.e., the data processing system 100b) and forms a status longword for the no op command packet.

117. inserts a pointer to the no op command packet on a termination queue 57a in the user process program 34.

120. interrupts the data processing system 100a.

122. services the interrupt.

123. begins to process the user program at a location determined by the interruption.

121. enters run loop.

124. removes the no op command packet from the termination queue 57a in the user process program 34.

125. tests the status longword 126. assuming that the communications device 26b is running (i.e., the external device 27a is active), forms a write device control message command packet.
 a. defines the starting address and length of the process data buffer 35a.
 b. defines the function that the communications device 26b is to perform.

Fig. 6D 142. removes the pointer to the write device control message command packet from the termination queue 57a in the user process program 34a.

143. tests the status longword.

done run loop

159. receives the read device command packet from the communications device 26b.

160. determines that the process data buffer defined in the read device command packet is properly identified.

161. initiates the transfer of process data from the process data buffer in the data block 35a to the buffer 50a in the process data path 47a and then to the buffer 50b in the process data path 47b over the data interconnection 51.

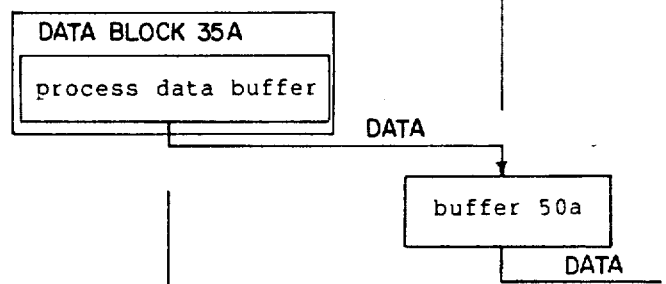

Fig. 6K run loop

Fig. 6M 175. receives the write device command packet from the communications device 26b.

176. determines that the process data buffer defined in the write device command packet is properly identified.

177. enables the transfer of process data from the buffer 50a to the process data buffer 47a to a process data buffer in the data block 35a.

178. initiates the transfer of process data over the data interconection 51.

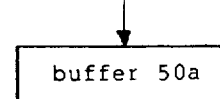

buffer 50a process data buffer

DATA BLOCK 35A 174. transfers the write device command packet in random access format over the control interconnection 46 and enables the transfer of process data from the process data buffer in the data block 35b to the buffer 50b in the process data path 7b.

*Fig. 6N*

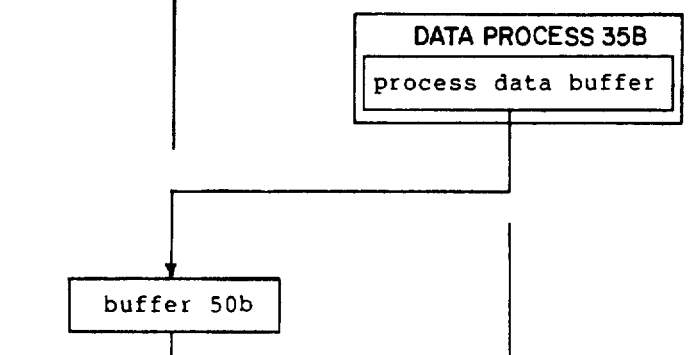

179. after data is transferred, determines the status of communications device 26a and transfers the status to the status longword in the write device command packet.

Fig. 60 run loop 180. forms a status longword indicating a successful completion of the transfer for the write device command packet.

181. transfers a pointer to the write device command packet on the termination queue in the user process program 34b.

182. interrupts the data processing system 100b.

*Fig. 6P*

183. services the interupt 184. begins to process the user process program at a location determined by the interruption.

185. removes the write device command packet from the termination queue in the user process program 34b.

186. tests the status longword.

187. tests the information in the log area.

188. forms a write device control message command packet.

189. transfers the address of the write device control message command packet to the input queue in the user process program 34b.

190. sets the go bit in the communications device 26b.

191. senses the setting of the go bit; removes the write device control message command packet from the input queue in the user process program 34b.

*Fig. 6R*

192. transfers the device message to the communications device 193. reads the status from the communications device 26a over the control interconnection 46.

194. transfers the status into a log area in the write device control message command packet and forms a status longword for the write device control message command packet.

195. places the write device control message command packet on the termination queue in the user process program 34b.

196. interrupts the data processing system 100b.

197. services the interrupt.

run loop 198. begins to process the user process program at a location determined by the interruption.

199. removes the write device control message command packet from the termination queue in the user process program 34b.

200. tests the status longword and the status in the log area.

done

Fig. 7A

| | | | | | |
|---|---|---|---|---|---|
| FORWARD LINK | | | | | |
| BACKWARD LINK | | | | | |
| CONTROL | PKTCTRL 0 | 0 CIS | 08 COMMAND | 0 LOG | 0 MESS |
| BYTE COUNT | 0 | | | | |
| DATA BUFFER VIRTUAL ADDRESS | x | | | | |
| MEMORY RESIDUAL BYTE COUNT | x | | | | |
| EXTERNAL DEVICE RESIDUAL BYTE COUNT | x | | | | |
| DEVICE STATUS | 0 | | | | |

NO OP COMMAND PACKET

WRITE DEVICE CONTROL MESSAGE
COMMAND PACKET

Fig. 7B

| | | | | | |
|---|---|---|---|---|---|
| FORWARD LINK | | | | | |
| BACKWARD LINK | | | | | |
| PKT CTRL 0 | CIS 2 | COMMAND 04 | LØA 0 | LDM K | CONTROL |
| n | | | | | BYTE COUNT |
| VA(i-1) | | | | | DATA BUFFER VIRTUAL ADDRESS |
| MEMORY RESIDUAL BYTE COUNT | | | | | |
| EXTERNAL DEVICE RESIDUAL BYTE COUNT | | | | | |
| 0 | | | | | DEVICE STATUS |
| | | | | | DEVICE MESSAGE |

Fig. 7C
READ DEVICE COMMAND PACKET

| FORWARD LINK | | | | | |
|---|---|---|---|---|---|
| BACKWARD LINK | | | | | |
| PKT CTRL 0 | CIS 1 | COMMAND 0 | LLA 0 | LDM 0 | CONTROL |
| "n" | | | | | BYTE COUNT |
| VA(i-1) | | | | | DATA BUFFER VIRTUAL ADDRESS |
| "n" | | | | | MEMORY RESIDUAL BYTE COUNT |
| "n" | | | | | EXTERNAL DEVICE RESIDUAL BYTE COUNT |
| 0 | | | | | DEVICE STATUS |

Fig. 7D
WRITE DEVICE COMMAND PACKET

| FORWARD LINK | | | | | |
|---|---|---|---|---|---|
| BACKWARD LINK | | | | | |
| PKT CTRL 0 | CIS 3 | COMMAND 2 | LLA j | LDM k | CONTROL |
| "n2" | | | | | BYTE COUNT |
| VA(b) OF B'S BUFFER | | | | | DATA BUFFER VIRTUAL ADDRESS |
| 0 | | | | | MEMORY RESIDUAL BYTE COUNT |
| 0 | | | | | EXTERNAL DEVICE RESIDUAL BYTE COUNT |
| 0 | | | | | DEVICE STATUS |
| (0) | OF A'S BUFFER | | | | ⎫ |
| ~ | | | | | ⎬ DEVICE MESSAGE |
| | | | | (k) | ⎪ |
| 0 | | | | (j) | ⎭ |

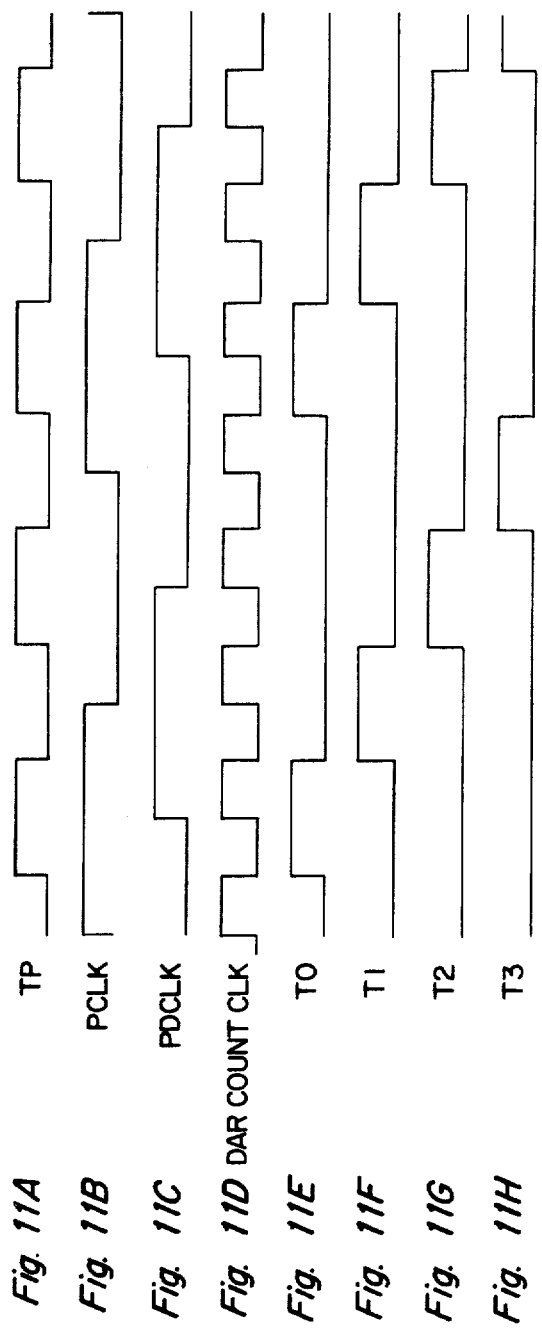
Fig. 11A  TP
Fig. 11B  PCLK
Fig. 11C  PDCLK
Fig. 11D  DAR COUNT CLK
Fig. 11E  T0
Fig. 11F  T1
Fig. 11G  T2
Fig. 11H  T3

LOCAL MEMORY REGISTERS

ADDRESS  DEVICE STATUS LONG WORD

| 31 30 29 28 27 26 25 24 | 23 22 21 20 19 18 17 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| | EXTERNAL DEVICE STATUS REGISTER | DEV PAR ERR | DRIVER ABRT | LENGTH VIOL | INV DEV CMD | RAM EN | FAES REQ EMPTY | INV CMD PXT | UNAL CMD ERR | RANGE ERR | SELF TEST | DEV DISABLE | CMD IN | INV PTE | CMD START | SUCCESS |

BASE ─ 387

| BASE+4 | DR-SBR |
| BASE+8 | DR-GBR |
| BASE+12 | BVA, COMMAND BLOCK |
| BASE+16 | LENGTH, COMMAND BLOCK |
| BASE+20 | SVA, PTE, BASE, COMMAND BLOCK |
| BASE+24 | BVA, DATA BLOCK |
| BASE+28 | LENGTH, DATA BLOCK |
| BASE+32 | SVA, PTE, BASE, DATA BLOCK |
| BASE+36 | |
| BASE+1020 | |

Fig. 13

| | 15 | 14 | 13 | 12 | 11 | 10 | 9 | 8 | 7 | 6 | 5 | 4 | 3 | 2 | 1 | 0 | | 7 | 6 | 5 | 4 | 3 | 2 | 1 | 0 |
|---|---|---|---|---|---|---|---|---|---|---|---|---|---|---|---|---|---|---|---|---|---|---|---|---|---|
| | DUPP DIAG INT L | DSMP REQ EN H | DSMD DI READ H | DSMR DI LEN ERR H | DSMN DDI BC=0 H | DCBN SBI BC>=16 H | DCBN SBI BC>=8 H | DSMN SBI BC NEQ 0 H | DSMP IN TRANS H | DSMN SBC REG 6 H | DSMN SBC REG 5 H | DSMN SBC REG 4 H | DSMN SBC REG 3 H | DSMN SBC REG 2 H | DSMN SBC REG 1 H | DSMN SBC REG 0 H | | | | DSMP REQ 2 H | DSMP REQ 1 H | DC1P SBC>=112 H | DSMP SBC>=96 H | DSMP SBC>=4 L |  |
| 00 | – | – | – | – | – | – | – | – | L | L | L | L | L | L | L | L | | A | A | • | • | • | • | A | A |
| 01 | – | – | – | – | – | – | – | – | H | H | H | – | – | – | – | – | | A | A | • | • | A | • | • | A |
| 02 | | | | | | | | | | | | | | | | | | | | | | | | | |
| 03 | L | H | – | – | – | – | H | – | – | – | – | – | – | – | – | – | | A | A | • | A | • | • | • | A |
| 04 | L | H | – | – | – | – | L | H | L | – | – | – | – | – | – | – | | A | A | • | A | • | • | • | A |
| 05 | H | H | H | – | – | – | H | – | – | H | – | – | – | – | – | – | | A | A | • | A | • | • | • | A |
| 06 | H | H | H | – | – | – | H | – | – | – | H | – | – | – | – | – | | A | A | • | A | • | • | • | A |
| 07 | H | H | H | – | – | – | H | – | – | – | – | H | – | – | – | – | | A | A | • | A | • | • | • | A |
| 08 | H | H | H | – | – | – | H | – | – | – | – | – | H | – | – | – | | A | A | • | A | • | • | • | A |
| 09 | H | H | H | – | H | – | L | H | L | – | – | – | – | – | – | – | | A | A | • | A | • | • | • | A |
| 10 | H | H | H | H | – | – | L | H | L | H | – | – | – | – | – | – | | A | A | • | A | • | • | • | A |
| 11 | H | H | H | H | – | – | L | H | L | – | H | – | – | – | – | – | | A | A | • | A | • | • | • | A |
| 12 | H | H | H | H | – | – | L | H | L | – | – | H | – | – | – | – | | A | A | • | A | • | • | • | A |
| 13 | H | H | H | H | – | – | L | H | L | – | – | – | H | – | – | – | | A | A | • | A | • | • | • | A |
| 14 | H | H | H | H | – | – | L | H | L | – | – | – | – | H | – | – | | A | A | • | A | • | • | • | A |
| 15 | H | H | H | H | – | – | L | H | L | – | – | – | – | – | H | – | | A | A | • | A | • | • | • | A |
| 16 | H | H | H | H | – | – | L | H | L | – | – | – | – | – | – | H | | A | A | • | A | • | • | • | A |
| 17 | H | H | H | – | – | – | L | H | L | H | – | – | – | – | – | – | | A | A | • | A | • | • | • | A |
| 18 | H | H | H | – | – | – | L | H | L | – | H | – | – | – | – | – | | A | A | • | A | • | • | • | A |
| 19 | H | H | H | – | – | – | L | H | L | – | – | H | – | – | – | – | | A | A | • | A | • | • | • | A |
| 20 | H | H | H | – | – | – | L | H | L | – | – | – | H | – | – | – | | A | A | • | A | • | • | • | A |
| 21 | H | H | L | – | – | – | H | L | L | – | – | – | – | – | – | – | | A | A | • | A | • | • | • | A |
| 22 | H | H | L | – | – | – | H | – | L | – | L | – | – | – | – | – | | A | A | • | A | • | • | • | A |
| 23 | H | H | L | – | – | – | H | – | L | – | – | L | – | – | – | – | | A | A | • | A | • | • | • | A |
| 24 | | | | | | | | | | | | | | | | | | | | | | | | | |
| 25 | H | H | L | – | – | L | H | L | L | – | – | – | – | – | – | – | | A | A | • | A | • | • | • | A |
| 26 | H | H | L | – | – | L | H | L | – | L | – | – | – | – | – | – | | A | A | • | A | • | • | • | A |
| 27 | H | H | L | – | – | L | H | L | – | – | L | – | – | – | – | – | | A | A | • | A | • | • | • | A |
| 28 | | | | | | | | | | | | | | | | | | | | | | | | | |
| 29 | | | | | | | | | | | | | | | | | | | | | | | | | |
| 30 | | | | | | | | | | | | | | | | | | | | | | | | | |
| 31 | H | H | H | – | – | H | – | – | – | H | – | – | – | – | – | – | | A | A | A | • | • | • | • | A |
| 32 | H | H | H | – | – | H | – | – | – | – | H | – | – | – | – | – | | A | A | A | • | • | • | • | A |
| 33 | H | H | H | – | – | H | – | – | – | – | – | H | – | – | – | – | | A | A | A | • | • | • | • | A |
| 34 | H | H | H | – | – | L | H | H | L | H | – | – | – | – | – | – | | A | A | A | • | • | • | • | A |
| 35 | H | H | H | – | – | L | H | H | L | – | H | – | – | – | – | – | | A | A | A | • | • | • | • | A |
| 36 | H | H | H | – | – | L | H | H | L | – | – | H | – | – | – | – | | A | A | A | • | • | • | • | A |
| 37 | H | H | H | – | H | L | H | H | L | – | – | – | – | – | – | – | | A | A | A | • | • | • | • | A |
| 38 | H | H | L | – | – | H | – | – | L | – | – | – | – | – | – | – | | A | A | A | • | • | • | • | A |
| 39 | H | H | L | – | – | H | – | – | – | – | L | – | – | – | – | – | | A | A | A | • | • | • | • | A |
| 40 | H | H | L | – | – | H | – | – | – | – | – | L | L | – | – | – | | A | A | A | • | • | • | • | A |
| 41 | H | H | L | – | L | H | H | – | L | – | – | – | – | – | – | – | | A | A | A | • | • | • | • | A |
| 42 | H | H | L | – | L | H | H | – | – | L | – | – | – | – | – | – | | A | A | A | • | • | • | • | A |
| 43 | H | H | L | – | L | H | H | L | – | – | L | – | – | – | – | – | | A | A | A | • | • | • | • | A |
| 44 | – | – | – | – | – | – | – | – | H | H | – | – | – | – | – | – | | A | A | • | • | • | A | • | A |
| 45 | | | | | | | | | | | | | | | | | | | | | | | | | |
| 46 | | | | | | | | | | | | | | | | | | | | | | | | | |
| 47 | | | | | | | | | | | | | | | | | | | | | | | | | |

*Fig. 22A*

ACTIVE LEVEL: | H | H | H | H | H | H | H |

INPUT

| 7 | 6 | 5 | 4 | 3 | 2 | 1 | 0 |
|---|---|---|---|---|---|---|---|
| 2ND LW | FR | SBI BC 7:4 | SBI CTR 01 | SBI CTR 00 | VA 02 | VA 01 | VA 00 |

OUTPUT

| 7 | 6 | 5 | 4 | 3 | 2 | 1 | 0 |
|---|---|---|---|---|---|---|---|
| 0 | DELTA VA 2 | DELTA VA 1 | DELTA VA 0 | 0 | SBI VB 2 | SBI VB 1 | SBI VB 0 |

FIRST REFERENCE FIRST LONG WORD

| SBI BYTE COUNT | VA=0 | | VA=1 | | VA=2 | | VA=3 | | VA=4 | | VA=5 | | VA=6 | | VA=7 | |
|---|---|---|---|---|---|---|---|---|---|---|---|---|---|---|---|---|
| | DELTA | SBI VB | DELTA | SBI VB | DELTA | SBI VB | DELTA | SBI VB | DELTA | SBI VB | DELTA | SBI VB | DELTA | SBI VB | DELTA | SBI VB |
| 0 | 0 | 0 | 1 | 0 | 2 | 0 | 3 | 0 | 4 | 0 | 5 | 0 | 6 | 0 | 7 | 0 |
| 1 | 1 | 1 | 2 | 1 | 3 | 1 | 4 | 1 | 4 | 0 | 5 | 0 | 6 | 0 | 7 | 0 |
| 2 | 2 | 2 | 3 | 2 | 4 | 2 | 4 | 1 | 4 | 0 | 5 | 0 | 6 | 0 | 7 | 0 |
| 3 | 3 | 3 | 4 | 3 | 4 | 2 | 4 | 1 | 4 | 0 | 5 | 0 | 6 | 0 | 7 | 0 |
| >=4 | 4 | 4 | 4 | 3 | 4 | 2 | 4 | 1 | 4 | 0 | 5 | 0 | 6 | 0 | 7 | 0 |

FIRST REFERENCE SECOND LONG WORD

| | VA=0 | | VA=1 | | VA=2 | | VA=3 | | VA=4 | | VA=5 | | VA=6 | | VA=7 | |
|---|---|---|---|---|---|---|---|---|---|---|---|---|---|---|---|---|
| 0 | 0 | 0 | 1 | 0 | 2 | 0 | 3 | 0 | 4 | 0 | 5 | 0 | 6 | 0 | 7 | 0 |
| 1 | 0 | 0 | 1 | 0 | 2 | 0 | 3 | 0 | 5 | 1 | 6 | 1 | 7 | 1 | 0 | 1 |
| 2 | 0 | 0 | 1 | 0 | 2 | 0 | 3 | 0 | 6 | 2 | 7 | 2 | 0 | 2 | 0 | 1 |
| 3 | 0 | 0 | 1 | 0 | 2 | 0 | 3 | 0 | 7 | 3 | 0 | 3 | 0 | 2 | 0 | 1 |
| >=4 | 0 | 0 | 1 | 0 | 2 | 0 | 3 | 0 | 0 | 4 | 0 | 3 | 0 | 2 | 0 | 1 |

NOT FIRST REFERENCE

| | VA=0 | | VA=1 | | VA=2 | | VA=3 | | VA=4 | | VA=5 | | VA=6 | | VA=7 | |
|---|---|---|---|---|---|---|---|---|---|---|---|---|---|---|---|---|
| 0 | 0 | 0 | 1 | 0 | 2 | 0 | 2 | 0 | 4 | 0 | 5 | 0 | 6 | 0 | 7 | 0 |
| 1 | 1 | 1 | 0 | 0 | 0 | 0 | 0 | 0 | 5 | 1 | 0 | 0 | 0 | 0 | 0 | 0 |
| 2 | 2 | 2 | 0 | 0 | 0 | 0 | 0 | 0 | 6 | 2 | 0 | 0 | 0 | 0 | 0 | 0 |
| 3 | 3 | 3 | 0 | 0 | 0 | 0 | 0 | 0 | 7 | 3 | 0 | 0 | 0 | 0 | 0 | 0 |
| >=4 | 4 | 4 | 0 | 0 | 0 | 0 | 0 | 0 | 0 | 4 | 0 | 0 | 0 | 0 | 0 | 0 |

DSMS DI WRITE SEQ-E99
23 0 43C6-00

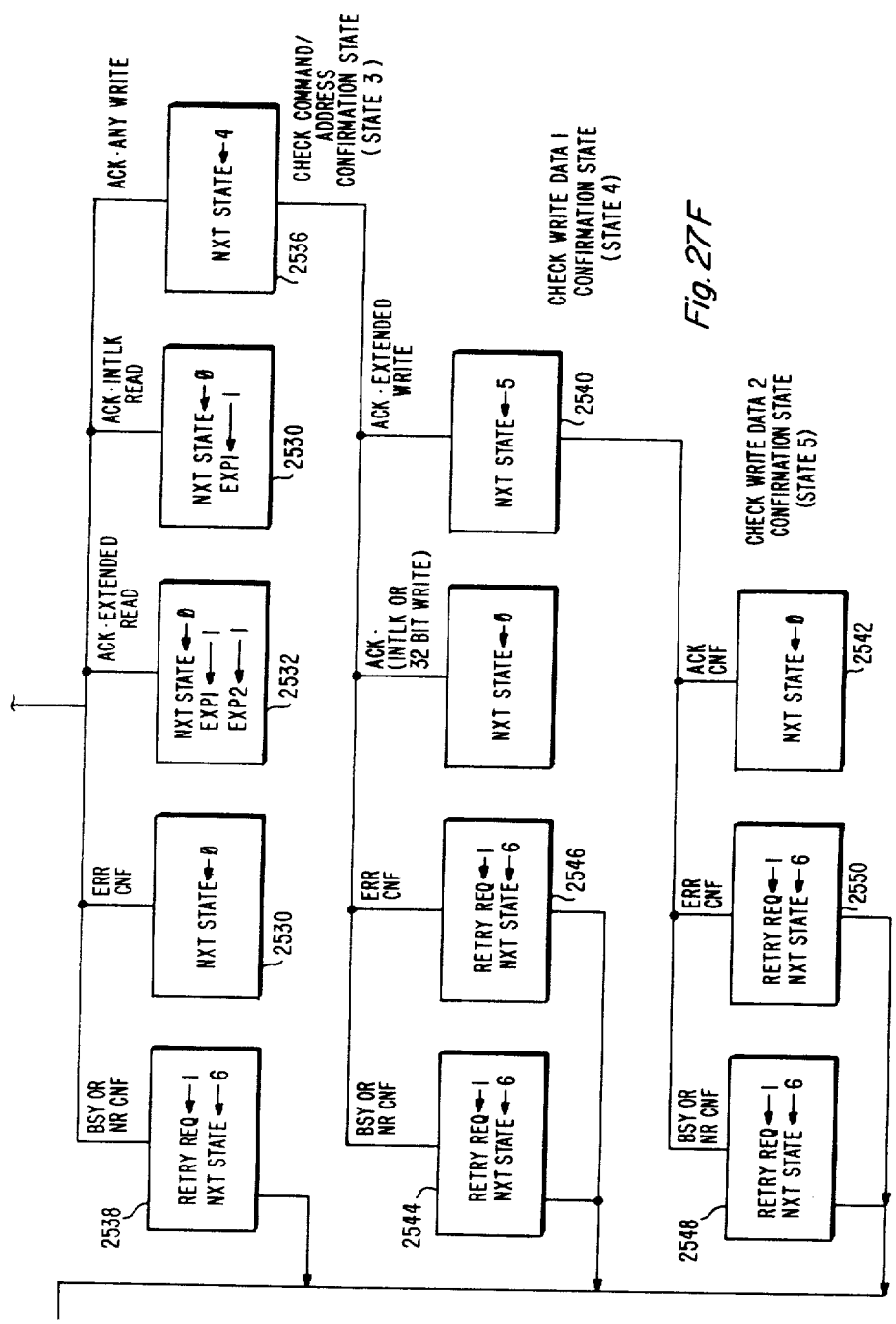

| | I 15 INIT L | I 14 I | I 13 SELECT H | I 12 ABORT H | I 11 ENABLE ID H | I 10 ARBOK H | I 9 CNF 1 L | I 8 CNF 2 L | I 7 SILO DIR H | I 6 UP SBI CODE 1 H | I 5 UP SBI CODE 0 H | I 4 UP ADRS H | I 3 SILO REF H | I 2 STATE 2 H | I 1 STATE 1 H | I 0 STATE 0 H | O 7 INTLK L | O 6 HIGH ADRS L | O 5 XMIT DATA H | O 4 UP RQ L | O 3 NXT SILO H | O 2 STATE 2 H | O 1 STATE 1 H | O 0 STATE 0 H |
|---|---|---|---|---|---|---|---|---|---|---|---|---|---|---|---|---|---|---|---|---|---|---|---|---|
| 24 H | - | - | - | - | - | - | - | - | L | - | - | - | H | L | L | H | · | · | · | A | · | A | · |
| 25 H | - | - | - | - | - | - | - | - | - | - | - | - | H | L | H | L | · | · | · | A | · | A | A |
| 26 H | - | - | - | - | - | - | - | - | - | - | - | - | H | L | H | H | · | · | · | A | A | A | · |
| 27 H | - | - | - | - | - | - | H | - | - | - | - | - | H | H | L | L | · | · | · | A | A | A | · |
| 28 H | - | - | - | - | - | L | L | - | - | - | - | - | H | H | L | L | · | · | · | A | A | A | · |
| 29 H | - | - | L | L | - | - | - | - | - | - | - | - | H | H | H | L | · | · | · | A | A | A | · |
| 30 H | - | - | - | H | L | - | - | - | - | - | - | - | H | H | H | L | · | · | · | A | A | A | · |
| 31 H | - | H | - | - | - | - | - | - | - | - | - | - | - | L | H | H | · | A | · | · | · | · | · |
| 32 H | - | - | - | - | - | - | H | - | - | - | - | - | H | L | L | H | · | · | A | · | A | · | A |
| 33 | | | | | | | | | | | | | | | | | | | | | | | | |
| 34 | | | | | | | | | | | | | | | | | | | | | | | | |
| 35 | | | | | | | | | | | | | | | | | | | | | | | | |
| 36 | | | | | | | | | | | | | | | | | | | | | | | | |
| 37 H | - | - | H | L | - | - | - | - | - | - | L | - | L | L | L | L | · | · | · | A | · | · | · |
| 38 H | H | - | H | H | - | - | H | - | - | - | L | - | L | L | L | L | · | A | · | A | · | · | A |
| 39 H | H | - | H | H | - | - | H | - | - | - | - | H | H | H | L | · | · | A | · | A | · | · | A |
| 40 | · | · | | | | | | | | | | | | | | | | | | | | | | |
| 41 | | - | | | | | | | | | | | | | | | | | | | | | | |
| 42 | | | | | | · | | | | | | | | | | | | | · | | | | | |
| 43 H | - | - | - | - | - | H | - | H | H | - | L | H | H | · | · | · | · | A | A | · |
| 44 H | L | - | - | - | - | L | H | - | H | L | - | L | L | H | H | · | · | · | · | A | A | · |
| 45 H | - | - | - | - | - | H | H | - | H | L | - | L | L | H | H | · | · | · | · | A | A | · |
| 46 | | | | | | | | | | | | | | | | | | | | | | | | |
| 47 | | | | | | | | | | | | | | | | | | | | | | | | |

PROGRAMMABLE LOGIC ARRAY 852

- -= DON'T CARE
- •= NOT USED FOR THIS OUTPUT
- A= TERM PRESENT IN OUTPUT, OUTPUT=OUTPUT LEVEL

*Fig. 28 B*

|  | INPUTS | | | | | | | | | | | | | | | | | OUTPUTS | | | | | | | | | OUTPUT LEVEL |
|---|---|---|---|---|---|---|---|---|---|---|---|---|---|---|---|---|---|---|---|---|---|---|---|---|---|---|
|  | I 15 INIT L | I 14 TECH H | I 13 | I 12 ABORT H | I 11 CMARLF ID H | I 10 ARB OK H | I 9 CNF 1 L | I 8 CNF 0 L | I 7 SILO DIR H | I 6 UP SBI CODE 1 H | I 5 UP SBI CODE 0 H | I 4 ADRS H | I 3 SILO REF H | I 2 STATE 2 H | I 1 STATE 1 H | I 0 STAIF 0 H | L 7 SBI BSY L | L 6 SBUS BSY L | L 5 MASK 1 L | L 4 MASK 0 L | L 3 EN CNF H | L 2 SET EXP 1 H | L 1 SET EXP 2 H | L 0 RETRY REQ H |  |
| 24 | H | – |  | – | H | H | – | – | – | – | – | – | L | H | H | L | A | · | · | · | · | · | · | · |  |
| 25 | H | – |  | – | H | H | – | – | H | – | – | – | H | H | H | L | A | A | A | · | · | · | · | · |  |
| 26 | H | – |  | – | H | H | – | – | L | – | – | – | H | H | H | L | A | · | · | · | · | · | · | · |  |
| 27 | H | – |  | – | – | – | – | – | – | – | – | – | H | H | L | L | A | · | · | · | · | · | · | · |  |
| 28 | H | – |  | – | – | – | H | – | L | – | – | – | L | L | H | H | A | · | · | · | · | · | · | A |
| 29 | H | – |  | – | – | – | H | – | H | – | – | – | L | L | H | H | A | · | · | · | · | · | · | A |
| 30 | H | L |  | – | – | – | L | H | – | H | L | – | L | L | H | H | A | · | · | · | · | · | · | A |
| 31 | H | – |  | – | – | – | H | H | – | H | L | – | L | L | H | H | A | · | · | · | · | · | · | A |
| 32 |  |  |  |  |  |  |  |  |  |  |  |  |  |  |  |  |  |  |  |  |  |  |  |  |  |
| 33 |  |  |  |  |  |  |  |  |  |  |  |  |  |  |  |  |  |  |  |  |  |  |  |  |  |
| 34 |  |  |  |  |  |  |  |  |  |  |  |  |  |  |  |  |  |  |  |  |  |  |  |  |  |
| 35 |  |  |  |  |  |  |  |  |  |  |  |  |  |  |  |  |  |  |  |  |  |  |  |  |  |
| 36 |  |  |  |  |  |  |  |  |  |  |  |  |  |  |  |  |  |  |  |  |  |  |  |  |  |
| 37 |  |  |  |  |  |  |  |  |  |  |  |  |  |  |  |  |  |  |  |  |  |  |  |  |  |
| 38 |  |  |  |  |  |  |  |  |  |  |  |  |  |  |  |  |  |  |  |  |  |  |  |  |  |
| 39 |  |  |  |  |  |  |  |  |  |  |  |  |  |  |  |  |  |  |  |  |  |  |  |  |  |
| 40 |  |  |  |  |  |  |  |  |  |  |  |  |  |  |  |  |  |  |  |  |  |  |  |  |  |
| 41 |  |  |  |  |  |  |  |  |  |  |  |  |  |  |  |  |  |  |  |  |  |  |  |  |  |
| 42 |  |  |  |  |  |  |  |  |  |  |  |  |  |  |  |  |  |  |  |  |  |  |  |  |  |
| 43 |  |  |  |  |  |  |  |  |  |  |  |  |  |  |  |  |  |  |  |  |  |  |  |  |  |
| 44 |  |  |  |  |  |  |  |  |  |  |  |  |  |  |  |  |  |  |  |  |  |  |  |  |  |
| 45 |  |  |  |  |  |  |  |  |  |  |  |  |  |  |  |  |  |  |  |  |  |  |  |  |  |
| 46 |  |  |  |  |  |  |  |  |  |  |  |  |  |  |  |  |  |  |  |  |  |  |  |  |  |
| 47 |  |  |  |  |  |  |  |  |  |  |  |  |  |  |  |  |  |  |  |  |  |  |  |  |  |

– = DON'T CARE
· = NOT USED FOR THIS OUTPUT
A = TERM PRESENT IN OUTPUT, OUTPUT = OUTPUT LEVEL.

*Fig. 29B*

PART NO 23-15381-00

| TEST OSEQ L | ID1 AVAIL L / ID2 AVAIL L | ID1 SILO READ H / ID2 SILO READ H | ST2 ST1 ST0 | FORCE READ H | ID1 NEXT / ID2 NEXT | ID1 SECOND / ID2 SECOND | ST2 ST1 ST0 |
|---|---|---|---|---|---|---|---|
| H | L L | X X | L L L | L | L L | L L | L L L |
| H | H H | L L | L L L | L | L L | L L | L L L |
| H | H H | L H | L L L | L | L H | L L | L H L |
| H | H H | H L | L L L | L | H L | L L | L L H |
| H | H H | H H | L L L | L | L L | L L | L L L |
| H | H L | H X | L L L | L | H L | L L | L L H |
| H | H L | L X | L L L | L | L L | L L | L L L |
| H | L H | X H | L L L | L | L H | L L | L H L |
| H | L H | X L | L L L | L | L L | L L | L L L |
| H | H L | X X | L L H | L | H L | L L | L L H |
| H | L L | X X | L L H | L | L L | L L | L L L |
| H | H H | X H | L L H | L | L H | L H | L H H |
| H | H H | X L | L L H | L | H L | L L | L L H |
| H | L H | X X | L H L | L | L H | L L | L H L |
| H | L L | X X | L H L | L | L L | L L | L L L |
| H | H H | H X | L H L | L | L H | H L | H L L |
| H | H H | L X | L H L | L | L H | L L | L H L |
| H | H H | X X | L H H | L | H L | L H | L H H |
| H | L H | X X | L H H | L | L L | L L | L H L |
| H | H L | X X | L H H | L | H L | L L | H L H |
| H | L L | X X | L H H | L | L L | L L | L L L |
| H | H H | X X | H L L | L | L H | H L | H L L |
| H | H L | X X | H L L | L | H L | L L | L L H |
| H | L H | X X | H L L | L | L H | L L | H L H |
| H | L L | X X | H L L | L | L L | L L | L L L |
| H | H L | X X | H L H | L | H L | L L | H L H |
| H | L H | X X | H L H | L | L H | L L | H L H |
| H | H H | X X | H L H | L | L L | L L | L L L |
| H | L L | X X | H L H | H | L L | L L | H H L |
| H | X X | X X | H H L | H | L L | L L | L L L |
| H | X X | X X | H H H | L | L L | L L | L L L |

Fig. 30 A

| TEST OSEQ L | ID1 AVAIL L / ID2 AVAIL L | ID1 SILO READ H / ID2 SILO READ H | ST2 / ST1 / ST0 | FORCE READ H | ID1 NEXT / ID2 NEXT | ID1 SECOND / ID2 SECOND | ST2 / ST1 / ST0 |
|---|---|---|---|---|---|---|---|
| L | L L | X X | L L L | L | L L | L L | L L L |
| L | H L | H X | L L L | L | L L | H L | L L H |
| L | H L | L X | L L L | L | L L | L L | L L L |
| L | L H | X H | L L L | L | L L | H L | L H L |
| L | H H | L H | L L L | L | L L | H L | L H L |
| L | H H | H L | L L L | L | L L | H L | L L H |
| L | H H | H H | L L L | L | L L | L L | L L L |
| L | H H | L L | L L L | L | L L | L L | L L L |
| L | H L | X X | L L H | L | L L | H L | L L H |
| L | L L | X X | L L H | L | L L | L L | L L H |
| L | L H | X H | L L H | L | L H | L L | H L H |
| L | L H | X L | L L H | L | L L | L L | L L H |
| L | H H | X H | L L H | L | L H | H L | L H H |
| L | H H | X L | L L H | L | L L | H L | L L H |
| L | H H | X X | L H H | L | L H | H L | L H H |
| L | H L | X X | L H H | L | L L | H L | L H H |
| L | L H | X X | L H H | L | L H | L L | L H H |
| L | L L | X X | L H H | L | L L | L L | H L H |
| L | L H | X X | L H L | L | L L | L H | L H L |
| L | L L | X X | L H L | L | L L | L L | L H L |
| L | H L | H X | L H L | L | H L | L L | H L H |
| L | H L | L X | L H L | L | L L | L L | L H L |
| L | H H | H X | L H L | L | H L | L H | H L L |
| L | H H | L X | L H L | L | L L | L H | L H L |
| L | H H | X X | H L L | L | H L | L H | H L L |
| L | L H | X X | H L L | L | L L | L H | H L L |
| L | H L | X X | H L L | L | H L | L L | H L L |
| L | L L | X X | H L L | L | L L | L L | H L H |
| L | H L | X X | H L H | L | H L | L L | H L H |
| L | L H | X X | H L H | L | L H | L L | H L H |
| L | L L | X X | H L H | H | L L | L L | H H L |
| L | H H | X X | H L H | L | L L | L L | L L L |
| L | X X | X X | H H L | H | L L | L L | L L L |

Fig. 30B

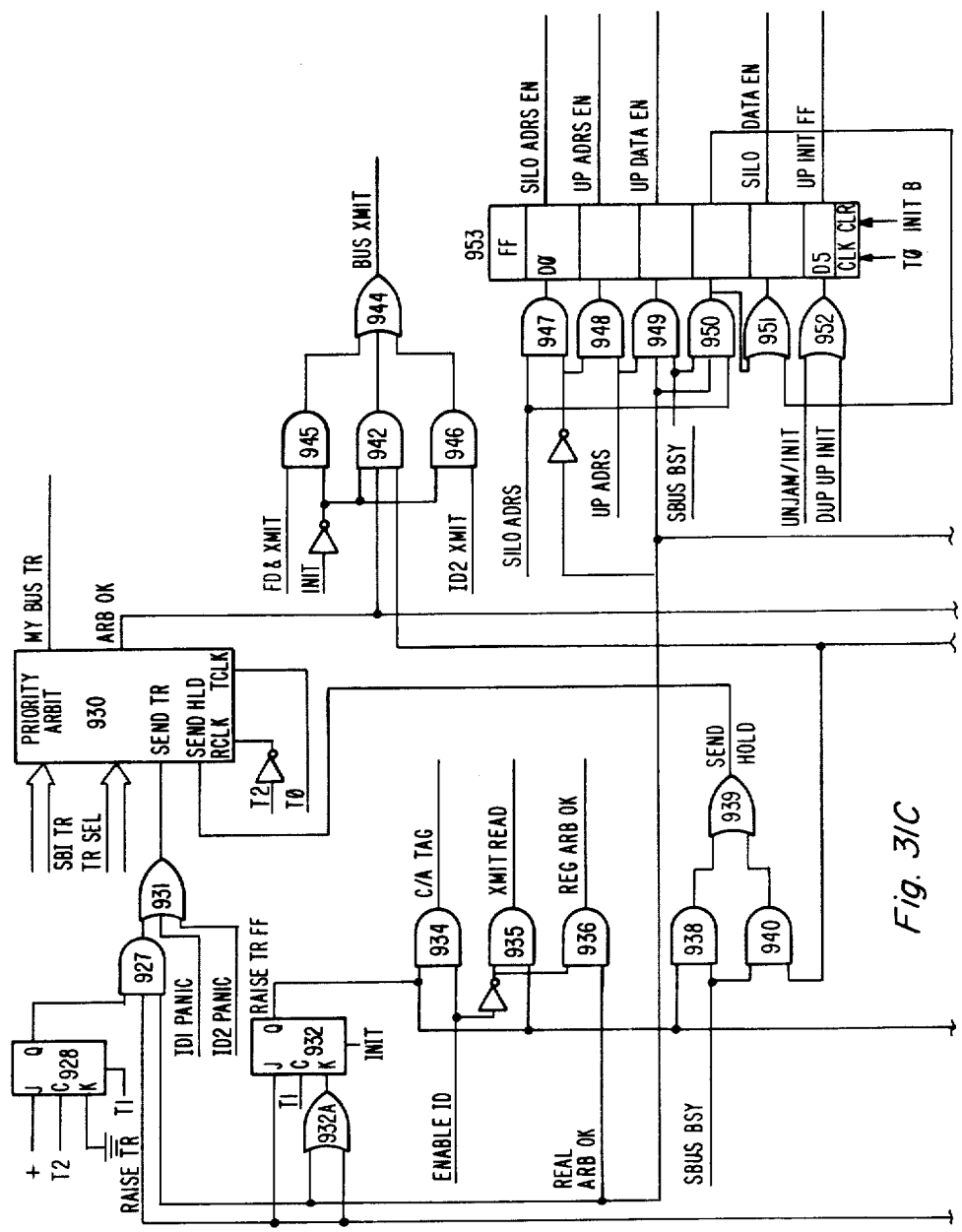
Fig. 3/C

| | INPUTS | | | | | | | | | | | | | | | OUTPUTS | | | | | | | |
|---|---|---|---|---|---|---|---|---|---|---|---|---|---|---|---|---|---|---|---|---|---|---|---|
| | I15 DSCN REG CYCLE L | I14 INHIBIT M | I13 ABORT H | I12 REQ 2 H | I11 REQ 1 H | I10 DUP DATA REQ H | I9 IC1 RETRY H | I8 IC2 RETRY H | I7 IO1 AVAIL H | I6 IO2 AVAIL H | I5 ADRS REG ∅3 H | I4 ADRS NOT VAL H | I3 LATCH IT H | I2 S2 H | I1 S1 H | I0 S∅ H | O7 ENABLE IO1 H | O6 ENABLE IO2 H | O5 RAISE TR H | O4 SILO ADRS H | O3 UP ADRS H | O2 S2 H | O1 S1 H | O0 S∅ H |
| 0 | H | L | L | - | - | - | H | - | - | - | - | - | L | L | L | L | A | • | A | • | • | • | A | A |
| 1 | H | L | L | - | - | - | L | H | - | - | - | - | L | L | L | L | • | A | A | • | • | • | A | • |
| 2 | H | L | L | - | - | H | L | L | H | - | - | - | L | L | L | L | A | • | A | • | A | • | A | • |
| 3 | | | | | | | | | | | | | | | | | | | | | | | | |
| 4 | H | L | L | L | H | L | L | L | H | H | L | L | L | L | L | L | A | • | A | A | • | • | • | A |
| 5 | H | L | L | H | L | L | L | L | H | H | L | L | L | L | L | L | A | • | A | A | • | • | • | A |
| 6 | H | L | L | H | L | L | L | L | H | L | L | L | L | L | L | L | A | • | A | L | • | • | • | A |
| 7 | H | L | L | H | H | L | L | L | H | L | L | L | L | L | L | L | A | • | A | A | • | • | • | A |
| 8 | H | L | L | H | L | L | L | L | L | H | H | L | L | L | L | L | • | A | L | L | • | L | • | • |
| 9 | H | L | L | H | H | L | L | L | L | H | H | L | L | L | L | L | • | A | A | A | • | A | • | • |
| 10 | L | L | - | - | - | - | - | - | - | - | - | - | - | L | L | L | • | • | A | • | • | A | A | A |
| 11 | | | | | | | | | | | | | | | | | | | | | | | | |
| 12 | | | | | | | | | | | | | | | | | | | | | | | | |
| 13 | - | - | L | - | - | - | - | - | - | - | - | - | - | L | H | H | A | • | A | • | • | • | A | A |
| 14 | - | - | L | - | - | - | - | - | - | - | - | - | - | H | H | L | • | A | A | • | • | A | A | • |
| 15 | - | - | L | - | - | - | - | - | - | - | - | - | - | L | H | L | A | • | A | • | A | • | A | • |
| 16 | | | | | | | | | | | | | | | | | | | | | | | | |
| 17 | - | - | L | - | - | - | - | - | - | - | - | - | - | L | L | H | A | • | A | A | • | • | • | A |
| 18 | - | - | L | - | - | - | - | - | - | - | - | - | - | H | L | L | • | A | A | A | • | A | • | • |
| 19 | H | L | L | L | H | L | L | L | H | H | L | L | L | L | L | L | • | A | A | A | • | L | • | • |
| 20 | H | L | L | H | L | L | L | L | H | H | H | L | L | L | L | L | • | A | A | A | • | A | • | • |
| 21 | H | L | L | H | H | L | L | L | H | H | L | L | L | L | L | L | A | • | A | A | • | • | • | A |
| 22 | H | L | L | H | H | L | L | L | H | H | H | L | L | L | L | L | • | A | A | A | • | A | • | • |
| 23 | - | - | - | - | - | - | - | - | - | - | - | - | - | H | H | H | • | • | A | • | • | A | A | A |
| 24 | - | - | H | - | - | - | - | - | - | - | - | - | - | L | H | H | A | • | • | • | • | • | • | • |
| 25 | - | - | H | - | - | - | - | - | - | - | - | - | - | H | H | L | • | A | • | • | • | • | • | • |
| 26 | - | - | H | - | - | - | - | - | - | - | - | - | - | L | H | L | A | • | • | A | • | • | • | • |
| 27 | - | - | H | - | - | - | - | - | - | - | - | - | - | L | L | H | A | • | • | A | • | • | • | • |
| 28 | - | - | H | - | - | - | - | - | - | - | - | - | - | H | L | L | • | A | • | A | • | • | • | • |

PART NO. 23-046C6-00

- = DON'T CARE
- • = NOT USED FOR THIS OUTPUT
- A = TERM PRESENT IN OUTPUT, OUTPUT=H

Fig. 31D

COMMUNICATIONS DEVICE FOR DATA PROCESSING SYSTEM

TABLE OF CONTENTS

Cross References to Related Patents and Patent Applications
Background of the Invention
Summary
Brief Description of the Drawings
Description of an Illustrative Embodiment
  A. General Discussion
    1. Data Processing System
    2. Communications Device
    3. Operation of Communications Device
    4. Application of Communications Device
      a. Generalized External Device
      b. Interconnected Data Processing System
  B. Specific Description
    1. Data Paths
    2. Basic Operations
    3. Data Processing System Transfers
    4. Command Interpreter and Control Interconnect
    5. Address Generation
    6. Process Data Path
    7. Memory Reference Controller and Address Generator
  C. Operation

CROSS REFERENCE TO RELATED PATENTS AND PATENT APPLICATIONS

U.S. Pat. No. 3,710,324 issued Jan. 9, 1973 for a DATA PROCESSING SYSTEM and assigned to the same assignee as the present invention.

U.S. Pat. No. 3,999,163 issued Dec. 21, 1976 for a SECONDARY STORAGE FACILITY FOR DATA PROCESSING SYSTEM and assigned to the same assignee as the present invention.

U.S. patent application Ser. No. 954,453 filed Oct. 25, 1978 for a CENTRAL PROCESSOR UNIT FOR EXECUTING INSTRUCTIONS OF VARIABLE LENGTH and assigned to the same assignee as the present invention, which is now U.S. Pat. No. 4,236,206.

U.S. patent application Ser. No. 954,601 filed Oct. 25, 1978 for a BUS FOR A DATA PROCESSING SYSTEM WITH OVERLAPPED SEQUENCES and assigned to the same assignee as the present invention, which is now U.S. Pat. No. 4,232,366.

BACKGROUND OF THE INVENTION

This invention generally relates to digital data processing systems and, more specifically, to the communication of data between a digital data processing system and an external device connected to that system.

Conventionally, a data processing system includes a plurality of interconnected data elements, usually comprising a central processor, memory, secondary storage devices, and input-output devices, plus programs for controlling the operation and interaction of these data elements. A VAX11/780 data processing system that is manufactured and sold by Digital Equipment Corporation, the assignee of this invention, is one specific embodiment of a data processing system in which the central processor, memory, secondary storage devices and input-output devices connect in parallel on an internal bus. This system is described in U.S. patent application Ser. Nos. 954,453 and 954,601 and in several publications, including publications titled: *VAX*11/780 *Architecture Handbook* (1977), *VAX*11/780 *Hardware Handbook* (1978), and *VAX*11/780 *Software Handbook* (1977), all published by Digital Equipment Corporation.

In this data processing system, as in many others, certain programs control the operation and interaction of the data elements and they constitute an operating system. More specifically, the operating system is an integrated collection of service routines, or programs, for supervising the sequencing of programs by the data processing system. These programs perform various debugging, input-output, accounting, compilation, and storage-assignment tasks, and process scheduling. Of particular interest with this patent application are the functions that are known as "input-output driver", or "I/O driver", routines. An I/O driver routine is a routine that initiates, in a data element such as an input-output driver, requests for transferring data referenced in a program to or from that input-output data element in response to input-output requests. As input-output requests are generated, they are placed in a queue and are subsequently processed according to the relative priority of the user program that issues them. The requests are issued to channels which have been previously associated with particular data elements. In addition, I/O driver routines process errors and interruptions. Each secondary storage device and each input-output device will have an I/O driver routine that pertains to that particular device.

Other programs are called "application" or "user" programs. They operate on "process data" to solve specific problems. They also interact with the operating system to transfer information among the data elements. In the following discussion, the process data is maintained in a "process data buffer". The phrase "user process" then encompasses the area in memory that contains the user program and the process data buffer.

The VAX11/780 data processing system, and other systems, are typically characterized by diverse types of external devices that are connected to an interconnecting bus in addition to the memory and central processor. One is an input-output adapter that couples the interconnecting bus to a plurality of input-output devices such as teletypewriters, etc. A secondary storage bus adapter couples the bus to various secondary storage devices that typically include disk and tape drive units. In the VAX11/780 data processing systems, these adapters enable transfers of data between a particular device and the memory at an effective rate that is less than the maximum potential data transfer rate. More specifically, in the VAX11/780 the maximum potential data transfer rate is 13.3 megabytes per second. Various restrictions imposed by the data elements reduce this rate. Thus the potential effective data transfer rate that might be reached during transfer between the device and the memory is 1.5 megabytes per second. Interrupt latency and other delays required for the operating system to initiate a request reduce the actual effective rate even more.

Two related problems contribute to the difference between the maximum potential data transfer rate and the low actual effective transfer rate: namely, (1) requirements for physical addresses to be calculated by address calculation routines in the operating system and (2) limitations in the adapter's capability to form addresses. For example, in the VAX11/780 data processing system, the data elements operate with virtual addresses. For example, a data element might have a capability generating 18-bit virtual addresses in a system that requires a 30-bit address to specify a physical memory location address. A physical address must therefore be calculated before a device can transfer any data, and an address calculation routine in the operating system is required to perform the calculation.

These calculations are further complicated by the segmentation of virtual memory into contiguous virtual memory pages. While successive virtual memory pages are contiguous, there is no guarantee that the corresponding page locations in physical memory will be contiguous. Therefore it is necessary to recompute the physical address of the beginning of a page each time a page boundary is crossed. Each such calculation involves a number of operations other than merely calculating the physical address. For example, it is necessary to assure that a virtual address in a user process corresponds to a location that is assigned to that user process.

Other processing must be interrupted so that the address calculation routine can be processed. This requires processor time and may require a significant amount of bus time, especially if the address calculation routine does not reside permanently in the random access memory and has to be transferred from a secondary storage device. As will be apparent, the repeated use of the operating system for overhead functions, such as address calculations, can reduce the overall rate of data transfers that may be attained by a user to a rate that is less than element the rate at which the data can transfer.

The driver routines for such data elements also reduce the effective data transfer rate. They include various messages that must be sent before a data transfer can occur. For example, the driver routine for a secondary storage device must transfer starting addresses, byte counts, commands for reading or writing, track and sector addresses, and other information before the data transfer can commence. Each of these information transfers may require one or more bus cycles that preclude the transfer of the user's process data.

Under such situations data may be lost or the user must reduce the rate at which the data is generated. Such losses or reductions can become unacceptable in many applications. For example, there are a number of scientific applications for data processing systems in which sensors for an experiment generate information at very high rates and in which the loss of data or a reduction in data would reduce the accuracy of the results of the experiment.

SUMMARY

Therefore, it is an object of this invention to facilitate the transfer of information between an external device and memory in a data processing system.

Another object of this invention is to provide a greater effective rate of data transfer between an external device and memory in a data processing system.

Still another object of this invention is to provide for direct communications between a user process that is resident in a data processing system memory and an external device.

Yet another object of this invention is to provide greater access for an external device to a memory in a data processing system.

Still yet another object of this invention is to provide a user process with far more capability to effect data transfers.

These objects are attained by utilizing a data element, called a communications device, to connect an external device to the interconnecting bus of the data processing system that also connects to the central processor and to the memory. The operating system transfers to the communications device, information that allows the determination of physical addresses of those memory locations that contain a user process by the communications device. This allows the communications device to generate physical addresses of locations in the memory that correspond only to the physical addresses of the user process without further utilization of the operating system. Information from the user process, including process data, moves between the user process and the external device through a memory reference controller. The memory reference controller routes the information accordingly to transfer information between the external device and either the user process program or the process data buffer. Direct transfers of data between the external device and the data processing system memory are made independently of operating system routines.

This invention is pointed out with particularity in the appended claims. The above and further objects and advantages of this invention may be better understood by referring to the following description taken in conjunction with the accompanying drawings.

BRIEF DESCRIPTION OF THE DRAWINGS

FIGS. 7A through 7D depict the organization of four different command packets that are useful in understanding the description in FIG. 6;

FIGS. 11A through 11H constitute a timing chart of reference timing signals that are utilized in the circuitry shown in FIG. 9 and subsequent figures;

FIG. 13 depicts certain registers that are found in the local store shown in FIG. 8;

FIGS. 22A and 22B are truth tables that is useful in understanding the operation of the circuitry shown in FIG. 21C;

FIGS. 24A and 24B are truth tables that is useful in understanding the operation of the circuitry shown in FIG. 23B;

FIGS. 27A through 27F comprise a logic diagram of circuitry in the control sequencer shown in FIG. 26B;

FIGS. 28A and 28B truth tables that is useful in understanding the operation of the circuitry shown in FIG. 27B;

FIGS. 29A and 29B shows another truth table that is useful in understanding the operation of the circuitry shown in FIG. 27B;

FIGS. 30A and 30B are truth tables that is useful in understanding the operation of the circuitry shown in FIG. 27C;

FIGS. 31A through 31D comprise a logic diagram of circuitry in the control sequencer shown in FIG. 26B;

DESCRIPTION OF AN ILLUSTRATIVE EMBODIMENT

A. General Discussion

1. Data Processing System

Figure 1:
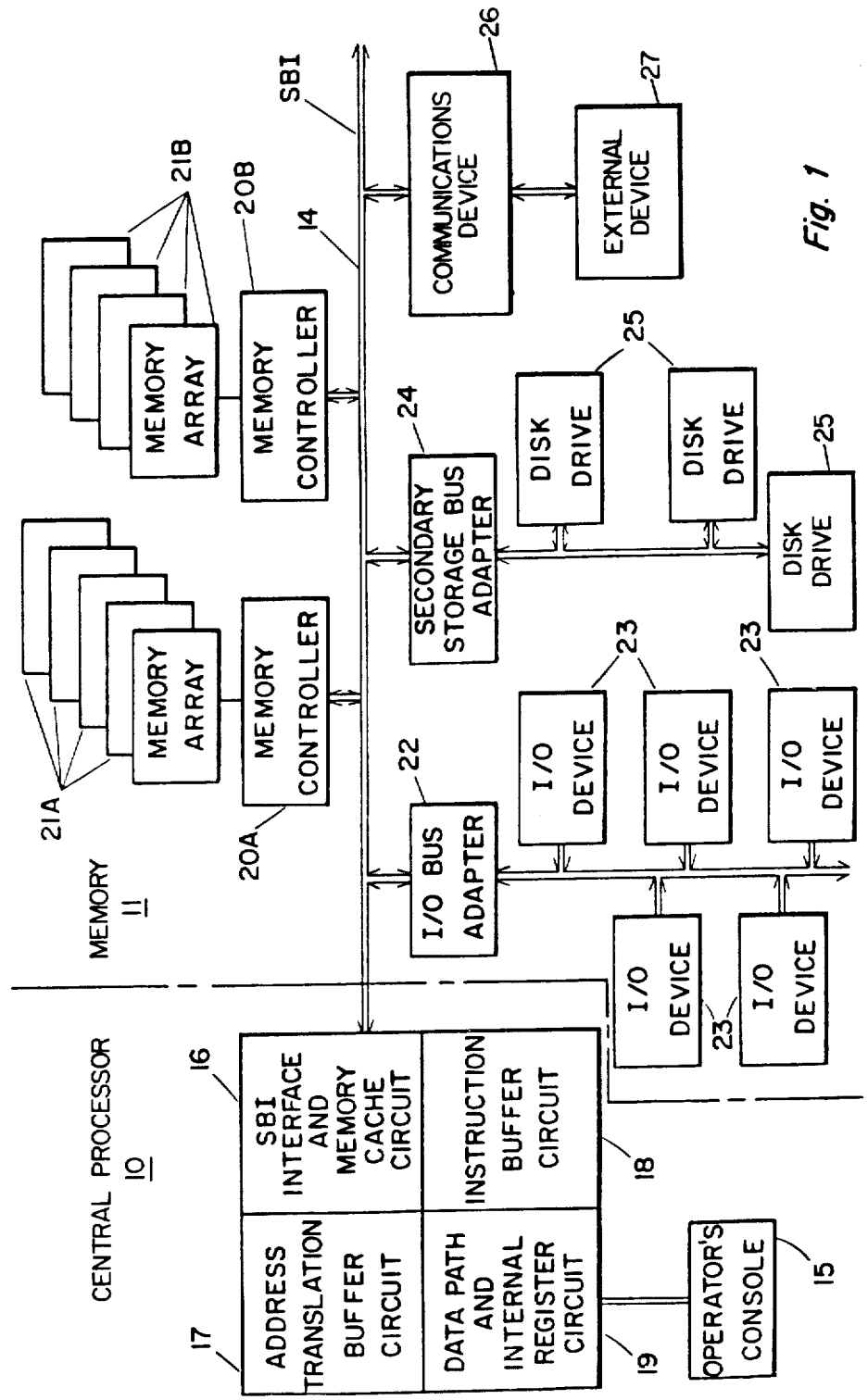
FIG. 1 is a basic block diagram of a data processing system that is adapted to transfer data between an external device and memory in accordance with this invention.

Referring to FIG. 1, a data processing system to which this invention applies comprises, as basic elements, a central processor 10, memory 11 and I/O units. A synchronous backplane interconnection (SBI) 14 interconnects the central processor 10, memory 11 and I/O units in parallel.

The central processor 10 comprises an operator's console 15, an SBI interface and memory cache circuit 16, an address translation buffer circuit 17, an instruction buffer circuit 18 and a data path and internal register circuit 19. The SBI interface and memory cache circuit 16 provide the necessary interfacing circuitry for transferring information over the SBI 14 to the memory 11 and I/O units. The circuit 16 receives all data from the memory and all address translations from the buffer circuit 17. It includes an associative memory, or cache. Any time data is written into the cache memory in the circuit 16 from the data path and internal register circuit 19, that data is also written into a corresponding location in the memory 11.

This specific embodiment of the central processor 10 operates with virtual addresses. The address translation buffer circuit 17 converts the virtual addresses to physical addresses which the memory cache circuit 16 uses either to determine whether it contains data from the corresponding location or to initiate a transfer from the corresponding actual location in the memory 11. The instruction buffer circuit 18 includes, as described later, means for storing instructions, or portions thereof, as they are retrieved either from the cache memory directly or from the memory 11.

The operator's console 15 serves as the operator interface. It allows the operator to examine and deposit data, halt the operation of the central processor 10 or step it through a sequence of program instructions. It also enables an operator to initialize the system through a bootstrap procedure and perform various diagnostic procedures on the entire data processing system.

In FIG. 1, the illustrated memory 11 comprises two memory controllers 20A and 20B. Each memory controller connects to a plurality of memory arrays. Specifically, memory controller 20A connects to memory arrays 21A while memory controller 20B connects to memory arrays 21B.

Several types of I/O units are shown. An I/O bus adapter 22 interconnects various input/output (I/O) devices 23, such as teletypewriters, to the bus 14. The interconnection, operation and transfer of signals between the I/O bus adapter 22 and the I/O devices 23 is disclosed in U.S. Pat. No. 3,710,324.

Another one of the I/O units comprises a secondary storage facility for the data processing system. It includes a secondary storage bus adapter 24 and a plurality of disk drives 25. The interconnection of the secondary storage bus adapters 24 and its respective disk drives 25 is disclosed in the foregoing U.S. Pat. No. 3,999,163.

U.S. patent application Ser. No. 954,601 describes the interactions of these data elements over the SBI 14. For purposes of the following discussion, it will be helpful to summarize these interactions and to define specific terms including the definition of data items, or groups, which this specific embodiment of the invention can process. The basic, or most elementary, information group is a byte. A byte includes eight bits in this data processing system. A word comprises two bytes. A "longword" comprises two consecutive words or four consecutive bytes while a "quadword" comprises two consecutive longwords, i.e., four consecutive words or eight consecutive bytes. Any transfer of information over the SBI 14 involves a longword.

The SBI 14 is time-division multiplexed and includes signal paths for carrying information and control signals. Each unit that connects to the SBI is called a nexus. The specific system shown in FIG. 1 includes six nexuses. A nexus is defined further in terms of its function during an exchange of information. At least two SBI transactions are necessary to exchange information between two nexuses. During a first transaction, one nexus, as a transmitting commander nexus, transmits command and address information to all the nexuses. This nexus is called a transmitting nexus because it is driving the SBI 14 and a commander nexus because it has transmitted the command and address information. During this transaction all nexuses, including the transmitting nexus, are receiving nexuses. However, only one receiving nexus will respond to the address information. That nexus is a responder nexus and it transmits a confirmation of receipt of the command and address information at a fixed interval after the commander nexus transmits that information. Thus, should the central processor 10 need to retrieve data from the memory controller 20A, the central processor 10 becomes a commander nexus and transmits a read command and an address to which the memory controller 20A will react initially as a receiving nexus and then as a responder nexus.

After some interval, the memory controller 20A will be prepared to send the retrieved data to the central processor 10. As described in U.S. patent application Ser. Nos. 954,453 and 954,601, it seeks control of the SBI 14. When it gains control, the memory controller 20A becomes a transmitting responder nexus and transfers the requested data onto the SBI 14 for transfer to the central processor 10. During this transaction, the central processor 10 is a receiving commander nexus.

Similar transactions occur for any information exchange between any two nexuses, although the memory controllers normally function only as responder nexuses and the central processor unit normally functions only as a commander nexus.

2. Communications Device 26

In accordance with this invention, one nexus that connects to the SBI 14 is a communications device that also connects to an external device 27. The external device may comprise any number of different data elements. In one application, the external device 27 will comprise an array processor or special laboratory test equipment. In still another application, the external device 27 will comprise another data processing system as shown in FIG. 1 with the connection to the communications device 26 being through another communications device of like construction. Such an interconnection provides a multiple processor data processing system.

Figure 2:
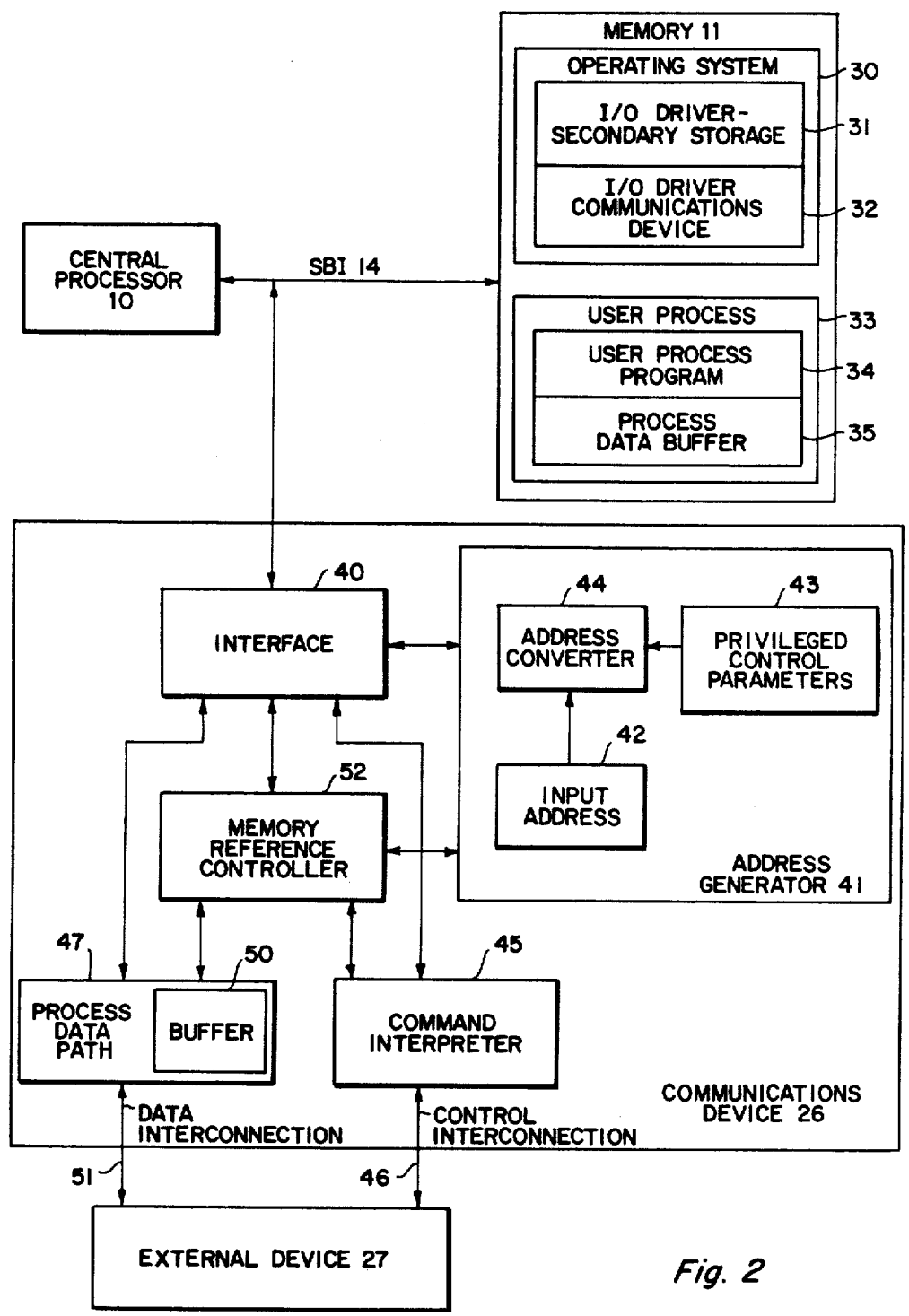
FIG. 2 depicts various functions in the interconnection of the communications device between a data processing system and an external device.

FIG. 2 depicts, in functional form, the communications device 26 of this invention and its interconnection to the external device 27 and to specific data elements in the data processing system: namely, the central processor 10 and the memory 11. Two blocks are shown in the memory 11. An operating system depicted as block 30 comprises an I/O driver 31 for a secondary storage bus adapter 24 shown in FIG. 1 and an I/O driver 32 for the communications device 26. The memory 11 contains another block 33 that represents a user process that includes a user process program 34 and a process data buffer 35. Although the representation in FIG. 2 depicts the operating system 30 and the user process 33 as each being stored in a separate, unitary block of contiguous memory locations, it will be apparent that no such restriction is necessary and normally does not occur. Each can be stored on a plurality of noncontiguous blocks of storage locations, and each block contains an equal number of physical storage locations.

The I/O driver 32 for the communications device comprises instructions and data that represent pointers to page tables in "privileged" memory areas and lengths of pages reflecting the size of a memory area for a user process. A "privileged" memory area is one that is not normally available to user process programs or data elements; its access is normally limited to the central processor when it is processing the operating system, or even specific routines in the operating system, that are known to be correct. In accordance with one aspect of this invention, however, the central processor 10 processes the I/O driver 32 to transfer such privileged information to the communications device 26.

During use, the central processor 10 processes instructions from the user process program. This program may include instructions that call various routines in the operating system. For example, if information is required from a disk, an instruction in the user process program calls the I/O driver 34 and thereafter that driver initiates a transfer of information from locations defined by the programmer in the process data buffer to the secondary storage bus adapter. Likewise, the central processor 10 would process another instruction in the user process program to call the I/O driver 32 thereby to transfer information to the communications device 26.

The communications device 26 and the external device 27 operate in response to "commands" that are received either from user process 33 or even from the external device 27 when it is capable of transmitting such commands. These "commands" are contained in "packets" of information. Normally the user process program command will contain such "command packets" in the form of literals. The communications device 26 processes the information in a command packet after it transfers the information from the user process program 34 in the memory 11. The communications device 26 responds to certain commands by initiating transfers of process data between the process data buffer 35 and the external device 27 through the communications device 26. Both transfers of commands and process data occur directly between the memory 11 and the communications device 26, so it is not necessary for the user process program to call any routines in the operating system 30 to effect those transfers.

Now referring to the communications device 26 in more detail, an interface 40 connects to the memory 11 and to the central processor 10 by means of the SBI 14. The interface sends information to and receives information from both the central processor 10 and the memory 11, and this information may be interpreted as addresses, commands or process data. An address generator 41 also connects to the interface 40. It includs an input address circuit 42 that generates a virtual input address and a privileged control parameters circuit 43 that receives various information for converting the virtual input addresses into physical addresses. These privileged control parameters are transferred to the address generator 41 by the I/O driver 32 for the communications device 26, usually from a privileged portion of the operating system. An address converter 44 utilizes the information from the input address circuit 42 and the privileged control parameter circuit 43 for generating a physical address. Part of the information transferred to the privileged control parameters circuit 43 prevents the address converter 44 from producing physical addresses of locations that are not properly associated with the user process.

A command interpreter 45 that processes commands connects to the interfacing means and to the external device 27 through a control interconnection 46. The command interpreter 45 can transfer information to the external device 27 to effect its operation through the control interconnection 46. The external device 27 may also be capable of sending commands through the control interconnection 46 to the command interpreter 45. Thus, either the user process or the external device 27 may control the operation of the communications device 26.

A process data path 47, including a buffer 50, connects to the interface 40 and through a data interconnection 51 to the external device 27. The process data path 47 transfers process data between the process data buffer 35 and the external device 27 during a process data transfer.

A memory reference controller 52 connects to the interface 40, the address generator 41, the command interpreter 45, and the process data path 47. The controller 52 routes information received from the user process to the appropriate ones of the address generator 41, the command interpreter 45, and the process data path 47. Also the controller routes information from any of the address generator 41, command interpreter 45, and process data path 47 through the interface 40 to the user process 33.

3. Operation of Communications Device 26

Typically, a user process initiates the operation of the communications device 26 by calling the I/O driver 32. The I/O driver 32 establishes various initial conditions and transfers privileged control parameters to the circuit 43 in the address generator 41. Thereafter, the communications device 26 transfers command packets from the user process program 34 through the interface 40 to the command interpreter 45 independently of the operating system 30. Certain commands are interpreted by the command interpreter 45 to establish subsequent operations within the communications device 26. Other commands pass through the command interpreter 45 to establish subsequent operations within the external device 27.

Typically a command packet includes (1) links to addresses of previous and next command packets, (2) control information such as the size of the packet and a number of status words in the packet, (3) a command message, (4) the virtual address of the beginning of the process data buffer with which the first item of process data is to be transferred, (5) the number of bytes of process data to be transferred, (6) the residual number of data bytes to be transferred between the process data path 47 and the memory 11, and (7) locations for a number of status words that will reflect the operating status of the communications device 26 and the external device 27 after the command packet has been processed.

As each command packet is processed, the command interpreter 45 and memory reference controller 52 transfer the virtual address to the input address circuit 42 in the address generator 41. Thereafter, the address generator 41 utilizes the privileged control parameters in the circuit 43 to produce, independently of the operating system, a physical address of a location in the process data buffer 35. The command interpreter 45 also may respond to the control message to initiate a transfer and the transfer will thereafter occur between the external device 27 and the process data buffer 35. The interface 40 combines the data and the addressing information to produce the necessary sequence of signals to effect the transfer over the SBI 14. Thus, the communications device 26 becomes a commander nexus and fully controls the transfer. Moreover, the transfer of process data also occurs independently of the operating system 30. Thus, the I/O driver 32 only transfers the necessary addressing and other initializing information to the communications device 26. This reduction in the use of the operating system enables a higher rate of overall transfer of processed data to be effected between the external device 27 and the process data buffer 35. In the application to a VAX 11/780 data processing system, transfer rates should increase from 1.5 megabytes per second to about 6 megabytes per second.

4. Application of the Communications Device 26

A general description of a typical application for the communications device 26 will be helpful to an understanding of the detailed structure of the communications device 26 shown in FIGS. 1 and 2. This discussion includes a description of the preliminary operations that must occur in the system before the communications device 26 is utilized. Then the discussion turns to a typical interchange of information between a typical external device 27 and a memory 11. After this generalized exchange of information is discussed, a complete transfer or sequence of operations in which the external device 27 comprises a second data processing system will be discussed.

As previously stated, the data processing system depicted in FIG. 1 utilizes virtual addressing. Thus, any user of the system writes programs utilizing virtual addresses which the operating system normally converts to physical addresses. Processes for converting virtual addresses to physical addresses are well known in the art. If an operator wishes to utilize the communications device 26 and produce transfers between the user process 33 and the external device 27, the operator must define the user process base. FIG. 2 depicts two basic areas of the user process 33: namely, the user process program 34 and the process data buffer 35. The operator further divides the user process program 34 into various instructions for controlling the user process.

Figure 3:
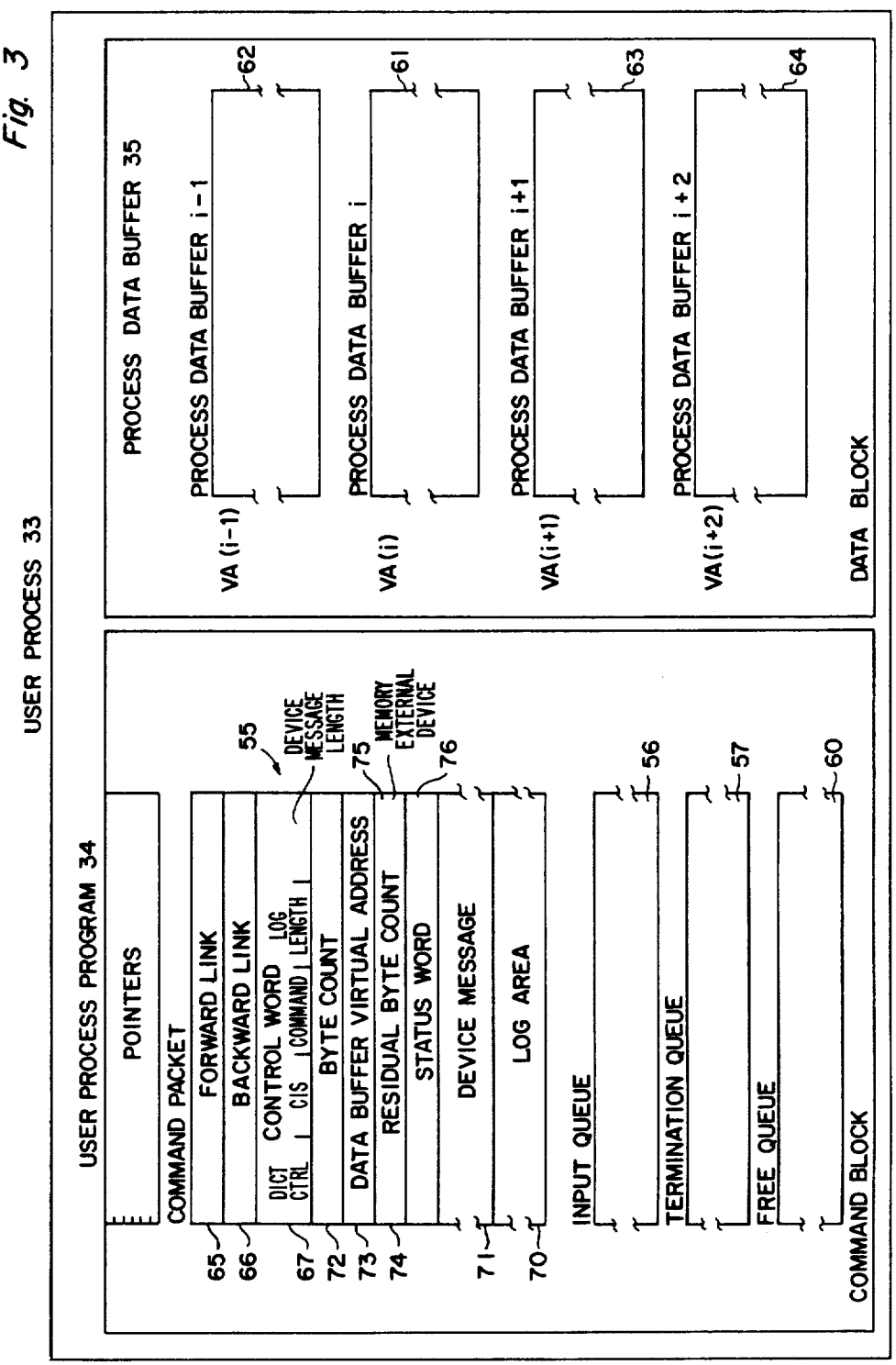
FIG. 3 is a more detailed block diagram of a user process that is shown in FIG. 2.

This further division is depicted in FIG. 3. The operator must define a command packet. A typical command packet 55 comprises a block of locations in the user process program 34 beginning at a predetermined virtual address. In this particular example, the address is designated symbolically as "CP(i)". Each command packet allows a predetermined direct communication to occur between the user process 33 and the external device 27. Operations in response to the command packet 55 begin when the user process 33 transfers the user's command packet to an input queue 56. This transfer is produced when the address CP(i) is transferred to a location at the "head" of an input queue 56, which comprises a block of memory locations in the user process program 34. As described more fully later, once the communications device 26 processes a command packet, it transfers the command packet back to the user process program 34 again by transferring its virtual address to a termination queue 57 in the user process program 34. Thus the operator must define a block of virtual addresses that will constitute the input queue 56 and a block of virtual addresses that will define the termination queue 57. The number of locations in each queue, as well as in a free queue 60, will depend upon the particular requirements on the user process program 34.

Each command packet 55 may initiate a control function or a data transfer function with the external device 27. When a command packet initiates a data transfer, there must be a corresponding process data buffer associated with that command packet in an area of the memory that has heretofor been identified as process data buffer 35 and is identified from here as a data block 35. In FIG. 3, a process data buffer 61 identified by symbolic address VA(i) corresponds to the command packet 55 at symbolic address CP(i). Other process data buffers 62, 63 and 64 are also shown as defining a group of process data buffers VA(i−1) through VA(i+2). Moreover, the user process program 34 would contain a command packet associated with each of the process data buffers 62, 63, and 64 in addition to the command packet 55.

Now referring to the command packet 55, which resides in a command block, each command packet in the user process program 34 comprises a forward link 65 that is a long word and that is at the initial location of that command packet. This forward link 65 enables the communications device 26 to ascertain the location of a next command packet in the input queue 56 and allows the user process program to ascertain the location of the next command packet in the termination queue 57. More specifically, the virtual address of a next command packet in sequence equals the sum of the virtual address for the forward link 65 plus the value stored in the forward link. Thus the value of the forward link is an offset number to the next command packet. The command packet also includes a longword that is a backward link 66 that is used in an analogous process to define the address of a predecessor command packet. As described more fully later, when the communications device 26 begins to process a command packet, it manipulates these links.

A control word 67, that also is a long word, comprises several fields. A PKT CTRL field contains two subfields. A first subfield defines three basic interruption states that control the conditions under which the communications device 26 will interrupt the user process program 34. In a first, or unconditional, state, an interrupt is enabled whenever the command packet is placed on the termination queue 57. In a second, or termination queue empty, state, an interruption will occur only when the command packet is inserted on the termination queue and the termination queue is empty. In a third, or no-interrupt, state, no interruption will occur when the command packet is placed on the termination queue. The second subfield comprises and SLE bit that is set to disable any error messages from being generated whenever a data transfer over the data interconnection 51 terminates before all the data bytes are transferred.

Still referring to FIGS. 2 and 3, the next two fields in the control word 67 are a CIS field and a COMMAND field. The CIS field controls the transfer of signals onto the control interconnection 46 that are used in conjunction with data transfers. In a first state of the CIS field no transmission of signals occurs over the control interconnection 46. In a second state, the command interpreter 45 is enabled to transfer the contents of the COMMAND field to a command register in the external device 27. This state is normally used when the COMMAND field will initiate a data transfer. A third state of the CIS field enables the command interpreter 45 to transmit the COMMAND field as in the previous code to the external device 27 and then to transmit a device message. This allows commands that require more than one byte of information to be transferred. In a fourth state of the CIS field the command interpreter 45 transmits the COMMAND field, a byte field, and a device message to the external device. This state is used when the external device 27 is a data processing system because the device message field will contain the virtual address of the buffer block in the data processing system memory that constitutes the external device 27.

The COMMAND field defines a number of specific commands that effect data transfers or other functions. A READ DEVICE command specifies that the communications device 26 will transfer data from the external device 27 to a designated process data buffer in the data block 35. A READ DEVICE CHAINED command performs a similar function except that the communications device 26 immediately transfers control to subsequent READ DEVICE and READ DEVICE CHAINED command packets that will perform a corresponding data transfer to another process data buffer automatically, assuming the subsequent command packet is in the input queue 56 shown in FIG. 3. If a series of READ DEVICE CHAINED commands are inserted in the input queue 56, the last command in sequence will be a READ DEVICE command.

There are three commands for transferring information to the external device 27. A WRITE DEVICE command and a WRITE DEVICE CHAINED command perform similar functions to the READ DEVICE and the READ DEVICE CHAINED commands except that data is transferred from a process data buffer in the data block 35 to the external device 27. A WRITE DEVICE CONTROL MESSAGE command causes the communications device 26 to transfer a control message from the command interpreter 45 over the control interconnection 46. The control message is contained in a device message field of the command packet that is described later.

A SET RANDOM ENABLE command and a CLEAR RANDOM ENABLE command control an internal random enable flag. There are three potential sources of commands. One source of commands is the user process program 34. The I/O driver 32 is a second source, but is limited to an ABORT command or a CLEAR HALT command. As previously indicated, the external device 27 may also transfer a command packet to the communications device 26. The SET and CLEAR RANDOM ENABLE commands control whether the communications device 26 will respond to commands from the external device 27.

A NO OP command is sent from the user process program 34 to the communications device 26 to produce a response, but no data transfer.

A SET HALT command halts further operation of the communications device 26.

Still referring to the command packet 55 in FIG. 3, a LOG LENGTH field in the control word 67 specifies a maximum number of status bytes that can be logged into the command packet in a log area 70. The status bytes represent the contents of predetermined registers in the external device 27 that are transferred over the control interconnection 46.

A DEVICE MESSAGE LENGTH field in the control word 67 defines the number of bytes in a device message field 71. This field 71 contains information that is to be transferred to storage and control registers in the external device 27. One such message, for example, will contain the address of a data buffer in the external device.

After the control word 67, the command packet 55 contains a byte count longword 72. This longword indicates the number of bytes that are to be transferred to or from the corresponding process data buffer.

A next location in the command packet 73 contains a data buffer virtual address. In the case of the specific command packet 55, for example, the storage location 73 will contain a virtual address corresponding to the symbolic address VA(i). Two residual byte counts are stored as sequential in locations 74 and 75. A memory residual byte count in location 74 indicates the number of data bytes that are yet to be transferred between a process data buffer in the data block 35 and the buffer 50 in the process data path 46. An external device residual byte count in location 75 indicates the number of data bytes that remain to be transferred between the external device 27 and the buffer 50. Residual byte count information is only stored in locations 74 and 75 for READ DEVICE, READ DEVICE CHAINED, WRITE DEVICE, and WRITE DEVICE CHAINED commands and certain diagnostic commands. The residual byte count fields in command packets received from the user process are zero. These fields are loaded by the communications device following a transfer. If, following a transfer, the residual byte count fields are not both zero, a length error has occurred.

A device status longword 76 is stored in the command packet following the external device residual byte count longword 75. The device status longword 76 contains the status of the communications device 26 after the communications device processes a command packet. Specific items concerning status will be described later. For purposes of description, however, the least significant bit position in the status longword 76 is a success bit that indicates the successful processing of a command packet without error. If an error were to occur, other bit positions in the device status word 76 identify that error.

a. Generalized External Device

With this understanding of the organization of the operating system 30, the user process 33, and the functional organization of a communications device 26 at the level shown in FIGS. 2 and 3, it will now be helpful to describe a representative sequence of interactions between and operations performed by each of the operating system 30, the user process program 34, and the communications device 26. This sequence is outlined in FIG. 4. During the discussion, however, reference will be made to elements that are depicted in FIGS. 2 and 3.

The first action in any sequence normally will occur with the formation of a command packet 55 in step 80. The command packet 55 can be formed two ways. First, instructions in the user process program 34 can transfer literals into successive locations thereby to construct the command packet 55. Alternatively, the programmer might actually form the command packet within the user process 34.

Operations in response to the command packet 55 are initiated by another instruction in the user process program 34 that transfers the virtual address of the forward link 65 (i.e., the symbolic virtual address CP(i)) to the head of the input queue 56 (step 81). In step 82, the user process program 34 executes an instruction that transfers signals over the bus 14 through the interface 40 to the memory reference controller 52 shown in FIG. 2. This message is in the form of a command and sets one bit position, designated as a GO bit position, to initiate operations.

When the GO bit is set, control passes to the communications device 26. Specifically, the memory reference controller 52 retrieves the appropriate portions of the command packet 34 directly from it in the user process program 34 (step 83). The command interpreter 45 processes the control word 67 (step 84) and transfers the COMMAND field to the external device 27 if that is appropriate (step 85). As previously indicated, transfers to the external device are controlled in response to the CIS field in the control word 67. If such a transfer is appropriate, the external device receives the portions (step 86) and initiates an operation in response to that command (step 87).

If the COMMAND field of the control word 67 defines a data transfer operation, the data transfer operation begins as shown by steps 90A and 90B. More specifically, step 90A represents the transfer between the external device 27 and the buffer 50 in the process data path 47; step 90B represents the transfer between the buffer 50 and the process data buffer in the data block 35 in the user process 33. With respect to FIG. 3, if the command packet 55 is being processed, the process data buffer 61 is utilized in the transfer.

After the transfer is completed, the communications device 26 determines the status of response to the command and stores that status in the status word location 76 of the command packet (step 91). Then the memory reference controller 52 transfers the address of the command packet to the end, or "tail", of the termination queue 57 in the user process (step 92). In step 93, the communications device interrupts the user process 33.

Interruptions to the user process program 34 are made directly through the operating system 30. Step 94 represents the I/O driver response to the interruption that initiates a response in the user process program 34 in step 95. The effect, however, is that the user process is interrupted and performs an interruption service routine. The transaction is completed when the user process removes the command packet from the termination queue and processes the status longword 76.

The previous description of the control word 67 in FIG. 3 discusses several data transfer commands including commands that produce "chained" and "unchained" data transfers. Moreover, the communications device 26 also can perform "command chained" operations. Command chaining comprises the transfer of the initial addresses of a succession of command packets, such as command packet 55 in FIG. 3, to the input queue 56. The communications device 26 then processes these successive command packets in sequence without further interference from the operating system 30 or the user process program 34. Data chaining operations require command chaining operations. Data chaining operations allow successive data transfers to successive data buffers, again without further use of the operating system.

Figure 4:
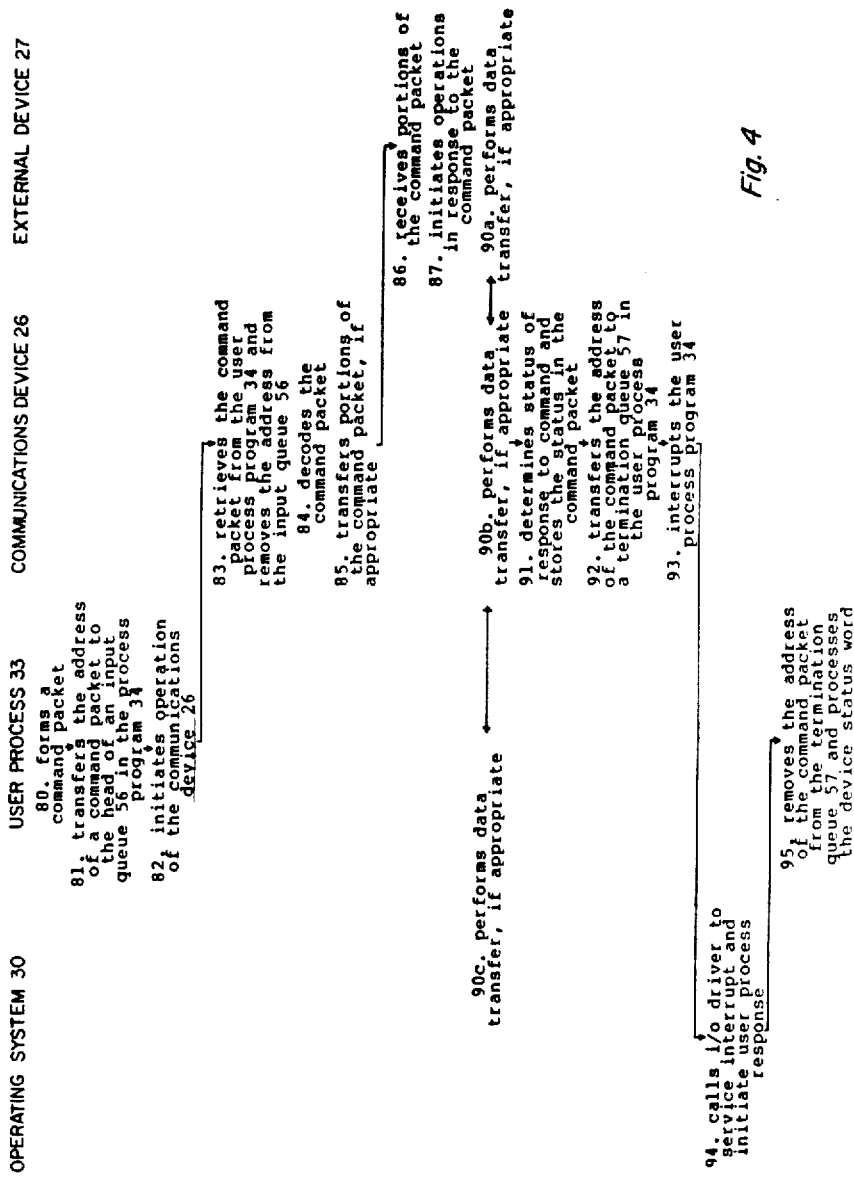
FIG. 4 is a chart that depicts the general sequence that occurs among the user process, communications device, and external device in accordance with this invention.

All these operations including variations on the basic sequence shown in FIG. 4 can be explained by considering transfers during a typical data processing system. The best example can be presented when the external device 27 is another data processing system as shown in FIG. 5.

b. Interconnected Data Processing Systems

Figure 5:
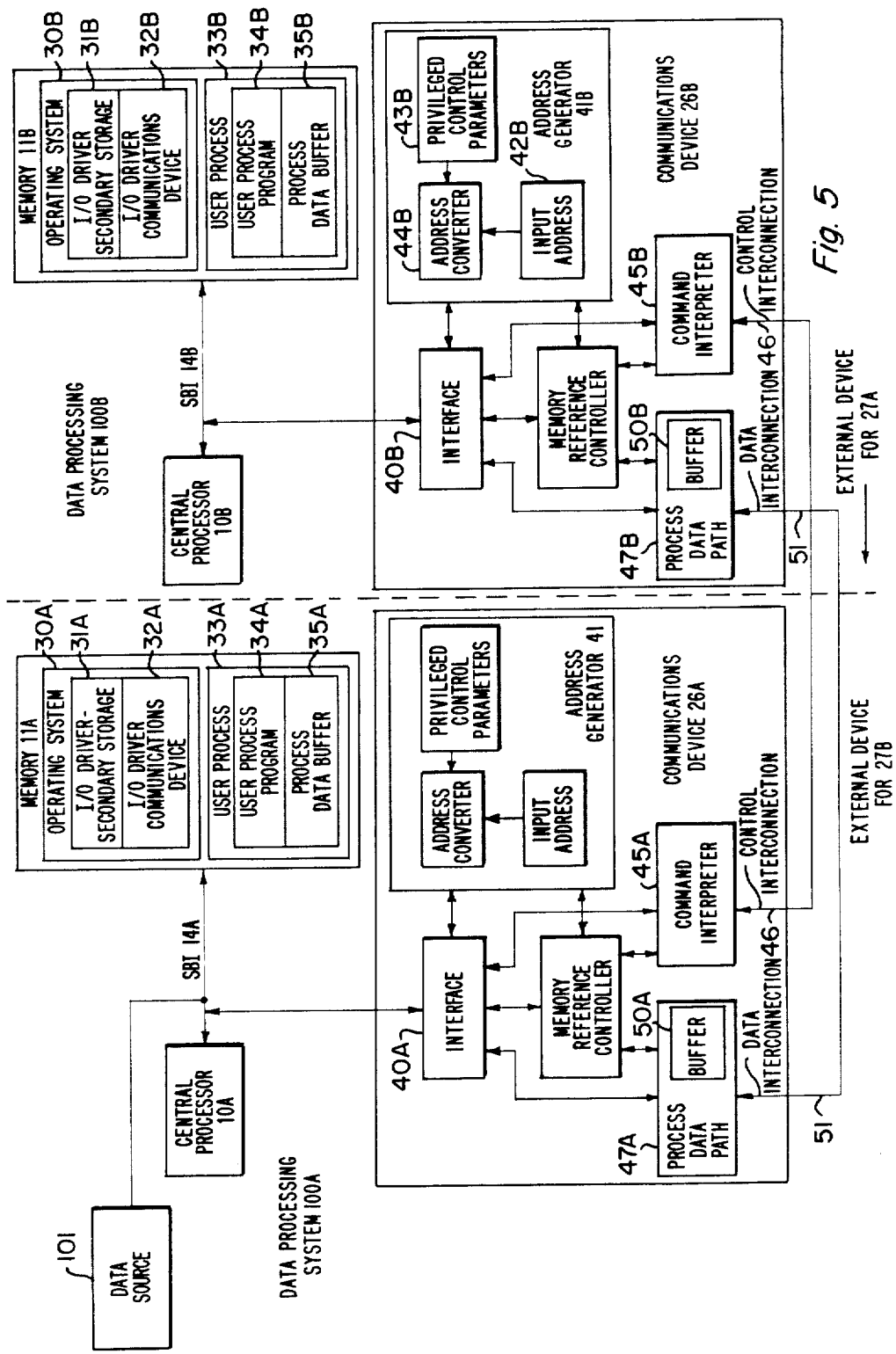
FIG. 5 is a block diagram that depicts communications devices constructed in accordance with this invention that interconnect two data processing systems.

FIG. 5 depicts two data processing systems: data processing system 100A to the left of FIG. 5, and data processing system 100B to the right of FIG. 5. Each element in FIG. 5 utilizes a reference numeral that designates a corresponding element in FIG. 2, with the addition of a letter suffix "A" to designate elements that are associated with the data processing system 100A and distinguish them from elements in the data processing system 100B. For example, the two central processors are designated with reference numerals 10A and 10B respectively. Moreover, the data processing system 100B including its communications interface 26B constitutes an external device 27A for the data processing system 100A including the communications device 26A. Similarly, the data processing system 100A including its communications device 26A constitutes an external device 27B for the data processing system 100B and the communications device 26B.

FIG. 5 also includes a data source 101 that connects to the SBI 14A. This may comprise an inputoutput device or a secondary storage facility or, depending upon the expected data transfer rates, even another communications device and its associated external device. For purposes of this explanation, it is assumed that the data processing system 100A retrieves data from the data source 100 and assembles this data into a form which permits its efficient processing. In such an application, the data processing system 100B then could be adapted to perform a few, specific functions. For example, the data processing system 100B might include a Fortran compiler for processing data.

In such an application, the user process program 34A includes instructions for transferring the assembled data from a process data buffer in the data block 35A through the communications devices 26A and 26B to a process data buffer in the data block 35B associated with the requested program to be processed by the data processing system 100B. Moreover it is assumed, for purposes of this description, that a user process program 34B in the data processing system 100B includes instructions for transferring additional data back to the data block 35A and for indicating to the data processing system 100A that the processed data has been returned successfully. This enables other portions of the user process program 34A to utilize the processed data.

The transfers of control among the operating system, the user processes, and the communications devices is depicted in FIGS. 6A through 6R.

Figure 6D:
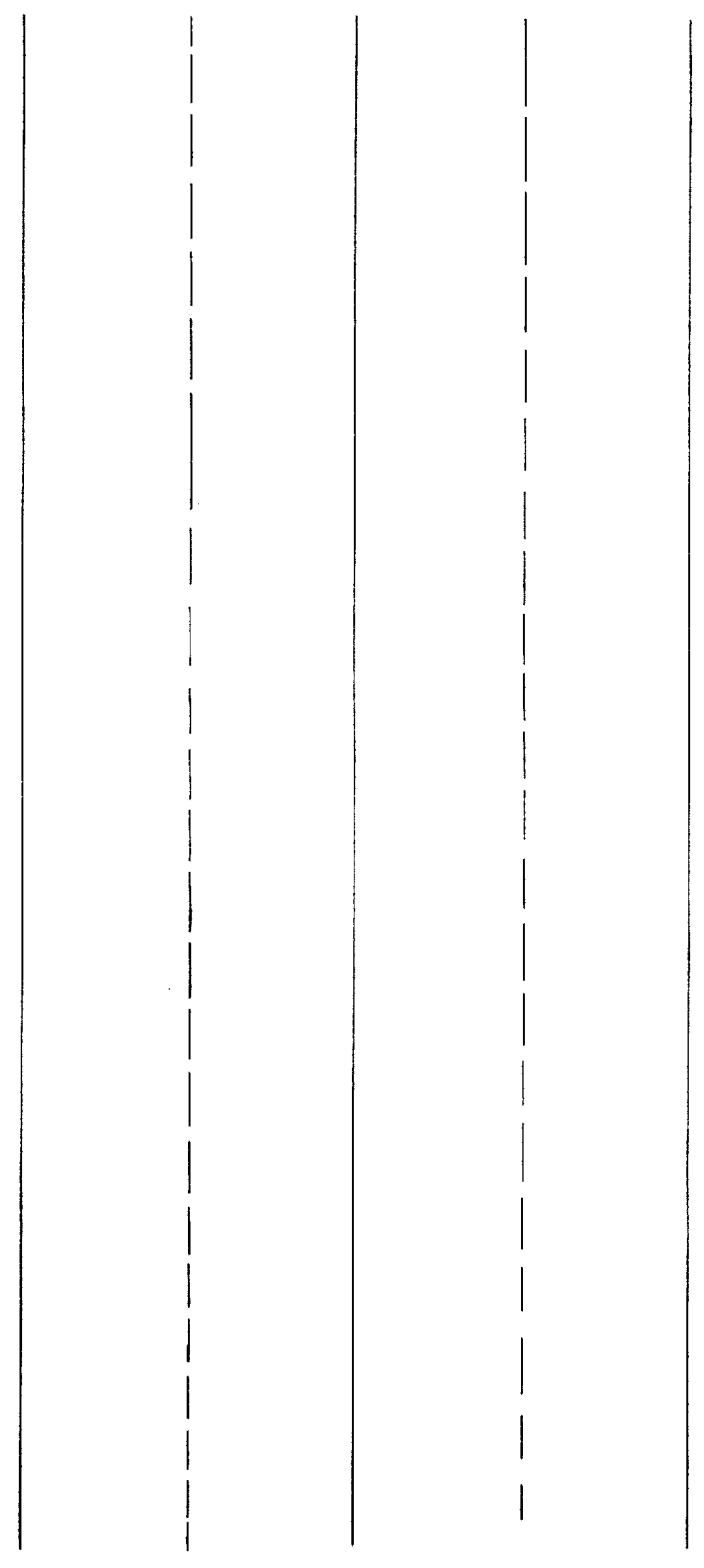
Figure 6E:
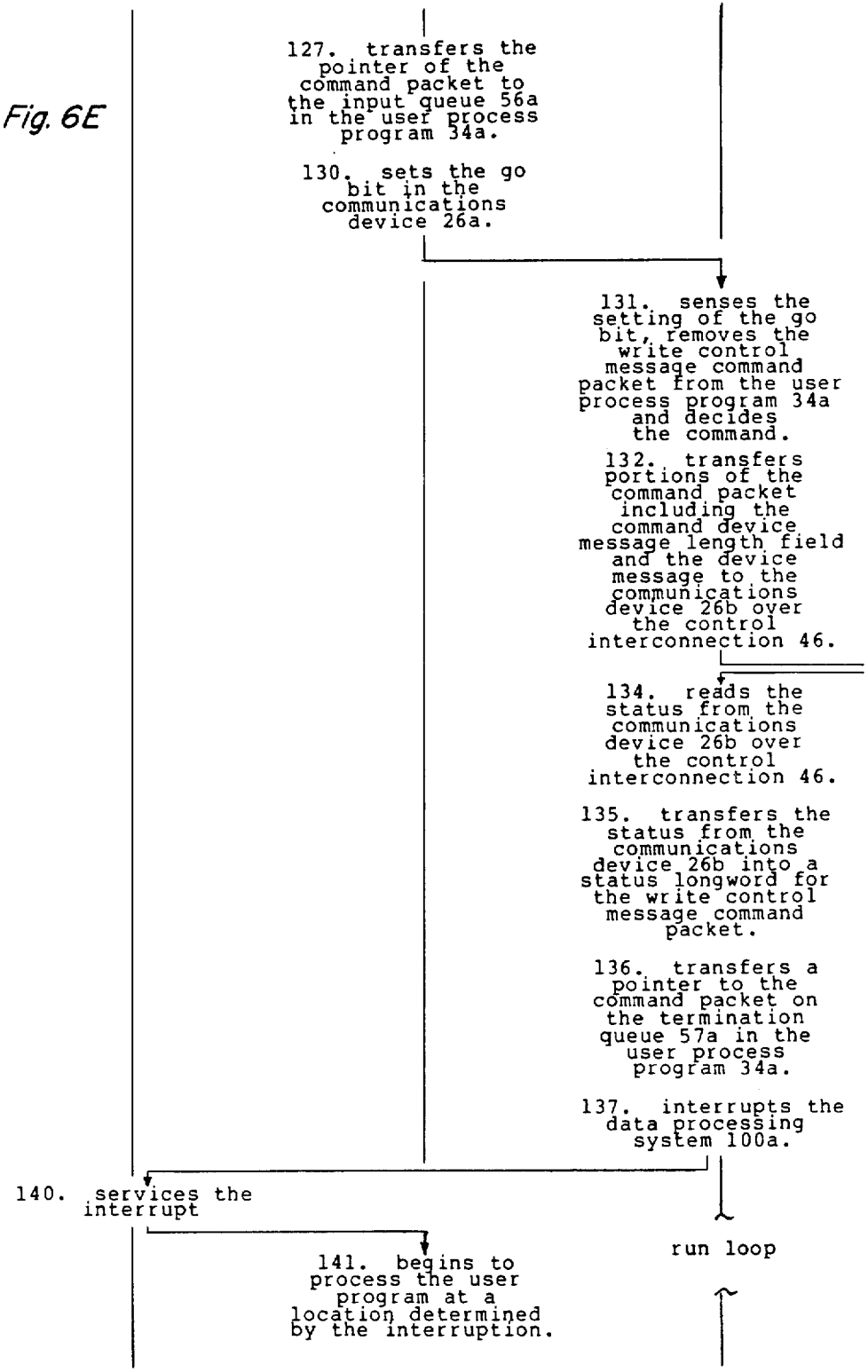
FIG. 6 depicts the relative positions of FIGS. 6A through 6R that provide a functional description of the various transfers that may occur between the communications devices shown in FIG. 5 and their respective data processing systems.

FIGS. 6A through 6R have a positional relationship as shown in FIG. 6. FIG. 6A and other vertically aligned figures (FIGS. 6C, 6E, . . . ) depict operations in the data processing system 100A while FIG. 6B and other vertically aligned figures (FIGS. 6D, 6F, . . . ) depict operations that occur within the data processing system 100B. The operations occur in a time sequence vertically as shown. Initially it is assumed that the communications device 26A in inactive while the communications device 26B is active. It is also assumed that the central processor 10B is not processing either the operating system 30B or the user process program 34B.

Referring to steps 101 through 104 in FIG. 6A, the user process 33A initiates operations through the communications device 26A. In step 101 the central processor 10A begins to process instructions in the user process program 34A and assemble data in the process data buffer 35A. The appropriate time to transfer the data to the process data buffer 35B for processing in the data processing system 100B is established in step 102. In step 103, the user process 33A establishes the virtual addresses of command packets and of process data buffers that correspond to those command packets. Once this preparatory information has been assembled, the user process 33A, in step 104, calls the I/O driver routine 32A for the communications device 26A.

The operating system 30A responds to this call by processing instructions outlined in steps 105 through 110. Many of these steps may have been performed earlier. In step 105, the operating system 30A transfers all necessary pages in the user process 33 to the memory 11A. The user process 33, or various portions of the user process 33, normally reside in a secondary storage facility such as a disk drive 25 (FIG. 1). The operating system 30A normally retrieves only those pages on which it is presently operating or expects to operate. Prior to a data transfer through the communications device, however, all process data buffers and command packets, such as those shown in FIG. 3, must be available in the random access memory 11 (FIG. 1). A number of conventional procedures are available for assuring that these portions of the user process are accessible in the memory 11.

Each user process program 34 includes a predetermined number of virtual memory addresses. In effect, each user process will have associated with it a particular virtual machine that can be defined in terms of its memory size. In step 106, the operating system 30A determines whether the virtual addresses that will be defined by the user process correspond to valid addresses for that user process. In one embodiment, user process program 34 contains starting virtual addresses and literals corresponding to the length of the virtual memory. The operating system 30 utilizes this information to ascertain that all the virtual addresses lie within the virtual memory address space assigned to the particular user process 33.

Next, the operating system 30A transfers several items of control information to the privileged control parameter circuit 43A. This information includes starting virtual addresses and lengths for each of the data blocks and command blocks, a system virtual address, mapping constants, and other information. In addition, the operating system 30A normally ascertains whether each page in the data block is capable of performing reading or writing operations. When step 107 has been completed, the address generator 41A has the capability of transmitting physical addresses directly onto the SBI 14A through the interface 40A in response to the information that the operating system 30A has transferred to it in step 107. Thus, the addresses can be generated without further use of the operating system.

When these, and other optional, operations have been completed, the operating system 30A terminates its operation by transferring a CLEAR HALT command to the communications device 26A in step 110. The communications device 26A responds to the CLEAR HALT command by becoming active. Specifically, the communications device 26A enters a RUN LOOP operation and scans for "events", an "event" representing a transfer of a command packet to the communications device 26A either from the user process 33A or from the user process 33B through the communications device 26B. In addition, the operating system 30A transfers control back to the user process 33A and in step 112 the user process 33A begins a series of operations that will produce interactions with the communications device 26A.

Specifically, in step 112 the user process 33A determines the status of the communications device 26A by forming a NO OP command packet that is shown in FIG. 7. As previously indicated, the NO OP command packet produces no response between the communications device 26A and the external device 27A, in this case the communications device 26B. However, it does cause the communications device 26A to return a device status longword to the user process 33A. The contents of the forward and backward links are described generally later. The byte count is ignored by the communications device when the command is NO OP. The data buffer virtual address and residual byte count words have no meaning. The status longword is initially cleared. The control word fields are all cleared except for the command field, which has a hexadecimal value of eight [i.e., 8(16)] the value of the command field of a NO OP command packet. Once the user process 33A forms this NO OP command packet, it transfers a pointer to the NO OP command packet to the head of the input queue 56A in the user process program 34A. Then the user process 33A executes an instruction which transmits a message to a control register in the communications device 26A which sets a GO bit. The user process 33A enters a WAIT state in step 113 during which no further action occurs within the user process 33A.

As previously indicated, the communications device 26A was placed in the RUN LOOP operating sequence in response to the CLEAR HALT command. It therefore tests for an ABORT command from the operating system 30A, incoming commands from the external device 27A, specifically the communications device 26B, and incoming commands from the user process 33A that set the GO bit. In step 114 of FIG. 6C, the communications device 26A senses that the user process 33A has set the GO bit; and then tests to determine whether a command packet has been received. Specifically, in step 115 the communications device 26A obtains the pointer to the NO OP command packet from the head of the input queue 56A and converts this pointer into a physical address thereby to transfer appropriate portions of the NO OP command packet into the communications device 26A. The command interpreter 45A responds to the NO OP command by testing the status of the external device 27A (i.e., the data processing system 100B) and forms a status longword for the NO OP command packet. If, as assumed, the communications device 26B is in the RUN LOOP operating mode, a signal on the control interconnection 46 indicates that the communications device 26B is operating. The communications device 26A forms a status longword in the command packet and, in step 117, inserts a pointer to the command packet on the termination queue 57A in the user process program 34A.

In step 120, the communications device 26A interrupts operations on the SBI 14A. The interruption occurs because the INTERRUPT CONTROL subfield in the control word establishes an unconditional interruption state that automatically generates an interruption each time a pointer to the command packet is placed on the termination queue 57A. After the interruption is requested, the communications device 26A reenters the RUN LOOP operating sequence in step 121 to await some subsequent event.

The operating system 30A initially processes the interruption (step 122) and transfers certain information concerning the interruption back to the user process 33A. In step 123 the user process 33A begins to process the user program at a predetermined location. The use of the operating system 30A to respond to an external interruption and then to vector operations to a particular position in a user program is well known.

When the user process 33A responds to the interruption, it retrieves the pointer to the NO OP command packet that is contained in the termination queue 57A to remove the NO OP command packet from the termination queue 57A (step 124). It then tests the status longword in step 125 to determine whether the operations in response to the NO OP command were successful.

Assuming a successful operation, the user process 34A then prepares to initiate a data transfer to the user process 33B. First, the user process 33A informs the user process 33B of the type of transfer it will perform, the virtual address of the base of user process 33A's buffer with respect to which the transfer will occur, and the number of bytes to be transferred. Specifically, in step 126 the user process 33A forms a WRITE DEVICE CONTROL MESSAGE command packet. FIG. 7B depicts a typical WRITE DEVICE CONTROL MESSAGE command packet. The packet control subfield establishes the unconditional interruption state and a state for suppressing length errors. The CIS field is ignored for this command. The COMMAND field has a value of of "04" corresponding to a WRITE DEVICE CONTROL MESSAGE command. The control word also specifies the length of the DEVICE MESSAGE, which is here assumed to be "k". The BYTE COUNT, VIRTUAL ADDRESS, and the two RESIDUAL BYTE COUNT fields have no meaning and the status longword is cleared. The DEVICE MESSAGE follows and contains "k" bytes represented by the "k" in the MESSAGE LENGTH field of the control word. The information in the DEVICE MESSAGE indicates to the data processing system 100B that the process data buffer 62A contains data to be processed in accordance with a particular function that is within the capability of data processing system 100B. Specifically, the DEVICE MESSAGE identifies the type of transfer that user process 33A will perform, with process 33B, the virtual address of user process 33A's buffer, and the number of bytes to be transferred, in consecutive longword fields.

Now referring to FIG. 6E, the user process 33A transfers the pointer of the command packet shown in FIG. 7B to the input queue 56A program 34A in step 127. In step 130 the user process 33A sets the GO bit in the communications device 26A thereby to transfer control to the communications device 26A.

In step 131, the communications device 26A leaves the RUN LOOP operating sequence established in step 121 and transfers appropriate portions of the WRITE CONTROL MESSAGE command packet directly from the command block of the user process program 34A so that the command can be decoded in the command interpreter 45A. Specifically, these portions include the COMMAND field, the MESSAGE LENGTH field, and the DEVICE MESSAGE field.

The command interpreter 45A transfers this information across the control interconnection 46 to be received by the command interpreter 45B as an external command.

Figure 6F:
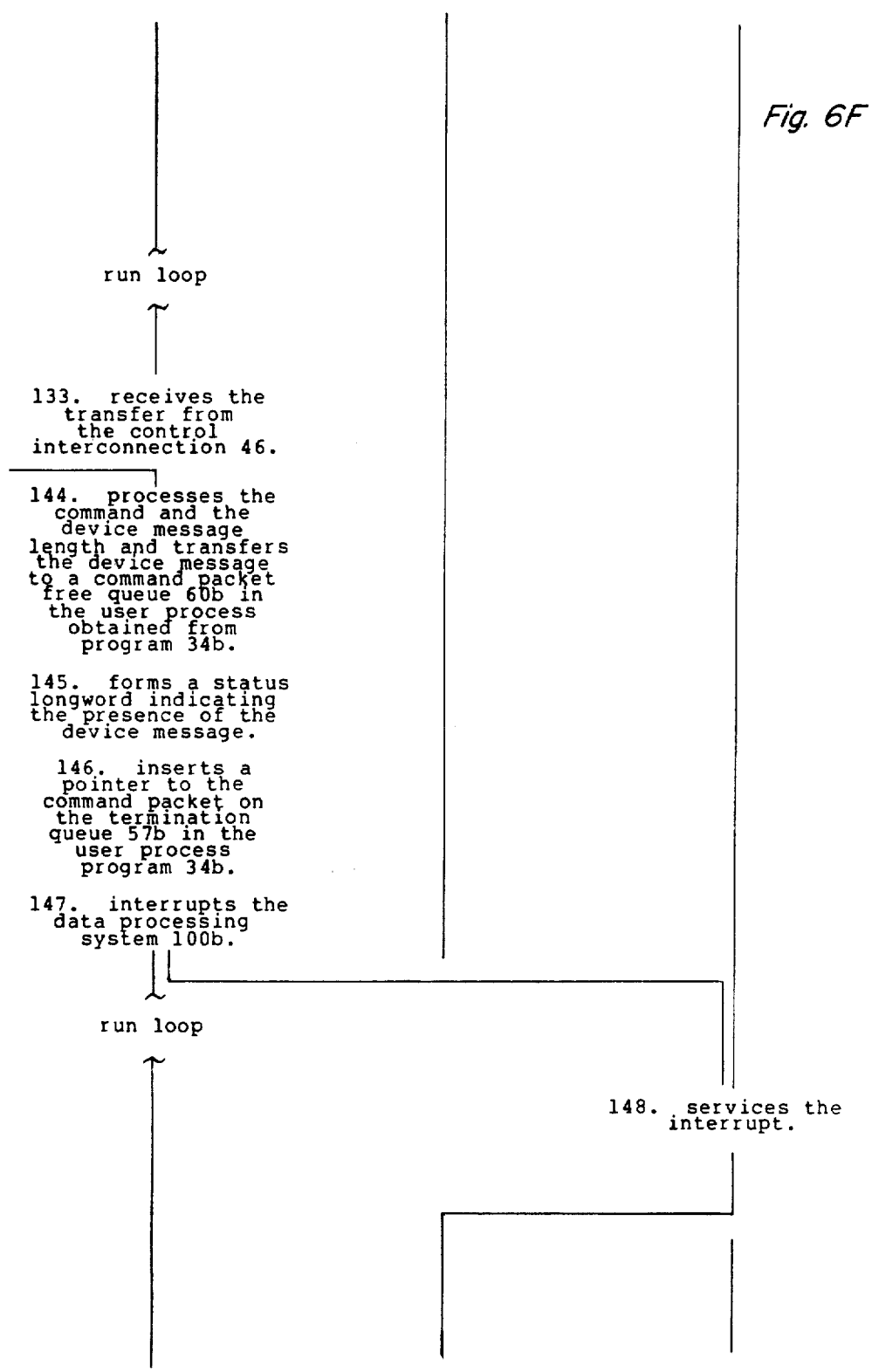

While the operating system 30A, the user process 33A, and the communications device 26A are operating as shown through step 130 in FIGS. 6A, 6C, and 6E, the communications device 26B is in the RUN LOOP operating sequence as shown in FIGS. 6B, 6D, and 6F. These last three figures also depict an apparent inactivity by the user process 33B and operating system 30B. There is no activity with respect to the external device 27B, namely the data processing system 100A and communications device 26A. However, it is possible for both the user proces 34B and operating system to be active in connection with other tasks. Thus, the data processing system 100B, as well as the data processing system 100A, may operate in a multi-processing mode in appropriate circumstances and applications.

The communications device 26B is in a RUN LOOP operating sequence and it accepts the transferred portions of the WRITE DEVICE CONTROL MESSAGE command packet in step 133 of FIG. 6F. Now both communications devices 26A and 26B perform different and independent operations simultaneously and require the utilization of their respective operating systems and user programs as shown in FIGS. 6E through 6H.

Referring specifically to FIG. 6E, the communications device 26A reads the status from the communications device 26B over the control interconnection 46 (step 134) and forms a device status longword for the WRITE DEVICE CONTROL MESSAGE command packet (step 135). In step 136 the communications device 26A transfers a pointer to the command packet onto the termination queue 57A. The communications device 26A also interrupts the data processing system 100A, as previously described with respect to the NO OP command packet, in step 137 and returns to the RUN LOOP operating sequence.

The operating system 30A services this interruption (step 140) and transfers operations back to the user process program at step 141. In step 142 (FIG. 6G), the user process program 34A retrieves the pointer to the WRITE DEVICE CONTROL MESSAGE packet from the termination queue 57A and, in step 143, tests the status word to determine whether the transfer to the communications device 26B was successfully accomplished. If the transfer is successful, the user process 33A is done until a subsequent data transfer has been completed.

While steps 134 through 143 are being processed, the communications device 26B responds to the receipt of the external command. Specifically, the device 26B processes the command and device message length fields and transfers the device message to a command packet that is formed in a free queue 60B obtained from the user process program 34B (step 144). Then the communications device 26B forms a status longword indicating the presence of the device message (step 145) and, in step 146, inserts a pointer to the command packet on the termination queue 57B in the user process program 34B. In step 147, the communications device 26B interrupts the data processing system 100B and enters the RUN LOOP operating sequence.

Figure 6H:
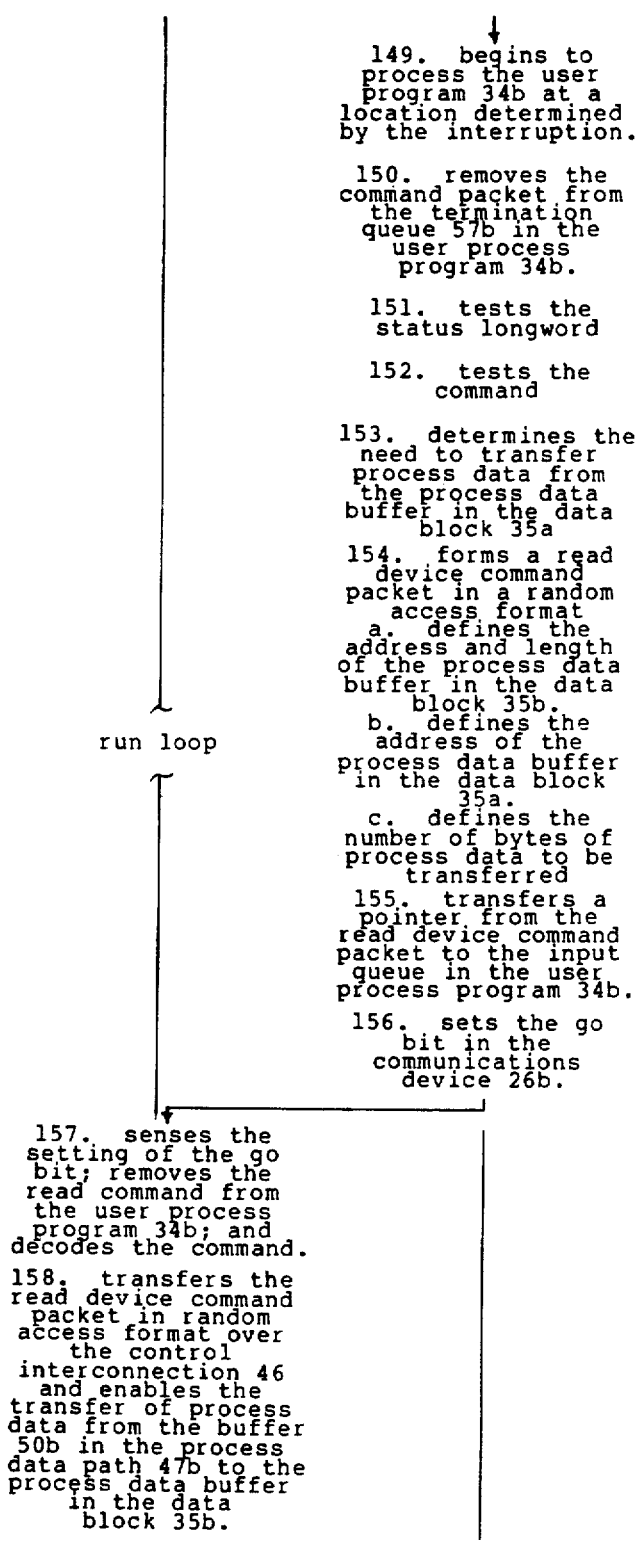

The interruption response of the data processing system 100B is analogous to the response of the data processing system 100A. Specifically, the operating system 30B services the interruption in step 148 and vectors further operations to a predetermined location in the user program 34B in step 149 (FIG. 6H). The user process program 34B removes the pointer to the command packet from the termination queue 57B in step 150 and tests the status longword in step 151. The status word indicates the receipt of the command from the external device 27B (i.e., the communications device 26A). In step 152, the user process tests the command field and, in step 153, determines the need to transfer process data from the process data buffer 62A to a corresponding process data buffer 62B.

The transfer of process data can now occur. In step 154, the user process program 34B forms a READ DEVICE command packet in a random access format (FIG. 7C) that will enable the communications device 26A to respond. It contains forward and backward links. The PKT CTRL field is zero, indicating an unconditional interruption state and a suppression of length errors. The CIS field has a value of "3", indicating that the COMMAND CONTROL field, the byte count field and device message field are to be transmitted to the COMMAND register in the external device 27B (specifically, the command interpreter 45A in FIG. 5). The COMMAND field, which was obtained from the command longword in the DEVICE MESSAGE field in the WRITE DEVICE CONTROL MESSAGE command packet from user process 33A, has a value "0" corresponding to the READ DEVICE command. The LLA field, the length of the LOG AREA is zero, as this command does not involve a LOG message. The LDM field, the length of the DEVICE MESSAGE is four. The BYTE COUNT field, which was obtained from the respective field in the DEVICE MESSAGE in the WRITE DEVICE CONTROL MESSAGE command packet from user process 33A, has a value "n". The virtual address of the user process 33B's data buffer 62 in FIG. 3 into which the data from user process 33A will be transferred is included after the byte count. Both the memory and external device residual byte counts are also set to "0".

The device message field contains the virtual address of user process 33A's data buffer with respect to which the transfer will occur, which was obtained from the respective longword in the DEVICE MESSAGE field in the WRITE DEVICE CONTROL MESSAGE command packet from user process 33A.

Following the basic sequence in FIG. 4, the user process 33B transfers a pointer to this command packet to an input queue in the user process program 34B (step 155). Then the user process 33B uses step 156 to transfer a control word to the memory reference controller 52B in the communications deviche GO bit.

In step 157, the communications device 26B transfers the READ DEVICE COMMAND packet in FIG. 7C directly from the user process program 34B to the memory reference controller 52B in the command interpreter 45B. When the COMMAND field that defines the READ DEVICE operation is decoded, the command interpreter 45B uses step 158 to transfer the command in a random access format over the control interconnection 46. Command interpreter 45B also transfers the virtual address from the DEVICE MESSAGE field and the byte count from the READ DEVICE command packet to command interpreter 45A. This enables the transfer of process data from the process data buffer in the data block 35A through the process data path 47A, the data interconnection 51, and the process data path 47B to a designated process data buffer in the data block 35B.

When the command interpreter 45A receives the READ DEVICE COMMAND, the virtual address and the byte count, in step 159 (FIG. 6I), the communications device 26A utilizes the information in the address generator 41A to determine that the READ DEVICE COMMAND packet is properly identified. This enables the transfer of process data to begin.

In step 161, the memory reference controller 52A responds to the command in the command interpreter 45A and address information in the address generator 41A to begin transferring process data from the process data buffer in the data block 35A. The address for each data item is generated by the address generator 41A and so is independent of the central processor 100A including the operating system 30A. Moreover, the memory reference controller 52A routes the retrieved data from the SBI 14A to the buffer 50A in the process data path 47A. When the buffer 50A contains data at its connection to the data interconnection 51, the process data is transferred onto the data interconnection 51 along with control signals which then transfer the data into the buffer 50B.

Figure 6J:
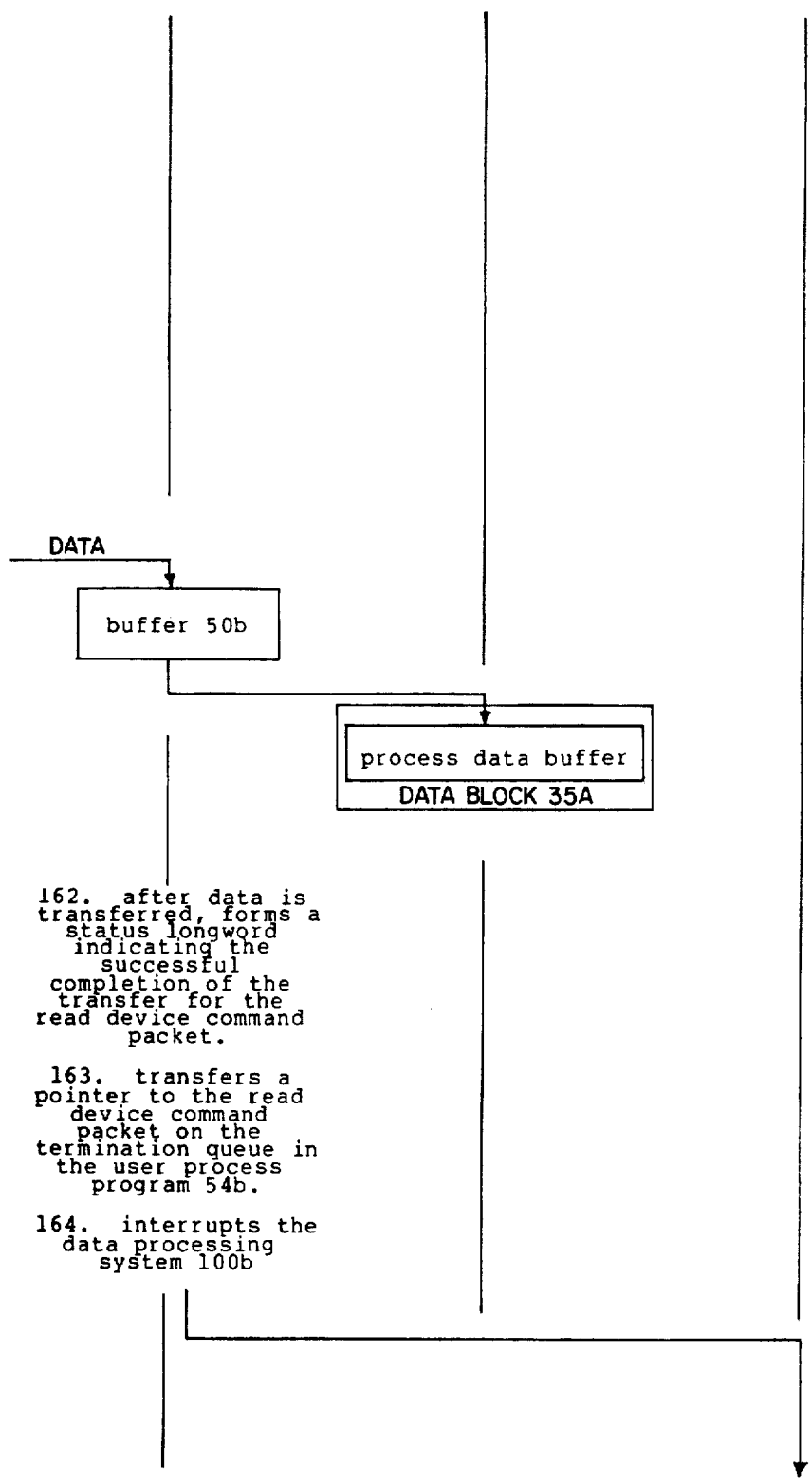
Figure 6K:
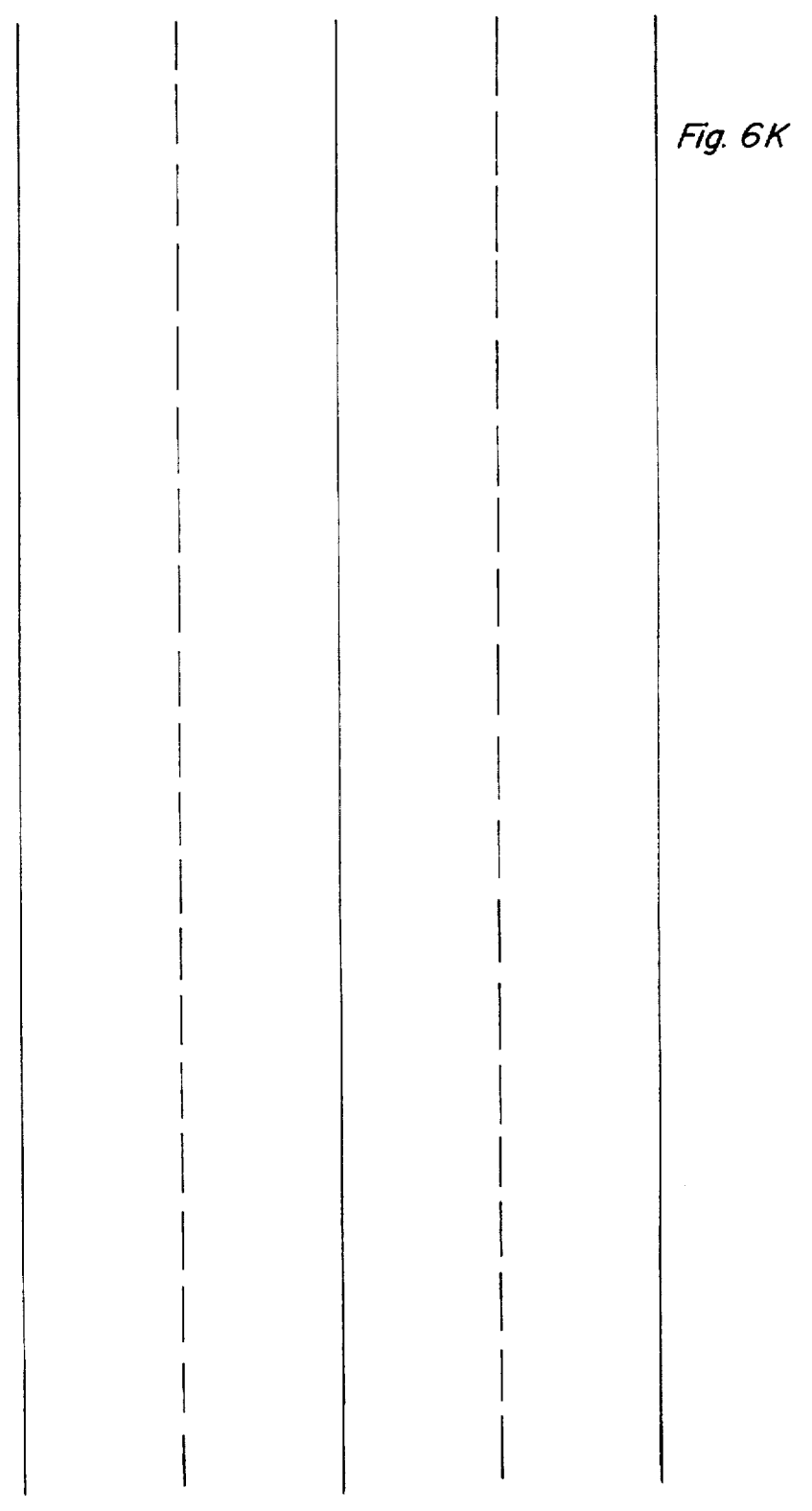
Figure 6L:
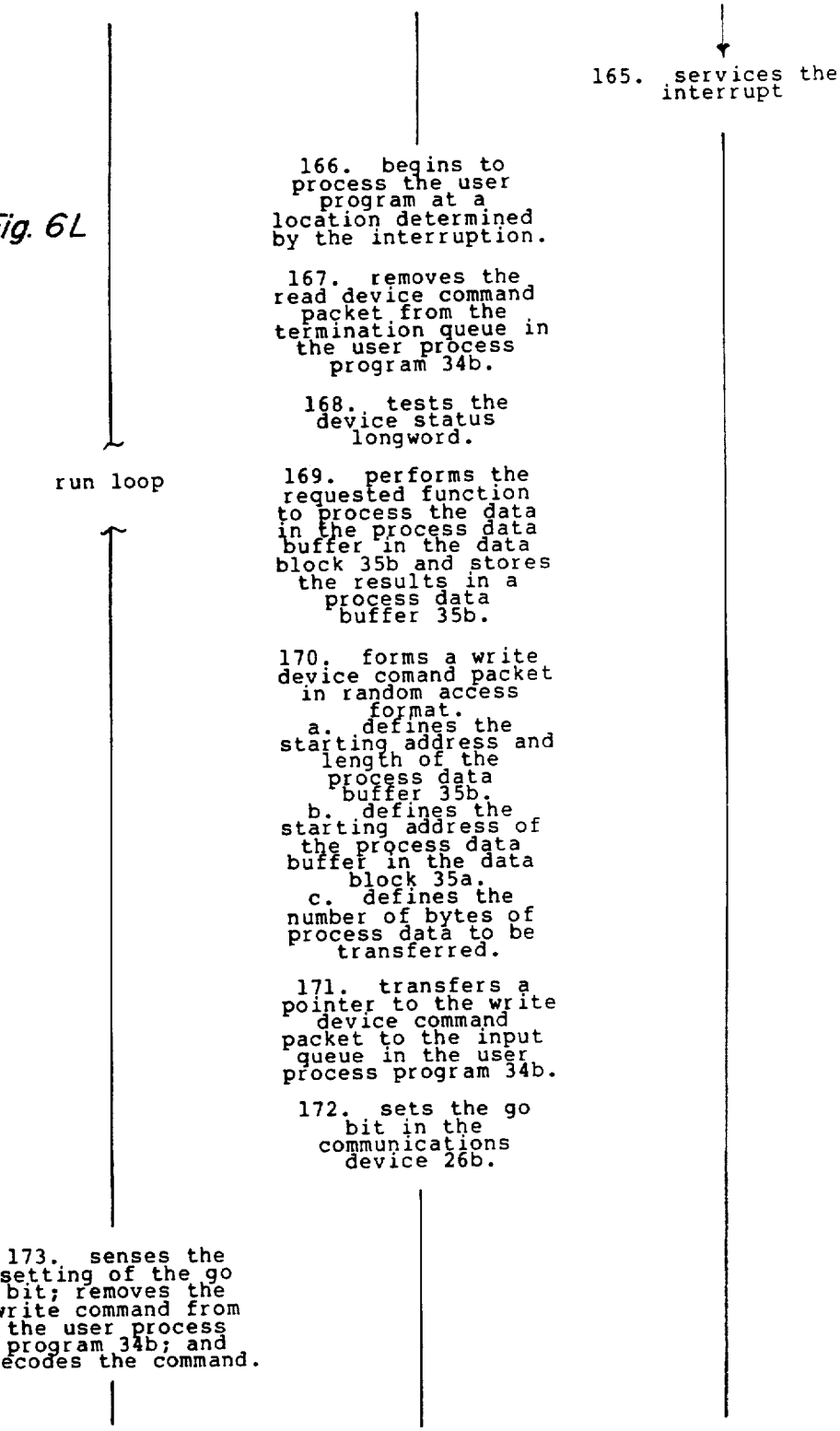

The communications device 26B processes the READ DEVICE COMMAND by sensing the presence of incoming process data at the connection between the buffer 50B and the interface 40B, thereby to begin transferring data through the interface 40B and the SBI 14B into the process data buffer in the data block 35B (FIGS. 6I and 6J). The address of each location in this process data buffer 35B is identified by the address generator 41B. Each time a data longword is transferred, the memory reference controllers 52A and 52B update or alter their residual byte counts. The memory residual byte count is altered each time a transfer occurs between the process data path buffer and the memory; whereas the external device residual byte count is altered each time a transfer occurs over the data connection.

When all the data has been transferred, the byte counts will be zero. The communications device 26B then forms a status longword indicating the successful completion of the transfer in step 162 (FIG. 6J). As previously indicated, a pointer to the READ DEVICE command packet with the new device status longword is then transferred to a termination queue in the user process program 34B. This causes the communications device 26B to interrupt the operation of the data processing system in step 164, whereupon the operating system 30B services the interrupt in step 165 (FIG. 6R). Once the interruption has occurred, the communications device 26B begins the RUN LOOP operating sequence and awaits the occurrence of the next event.

After the operating system services the interruption, the user process program 34B in FIG. 5 uses step 166 (FIG. 6L) to begin processing of a user program that is determined by the interruption. That user process program removes the READ DEVICE command packet from the termination queue in step 167 and tests the device status longword in step 168. This completes the operations for transferring the process data to the data processing system 100B. In step 169, the user process 33B processes the data in the data block 35B in accordance with the program or function that had been requested in the WRITE DEVICE CONTROL MESSAGE command packet. The results would be stored in another process data buffer in the data block 35B, assuming, for example, that the results are to be returned to the data processing system 100A. It is assumed that this process data buffer has an initial virtual address VA(b) and that "n" data bytes will be transferred.

In step 170, the user process 34B forms a WRITE DEVICE command packet in a random access format as shown in FIG. 7D. The PKT-CTRL field again has a zero value to provide an unconditional interruption state and to suppress length errors. The CIS field has a value of "3". The command interpreter 45B responds to this CIS field by transmitting the COMMAND field, the BYTE COUNT field, and the DEVICE MESSAGE field to the command interpreter 45A. The COMMAND field has a value of "2", indicating a WRITE DEVICE command. The byte count word contains the value "n2". The data buffer virtual address contains "VA(b)", which is the address of the first location of the data to be transferred in the data block 35B. The residual byte counts are set to zero. A zero value is in the device status longword. The LDM field in the control word contains a value "4" that indicates that the DEVICE MESSAGE field contains "4" bytes. With this WRITE DEVICE COMMAND packet, the device message would be the virtual address of the command of the process data buffer in the memory 11A, VA(i−1).

Once this command packet is formed and the GO bit is set (steps 171 and 172), the functions of which have been described previously, the communications device 26B retrieves the WRITE DEVICE COMMAND packet directly from the user process program 34B and decodes that packet in step 173. In step 174 in FIG. 6N, the communications device 26B enables the command interpreter 45B to transfer the command field, the byte count, and the device message to the command interpreter 45A over the control interconnection 46. In addition, the memory reference controller enables the transfer of the virtual address into the address generator 41B and enables a data path from the memory 11B through the SBI 14B, the interface 40B, and the process data path 47B to the data interconnection 51.

When the command interpreter 45A in the communications device 26A receives the control information in step 175 of FIG. 6M, the communications device 26A uses the DEVICE message to define the virtual address of the data buffer to receive the information. If the information were to be stored in the process data buffer 62, the DEVICE message would include the virtual address VA(i−1). The address generator 41A uses the privileged control parameter circuit 43A to determine the validity of this virtual address. In step 177, the communications device 26A enables the address generator 41A to produce physical addresses of the process data buffer 64 and enables a data path from the data interconnection 51 through the process data path 47A and the interface 40A over the SBI 14A to the process data buffer 62 in the data block 35A.

Then the transfer occurs. Specifically, data is transferred from the data block 35B into the buffer 50B. It is also transferred from the buffer 50B through the data interconnection 51, into the buffer 50A and from the buffer 50A to the memory 11A. As will be apparent, this transfer, like the prior transfers, occurs without any intervention of either the operating system or the user program.

Once the transfer is complete, the communications device 26B determines the status of the communications device 26A (step 179 in FIG. 6N) and forms a device status longword indicating a successful completion in step 180 (FIG. 6P). A pointer to the WRITE DEVICE command packet is transferred into the termination queue in the user process program 34B in step 181. As previously indicated, this transfer initiates an interruption of the data processing system 100B in step 182, whereupon the communications device 26B shifts back into a RUN LOOP operating sequence.

In response to the interruption, the operating system 30B services the interrupt in step 183, so the user process program 34B begins to process the user program at a predetermined location in step 184. This program removes the WRITE DEVICE command packet from the termination queue in step 185 and tests the status longword including the status of the communications device in steps 186 and 187. The device 26B then forms a WRITE DEVICE CONTROL MESSAGE command packet that is analagous to the command packet shown in FIG. 7B. This packet includes a DEVICE message that indicates that the transfer of the results has occurred. Once the packet is formed, it is placed on the input queue in step 189 and the GO bit in the communications device 26B is set in step 190. Then the communications device 26B removes the WRITE DEVICE CONTROL MESSAGE command packet from the input queue in step 191 and transfers it through the command interpreter 45B over the data control interconnection 46 to the command interpreter 45A.

As previously indicated, operations then commence in both the communications device 26A and 26B simultaneously. Referring first to the continued operations in the communications device 26B as shown in FIG. 6R, the status from the communications device 26A is received over the control interconnection 46A in step 193 and this status is then transferred into a device status longword that is formed in step 194. The command packet is then placed on the termination queue in step 195 to initiate an interruption of the data processing system 100B in step 196. When this occurs, the communications device 26B has completed all activity in connection with the transfer and returns to the RUN LOOP operating sequence.

In step 197, the operating system 30B services the interrupt and transfers operation back to the user process program in step 198. At this point, the user process program 34B transfers to step 199, wherein the status longword is obtained and tested in step 200. Assuming that all the transfers have been properly performed, the user process 33B is then completed and the data processing system 100B returns to other operations or awaits the receipt of a next command from the data processing system 100A.

Figure 6Q:
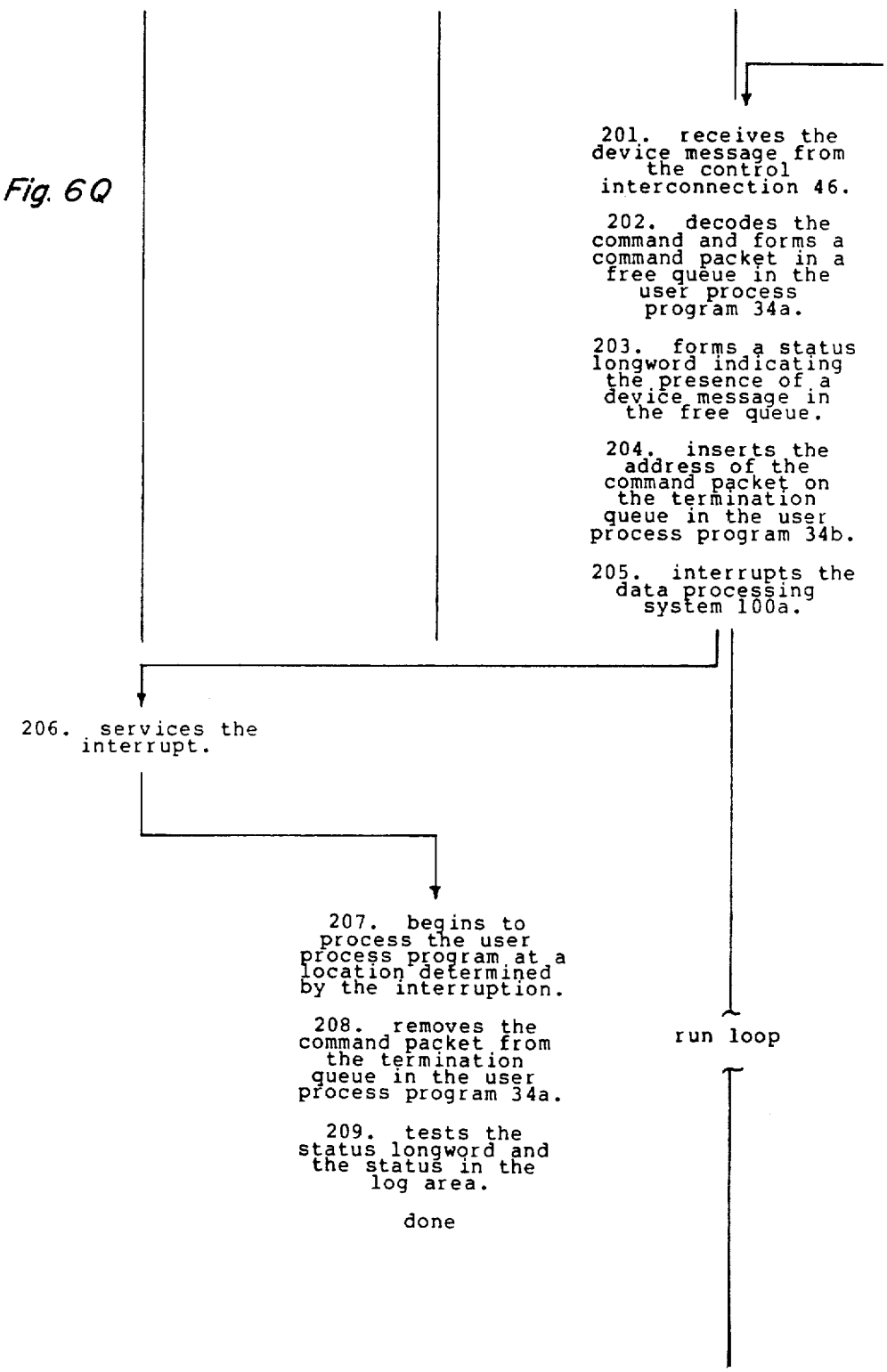

When the transfer over the control interconnection 46 occurs in step 192 of FIG. 6R, the command interpreter 45A receives the DEVICE message in step 201 of FIG. 6Q, decodes the command, and forms a command packet in a free queue in the user process program 34A in step 202. This includes the formation of a status longword indicating the presence of a device message in the free queue in step 203. Then the command packet is placed on the termination queue in step 204 to effect an interruption in step 205. This completes the operation of the communications device 26A, and it shifts back to a RUN LOOP operating sequence. As a result of the interruption, the operating system services the interrupt in step 206. The user process program then utilizes steps 207 through 209 to remove the command packet from the termination queue, and test the status word and the status of the log area to then determine that all processes have been completed and that the results have been stored in the process data buffer 35A.

An analysis of FIG. 6 illustrates the advantages of the communications device 26A and the reason it greatly facilitates the transfer of information from an external device to memory. First, the communications device controls all the data transfers between the external device and memory and nearly all transfers between itself and the memory. Once an address generator has received the privileged address information, it can generate addresses without any further intervention by the operating system with its attendant transfers over the SBI. Consequently the operating system is used on only a limited basis for servicing interruptions. This portion of the operating system is relatively compact and, in proper circumstances, can be stored in the memory 11A during such a transfer in order to further minimize transfers with secondary storage systems and the memory. Fourth, each transfer occurs independently of the operations in the central processor 10A or 10B. All this greatly reduces total number of transfers over the SBI 14 of the operating system or of other programs which are in the nature of "overhead" transactions as opposed to transactions involving the transfer of process data. Thus, once the data is ready to be transferred, the transfers occur without any significant overhead and the effective rate is, therefore, increased.

B. Specific Implementation

FIGS. 2 and 5 depict communications devices with functional elements, and the foregoing description sets forth a typical use of the communications devices that are constructed in accordance with this intention. With an understanding of this general structure and operation as background, the following description and the remaining drawings disclose a specific embodiment of a communications device that operates in accordance with the functions that have been described previously. This particular embodiment utilizes microprogramming techniques for controlling various data paths that exist within the communications device. The microprogramming control portions of the communications device, therefor, include circuits for performing multiple ones of the particular functions that are set forth in FIGS. 2 and 5.

Figure 8:
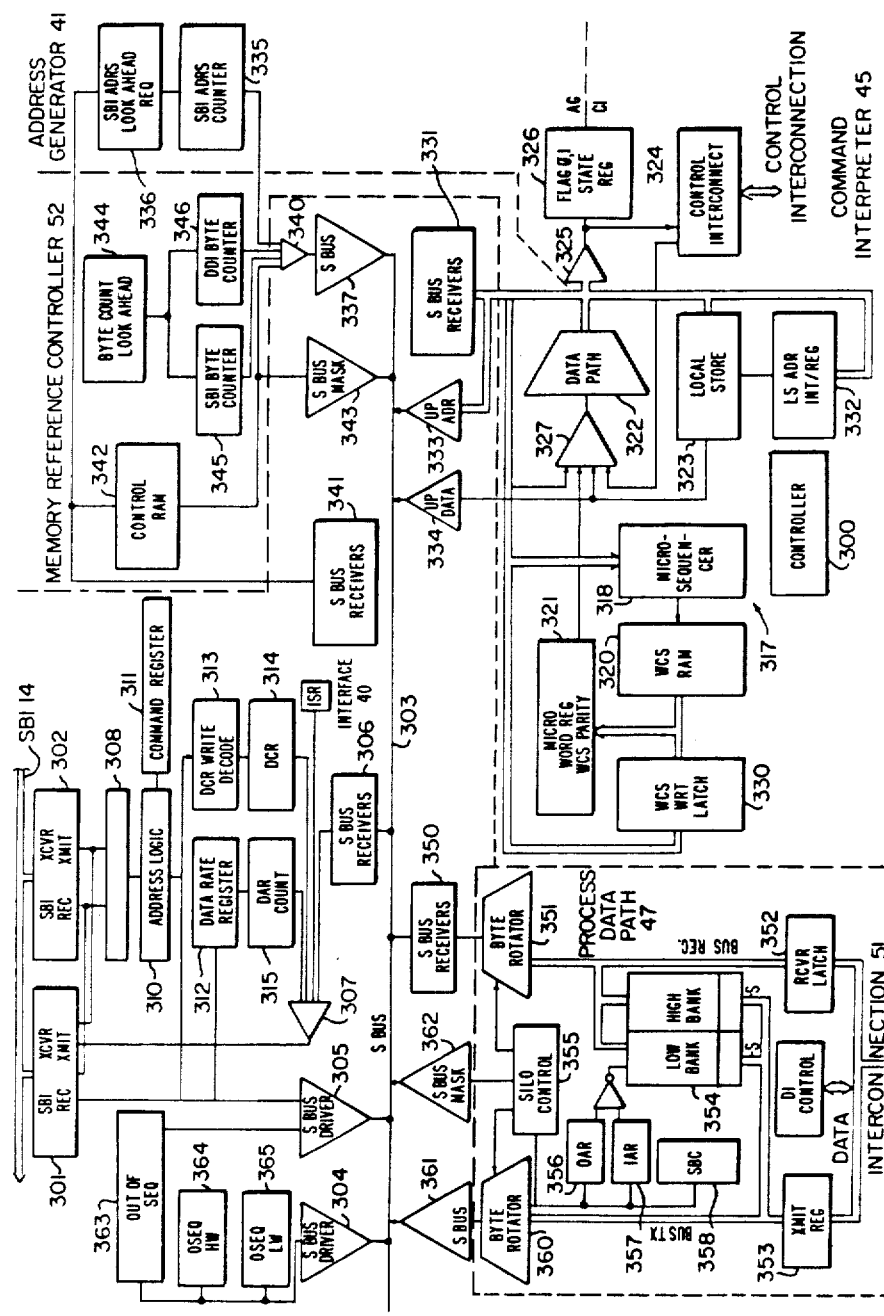
FIG. 8 is a block diagram of a specific embodiment of a communications device constructed in accordance with this invention.

FIG. 8 depicts the data paths that are incorporated in this specific embodiment. Dashed lines on FIG. 8 generally depict the position of the functional blocks that are shown in FIGS. 2 and 5. It is believed that the best understanding of the construction and operation of this specific embodiment can be attained by first describing the data paths and then describing various basic operations that involve the communications device and the response of the communications device to some specific commands. More particularly, the basic operations for transferring information between the communications unit and the SBI 14, the basic operation of the controller, and the specific operations of the communications device in connection with addressing, and communications over the control interconnection 46 and data interconnection 51 are discussed. An ABORT command, a NO OP command, and a WRITE DATA command, and variations of the WRITE DATA command for command and data chaining are described in detail.

1. The Data Paths

Still referring to FIG. 8, the communications device includes an SBI interface 40 which connects between SBI 14 and an interconnecting bus, designated SBUS 303, and includes transceiver circuits 301 and 302 that connect to the SBI 14. SBUS drivers 304 and 305, SBUS receivers 306, and a multiplexing circuit 307 in the interface 40 transmit and receive signals from the SBUS 303. More specifically, direct communications between the SBI 14 and the SBUS 303 are provided through the SBUS drivers 305 while signals from the SBUS receivers 306 are coupled through the multiplexer 307 back to the transceivers 301 and 302.

A data and control circuit 308 also connects to the transceivers 301 and 302. It establishes paths for various information, primarily control information, that is to be received from and transferred to the SBI 14. Specifically the data and control circuit 308 connects to address logic circuit 310 and command register 311. Signals from the transceivers are also coupled to a data rate register 312 and to a DCR WRITE decoder 313. The DCR WRITE decoder controls a DCR register 314 that provides another input to the multiplexer 307. The data rate register 312 connects to a data rate counter 315 that also provides an input to a multiplexer 307. The other input to multiplexer 307 is an instruction state register (ISR) 316.

The controller 300 connects, as described more fully later, to a microprocessor 317 that includes a microsequencer 318. In one specific embodiment, the microsequencer 318 comprises an AM2909 microprogram sequencer sold by Advanced Micro Devices, Inc., of Sunnyvale, Calif. The microsequencer provides address signals to a writeable control store (WCS RAM) 320. The writeable control store 320 contains microinstructions. Transfers to and from the writeable control store 320 are monitored by a microword register and WCS parity circuit 321. A microword register in the circuit 321 provides various signals that enable transfers to and from other registers based on the microinstructions provided by the writeable control store 320.

A data path circuit 322 comprising, in one embodiment, multiple microprocessor slices such as AM2901 four-bit, bipolar microprocessor slices that also are sold by Advanced Micro Devices, receives address and control information from the writeable control store 320 and the microword register in the circuit 321 and also processes information from a local store 323.

The command interpreter 45 from FIG. 2 comprises a control interconnect circuit 324 that receives signals from the data path circuit 322 through a driver 325. A FLAG 0,1 and STATE register 326 provides signals that are used by both the command interpreter 45 and the address generator 41.

An input multiplexer 327, that is also part of the microprogram slice, receives signals from the output of data path circuit 322, from the local store 323, from the control interconnect circuit 324, and from the microword register in the circuit 321.

The writeable control store 320 transfers the microinstruction through a writeable control store write (WCS WRT) latch 330. More specifically, the microinstructions are coupled from the SBI 14 through the transceivers 301 and 302, the SBUS driver 305, and SBUS receivers 331 to the input of the WCR WRT latch 330. The address in the writeable control store 320 is provided by the microsequencer 318 as described more fully later. Specific addresses may be provided based on certain conditons in the communications device.

A local store address register 332 receives signals from the output of the data path circuit 322 and provides address signals to the local store 323. Information from the microprocessor control 317 can also be transmitted to the S BUS 303 through microprocessor address drivers 333 and data drivers 334.

The address generator 41 includes an SBI address counter 335 and an SBI address lookahead register 336. An S BUS driver 337 couples a selected output from a multiplexer 340 to the S BUS 303. The address counter 335 provides one input to the multiplexer 340.

The memory reference controller 52 receives signals from SBUS receivers 341 that also connect to the SBI address lookahead register 336. A control random access memory unit 342 also receives information from the receivers 341 and transmits information onto the S BUS 303 either through the multiplexer 340 and drivers 347 or through an SBUS mask driver 343. The controller 52 also includes a byte count look ahead counter 344 that receives a byte count from the SBUS receivers 341. An SBI byte counter 345 tracks transfers between the process data path 47 and the SBI 14. A DDI byte counter 346 tracks byte transfers between the external device and the process data path 47.

The process data path 47 conveys data that is received from the SBI 14 through the interface 40, including SBUS receivers 350, to the data interconnection 51. Specifically, a byte rotator 351 and receiver latches 352 in the process data path couple the data to the data interconnection 51 along with various control signals. Data from the external device is coupled from the data interconnection 51 through a transmitting register 353 and into a silo memory 354. A silo control 355, an output address register 356, an input address register 357, and a silo byte count circuit 358 control the transfer of process data into and out of the silo memory 354. Process data is transmitted from the silo memory 354 through a byte rotator 360 and an SBUS driver circuit 361 to the S BUS 303. An SBUS mask driver 362 is also connected to the S BUS 303 and operates in response to signals from the silo control 355.

When information is being transferred into the silo 354, a predetermined sequence occurs. Circuitry including an out-of-sequence control circuit 363, an OSEQ HW latch 364 and an OSEQ LW latch 365 drive the SBUS driver 304 during these operations.

2. Basic Operations

There are certain basic operations that occur in the communications unit shown in FIG. 8 during the operations that are outlined with respect to FIG. 6. Some transfers involve command packets and process data; other transfers involve control information. Examples of the later types of transfers include the steps of transferring the microcode into the WCS memory 320 under the control of the operating system. The transfer of a CLEAR HALT command in step 110 in FIG. 6A is an example of a transfer to a control area of the communications device. At various times, information in any of the control registers, such as the data and control register 308, information from the microsequencer 318, or from the latch 330 might be involved. Analogous information can be transferred to and/or from the byte counters 345 and 346, the control random access memory 342, the address lookahead register 336, and the local store address register 332.

3. Data Processing System Transfers

Figure 9:
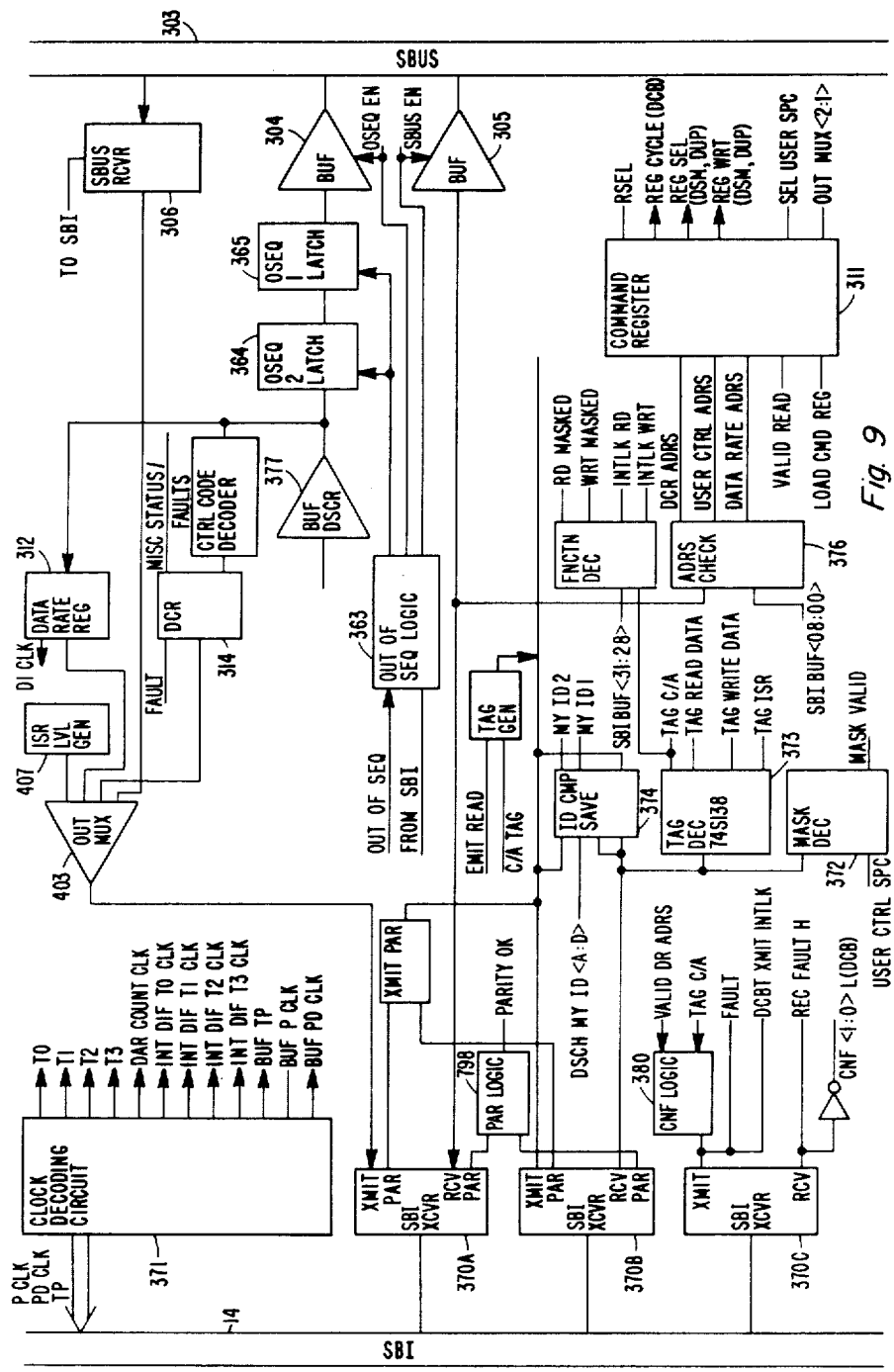
FIG. 9 is a block diagram of the interface 40 shown in FIG. 8.

Each of the foregoing transfers involves a transfer with other components or elements in the data processing system over the SBI 14. Such a transfer occurs through the SBI interface 40. FIG. 9 shows a detailed block diagram of interface 40 including SBI transceivers 370A, 370B and 370C. As described in the foregoing U.S. patent application Ser. No. 945,061, each transfer involves a number of signals, including transfer request signals, information signals, parity signals, tag signals, identification signals, fault signals and confirmation signals. Each SBI transfer requires two or three sequences of transaction intervals which are defined by timing signals transmitted over preassigned conductors in the SBI. SBI transceivers 370A receive parity and information signals from the the SBI 14. SBI transceivers 370A also transmit information and associated parity signals onto the SBI 14. SBI transceivers 370B similarly receive and transmit the ID signals, tag signals and mask signals from and to the SBI 14. Signals from the transceivers 370B are received in a mask decoder 372, a tag decoder 373 and an ID comparator 374. SBI transceivers 370C transmit and receive fault and confirmation signals to and from the SBI 14. A clock decode circuit 371 decodes clock signals from the SBI 14 to generate clocking signals that are depicted in FIG. 9.

As further described in the foregoing U.S. Patent Application, each transfer sequencecomprises a discrete number of bus cycles during which different functions occur. If the user process or operating system controls the transfer, the central processor is a commander nexus, and, after gaining access to the SBI 14, it issues a command/address word that identifies a data transfer function and the address to which or from which the data is to be transferred. If a write transfer is to be performed, one or two successive sequences are used to transfer the data from the commander nexus. If the command is a read command, the responder nexus will issue the data in one or two sequences that follow, usually after some delay. Both the read and write operations can produce the transfer of one or two longwords in succession.

Figures 10, 10A:
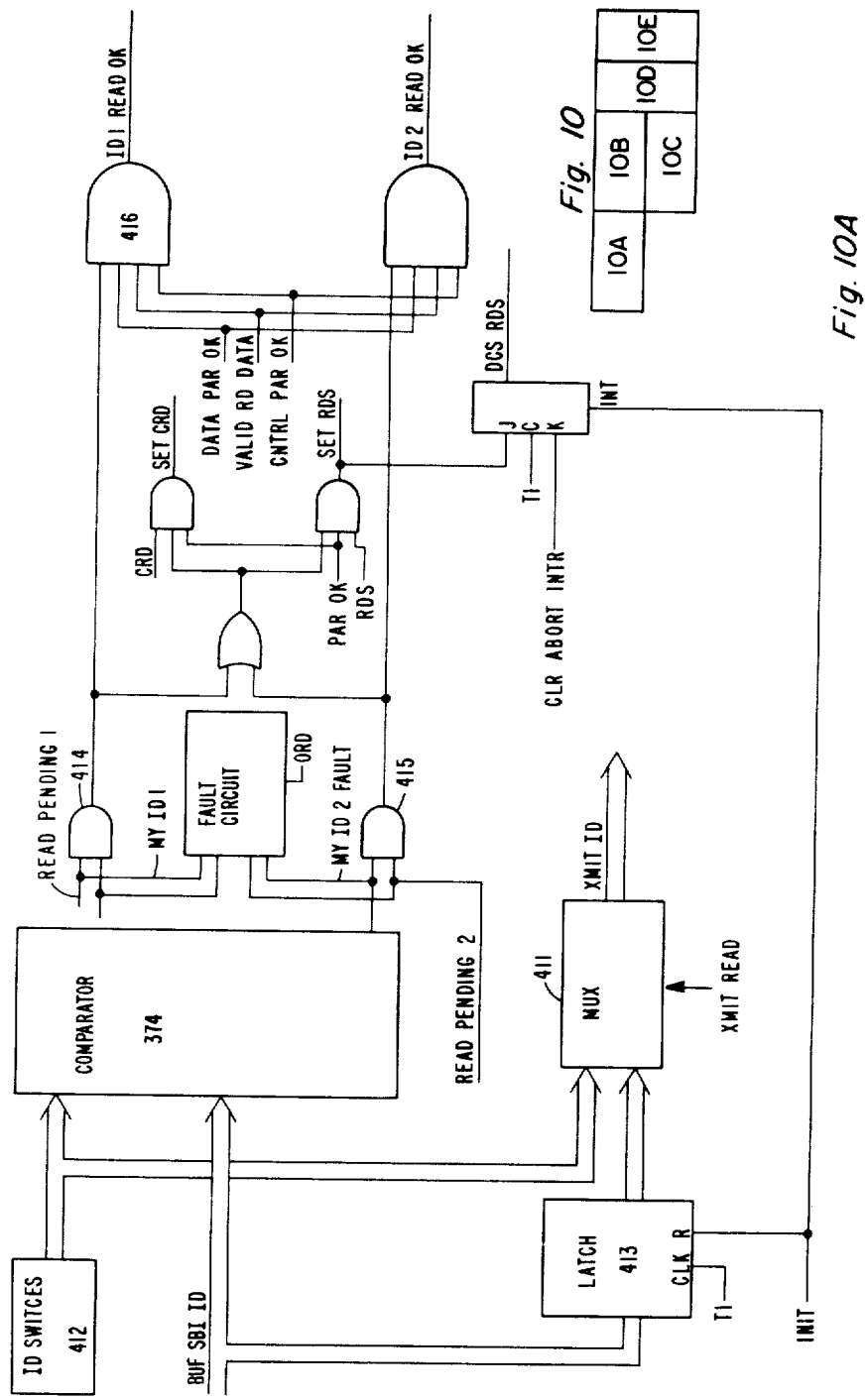
FIG. 10 sets forth the organization of FIGS. 10A through 10E, FIGS. 10A through 10E constituting a logic diagram of circuitry shown in FIG. 9.
Figure 10B:
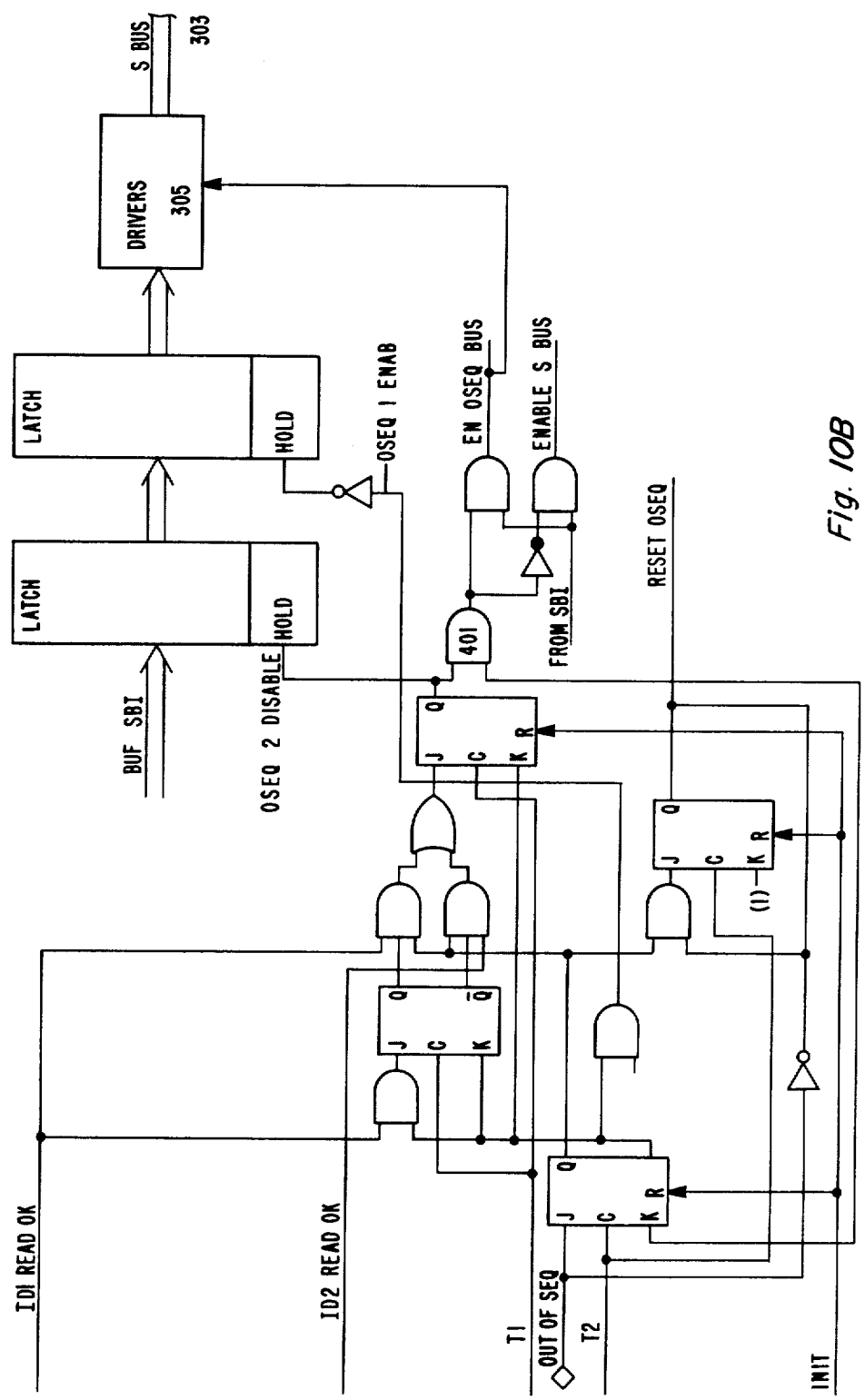
Figure 10C:
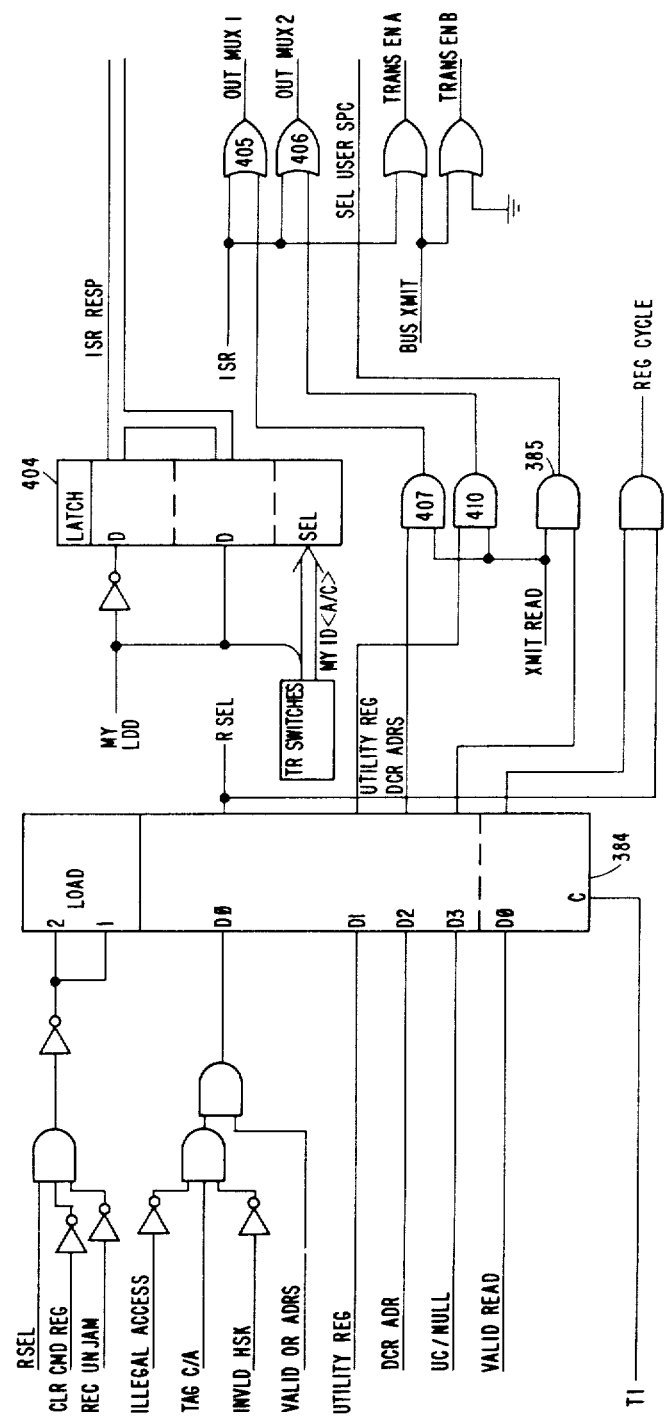
Figure 10D:
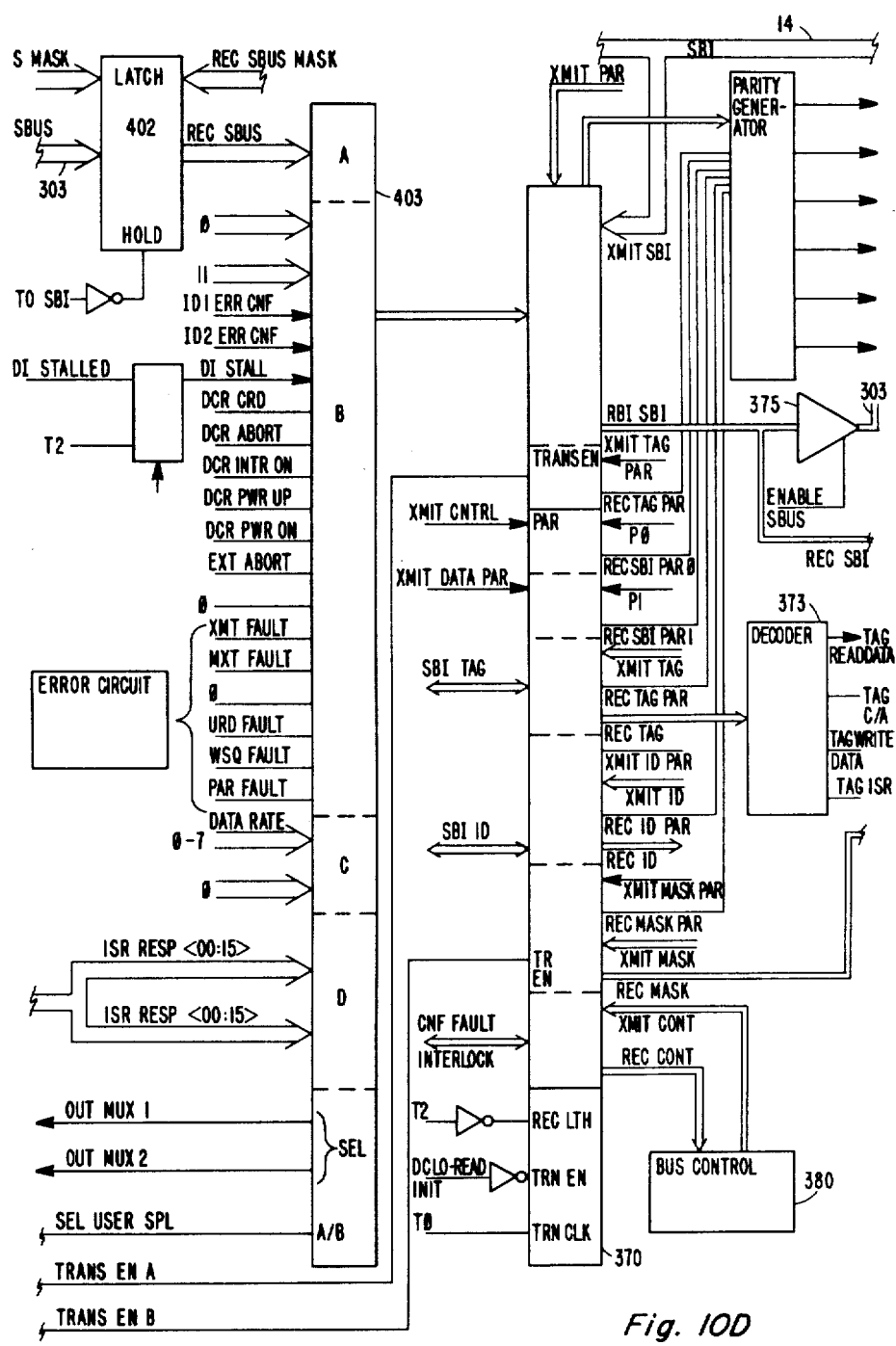

FIGS. 10A thorugh 10E depict a portion of FIG. 9 in greater detail. FIG. 10D depicts the connection of the SBI 14 to the interface 40. Specifically, incoming signals from the SBI 14 are applied to an input of transceiver circuits 370 and to a clock circuit 371 in FIG. 10E. The clock circuit receives the PCLK, PDCLK, and TP signals from the SBI 14 as shown in FIGS. 11A, 11B, and 11C. In response, the clock circuit 371 generates a number of signals. With respect to the operation of the circuit in FIG. 9, a DAR COUNT CLK signal, that is shown in FIG. 11D, and T0 through T3 signals, shown in FIGS. 11D through 11H, are important. The T0 through T3 pulses in sequence define a bus cycle. Each nexus as a transmitting nexus places information onto the SBI 14 beginning with a T0 pulse and receives, or latches, the information on the SBI 14 during a T2 pulse. Thus each time the clock circuit 371 issues a T2 pulse, all the other signals on the SBI 14 are received by the transceivers 370 and coupled to various circuits in the interface 40. Various parity circuits are coupled to a parity generator 372. TAG signals are coupled to a tag decoder circuit 373. ID signals are coupled to a comparator 374. The information signals are coupled to an amplifier and data drivers 375. Various CNF, FAULT, and INTERLOCK signals are coupled to a bus control circuit 376. The received SBI information signals are coupled to drivers 375 and an address and function checking circuit 376 and a buffer 377. A bus control circuit 380 receives CNF, FAULT, and INTERLOCK signals. Arbitration signals and interruption request signals are coupled to other portions of the communications device as described later.

The decoder 373 in FIG. 10D decodes the incoming TAG signals to indicate the nature of the signals in the information path. This information may be READ data, WRITE data, an interruption summary request, or command/address information. When the TAG signals identify the information on the SBI as read data or write data, the information signals contain a longword of data. When the TAG C/A signal is asserted, four high order bits of the information define a function and the remaining 28 bits define an address. The address and function checking circuit 376 receives the address signals when the decoder 373 in FIG. 10D asserts the TAG C/A signal.

Figure 12:
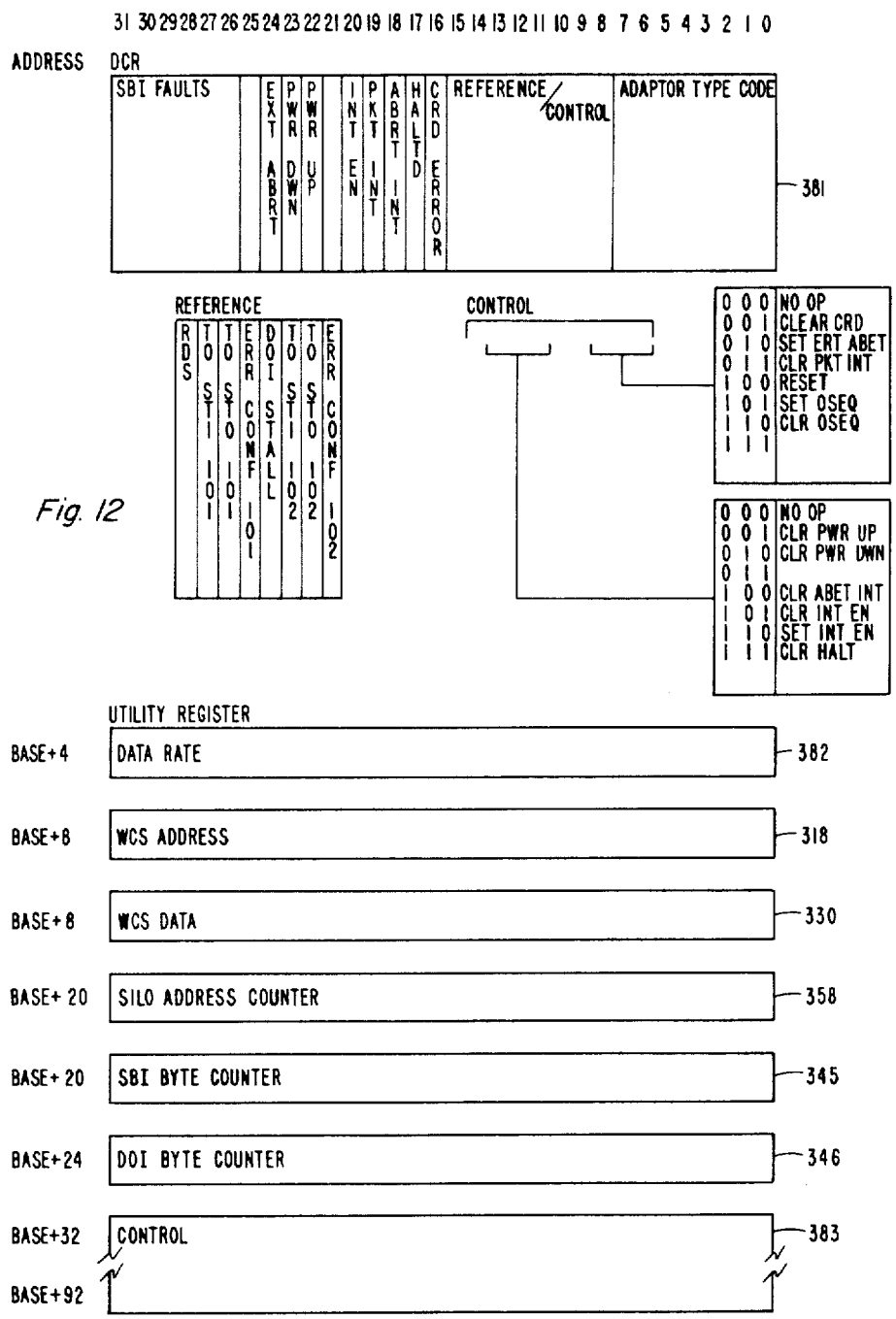
FIG. 12 depicts the oganization of certain registers that are found in FIG. 8.

The communications device shown in FIG. 8 comprises a number of addressable locations that define hardware registers and various memory locations. Four sets of such locations are important and each of these four sets is identified by two bit positions in the address space. A first set comprises a number of hardware registers and they are shown in FIG. 12. A DEVICE COMMAND register DCR 381 comprises a thirty-two bits. Each bit or group of bit positions in the DEVICE COMMAND register 381 has meaning as shown in FIG. 12. A reference control field establishes a number of operations. These are established when a write operation loads new contents into the DCR register. During read operations, this same field can be retrieved and when it is, the bit positions have meanings that are shown in the reference block. The specific use of the DCR register 381 is described later.

Other hardware registers in the first set of memory locations include a utility register 382 that stores a data rate for controlling the transfer rate over the data interconnection 51 in FIG. 8. As described later, the control receives address information in the microsequencer 318 and write information in a WCS WRITE latch 330 during the loading of microcode into the communications device shown in FIG. 8. These two registers, namely the WCS ADDRESS register 318 WCS WRITE latch 330 can be addressed in this set of locations. A silo address counter 358, the SBI byte counter 345 and DDI byte counter 346 are also included. A number of other registers can be used for control and they are generally designated by reference numeral 383.

When the transceivers 370 receive any of the addresses in this set of locations, , circuitry including the address and function checking circuit 376 and a latch 384 coact to identify the specifically addressed register.

The second set of addresses establishes locations that are used by the user process. When one of these locations has been identified, an AND gate 385 asserts a SEL USER SPC signal to indicate that the selection of user space. The other two sets of memory locations define specific addresses in the local store 323 that is shown in FIG. 8. The particular meaning of some of these locations is depicted in FIG. 13. The previously described device status longword is located at a base address and is identified by reference numeral 387. The other identified locations are used to store various addressing information that the address generator 41 in FIG. 8 uses in converting virtual addresses to physical addresses.

The information also received from the SBI 14 includes a MASK field. This information is received in a decoder 390. During a COMMAND/ADDRESS or WRITE DATA transfer, the MASK bits define specific bytes in a longword. When the TAG signals identify the information as being READ data, the MASK specifies the integrity of that data. That is, it indicates whether the data is correct, has a one bit error that has been corrected, or contains an uncorrectable error. Thus the decoder 390 generates a READ DATA or CRD (CORRECTED READ DATA) signal, a VALID RD DATA signal when either of the prior two signals is asserted and an RDS signal whenever the READ DATA or CRD signals are asserted and the TAG READ DATA signal from the decoder 373 is asserted.

Throughout the description of FIG. 6, references were made to setting a GO bit in the communications device. This process is initiated by generating a COMMAND ADDRESS function for a write operation that identifies a location in a user control address, namely register zero in the user control space. When this occurs, the address and function checking circuit 376 (FIG. 10E) enables a AND gate 391 so that on the next T1 pulse and T2 pulse flip-flops 392 and 393 are set successively thereby to assert an EN GO signal. During a subsequent write operation, the TAG WRITE DATA from the decoder 373 in FIG. 10D and a PAR OK signal from the parity generator 372 energizes an AND gate 394 in FIG. 10E which energizes another AND gate 395 if a stable halt condition does not exist. When the command is to set the GO bit, the "0" bit position in the data contains a "ONE". Thus, the next T1 pulse sets a flip-flop 396 as the "ONE" in the zero, or least significant bit position of the information in the WRITE DATA is asserted to energize an AND gate 397. When the flip-flop 396 sets, the GO signal shifts to an asserted state and initiates a sequence of events in the communications unit shown in FIG. 8 as described later.

Information is routed to a number of different locations within the communications device over the S BUS 303 through the drivers 375 (FIG. 10D) when an ENABLE SBUS signal is asserted. The ENABLE SBUS signal is generated each time the clock circuit 371 asserts the T3 pulse. Referring specifically to FIG. 10B, a FROM SBI signal energizes an AND gate 400 when an AND gate 401 is not energized. The AND gate 401 is energized only after the communications device has experienced read data from two different requests coming back out of order and subsequently the out of sequence read data has arrived. Thus the received S BUS signals are placed on the S BUS 303 during each S bus cycle.

Figure 10E:
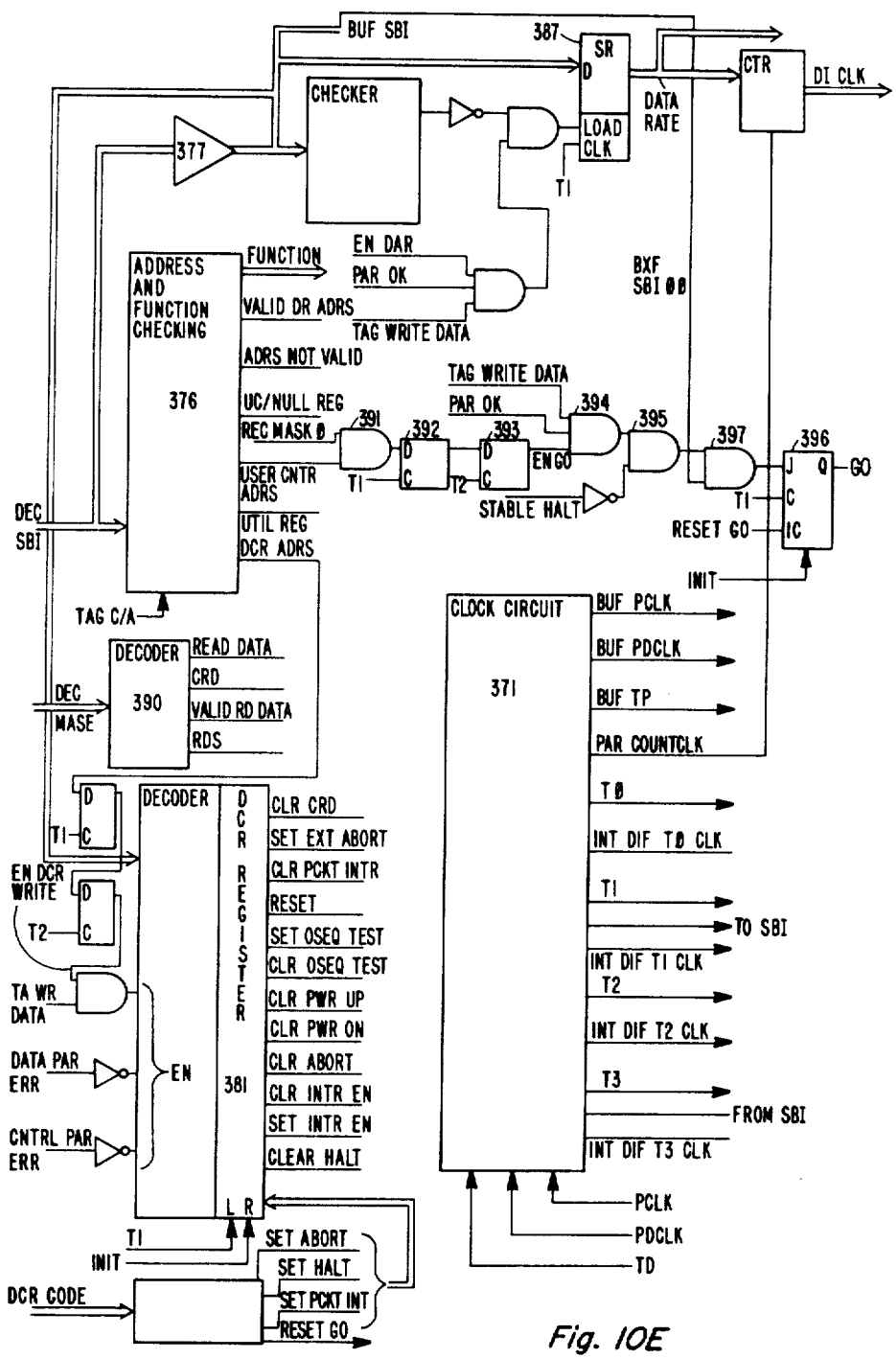

It is, of course, also possible to transmit signals from the communications device in FIG. 8 onto the SBI 14. There are a number of sources of such signals. As shown in FIG. 10D, each T0 pulse loads the information on the S BUS 303 into a latch 402 that then generates REC SBUS signals. A multiplexer 403 receives the REC SBUS signals at an A input and signals representing a number of error conditions, SIGNAL IN signals, and signals from the DCR register 381 at a B input. The data rate signals from the data rate register 382 in FIG. 10E are coupled to the C input and INTERRUPTION SUMMARY READ signals from a latch 404 in FIG. 10C are coupled to the D inputs. These signals are selectively coupled to the information signals portion of the transceiver 70 in response to OUT MUX 1 and OUT MUX 2 signals from OR gates 405 and 406 in FIG. 10C. During an INTERRUPTION SUMMARY READ signal, an ISR signal energizes both OR gates 405 and 406 thereby to couple the signals at the D input to the output of the multiplexer 381. If a COMMAND ADDRESS word identifies the DCR register and a reading operation, an AND gate 407 is energized while an AND gate 410, that is energized when a UTILITY REG signal is asserted, is deenergized. This asserts the OUT MUX 1 signal and selects B input. When the AND gate 410 is energized, the C input is selected. When neither is energized, it is assumed that the information is from the user space and the A input of the multiplexer 381 is selected as the signal source. Other circuitry in the system then causes the data to be transmitted onto the bus. Along with this information is SBI ID information from a multiplexer 411 in FIG. 10A. It issues XMIT ID signals that correspond to ID switches 412, or to the RECEIVED ID signals in the latch 413.

The communications device includes circuitry for implementing two separate transaction sequences over the SBI, that can be overlapped. Each includes a separate identification on the SBI 14, here referred to as ID1 and ID2. When a unit responds to a read from the communications device, it returns the ID, either ID1 or ID2, that was transmitted with the READ command and address. Comparator 374 receives the ID and asserts MY ID1 to enable AND gate 414 or MY ID2 to enable AND gate 415. If MY ID1 is asserted, and a READ PENDING 1 signal from the memory reference controller is asserted, AND gate 414 enables AND gate 416. If the parity is satisfactory, and VALID RD DATA is asserted from MASK Decoder 390, AND gate 416 will asset an ID1 RD OK signal, which is received in the memory reference decoder.

4. Command Interpreter and Control Interconnect

Figure 14A:
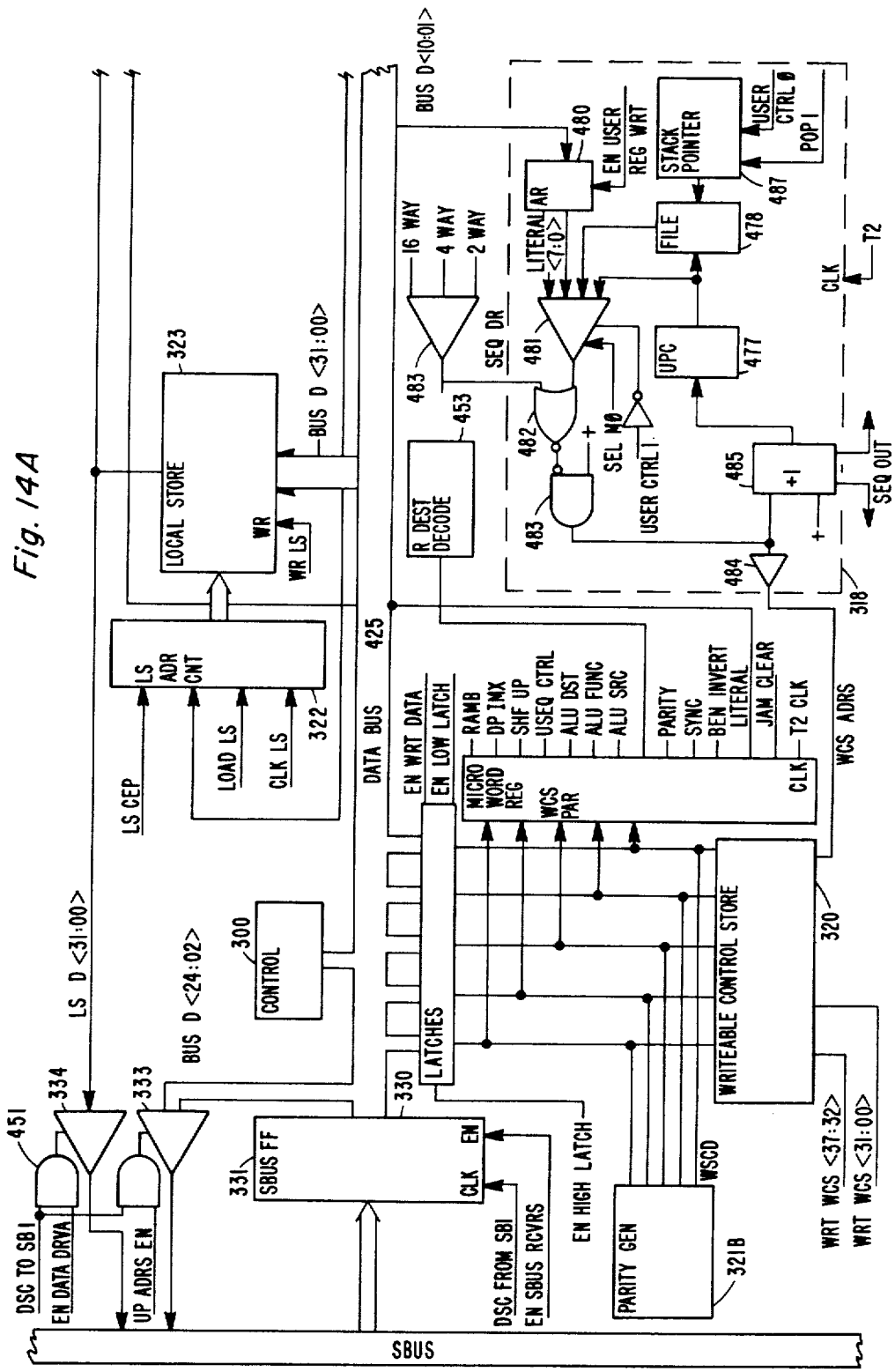
FIGS. 14A and 14B constitute a detailed block diagram of the command interpreter shown in FIG. 8.
Figure 14B:
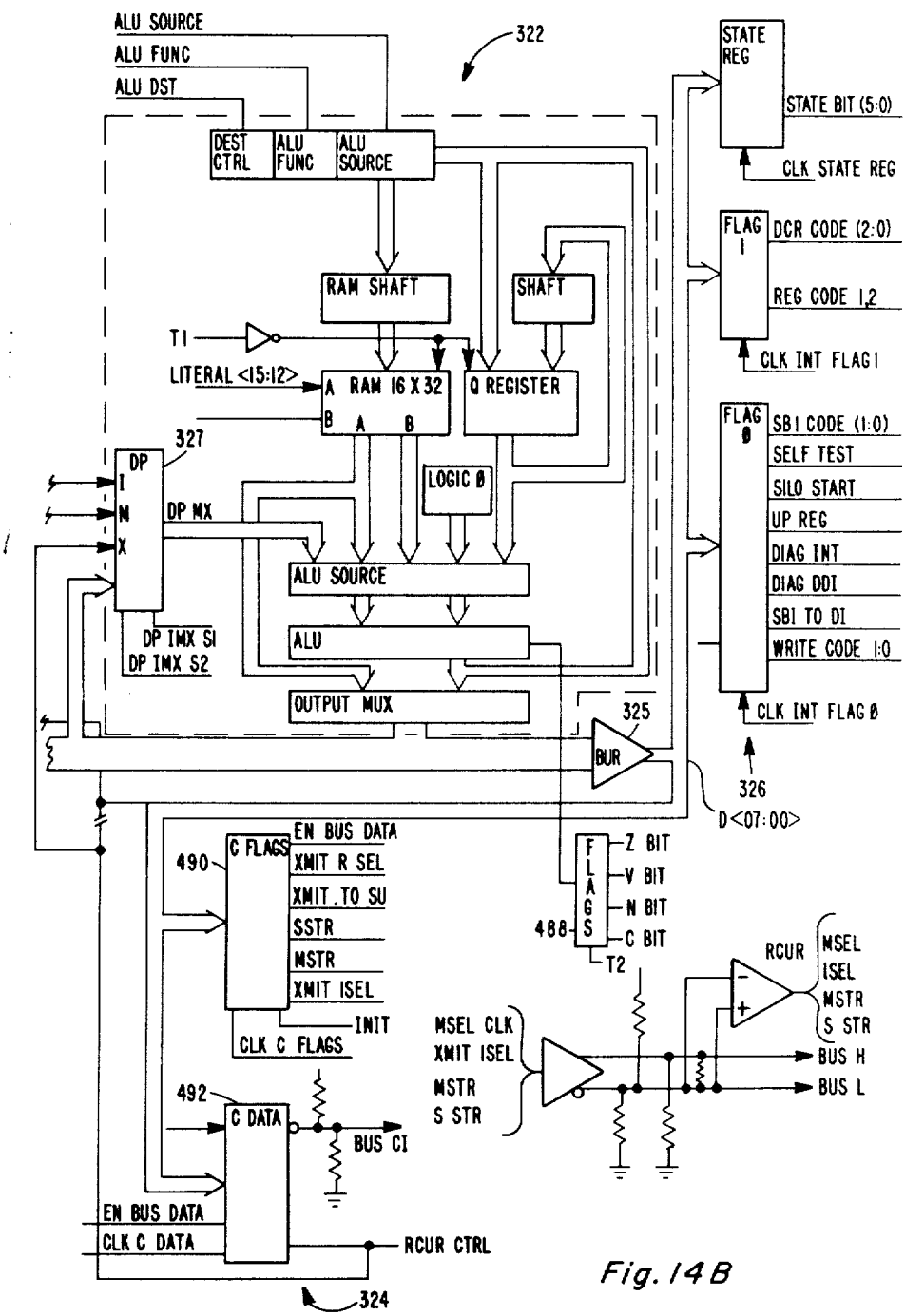

The command interpreter 45 that is shown in FIG. 8 utilizes the microprocessor 317. FIGS. 14A and 14B illustrate this microprocessor 317 including the microsequencers 318 and data paths 322 and the circuitry associated with the command interpreter 45 of FIG. 8.

Figure 15:
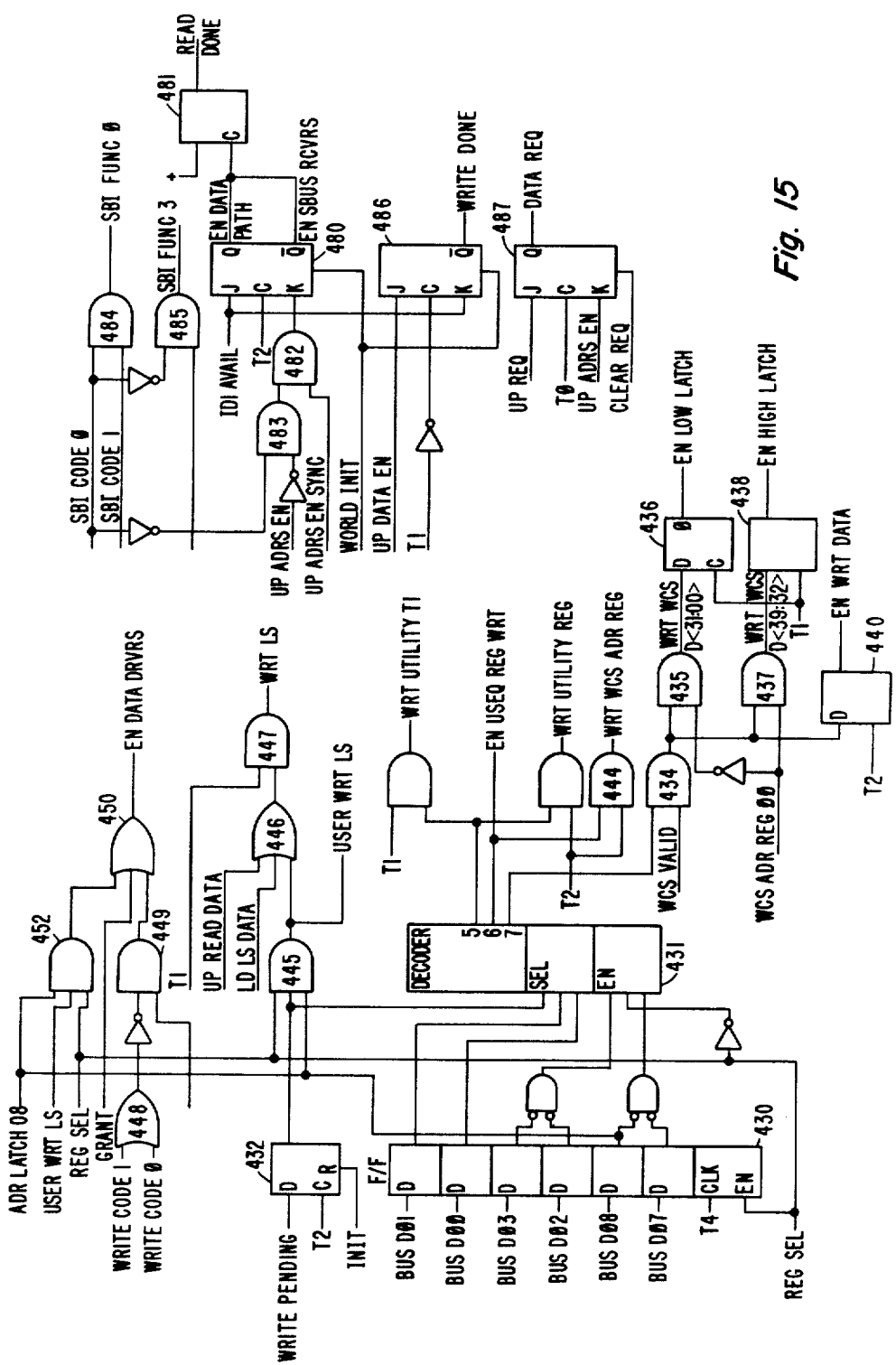
FIG. 15 comprises a logic diagram of a portion of the control block shown in FIG. 14A.

When an EN SBUS RCVR signal from a flip-flop 480 on FIG. 15 enables an SBUS latch 331, a FROM SBI signal from the clock decode circuit 371 (FIGS. 9 and 10E) loads the information signals from the S BUS 303 into the latch 331. A Data Bus 425, which in one specific embodiment includes 32 data lines, transfers signals from the latch 331 to the control 300, shown in more detail in FIG. 15.

Figure 16:
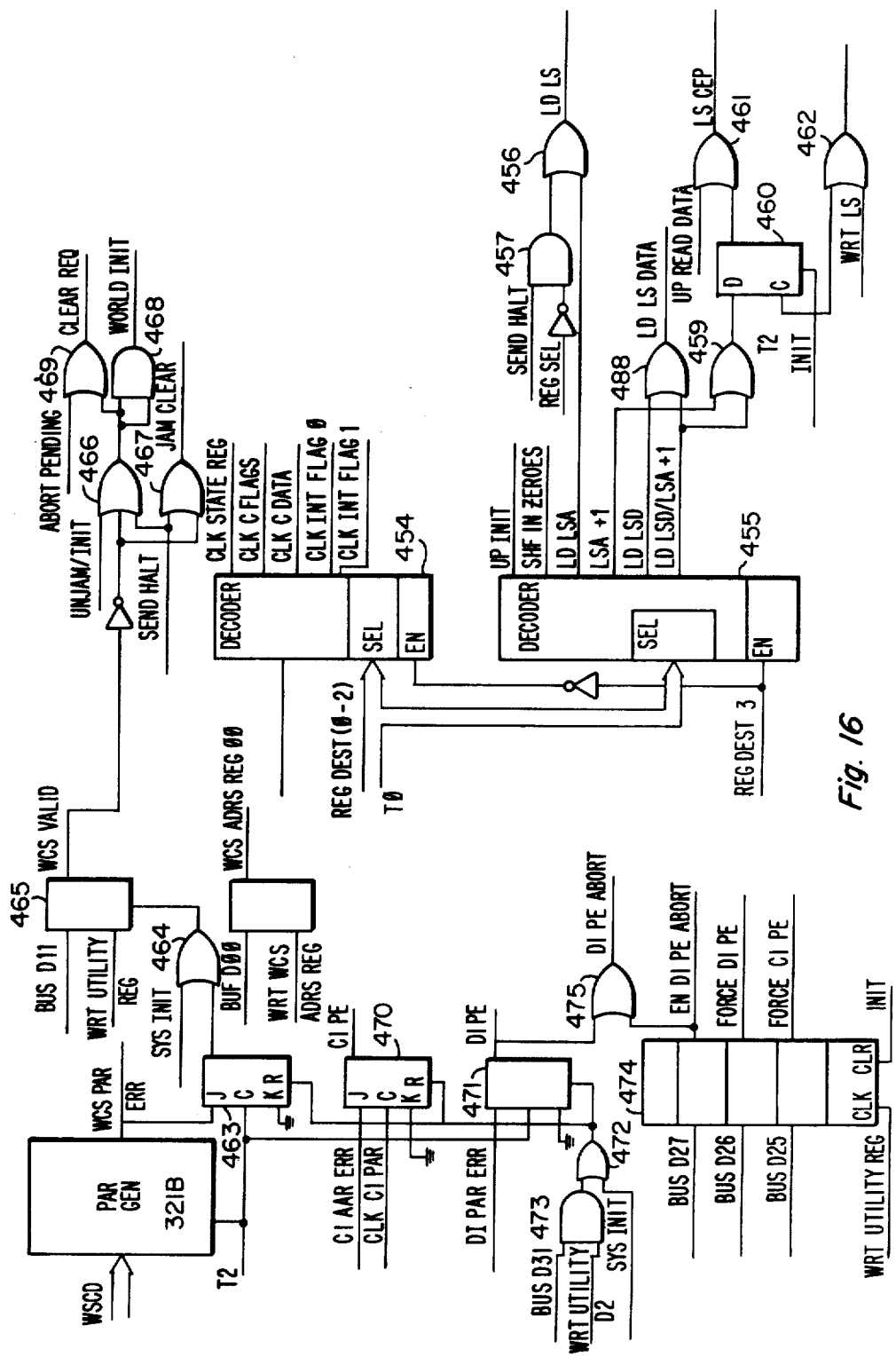
FIG. 16 comprises a logic diagram of other portions of the circuitry shown in FIG. 14A.

With reference to FIG. 15, signals from certain of the data bus lines are received in a latch 430, enabled by the REG SEL signal from command register 311 shown on FIG. 9, when clocked by the T1 clocking pulse. The outputs of latch 430 and the complemented REG SEL signal energize a decoder 431. The REG SEL signal, when asserted, indicates a transfer with one of the registers shown in FIG. 12. A WRITE PENDING signal conditions the "D" input of a flip-flop 432, clocked by a T2 clocking pulse; and the flip-flop 432 provides a third selection input to the decoder 431. The output of the decoder 431 is fed to a network of AND gates, including AND gate 434, which is enabled when a WCS VALID signal, from a flip-flop 465 on FIG. 16, is deasserted. The output of AND gate 434 in turn enables AND gate 435, which is then energized when a WCS ADR REG 00 signal from a flip-flop 476 on FIG. 16, is not asserted. The AND gate 435 generates a WRT WCS D (31:00) signal that conditions the set input of a flip-flop 436 clocked by the T1 clocking pulse, to produce an EN LOW LATCH signal for latch 330 on FIG. 14A. The output of AND gate 434 also enables the AND gate 437 to be energized when the WCS ADR REG 00 signal is asserted thereby to generate a WRT WCS D (39:32). This signal conditions a set input of a flip-flop 438, also clocked by the T1 clocking pulse, to produce an EN HIGH LATCH signal. The output of AND gate 434 also conditions the set input of a flip-flop 440 which is clocked at time T2, to assert an EN WRT DATA signal. The signals from flip-flops 436, 438 and 440 provide enabling inputs to latch 330, shown on FIG. 14A.

AND gates 442 through 444 also receive signals from the decoder 432. AND gate 442 is enabled by the T1 signal to assert a WRT UTILITY T1 signal. AND gate 443 is enabled at time T2 to produce a WRT UTILITY REG signal. AND gate 444, also enabled by the T2 signal, generates a WRT WCS ADR REG signal.

The output signal from flip-flop 432, the stage of latch 430 that receives the Data Bus line 08, and the REG SEL signal all condition an AND gate 445 to assert a USER WRT LS signal. This signal provides one enabling input to OR gate 446, which is also enabled by an UP READ DATA signal from an OR gate 882 on FIG. 27C, and an LD LS DATA signal from OR gate 458 on FIG. 16. The output of OR gate 446 enables an AND gate 447, which is clocked by T1, to assert a WRT LS signal.

Still referring to FIG. 15, control 300 also includes an OR gate 448 that is enabled by a WRITE CODE 1 or a WRITE CODE 0 signal from Flag 0 of flag register 326. WRITE CODE (0,0) and (0,1) refer to writing operations on the S BUS 303, while WRITE CODE (1,0) refers to writing operations of the SBI Byte Count register 345 and WRITE CODE (1,1) refers to writing operations of the DDI Byte Count register 346. A complemented signal from the OR gate 448 provides one enabling input to AND gate 449, which is energized by the UP DATA EN signal. When the AND gate 449 is energized, an OR gate 450 generates an EN DATA DRVRS signal. With reference to FIG. 14A, the assertion of the EN DATA DRVRS signal conditions an AND gate 451 to be set in response to a TO SBI signal from the SBI interface 40 thereby to convey signals through the drivers 334 to the S BUS 303.

The OR gate 450 is also energized by a GRANT signal from memory reference controller 52 or by AND gate 452 which senses the coincidence of an ADR LATCH 08 signal from latch 430, the USER WRT LS signal and the REG SEL signal from command register 311. The REG SEL signal when asserted indicates a transfer with one of the registers shown in FIG. 13.

As previously stated, the Data Bus 425 has thirty-two lines. However, in this specific embodiment there are forty lines between latches 330 and writable control store 320, and the microprogram code for each step in the microprogram is forty bits wide. The latch 330 contains forty stages, and an EN LOW LATCH signal enables the lower thirty-two stages to latch the signals from and to the corresponding lines of the Data Bus. An EN HIGH LATCH signal enables the upper eight stages to receive the signals on eight selected lines of the Data Bus and to place those signals on the upper eight lines to the WCS 320. Address signals from latches 330 are preliminarily received in microword register 321A and parity generator 321B. The outputs from the microword register 321A provide various signals for directing information over the Data Bus 425 to and from the various registers and stores shown on FIGS. 14A and 14B, that is, it establishes the sequence of register transfers that the communications device utilizes to perform its various functions. An R DEST decoder 453, a portion of which is shown in FIG. 16, provides additional loading and clocking signals.

With reference to FIG. 16, four lines connect the microword register 321A to the R DEST decoder 453. Three of the four lines connect to the select (SEL) input of decoders 454 and 455. A T0 clock pulse also connects to energize the decoder 454. The fourth line from microword register 321A provides an enabling signal for decoder 455, and its complement provides an enabling signal to decoder 454. Thus, when decoder 454 is enabled, one of the state registers, the flag registers, or the C DATA register is clocked. If decoder 455 is enabled, one or more of several signals are produced that are required to access the local store address counter 332 and the local store 323. One signal is an LD LSA local store address register loading signal from decoder 455 that energizes an OR gate 456 to produce an LD LS local store loading signal. A second input to OR gate 456 is provided by AND gate 457 which is energized when a SEND HALT signal is asserted if the REG SEL is not asserted. An LD LSD local store data load signal and an LD LSD/LSA+1 signal from decoder 455 enable OR gate 458 to assert an LD LS DATA signal. The LD LSD/LSA+1 signal enables the local store to load the next second longword in an extended read transfer operation over the SBI in the next subsequent storage location in the local store. An LSA+1 signal and the LD LSD/LSA+1 signal from decoder 455 also energize an OR gate 459, which conditions the set input of a flip-flop 460, which in turn is clocked by the T2 signal. When the flip-flop 460 sets, an OR gate 461 generates an LS CEP signal. A UP READ DATA signal constitutes a second input to the OR gate 461. An OR gate 462 enabled by either clocking signal T2 or a WRT LS signal from AND gate 447 on FIG. 15 provides a CLK LS signal. The two remaining outputs of decoder 455 generate an UP INIT signal and a SHF IN ZEROES signal.

The microword register also includes circuitry for detecting parity errors as shown on FIG. 16. The signals from the WCS lines are received in a parity generator and decoder 321B, which is clocked by the T2 clock signal, to determine if a parity error has occurred. If a parity error is detected, a WCS PAR ERR signal is asserted. The WCS PAR ERR signal conditions a flip-flop 463 to be set by the T2 clock signal thereby to energize an OR gate 464. The second input to OR gate 464 is provided by a SYS INIT signal. Whenever the OR gate 464 is energized, it conditions an overriding reset input of a flip-flop 465. When the OR gate 464 is not energized and a signal from Data Bus line D11 is asserted, the WRT UTILITY REG signal from AND gate 443 on FIG. 15 will set the flip-flop 465. The resulting WCS VALID signal provides one enabling input to the AND gate 434 in FIG. 15. The complement of the WCS VALID signal provides enabling inputs to OR gates 466 and 467. Either the WCS VALID signal or the SEND HALT signal energizes the OR gate 467 to produce a JAM CLEAR signal. Any of the WCS VALID, the SEND HALT, or an UNJAM/INIT signals energizes the OR gate 466 to enable a buffer 468 to assert a WORLD INIT signal and an OR gate 469 to produce a CLEAR REQ signal. An ABORT PENDING signal also energizes the OR gate 469.

The parity error detecting circuitry includes a flip-flop 470 which has a set input conditioned by a CI PAR ERR signal, and is clocked by a CLK CI PAR signal from FIG. 16. When set, flip-flop 470 asserts a CI PE signal. A flip-flop 471 has a set input conditioned by a DI PAR ERR signal from a flip-flop 748 on FIG. 23B. Flip-flop 471 is clocked by the T2 signal to assert a DI PE signal. Flip-flops 463, 470 and 471 are reset by an OR gate 472 which is enabled when a SYS INIT signal is asserted or when an AND gate 473 is asserted. AND gate 473 is enabled by the assertion of the Data Bus D31 line and the WRT UTILITY T1 signal from AND gate 442 on FIG. 15.

Signals from Data Bus lines D27, D26 and D25 are received in a latch 474 by the WRT UTILITY REG signal from the AND gate 443. The output signals of latch 474 constitute EN DI PE ABORT, FORCE DI PE and FORCE CI PE signals respectively. The DI PE signal from flip-flop 471 and the EN DI PE ABORT signal thus enable an AND gate 475 to produce a DI PE ABORT signal.

Microword register 321A in FIG. 14A further includes a flip-flop 476 which has a set input conditioned by the assertion of data bus line D00 and which is clocked by WRITE WCS ADDRESS REG signal from AND gate 444. When set, the flip-flop 476 asserts the WCS ADDRESS REG 00 signal thereby to enable AND gate 437 in FIG. 15.

With reference to FIG. 14A, the addressing of writable control store 320 is controlled by microsequencer 318. As explained hereinabove, the microsequencer in one specific embodiment is a conventional integrated circuit device, an AM2909 microsequencer sold by Advanced Micro Devices. There are several address sources that include a microprogram counter 477, a storage file 478, an address register 480, or a literal from the microword register 321A. The selection of the address source is made by a multiplexer 481 as determined by an SEL M0 signal and by the complement of a USEQ CTRL 1 signal from microword register 321A. An OR gate network 482 couples the output signals from the multiplexer 481 through an AND gating network 483 enabled by the SEL signal, to drivers 484. Drivers 483 receive branching signals that can be combined with the address signals as they pass through the OR gating network 482. An incrementer 485 also receives the output of buffer 483, increments the address therefrom by one and feeds it to the microprogram counter 477 to reset the microprogram counter 477, which also applies selection signals to the storage file 478, which stores microprogram addresses to permit returns from subroutines. A stack pointer 487, enabled by a USEQ CTRL 0 signal from microword register 321A, and by a POP 1 signal always points to the last address contained in the file to provide return address linkage if several microsubroutines are nested.

Figure 17:
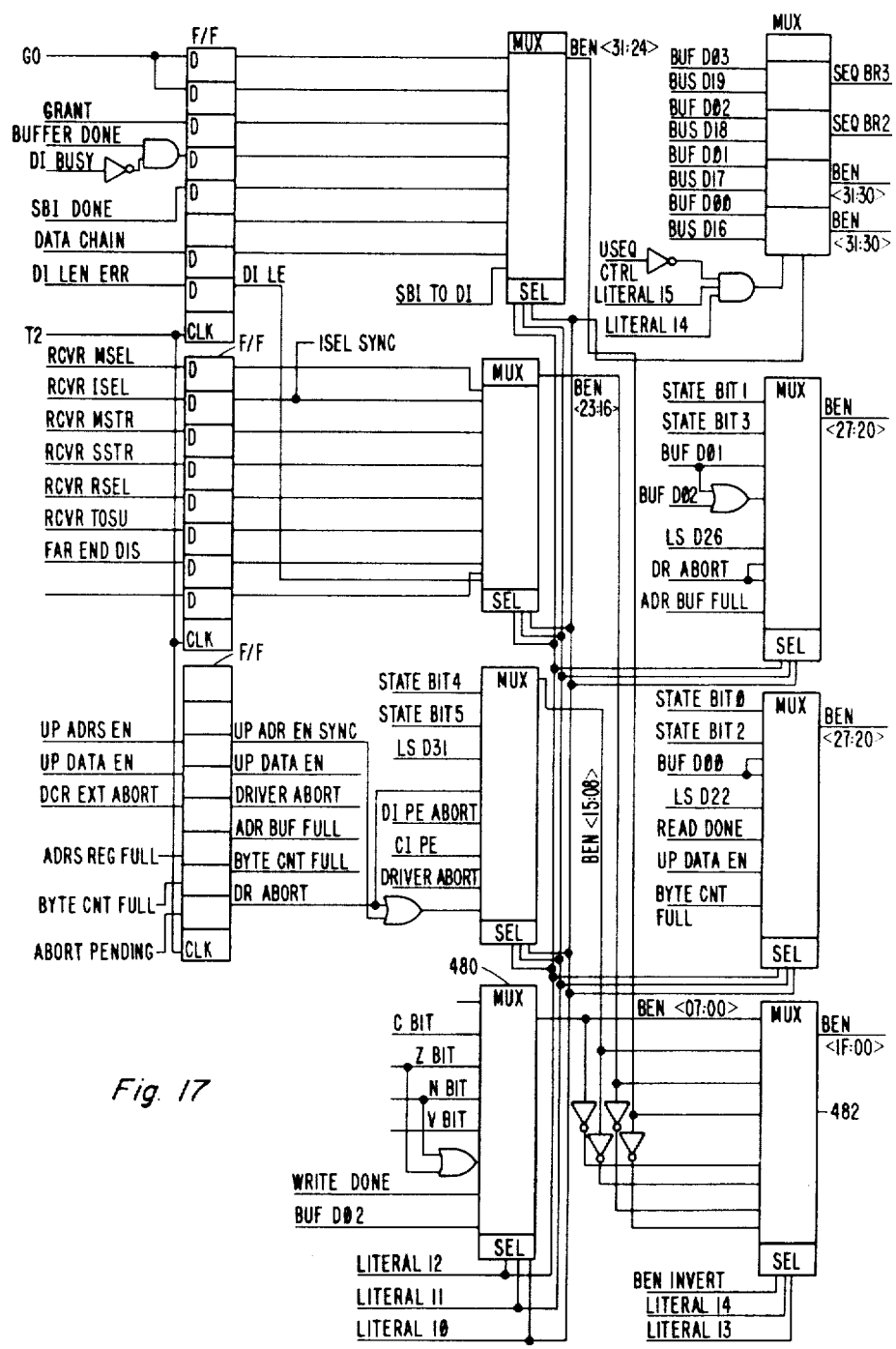
FIG. 17 comprises a logic diagram of branch decoding logic shown in FIG. 14A.

The microcode is stored in the writable control store 320 in the order in which the microprogram is to be carried out, subject to branches and returns that the circuitry in FIG. 17 establishes. Branches shift the normal sequence of accesses from the writeable control store 320 and depend on the state of the various flags, certain control or command signals from the SBI 14, and the status of the control interconnection and the data interconnection. As explained hereinafter, one function of the HALT bit is to initialize the microprogram counter 477 to the first address in the writeable control store (i.e., address "00"). The microsequencer initially selects that address for the WCS ADRS signal. The incrementer 485 increments the address by one and stores the new address in the microprogram counter. Multiplexer 481 then selects the next address from one of the microprogram counters, the file, the address register 480 or the literal address input. If an address from other than the microprogram counter is chosen, a microsubroutine has been entered and the file stores the address that had been stored in the microprogram counter, pointed to by stack pointer 487. The incrementer 485 then increments the address that had been selected and stores it in the microprogram counter. When the microsubroutine has terminated and a return from subroutine is required, multiplexer 481 obtains the return address from file 478. That address is directed to the WCS, and is then incremented and stored in the microprogram counter. The microsubroutines may be nested, depending on the number of return addresses that can be stored in file 478. In the AM2909 microsequencer, up to four microsubroutines may be nested. Stack pointer 487 always points to the last address stored in the file. After a microsubroutine is entered, the microprogram counter steps through the addresses in the microsubroutine in the same manner as through a main program, as the steps in the microsubroutines are also stored in order of execution. When a return from subroutine is required, the address pointed to in the file is selected by the multiplexer 481. The incrementer and microprogram counter thereafter step through the returned program.

At this point, it will be helpful to describe the process for transferring microcode into the writable control store 320. This process is required each time that the communications device is to be used and requires the transfer of writeable control store entries that are forty bits wide over the SBI 14, which can transfer only thirty-two bits of information. Addressing for the writeable control store is arranged so that a zero or even numbered address location identifies the lower thirty-two bits of microinstruction, and the next higher add address identifies the upper eight bits of the same microinstruction. Eight transactions are required over the SBI 14 and the Data Bus 425 to transfer each microinstruction into the writeable control store 320. The first two transactions constitute a write operation during which the address of the location in the writeable control store, specifically the address of the lower thirty-two bits, is transferred to the address register 480. During the first transaction a command/address identifies the writing operation and the address of the address register 480. Then the writeable control store address is transferred to the address register during the following data transfer transaction. During the third transaction a command/address identifies the latches and a writing operation. Then a longword is transferred containing the lower thirty-two bits of the microinstruction. This process is repeated to transfer the upper eight bits of the microinstruction. The address of the upper bits is transferred to the address register 480 during the fifth and sixth SBI transactions, and the upper bits are transferred during the seventh and eighth transactions.

The identification, tag and mask signals are received during each sequence, and are stored and decoded as described above. The identification signals identify the commanding nexus, while the tag signals identify the signals from the information lines as command/address during the first transaction sequence and as write data during the second and third transaction sequences.

Now referring to the five transactions in detail, the command and register address are received in SBI transceivers 370A and 370B during the first transaction. The function decoder and address check circuit 376 decodes the command and checks the address. The command register issues a REG SEL signal which enables the flip-flops 430 as shown in FIG. 15. Out of sequence logic 363 enables buffer 305 to transfer the signals from the SBI to S BUS 303. The signals are then received in SBUS flip-flop 331 shown in FIG. 14A. Control register 300 decodes the address and issues the EN USEQ REG WRT signal to enable address register 480 to receive the signals from Data Bus lines (10:01) during the second transaction. This address transfers from the SBI 14 through the drivers and receivers to the S BUS 303 and the SBUS flip-flops 331 and the data bus 425 to the address register 480 to identify the address in the writable control store into which the microinstruction will be stored. During the third transaction, the control 300 responds to the address of the writeable control store data buffer (at location "base+8" in FIG. 12) and then issues the EN LOW LATCH and EN WRT DATA signals to permit latches 330 to receive the input signals on Data Bus 425 in the lower latch during the fourth transaction. During the fifth transaction, the data is transferred to the stages in the latches 330 corresponding to the high-order bits in response to EN HIGH LATCH and EN WRT DATA signals. The microword register 321A and R DEST DECODE 453 to identify the writable control store data buffer and issue the necessary USEQ CTRL signals to multiplexer 481 to select address register 480 as the address source during the fourth and fifth transactions.

Both the lower 32 bits and the upper eight bits are buffered through buffer 305 onto S BUS 303. The respective upper and lower bits are latched in the upper and lower stages of latches 330, and written in WCS 320, enabled by WRT WCS (39:32) and WRT WCS (31:00) from AND gates 435 and 437 on FIG. 15.

The local store 323 stores data that is transferred from the data bus 425 in locations that are specified durng normal operation by the address counter 332 and each storage location in the local store 323 stores a longword. Initially the data processing system transfers information into the local store 323 with conventional writing operations. That is, a first transaction over the SBI 14 transfers a command/address and an address that identifies a specific location in the local store 323. The next transaction transfers the data to that location. For example, when the operating system loads the base virtual address of the command block into the local memory store 323, as shown in FIG. 13, the address portion of the command-/address specifies the base address plus 12 (i.e., base+12).

Any time information is transferred into the command interpreter of the communications device, the SBUS receivers 331 in FIGS. 8 and 15 must be enabled. With further reference to FIG. 15, the control 300 includes a flip-flop 480 that generates an EN SBUS RCVRS signal when it is cleared. The flip-flop 480 can be cleared directly by a WORLD INIT initializing signal or by a T2 clocking pulse when an AND gate 482 is energized and an ID 1 AVAIL signal from an AND gate 831 on FIG. 27B is not asserted. The EN SBUS RCVRS signal also clocks a flip-flop 481 to a set condition thereby to produce a READ DONE signal. The AND gate 482 is energized when an UP ADRS EN SYNC signal from FIG. 17 is asserted and an AND gate 483 is energized. AND gate 483 is energized when neither an UP ADRS EN signal from a latch 953 on FIG. 31C nor SBI CODE 0 is asserted. When the SBI CODE 1 signal and SBI CODE 0 signal are asserted, an AND gate 484 generates an SBI FUNC 0 signal. An AND gate 485 generates an SBI FUNC 3 signal when neither the SBI CODE 1 nor SBI CODE 0 signals are asserted. The SBI FUNC 0 signal is asserted during an interlocked write masked operation; and the SBI FUNC 3 signal, during an extended read operation. Two more SBI CODE 1,0 operations are also defined. The SBI CODE (0,1) refers to a write masked operation, and the SBI CODE (1,0) refers to an interlocked read masked operation.

When the ID 1 AVAIL signal is asserted and the AND gate 482 is not energized, a T2 clocking pulse sets the flip-flop 480 to generate an EN DATA PATH signal. The ID 1 AVAIL signal also conditions the clocked reset input of a flip-flop 486. Flip-flop 486 is clocked by the complement of the T1 clock signal. When the flip-flop 486 is cleared, it asserts a WRITE DONE signal. Flip-flop 486 also has a set input conditioned by a UP DATA EN signal from latch 953 on FIG. 31C.

The control 300 also includes a flip-flop 487 which has a set input conditioned by the UP REQ bit of Flag 0 in flag register 326. The flip-flop is clocked by the T0 clock signal, to generate a DATA REQ signal. Flip-flop 487 has a reset input conditioned by an UP ADRS EN signal, and an overriding reset input conditioned by a CLEAR REQ signal.

In one specific embodiment the command interpreter 45 utilizes the microprocessor, including its arithmetic logic unit and associated memories, for establishing data paths identified generally at 322. The command interpreter further includes a flag register 326A containing flags establishing the state of the output of the ALU in data paths 322, a state register 326B, a FLAG 0 register 326D and a FLAG 1 register 326C. Registers 326B through 326D are updated each time a respective one of the CLK STATE REG, CLK INT FLAG 1 and CLK INT FLAG 2 signals from the decoder 454 in FIG. 16 is asserted. The decoder 454 also controls the updating of a CFLAG register 490 and a C DATA register 492 that controls the control and data signals over the control interconnection.

Figure 18:
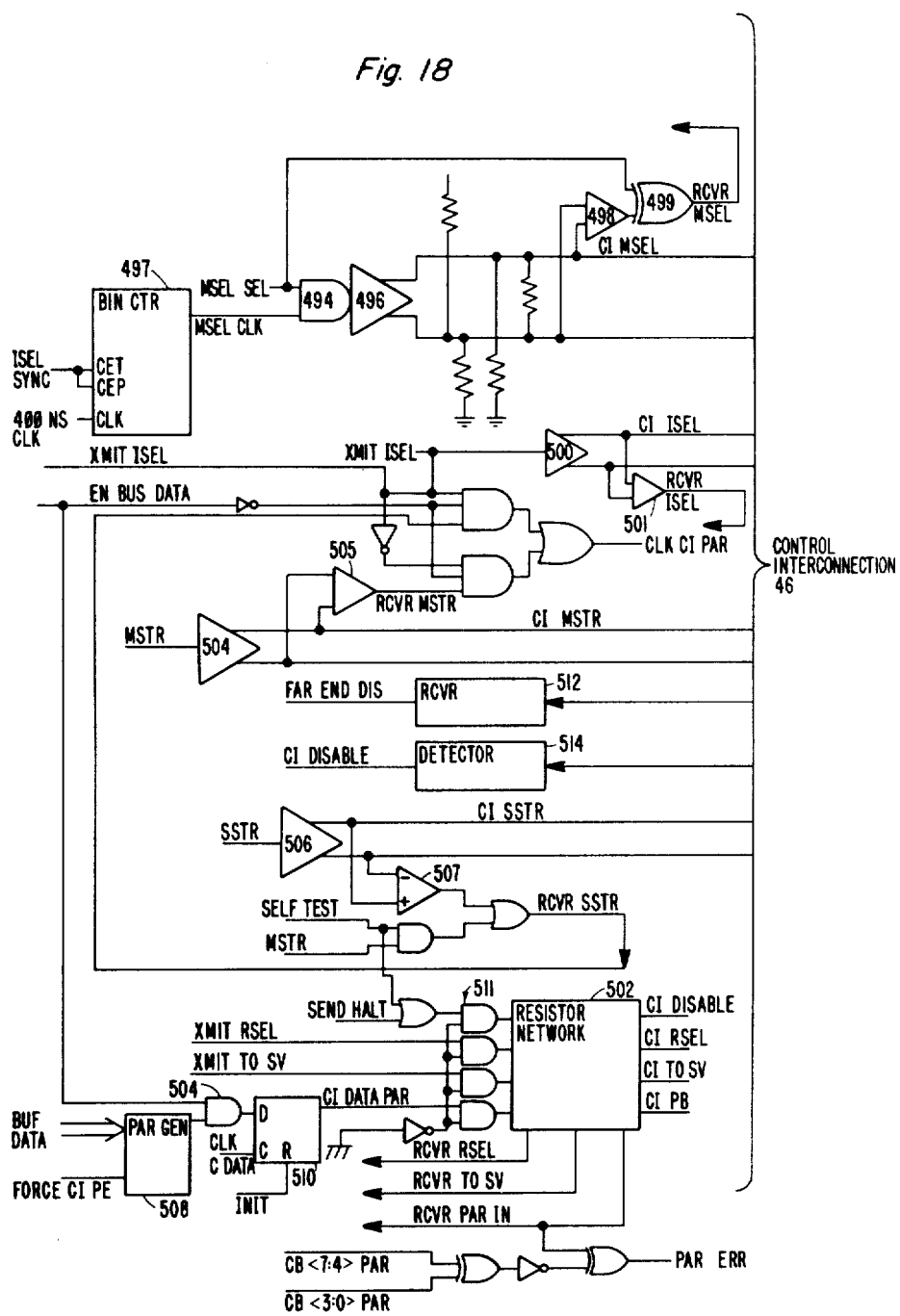
FIG. 18 comprises a logic diagram of control interconnection circuitry shown in FIG. 14B.

With reference to FIG. 18, the control interconnection 46 includes a number of control lines enabled by the C FLAG register 490 and data lines enabled by C DATA register 492 in FIG. 14B. The control interconnection 46 is an asynchronous bus. One of either the communications device or the external device is the master controlling the bus, and the other the slave. The control interconnection includes the following lines:

Master select, MSEL, a unidirectional line asserted by either the communications device or by the external device to identify which of the two is the master of the control interconnection bus. The state of the MSEL line oscillates between a high level and a low level at a rate determined by and MSEL CLK clocking signal when neither the communications device nor the external device is the master of the control interconnection thereby to avoid contention problems if both the communications device and the external device should attempt to act as a master simultaneously.

An inhibit select, ISEL, conductor is a bidirectional line that is energized by either the communications device or the external device when it is to become master of the control interconnection. The communications device can assert the corresponding ISEL signal only during one of the high state or the low state, and the external device can assert it only during the other state. When ISEL is asserted, MSEL stops changing state.

Control data, CD (7:0) signals are carried by eight corresponding bidirectional lines and are asserted by the master during a writing operation, or by the slave during a reading operation. Status information, from which the device status longword is formed, is transferred over the control data lines.

A bidirectional control data parity CD(P) line conveys a parity signal from the unit asserting the control data lines.

A master-to-slave, TOSV, line is a bidirectional line that the master energizes to indicate the direction of transfer over the control data parity lines with respect to the master. When TOSV is asserted, the direction of transfer is from the master to the slave (i.e., a writing operation will occur) and when the TOSV line is not asserted, the direction of transfer is from the slave to the master (i.e., a reading operation will occur).

A bidirectional register select, RSEL, line is energized by the device asserting the control data and control parity lines when the information transferred over the control data lines is address information to be stored in an address register. RSEL also may be asserted by a slave to indicate that it cannot complete a transfer. As explained below, this signal can be used to to inhibit a command transfer from the external device to the communications device while the communications device is processing a command from a command packet in the user process.

A master strobe, MSTR, signal on a corresponding bidirectional line is asserted by the master to indicate that data and parity signals on the control interconnection 46 are valid if the transfer is a writing operation and that the master is ready to receive data if the transfer is a reading operation.

A slave asserts a slave strobe, SSTR, signal on a corresponding bidirectional line when the data and parity signals have been received during a writing operation and when the data and parity signals are available on the control interconnection 46 during a reading operation.

Disable A to B and Disable B to A lines are unidirectional lines energized asserted by both devices connected to the control interconnection 46. When one of these lines is asserted by one device, the other device ignores the contents of the other lines of the control interconnection 46.

The master select, MSEL, signal is transmitted by the control interconnection by means of an AND gate 494 and driver 496. An MSEL SEL signal and the MSEL CLK signal from a binary counter 497 are inputs to the AND gate 494. The MSEL SEL signal in one embodiment is coupled over a jumper which may be connected by a user to permit the communications device to become master of the control interconnection when MSEL is at its high state, or when it is at its low state, the external device thereby being able to become master during the other state. When either the communications device or the external device generates the MSEL signal, a differential receiver 498 provides one input to an exclusive OR gate 499 that compares the state of the incoming MSEL signal with the state of the MSEL SEL signal. If the communications device is acting as the master, the RCVR MSEL signal is not asserted. If the external device is acting as the master, then RCVR MSEL will be asserted.

The ISEL line is transmitted by a driver 500 enabled by an XMIT ISEL line from the C FLAGS circuit 490 in FIG. 14B. The ISEL signal is received in a receiver 501 to provide a RCVR ISEL signal. The RCVR ISEL signal is received in the branch decode logic in FIG. 17, to generate an ISEL SYNC signal. ISEL SYNC, when asserted, disables binary counter 497, which stops MSEL CLK and prevents MSEL from changing state.

The DISABLE, RSEL, TOSV and parity signals are transmitted and received by a resistor network 502.

The master strobe MSTR line is transmitted by a driver 504 and received through a receiver 505 as a RCVR MSTR signal. The slave strobe SSTR line is transmitted by a driver 506 and received through a receiver 507 and OR gate 507A to provide a SSTR signal.

A parity generator 508 generates a parity bit and provides one input to a flip-flop 510 which is set in response to a CLK CI PAR signal from decoder 454. Flip-flop 510, when set, energizes an AND gate 509 if an EN BUS DATA signal is asserted. An AND gate network 511 buffers various signals including the CI DATA PAR signal from the flip-flop 510 and conveys these signals to the resistor network 502. The XMIT RSEL and XMIT TOSV signals from the C FLAGS circuit 490 in FIG. 14B and either a SEND HALT signal or a SELF TEST signal also pass through the AND gating network 511 to the resistor network 502.

5. Address Translation and Generation

The communications device manipulates addresses in two ways. First, given a virtual address, the communications device translates it into a physical address, using the privileged parameters stored in local store. Second, given the physical address of the base of a buffer in memory, which the communications device can obtain by translating the virtual address of the base of the buffer received from a command packet, the communications device can generates the physical addresses of succeeding memory locations in that buffer.

The communications device translates virtual addresses into physical addresses to permit it to access command packets from the input queue or the free queue, and to return command packets to the termination queue. Both transfers are accomplished by performing transfer operations with the command block in memory. The communications device also translates a virtual address to obtain the physical address of the base of the data buffer in the data block with respect to which a transfer set forth in a command packet is to occur. The physical address of the base of the data buffer is obtained by translating the virtual address provided in the command packet, specifically data buffer virtual address longword 73 in FIG. 3. The virtual address for a transfer may also be provided by the external device, as noted previously. The communications device translates a virtual address from an external device in a manner similar to the way it translates a virtual address from the user process.

The communications device generates virtual addresses during transfers with the data block. After the virtual address of the base of the data buffer is translated to obtain the physical address of the base of the data buffer, the communications device then generates the physical addresses of the succeeding memory locations in the data buffer.

In one specific embodiment of a memory with which the communications device performs transfers, the data block is divided into pages, each of which is pointed to by a process page table entry (PTE), each of which is pointed to by a process page table pointer (PPT.PTR). That is, the process page table pointer (PPT.PTR) is the address in memory of the process page table entry (PTE). Nominally each page contains storage locations for five hundred and twelve bytes. Similarly, one hundred and twenty-eight process page table entries (each four bytes long) form one page of process page table entries, which page is pointed to by a system page table entry. The system page table entry is pointed to by a system page table pointer (SPT.PTR). A plurality of process page table pointers may form several pages, each of which is pointed to by a system page table entry. Furthermore, since the transfers with the data block are of longwords that contain four bytes, for each transfer to obtain the next address generated within a page, the communications device increments the previous address by four.

The communications device translates addresses in the command interpreter 45, and generates addresses in address generator 41.

An address requires 30 bits. Since a transfer over the SBI is of a longword, the least significant nine bits identify a particular longword in memory, and specifically one byte of the longword. In performing a translation, the lower nine bits of the virtual address are unchanged. The upper twenty-one bits of the virtual address, VA (29:9), constitute the virtual page number, and identify the physical of a page table entry (PTE). The lower twenty-one bits of the page table entry, PTE (20:0), constitute a page frame number. The reserved lower nine bits of the virtual address are appended as low order bits to the the page frame number to form the translated physical address.

In translating a virtual address, the communications device makes use of the contents of various registers in the local store shown in FIG. 12, including the system base register (DR.SBR), the global base register (DR.GBR), registers that store command block privileged addressing parameters including the base virtual address (BVA) of the command block, the length of the command block, and the system virtual address of the page table entry of the base of the command block (SVA.PTE.BASE). The communications device also makes use of registers in local store that store data block privileged addressing parameters including the base virtual address (BVA) of the data block, the length of the data block and the SVA.PTE.BASE, of the data block.

From the virtual address and the contents of the above-mentioned registers of the local store, the communications device generates a system page table pointer (SPT.PTR), and a process page table pointer (PPT.PTR) and by read operations over the SBI, obtains the corresponding page table entries. The communications device first calculates an OFFSET by subtracting the lower nine bits of the BVA the from virtual address as received from the command packet. The particular BVA used in this calculation is the BVA of the data block if the virtual address being translated is in the data block, or the BVA of the command block if the virtual address is in the command block. A system virtual address of the page table entry of the offset (SVA.PTE.OFFSET) is then calculated, which is the sum of the upper twenty-one bits [bits (29:9)] of the OFFSET, multiplied by four [that is, in one embodiment shifting the upper twenty-one bits upwardly by two bits and forcing zeroes into the lower bit positions (10:9)], plus the SVA.PTE.BASE. The SPT.PTR then is derived from the SVA.PTE.OFFSET. The upper twenty-one bits of the SVA.PTE.OFFSET are multiplied by four, and the result is added to the contents of the system base register (DR.SBR) in local store. The result is the address of a system page table entry. The communications device does a read operation over the SBI to the memory location identified by the system page table pointer (SPT.PTR) to obtain the system page table entry. The process page table pointer, PPT.PTR, is formed by multiplying the lower twenty-one bits of the system page table entry by five hundred and twelve, that is, by shifting them upwardly by nine bits, and adding thereto the nine least significant bits of the SVA.PTE.OFFSET. The process page table pointer is the address of a process page table entry. The communications device then does a memory read operation over the SBI to the location in memory identified by the process page table pointer to obtain the process page table entry. The lower twenty-one bits of the process page table entry PPT.PTR are multiplied by five hundred and twelve, that is, shifted upwardly by nine bits, to form the page frame number (PFN) of the page table entry (PTE). The lower nine bits of the virtual address being translated are appended as low order bits to the PFN to form the physical address.

The translation is performed by the command interpreter 45, specifically by the data pathing circuit 322 under control of the microcode stored in the writable control store. The translated physical address is obtained at the output multiplexers of the microprocessor slices. If the address is an address in the data block, and is to be used with a transfer of process data, it is transferred to a next address register location in local store. If the address is to be used for a transfer with the command block, the address is suded immediately, that is, it is placed on the Data Bus 425 for immediate transfer to the SBI.

During a transfer of process data within the data block, the translated physical address is removed from the next address location in local store to the SBI address lookahead register 336 when that register is empty and thence to the SBI address counter 335. The SBI address counter steps through the nine least significant bits of the physical address that identify storage location of a page in memory. When the address counter reaches the end of the page, that is, when bits (8:2) of the counter are all ones, the contents of the SBI address lookahead register 336 are transferred to the SBI address counter 335, and the contents of the next address register in local store are transferred to the SBI address lookahead register.

For a transfer to the data block, the command interpreter 45 also calculates the number of pages of data to be transferred. The number of pages is obtained from the byte count longword 72 on FIG. 3 from the command packet by setting the nine least significant bits, bits (8:0), of the byte count to zero, and dividing the result by five hundred and twelve, that is by shifting the result downwardly by nine bits. The number of pages is stored in a register in the data pathing circuit 322.

Every time the data pathing circuit calculates a new physical address and transfers it to the next address register in local store, the communications device decrements the number of pages by one.

Thus, when the contents of the next address register in local store are transferred to the SBI address lookahead register, the data pathing circuit examines the number of pages remaining. If the contents of the page number register in the data pathing circuit is zero, the data pathing circuit does not calculate a new address for the local store next address register. If the contents of the page number register is not zero, the data pathing circuit calculates a new process page table pointer PPT.PTR.

In calculating a new PPT.PTR, the data pathing circuit first determines if the process page table pointer bits (8:2), PPT.PTR (8:2), are all "one". If they are not all "one", a new PPT.PTR is calculated by adding four to the current PPT.PTR, obtaining a new page table entry and page frame number as previously, shifting the page frame number upwardly by nine bits, and transferring the result to the next address register in local store. For this new address, the lower nine bits are all zero.

If bits (8:2) of the process page table pointer PPT.PTR are all ones, one page of process page table entries has been used, and a new page must be pointed to by a new system page table pointer SPT.PTR. A new SPT.PTR is calculated by adding four to the current SPT.PTR and the new system page table entry is obtained from memory. The PPT.PTR is then calculated by shifting the system page table entry SPT.PTR upwardly by nine bits. Once the PPT.PTR is calculated, the PFN and new physical address is calculated, as previously and is sent to the local store next address register.

After the next address register in local store is filled, the page number register in the data pathing circuit is decremented by one.

The communications device also verifies that the virtual address being translated is within the range of virtual addresses permitted for the user process. If the virtual address being translated is less than the BVA of the block, then a range error has occurred. Furthermore, if the length of the block (the command block or the data block depending on where the information is being transferred) is less than or equal to the difference between the virtual address from the command packet and the BVA, the virtual address of the base of the transfer is outside the block into which the communications device can transfer, and a range error has also occurred. In either event, a RANGE ERR flag in the device status longword is set.

6. Process Data Path

Figure 19:
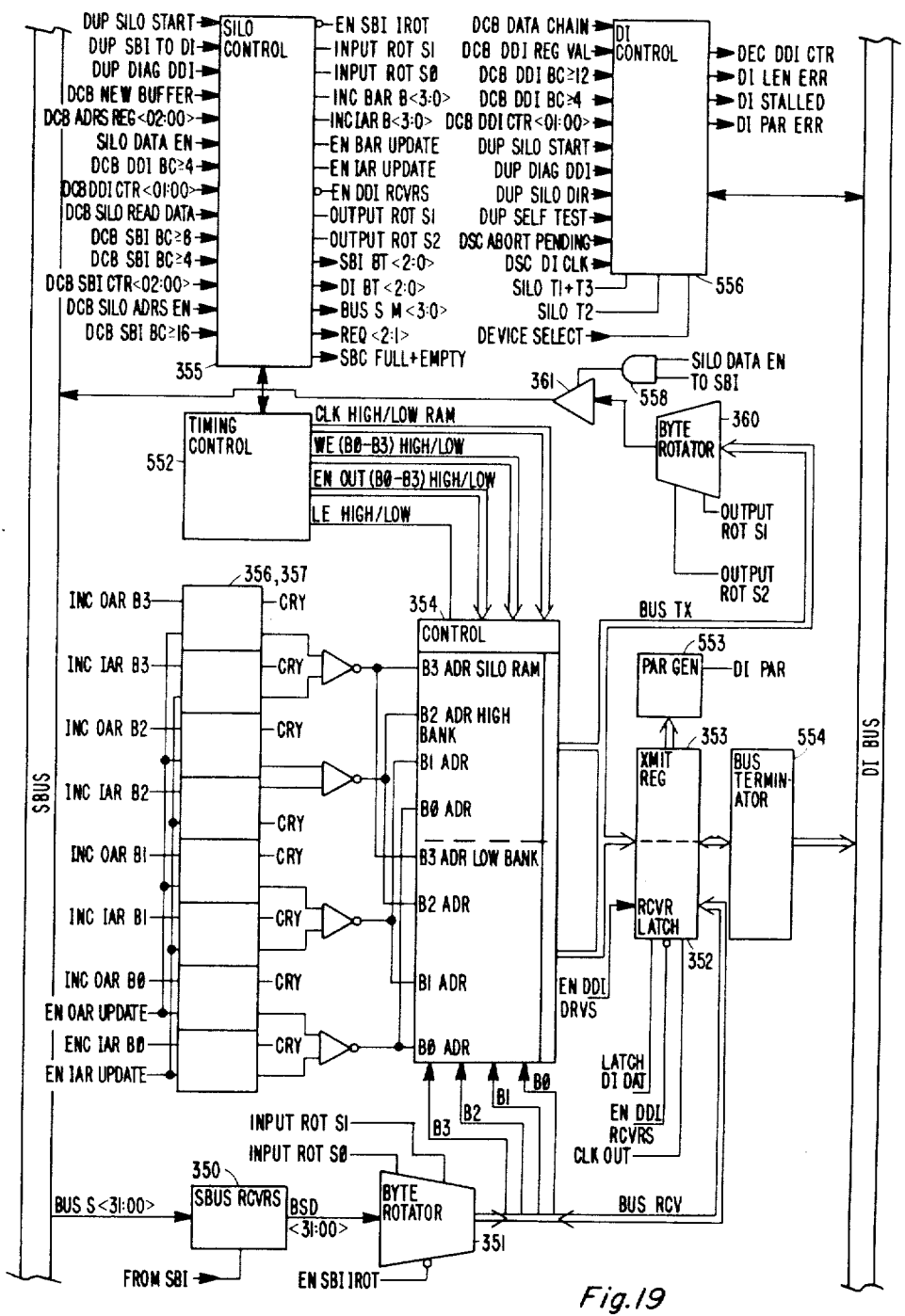
FIG. 19 comprises a detailed block diagram of the process data path shown in FIG. 8.

FIG. 19 is a detailed block diagram of the process data path 47 that connects the SBUS 303 and the data interconnection DI 51, including a DI bus 550. Data transfers between the SBUS and the DI bus are buffered through a silo 354. The silo normally transfer data in the longword form, but the last transfer can be of the lower byte, the lower two bytes or the lower three bytes of data. The silo control 355, output address register 356 and input address register 357, the latter two of which are divided into subregisters corresponding to each byte, keep track of the individual bytes transferring through the silo.

Information signals are received from the S BUS 303 through SBUS receivers 350 enabled by a FROM SBI signal from the clock decode circuit 371 on FIG. 9, and are transferred through a byte rotator 351 which rotates the bytes to put them into a selected configuration to be stored in the silo. The byte rotator is enabled by an EN SBI IROT signal, and the degree of rotation governed by the INPUT ROT S1/S0 signals. The silo control 355 and timing control 552 enables the silo to receive the data from the byte rotator.

If the information in the silo is to be transferred over the DI bus 550 to the external device, the information exits the silo RAM 354 onto bus TX and is received in a transmitter register (XMIT REG) 352. A parity bit is generated in a parity generator (PAR GEN) 553, and a bus terminator 554 provides a path for the information and the parity bits onto DI bus 550. Information signals from the external device are received over the DI bus 550 and routed through the bus terminator 354 to receiver latches (RCVR LATCH) 352 in response to an enabling (EN DDI RCVRS) signal and a clocking (LATCH DI DAT) signal. The received information is then transferred over the BUS RCV bus and transferred into the silo memory 354.

Information in the silo memory 354 may also be transferred to the S BUS 303. The information is clocked through the silo and placed onto a transmitting bus (BUS TX). The information is received in output an byte rotator 360 and coupled onto the S BUS 303 through drivers 361 when an enabling (SILO DATA EN) signal and a clocking (TO SBI) signal are asserted simultaneously thereby to energize an AND gate 558. Both signals are obtained from the clock decode circuit 371 in FIG. 14B. The degree of rotation of byte rotator 360 is governed by OUTPUT ROT S1/S0 control signals that establish a rotation of 0, 1, 2 or 3 bytes.

A DI Control circuit 556 generates various control signals on control line constituting, with data lines, the DI BUS 550. The DI BUS 550 is a synchronous bus and, one specific embodiment, comprises the following lines:

Data, D(31:00), lines are bidirectional lines asserted by either the communications device or the external device and they are used to transfer data.

A Data Parity, D(P), line is a bidirectional parity line asserted by the device asserting the Data D(31:00) lines to provide a parity check signal for the data lines.

A Clock A-B line, CKAB, is a unidirectional line asserted by one device, either the communications device or the external device, to provide synchronous clock signals to the other device.

A Clock B-A line, CKBA, is a unidirectional line providing the same function as the CKAB line for the device receiving the CKAB signal. In one specific embodiment the communication device generates the CKAB signal and the external device generates a CKBA signal as a return of the CKAB signal.

Three Send, S(2:0), lines are energized by the sending unit, i.e., the device asserting the Data D(31:00) and D(P) lines. When the sending unit is ready to transmit the data and is actually sending data, the SEND signals have various meanings. If either of the SEND 0 or SEND 1 signals is asserted, the sending unit is ready to send. If the SEND 2 signal is asserted, the sending unit is actually sending or is capable of sending. When the SEND 2 signal is asserted, the other SEND signals establish byte patterns, i.e., whether the lower byte, the lower two bytes, the lower three bytes, or all four bytes are being sent. If the SEND 2 signal subsequently shifts to a non-asserted state while the SEND 0 and SEND 1 signals do not change, a stall condition is indicated. A stall condition exists when more data is expected to be sent during a particular transmission, but the sending unit is currently incapable of sending that data.

A Receive, REC, line is a bidirectional line that the receiving unit energizes to indicate that it is prepared to receive data over the D (31:00) and D(P) lines. As explained hereinafter, the receiver may be temporarily incapable of receiving data and remain ready to receive and therefore still asserts the REC signal.

A Receiver Ready, RRDY, line is a bidirectional line asserted by the receiving unit only when the REC line is asserted. The receiver energizes both of the REC and RRDY lines when it is prepared to receive data and currently is capable of receiving data. If it shifts the RRDY signal to a non-asserted state while the REC signal remains asserted, the receiving unit is temporarily incapable of receiving data but is still prepared to and expects to receive more data during this particular transition. This condition is also called a stall condition.

Figure 20:
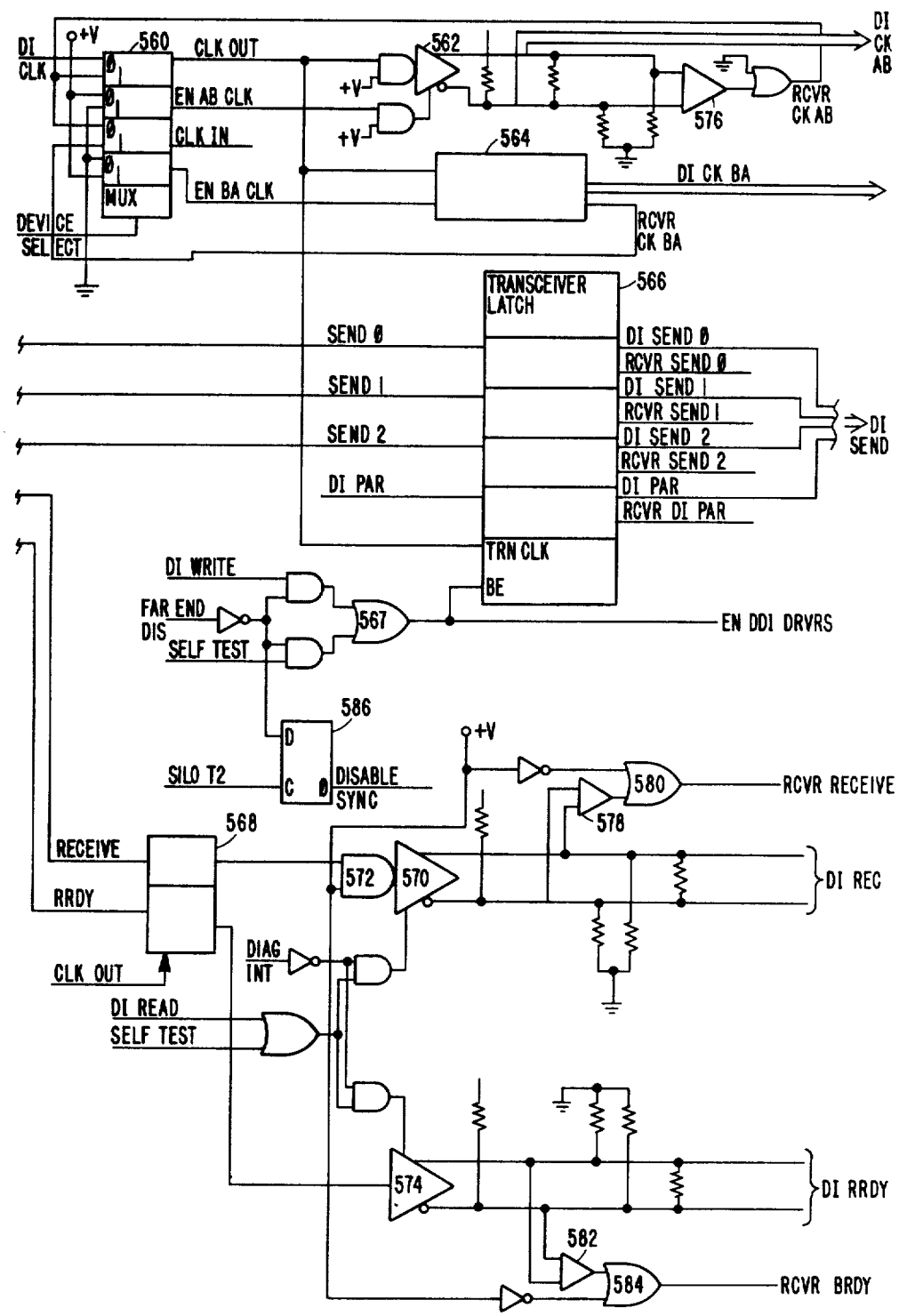
FIG. 20 comprises a logic diagram of data interconnection circuitry shown in FIG. 19.

With reference to FIG. 20, there are two clocking lines designated as a DI CKAB line and a DI CKBA line. Either the communications device or the external device can control timing, and hence the data transfer rate, over the data interconnection. Normally the communications device will control the rate. In such a configuration a DEVICE SELECT selection signal is held at an non-asserted level to indicate control by the external device. When the DEVICE SELECT selection signal is at a non-asserted level, a multiplexer 560 couples the DI CLK clocking signal from the circuitry in FIG. 10E through a differential driver circuit 562 onto the data interconnection. Another stage of the multiplexer 560 passes a positive voltage to the driver 562 as an enabling (EN ABCLK) signal, and a ground, or non-asserted voltage to another transceiver circuit 564 as a non-asserted EN BACLK signal that disables that driver circuit 564. A differential receiver circuit 576 couples the DI CKAB signals from the driver circuit 562 through another stage of the multiplexer 560 as CLKIN signals. When the external device is to control the transfers over the data interconnection, the DEVICE SELECT signal is asserted. Then the EN ABCLK signal is not asserted while the EN BACLK signal is asserted. Incoming signals on the DI CKAB lines pass through the receiver 576 to constitute the CLK OUT and the CLKIN signals. The CLK OUT signals now pass through the transceiver circuit 564 and onto the DI CKBA lines.

The SEND (2:0) lines are enabled by a transceiver latch 566 which both drives and receives the SEND lines. The DI parity line is also driven by transceiver latch 566. The latch 566 is enabled to assert the SEND and parity lines by an EN DDI DRVRS signal from OR gate 567, asserted by either the DI WRITE or SELF-TEST signals when the FAR END DISABLE signal from the control interconnection 46 is not asserted. When the latch 566 is enabled to transmit, the latches are updated at a rate determined by the CLKOUT signal from the multiplexer 560.. When the EN DDI DRVRS signal is not asserted, the SEND signals on the data interconnection are reflected at the RCVR SEND 0 through RCVR SEND 2 lines from the latch 566.

DI REC and DI RRDY signals are both generated in response to signals from a two-stage latch 568 that is updated at the rate of the CLKOUT signal. When the RECEIVE signal from latch 738 on FIG. 23B is asserted, the signal from the corresponding stage of the latch 568 energizes a differential driver 570 through an input AND gate 572 to assert the DI REC signal. Likewise when an RRDY signal, from latch 738 on FIG. 23B, is asserted, the other stage of the latch 568 will energize a differential driver 574 to generate the DI RRDY signal. The drivers 570 and 574 are independently enabled by the assertion of either a DI READ signal or a SELF-TEST signal when a diagnostic initialization (DIAG INIT) signal is not asserted. A receiver 578 and an OR gate 580 generate a RCVR RECEIVE signal in response to the DI REC signal; a receiver 582 and an OR gate 584 generate a RCVR RRDY signal in response to the DI RRDY signal.

Whenever the FAR END DISABLE signal from the control interconnection 46 is at an asserted level, a flip-flop 586, that is clocked by a SILO T2 clocking signal, clears and asserts a DISABLE SYNC signal that when asserted indicates that the communications device is to ignore the contents of all signals on the data interconnection 51.

Figure 21A:
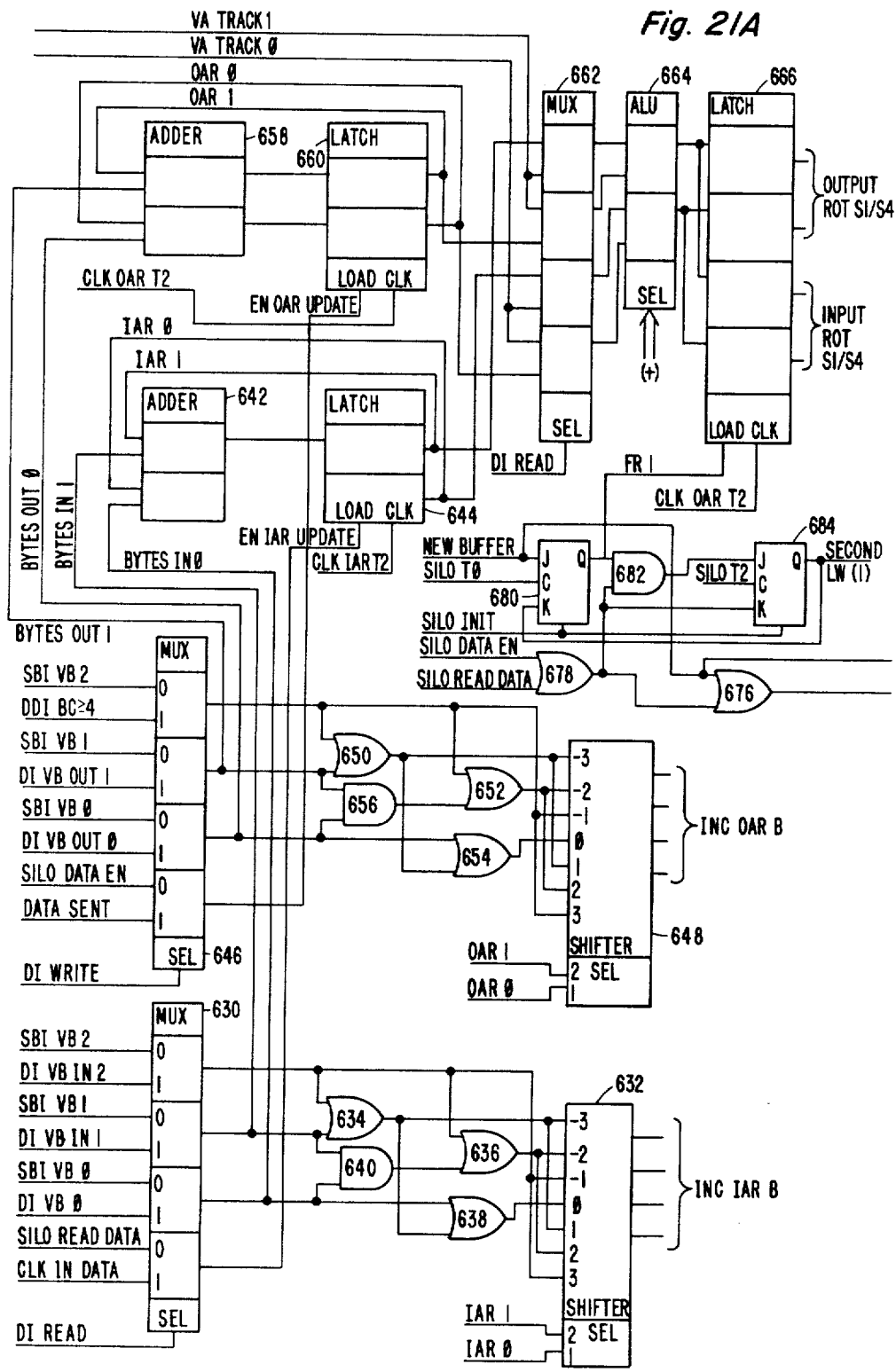
FIGS. 21A through 21D comprise a logic diagram of circuitry in the silo control shown in FIG. 19.
Figure 21B:
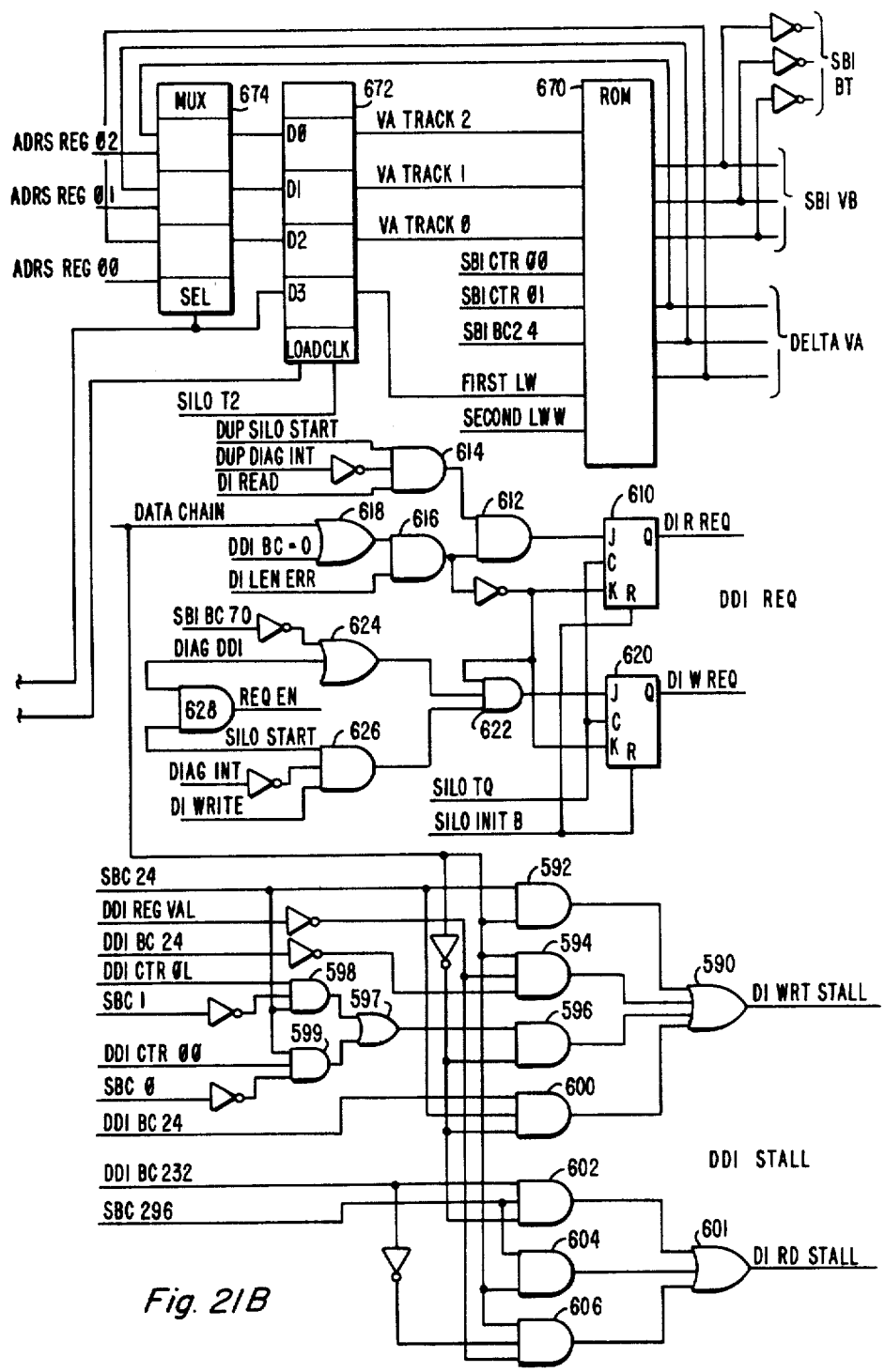

FIGS. 21A and 21B illustrate circuitry in the silo control 355 to increment the IAR B and OAR B incoming byte and outgoing byte address registers 351 and 357, and to assert the OUTPUT ROT S1/S0, and INPUT ROT S1/S0 signals which control byte rotators 351. The illustrated circuitry also asserts the DI RREQ and WREQ signals that govern read and write requests on the DI 51, and the DDI STALL signals that indicate that a stall condition exists.

A stall condition can occur under two conditions while transferring data between the process data path 47 and the external device 27. First, a read stall condition indicates a nearly full silo RAM, and prevents transfers from the external device to the communications device that could write over data in the silo RAM. Secondly, a write stall condition indicates that the number of bytes of data in the silo RAM is low, and that a transfer from the process data path to the far end device will be temporarily suspended until further data is transferred to the process data path from the user process data block.

Figure 32A:
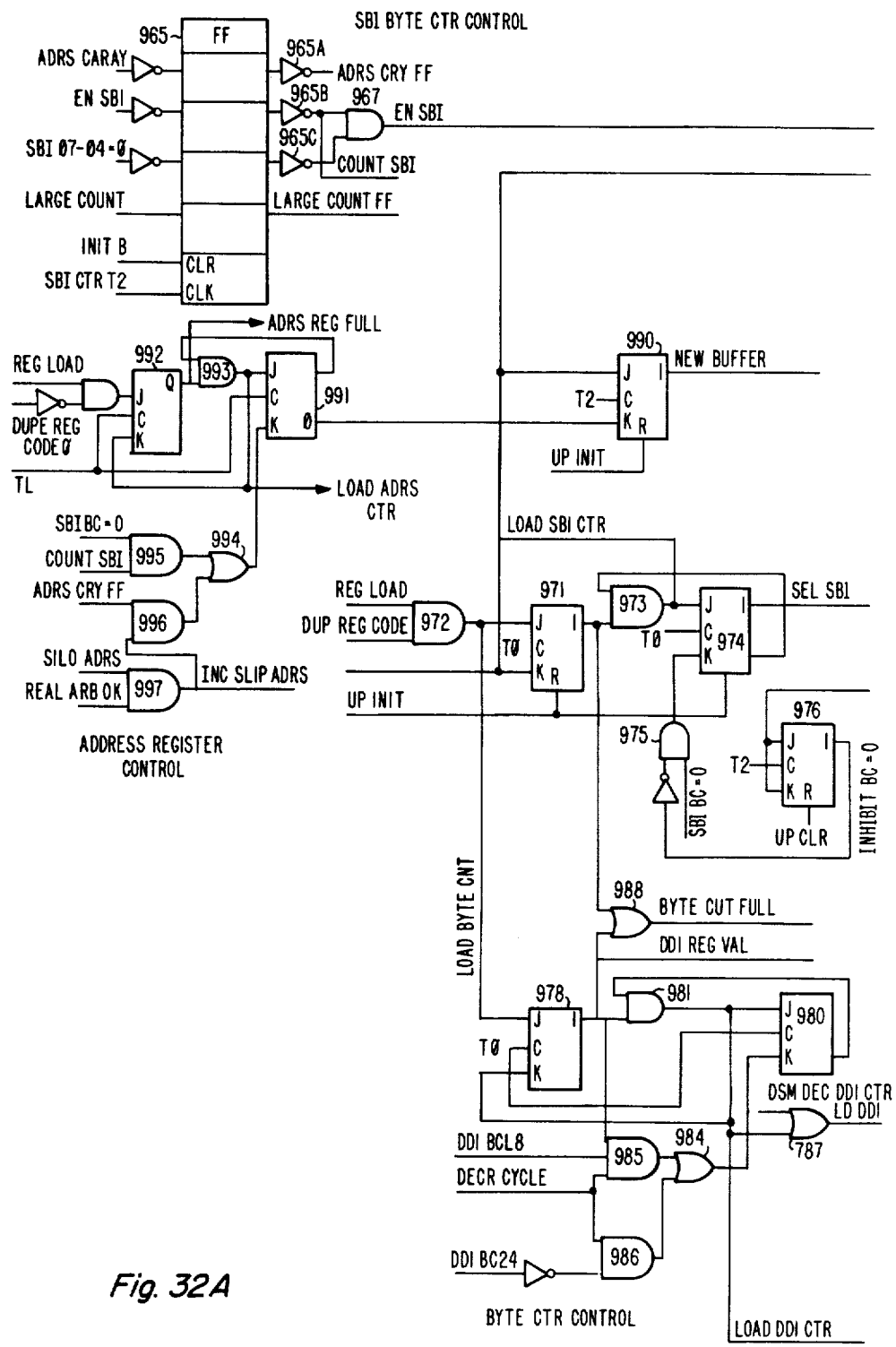
FIGS. 32A and 32B constitute a detailed logic diagram of circuitry shown in FIG. 26A.

If the communications device is transferring data to the external device over data interconnection 51 and a write stall condition arises, an OR gate 590 asserts a DI WRT STALL signal. Several AND and OR gates can energize OR gate 590 and they, in turn, are energized by certain signals from the data path control circuitry in FIGS. 21C and 21D and from byte count control and decode circuitry shown in FIGS. 32A-B and 33. OR gate 590 is energized by an AND gate 592 which in turn is energized if an SBC≧4 is not asserted, if a DATA CHAIN signal is asserted. OR gate 590 is also energized by an AND gate 594, which in turn is energized if the DATA CHAIN signal is asserted, if the DDI BC≧4 byte count signal is not asserted and a DDI REG VAL signal from flip-flop 978 on FIG. 32A is not asserted, indicating that the DDI byte count register is not being loaded. OR gate 590 is also energized by an AND gate 596, which is energized if the when DATA CHAIN signal is not asserted, and if an OR gate 597 is energized. OR gate 597 in turn is energized by an OR gate 598 which is energized when an SBC≧4 signal is not asserted, when an DDI CTR 01 line and an SBC 1 line are both not asserted. OR gate 597 is also energized by AND gate 599 which is energized if the SBC≧4 signal and the DDI CTR 00 line are asserted, if the SBC 1 line is not asserted. OR gate 590 is also energized by AND gate 600 which is energized when DATA CHAIN is not asserted if the DDI BC≧4 signal is asserted and the SBC≧4 signal is not asserted.

The DI RD STALL signal is generated by an OR gate 601 energized by any one of AND gates 602, 604 and 606. AND gate 602 is energized if the DATA CHAIN signal is not asserted, if both the DDI BC≧32 and SBC≧96 signals are asserted. In one specific embodiment, the silo RAM has a capacity of 128 bytes, and a silo byte count of greater than 96 indicates that the silo RAM is nearly full. AND gate 604 is energized if the DATA CHAIN and SBC≧96 signals are both asserted. AND gate 606 is energized if the DATA CHAIN signal is asserted if the DDI REG VAL and DDI BC≧32 signals are not asserted.

Silo control 355 further includes circuitry for generating read request and write request signals which indicate that the communications device requires data from external device 27 or has data to be transferred to external device 27 over the data interconnection DI 51. A read request, DI RREQ, signal is asserted if a flip-flop 610 is set. The flip-flop 610 is set if an AND gate 612 is energized and an AND gate 616 is not energized, when clocked by the SILO T0 clocking signal. AND gate 612 is energized when AND gates 614 and 616 are both energized. AND 614 is energized by a SILO START signal from the Flag 1 register on FIG. 14B, if a DI READ signal from OR gate 774 is asserted and a DIAG INT flag from the Flag 0 register on FIG. 14B is cleared. AND gate 616 is energized by a DI LEN ERR signal from flip-flop 778 on FIG. 23B if OR gate 618 is energized. OR gate 618 in turn is energized by the DATA CHAIN signal and by the DDI BC=0 signal. Flip-flop 610 can be cleared, to shift the DI RREQ signal to a non-asserted state, if AND gate 616 is not energized and the flip-flop is clocked by the silo T0 signal, or if the SILO INIT B initializing signal is asserted.

Figure 25:
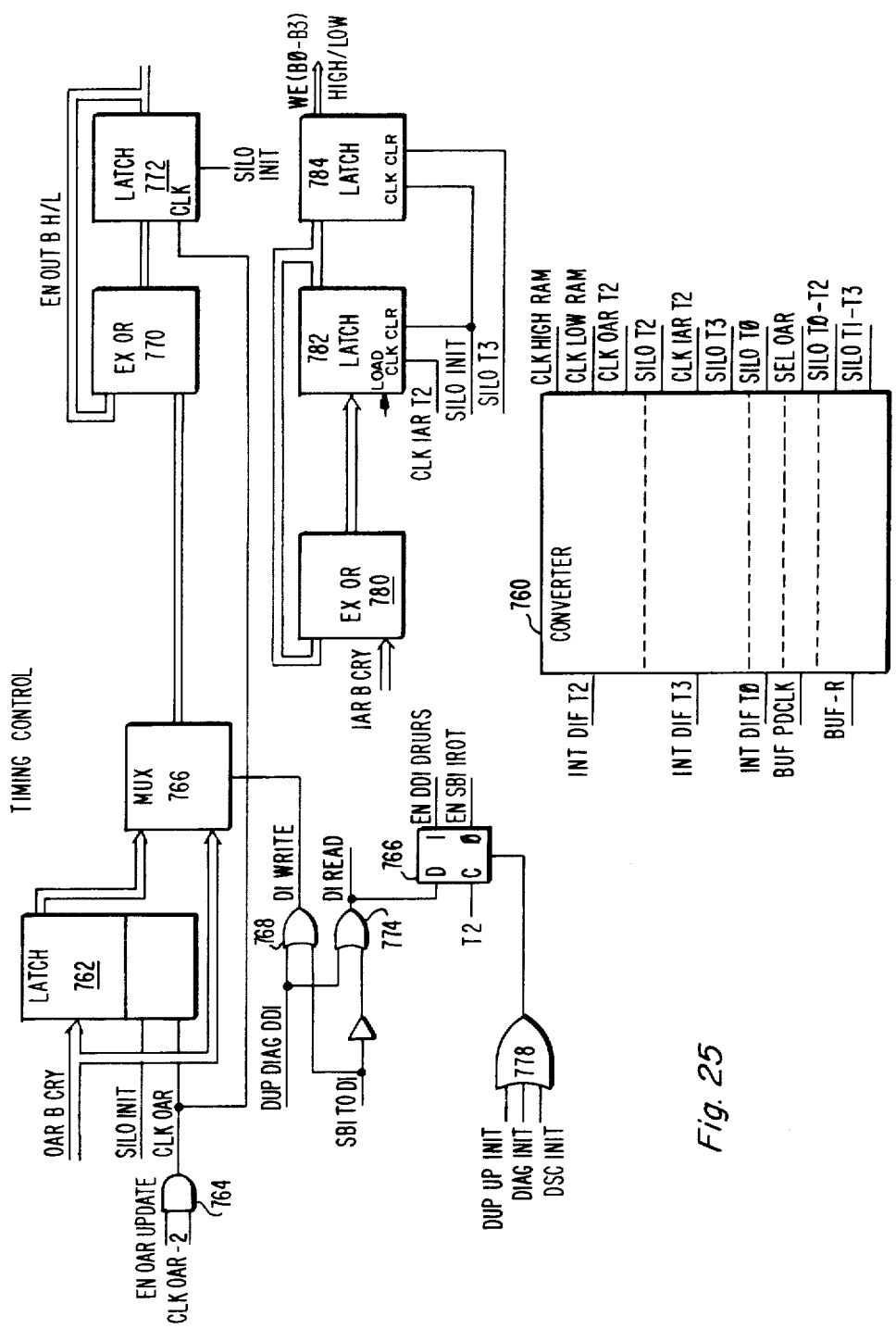
FIG. 25 comprises a detailed block diagram of the timing control circuitry that is shown in FIG. 19.

The write request, DI WREQ, signal is asserted if a flip-flop 620 is set. Flip-flop 620 is set if AND gate 622 is energized and AND gate 616 is not energized, when clocked by the SILO T0 clocking signal. AND gate 622 in turn is energized when AND gate 616, if OR gate 624 and AND gate 626 are all energized. OR gate 624 is energized if SBI BC=0 is not energized, if the DIAG DDI flag from Flag 0 register on FIG. 14B is set, or if the SBC≧112 signal is asserted. AND gate 626 is energized when the SILO START flag is set and the DI WRITE signal from OR gate 768 on FIG. 25 is asserted if DIAG INT is not set. An AND gate 628 asserts a REQ EN signal when the SILO START signal is asserted if the DIAG DDI flag is not set.

The remaining circuitry shown on FIGS. 21A and 21B controls the incrementing of the input address register IAR 357, output address register OAR 356, the input and output byte rotators 351 and 360 and for generating certain signals for decrementing the SBI and DDI byte counters in the memory reference controller 52 and for incrementing the address counter 335 as the process data is transferred.

A multiplexer 630 couples SBI VB 2-0 signals or DI VB 2-0 signals representing the number of valid bytes transferred during each read operation and to a shifter 632 through OR gates 634, 636 and 638, and an AND gate 640. The OR gates 634, 636 and 638 and AND gate 640 generate, during the transfer, a mask indicating which of the four bytes in each longword are valid, that is, which bytes are to be kept. The select input (SEL) of multiplexer 630 is energized by the DI READ signal.

The shifter 632, the select inputs of which are governed by IAR 1 and IAR 0 signals, provide the four INC IAR B signals that control the incrementing of respective stages of the address counters that constitute IAR address counter 357 as shown on FIG. 19. Output signals from two stages of multiplexer 630, corresponding to a BYTES IN 1 signal and a BYTES IN 0 signal, are coupled to an adder 642. Adder 642 adds the BYTES IN 0 and BYTES IN 1 signals to corresponding IAR 0 and IAR 1 signals, and the sums are stored in latch 644. The load input of latch 644 is conditioned by an IAR UPDATE signal from a third stage of multiplexer 630. The output signals of latch 644, which are clocked by a CLK IAR T2 clocking signal, that has the same timing as the T2 clocking signal, constitutes the IAR 0 and IAR 1 signals. The IAR 0 and IAR 1 signals are coupled to the inputs of adder 642 and to the select inputs of shifter 632 to control its shift, and they also provide input signals to two stages of a multiplexer 662.

Multiplexer 646, through shifter 648, OR gates 650, 652 and 654 and an AND gate 656, generates the INC OAR B signals to output address register OAR 356, in the same manner as the the INC IAR B signal is generated. An adder 658 and a latch 660 generate BYTES OUT 1 and BYTES OUT 0 signals from multiplexer 646 and OAR 0 and OAR 1 signals are coupled from latch 660 to provide the corresponding signals to two other stages multiplexer 662. VA TRACK 0 and VA TRACK 1 signals from latch 672 on FIG. 21B are also coupled to multiplexer 662.

The output signals from multiplexer 662, as selected by the DI READ signal, are coupled to a two stage arithmetic logic unit (ALU) 664. When DI READ is not asserted, multiplexer 662 couples the IAR 1 and VA TRACK 1 signal to one stage of ALU 664, and the IAR 0 and VA TRACK 0 signals to the second stage of ALU 664. When DI READ is asserted, multiplexer 662 couples the OAR 0 and VA TRACK 0 signals to one stage of ALU 664, and the OAR 1 and VA TRACK 1 signals to the second stage of ALU 664. The output signals from ALU 664 are stored in a latch 666, clocked by the CLK OAR T2 clocking signal, the output signals of which constitute the OUTPUT ROT S1/S0 signals and the INPUT ROT S1/S0 signals, which control output byte rotator 360 and input byte rotator 351 respectively. The load input of latch 666 is conditioned by an FR 1 signal from flip-flop 680.

As was previously mentioned, the circuitry from multiplexer 630 through latch 666 controls the byte rotators to permit the silo RAM to be filled during each longword transfer with only certain bytes and of each longword that have been identified as being valid bytes. Since transfers over the SBI are longword-aligned, certain lower bytes in the first longword of data received over the SBI may not be of interest. Furthermore, certain upper bytes of the last longword received from the SBI also may not be valid. The upper bytes are invalid if they would cause the number of bytes received in the silo RAM from the SBI to exceed the byte count stored in the SBI byte count register.

Cetain bytes in the last longword transferred by the external device to the communications device also may not be valid. If the SEND 2-0 signals indicate that fewer than four bytes of process data are being sent for each transfer, the other bytes are not valid and are not stored in the silo RAM. For transfers over the data interconnection 51, the valid bytes, if fewer than all of the bytes, are always the lower bytes.

The silo RAM stores the valid bytes at the low byte position, and the byte rotators are provided in the data path from the SBI to rotate the bytes so that the valid bytes are in the low byte positions. The bytes that are not of interest, that is, that are not valid, are stored in the silo RAM, but are written over during succeeding transfers. Multiplexers 630 and 646 identify the respective valid byte signals, whether SBI VB 0-2, DI VB IN 0-2, or DI VB OUT O-1, based on the direction of transfer. Thus, if a DI WRITE operation occurs, DI WRITE will be asserted and DI READ will not be asserted. Multiplexer 646 selects the "1" inputs, which includes the DI VB OUT 0-1 signals, to increment the output address registers and multiplexer 630 selects the "0" inputs, which couples the SBI VB inputs, to increment the input address registers. The incrementing is governed by the masks generated by the AND gates 640 and 656 and OR gates 634, 636, 638, 650, 652 and 654, and by the selection input signals provided by the IAR 1, IAR 0, OAR 1 and OAR 0 signals, which select four of the seven input signals of each of shifters 632 and 648 to be coupled to the respective INC IAR B and INC OAR B lines.

The output signals from the two middle stages of each multiplexer 630 and 646 identify the number of valid bytes clocked into the silo, and the number of valid bytes being clocked out of the silo respectively. The valid bytes of the first longword transferred from the SBI to the silo RAM, if fewer than all the bytes, are the upper one, two or three bytes, with the invalid bytes being the lower bytes. Thus, the valid bytes entering the process data path are rotated to the lowest byte positions and stored in the silo, and the input address register is incremented only for those byte positions that are valid. If the transfer is from the data interconnection 51, no rotation is required as the valid bytes are already in the lowest byte positions. The BYTES IN 0 and BYTES IN 1 signals identifies the number of valid bytes that are being clocked in, which is added to the number of valid bytes that were previously clocked in, as represented by the IAR 0 and IAR 1 signals. These signals are coupled through multiplexer 662 and in ALU 664 they are added to the VA TRACK 0 and VA TRACK 1 signals and received in latch 666 to provide the INPUT ROT S1/S0 signals to rotate the bytes of the incoming longword. At this point, the input address register increments the addresses corresponding to the valid bytes of the stored longword.

When a second and succeeding longwords, to the penultimate longword, are initially received from the SBI, all of the bytes are valid and the byte rotator rotates the bytes to the orientation determined by the first longword received. The orientation is selected so that the lowest valid bytes of the second longword cover the invalid bytes of the first longword stored in the silo, and the remaining bytes are stored in the lower bytes of the next longword in the silo RAM. For example, if the two upper bytes, Bytes 2 and 3, of the first longword transferred over the SBI are valid, they are rotated so as to be stored in byte positions 0 and 1 of a first longword of the silo, and bytes 0 and 1 are stored in byte positions 2 and 3. The incoming address register increments the addresses of byte positions 0 and 1, but not of byte positions 2 and 3. When the next longword is transferred, from the SBI, all four bytes are valid and the bytes of the longword will be rotated to place bytes 0 and 1 in byte positions 2 and 3, which are stored in the first longword in the silo RAM and to place bytes 2 and 3 in bytes positions 0 and 1, which are stored in the lower byte positions 0 and 1 of the second longword in the silo RAM. The input address register 357 will then increment the address of byte positions 0 and 1 to the third longword in the silo, and of byte positions 2 and 3 to the second longword. Transfers of succeeding longwords including the last longword transferred will be stored in the silo RAM a manner similar to the second longword, except that for the last longword the only stages of the input address register that are incremented are the ones corresponding to the valid bytes of the last longword.

For transfers from the DI, the bytes are not rotated, but unlike transfers over the SBI, transfers of longwords after the first may also include invalid bytes which are to be written over in the silo RAM. Thus, if the SEND signals indicate that the external device is transferring only the lower two bytes over the data interconnection, the upper two bytes are thus invalid. They are however stored in the silo RAM, but the input address registers for those bytes are not incremented and they are written over.

When a longword is received, the BYTES IN 0 and 1 signals identify the valid bytes, which are added to the IAR 0 and 1 signals which represent the byte positions in the silo containing valid bytes from previous bytes stored in the silo. This sum causes the INPUT ROT S1/S0 signals to rotate the bytes of the subsequent longword based on the valid bytes of this longword and the valid bytes of the previous longwords. Since the updated IAR 0 and 1 signals contain this information, the select inputs of shifter 632, governed by IAR1 and 0, cause shifter 632 to shift by an amount representative of the number of valid bytes in the transfer. The mask created by OR gates 634, 636 and 638 and AND gate 640 thus increment the addresses of the respective byte positions in the incoming address register based on the number of valid bytes in the subsequent longword, with the shifter selecting the byte positions to be incremented.

A ROM read only memory 670 receives VA TRACK 2-0 signals from multiplexer 672, the SBI BC≧4, SBI CTR 00 and SBI CTR 01 SBI byte count signals from the memory reference controller, a FIRST LW signal which when asserted indicates that the transfer is the first longword transfer with a new buffer, and a SECOND LW(1) signal which when asserted indicates that the transfer is the second with a new buffer. The truth table for ROM 670 is set forth in FIG. 22A. When the SBI BC≧4 signal is asserted all of the bytes of the longwords received after the first longword, are valid. If SBI BC≧4 is not asserted, indicating that the longword is the last longword, the SBI CTR 00 and the SBI CTR 01 signals identify the valid bytes of the longword. The output of ROM 670 constitutes DELTA VA 2-0 signals, which indicate the change in the virtual address of a next transfer necessitated by the number of bytes transferred during a particular transfer, SBI VB 2-0 signals which indicate the number of valid bytes transferred over the SBI during a particular transfer, and SBI BT 2-0 signals. The SBI BT 2-0 signals constitute the complement of the respective SBI VB 2-0 signals. The DELTA VA 2-0 signals are coupled to a three-stage multiplexer 674, which couples those signals or ADRS REG 2-0 signals to a latch 672. The SBI VB 2-0 signals provide input signals to multiplexers 630 and 646. The SBI BT 2-0 signals are coupled to the memory reference controller byte count registers, as described below with regard to FIGS. 32A and B. The ADRS REG 2-0 signals constitute the low three output signals from address register 804 on FIG. 26A, and identify for the first longword transfer the valid bytes of the longword.

The FR 1 signal which conditions the load input of latch 666 is generated by a flip-flop 680, and is asserted when the flip-flop is set by a NEW BUFFER signal from a flip-flop 990 on FIG. 32A in the memory reference controller when clocked by the SILO T0 clocking signal, if a SECOND LW(1) signal is not asserted.

An OR gate 678, energized by a SILO DATA EN signal or a SILO READ DATA signal, when the FR 1 signal is asserted, energizes an AND gate 682. The NEW BUFFER signal and the output of OR gate 678 also energizes an OR gate 676. OR gate 676 when asserted energizes the load input of latch 672. AND gate 682, when energized, conditions the set input of a flip-flop 684, which is clocked by the SILO T2 clock signal. The set output of flip-flop 684, the SECOND LW(1) signal, conditions the reset input to flip-flop 680 and also provides one input to ROM 670. OR gate 678 conditions the reset input to flip-flop 684. At the start of a transfer into a new buffer, NEW BUFFER sets flip-flop 680 by the SILO T0 clocking signal. Previous to this, AND gate 682 was not energized, and at the previous SILO T2 clocking signal OR gate 678 had reset flip-flop 684. When the next SILO T2 is asserted, AND gate 682 and OR gate 678 are energized, setting flip-flop 684 to assert the SECOND LW(1) signal, which resets flip-flop 680 at the next SILO T0 clocking signal.

Figure 23A:
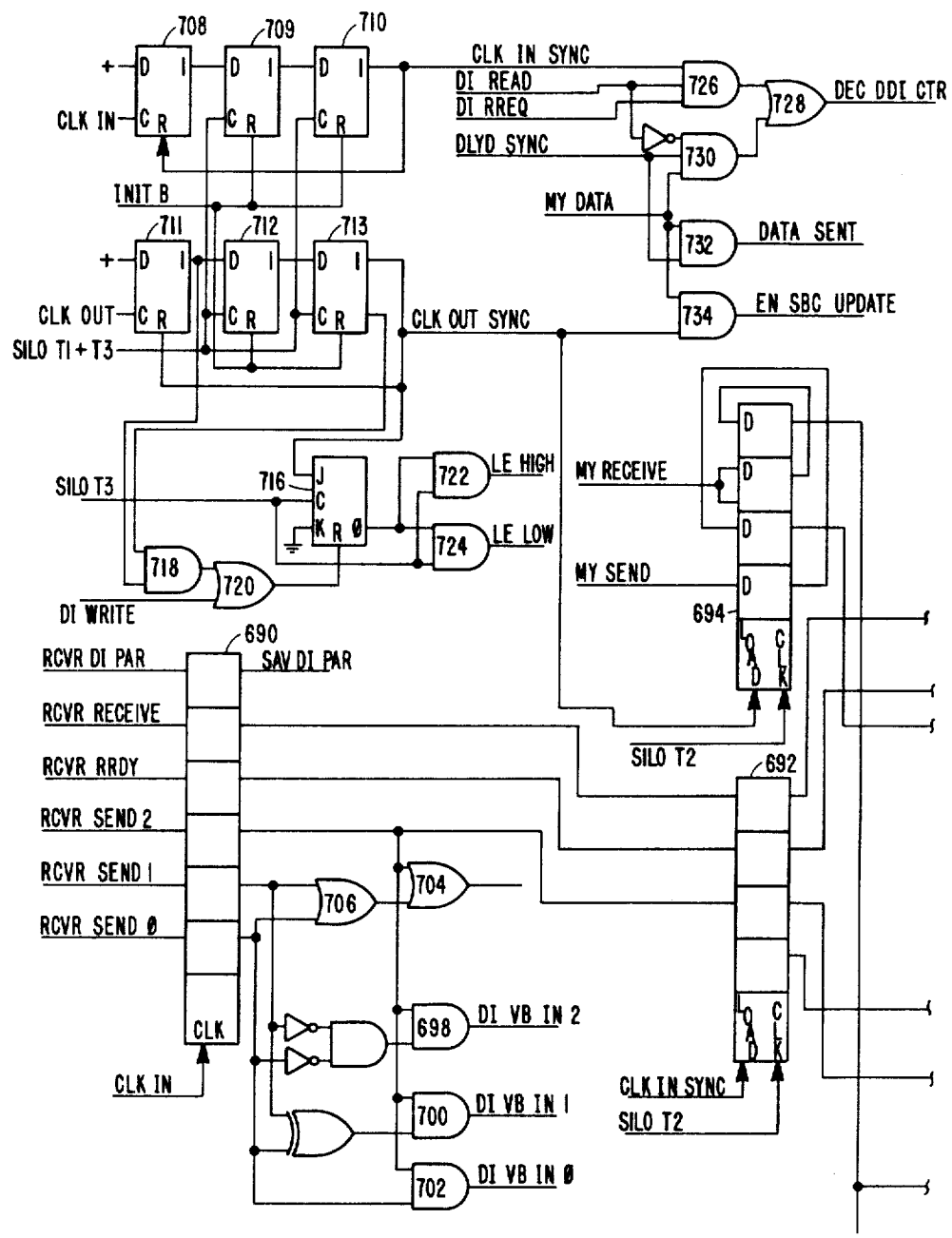
FIGS. 23A and 23B comprise a logic diagram of circuitry in the data interconnection control shown in FIG. 19.
Figure 23B:
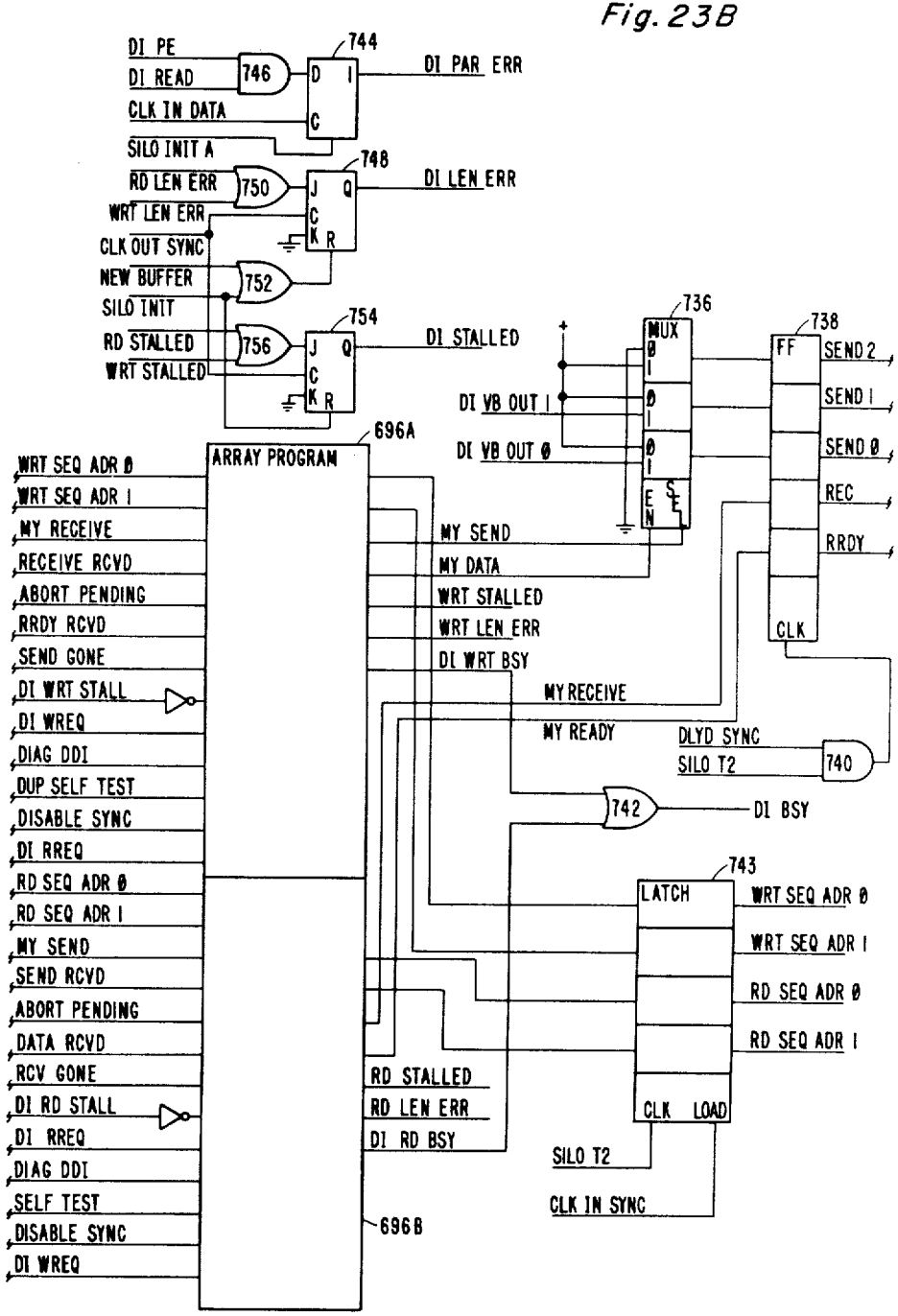

The DI VB IN 2-0 signals are generated by AND gates 698, 700 and 702 from FIG. 23A in response to the SEND 2-0 signals. The SEND 0 and 1 signals provide a mask indicating which of the lower one, two or three bytes, or all four bytes are being sent during the transmission. The DI VB OUT 1 and DI VB OUT 0 signals perform the same function for a transfer from the communications device to the external device over the DI. The DI VB OUT 1 and DI VB OUT 4 signals are generated by an AND gates 1108 and 1110 on FIG. 21C.

Figure 21C:
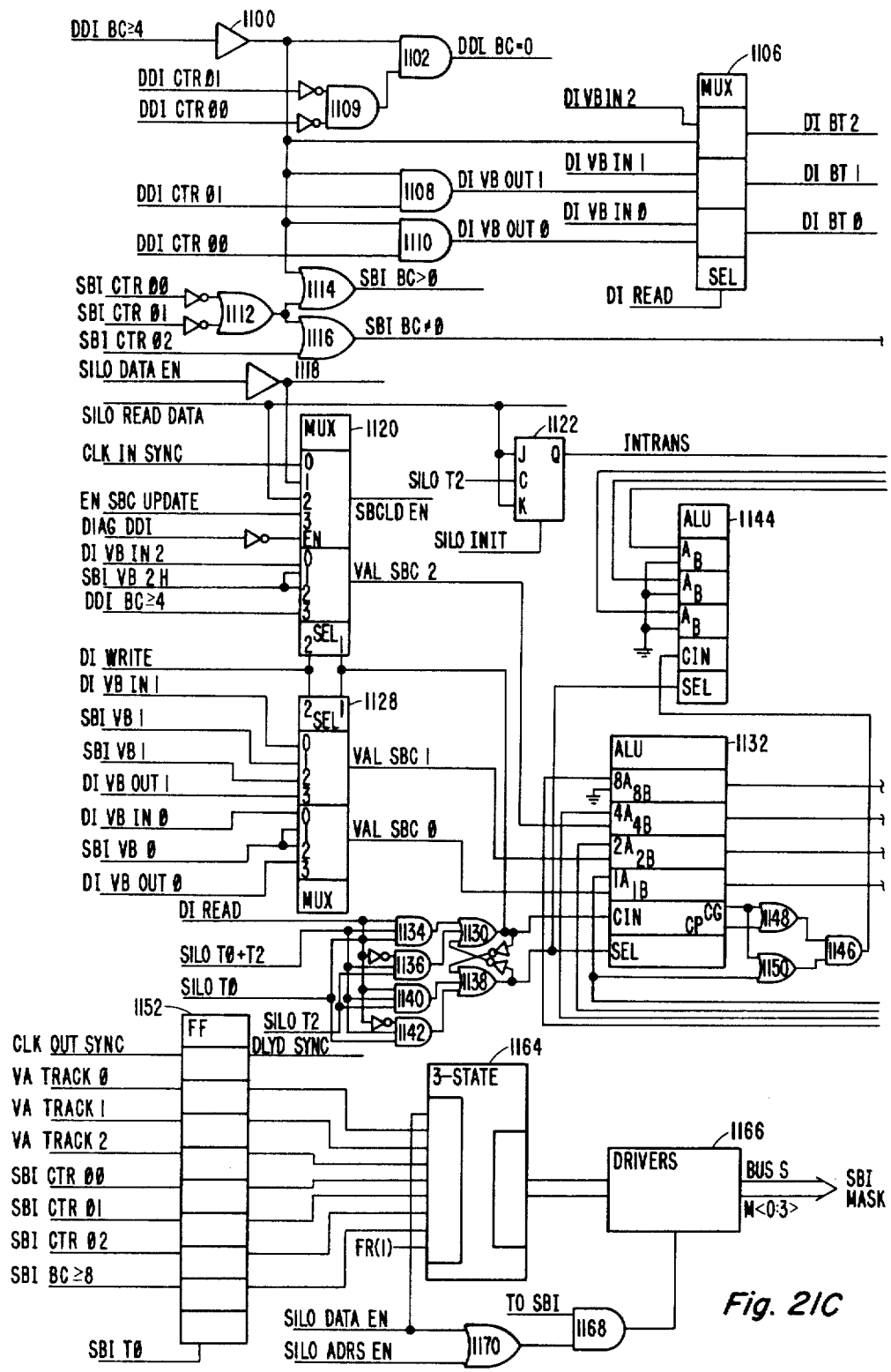
Figure 21D:
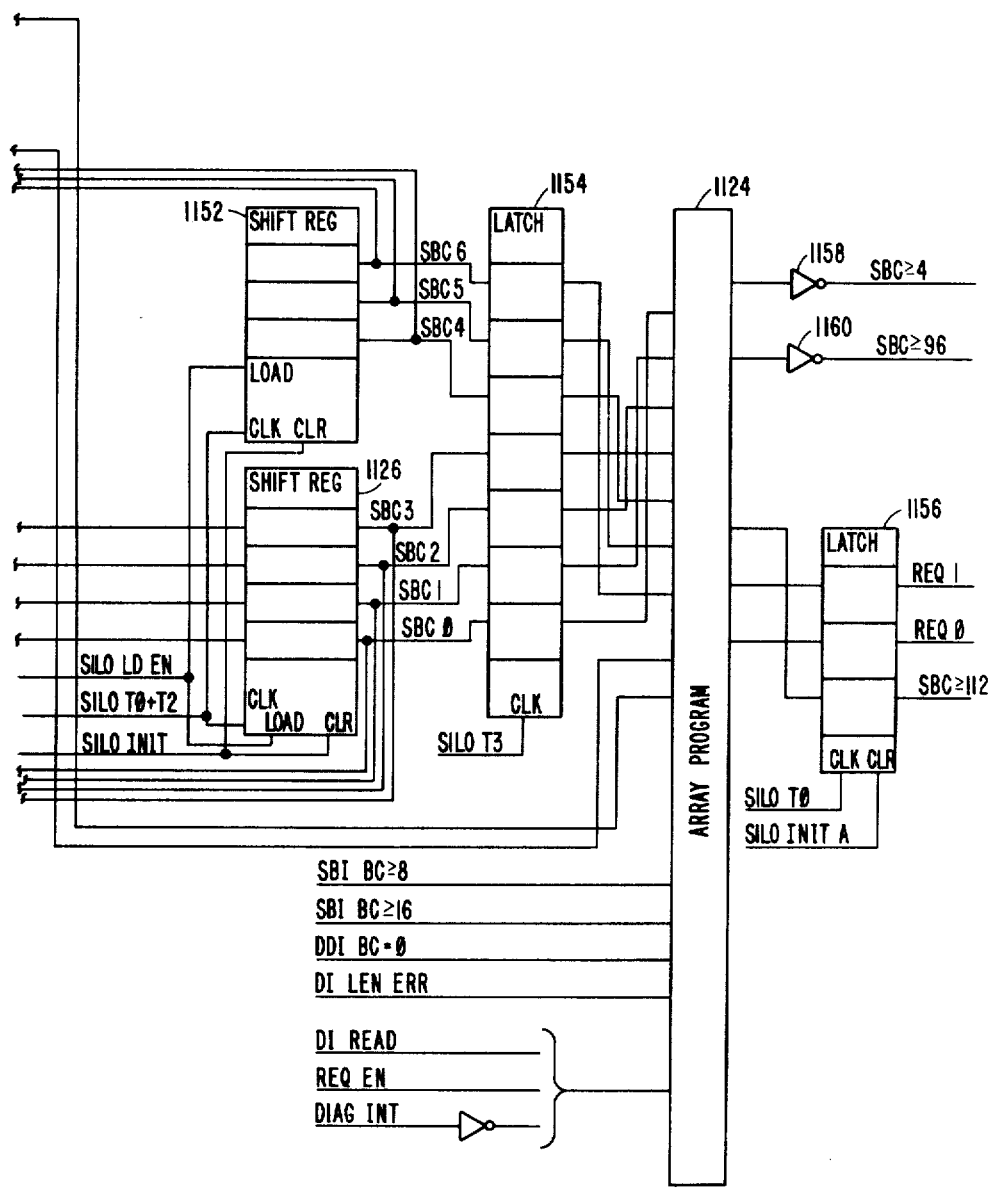
Figure 32B:
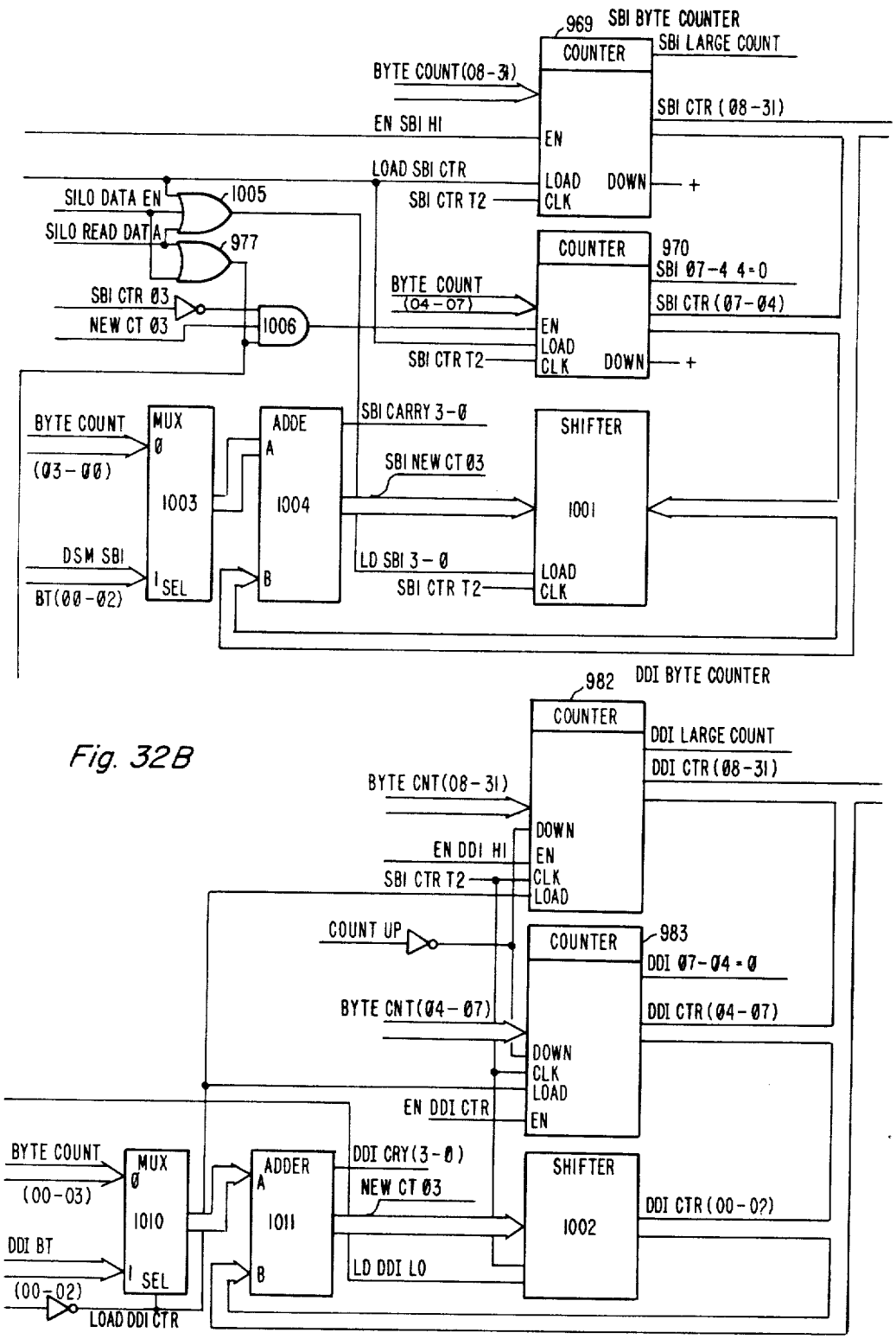
Figure 33:
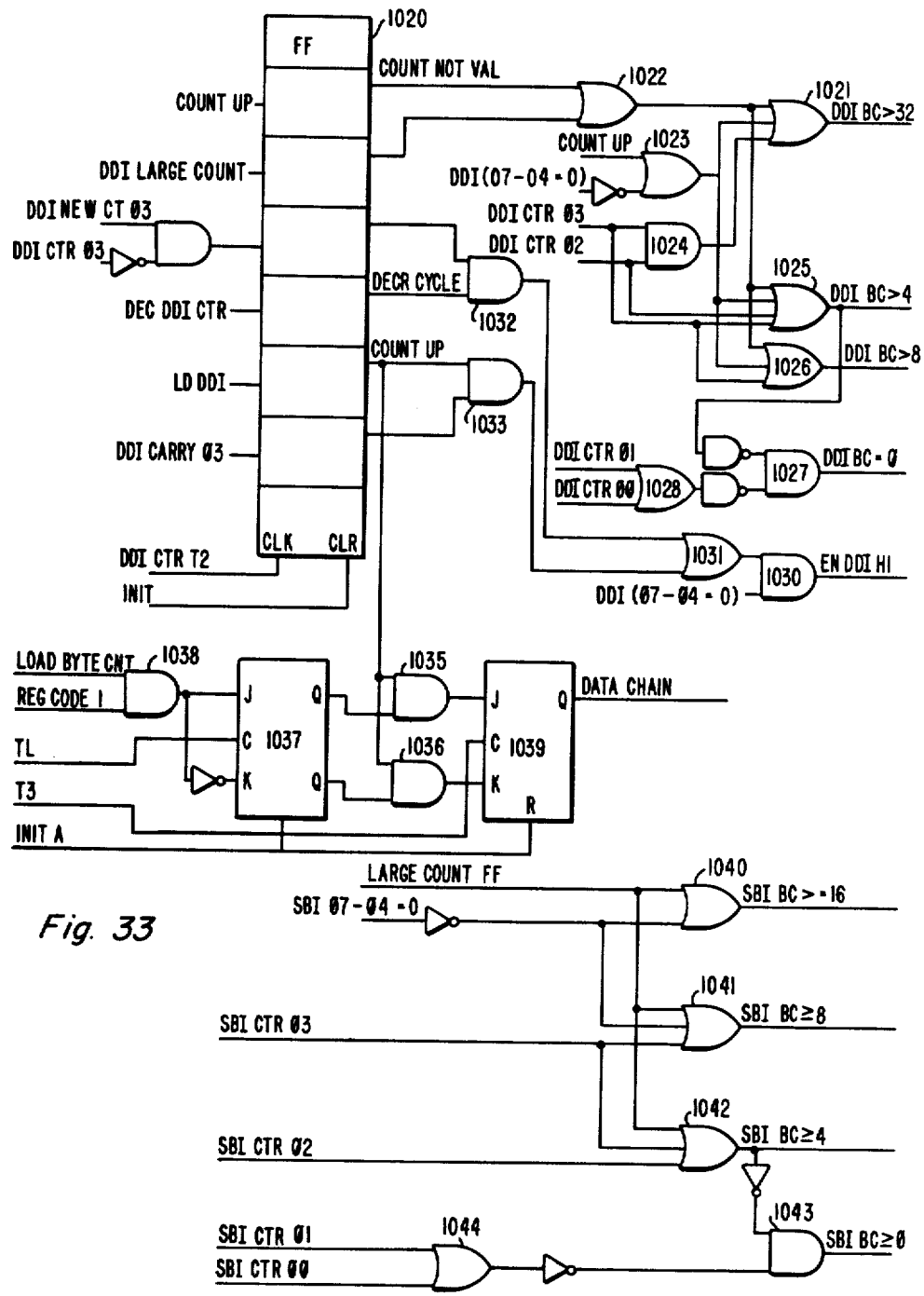
FIG. 33 constitutes a detailed logic diagram of other circuitry shown in FIG. 26A.
Figure 34A:
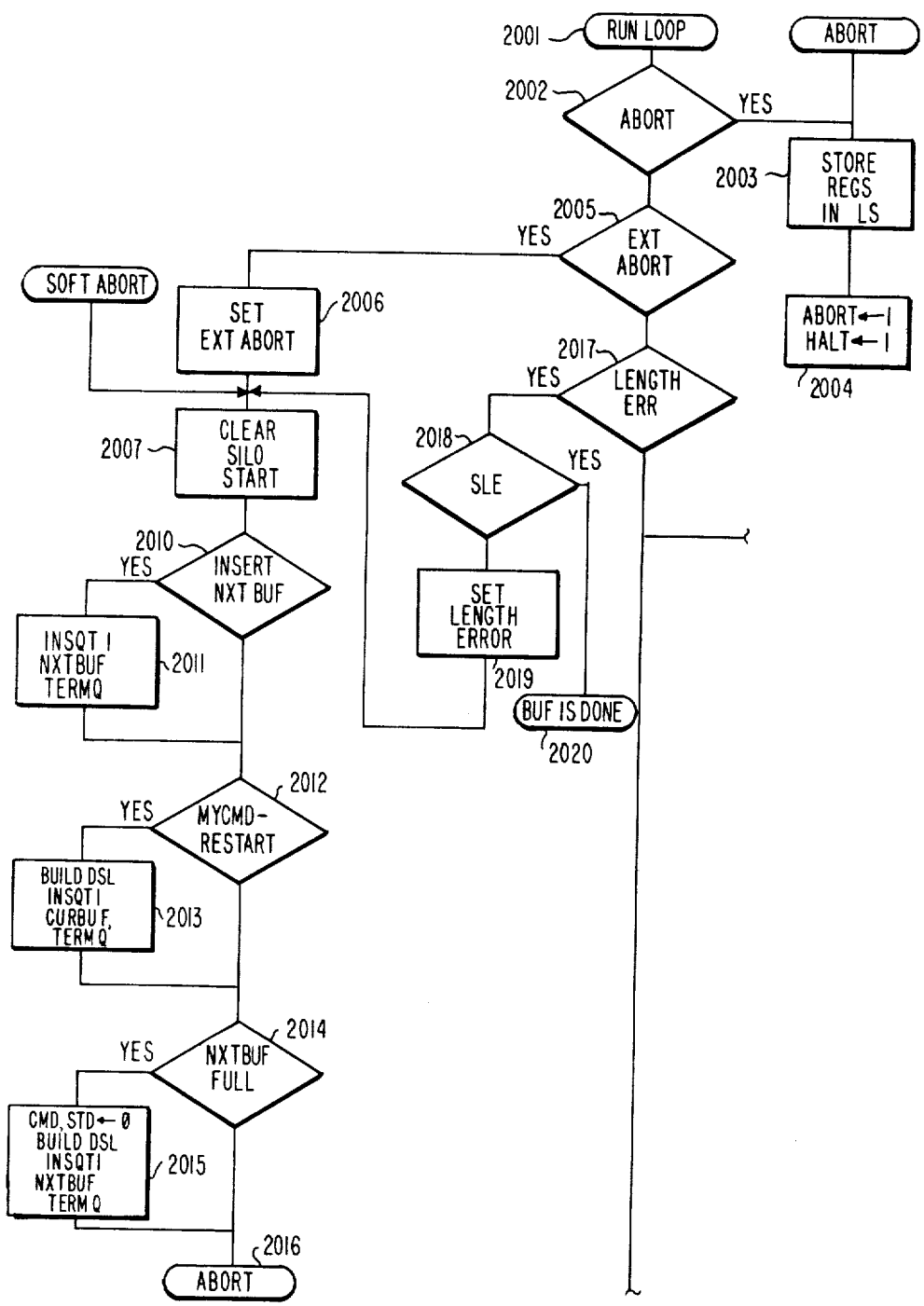
FIGS. 34A-34D shows a flow diagram that is useful in understanding certain phases of the operation of the circuitry shown in FIG. 8.
Figure 34B:
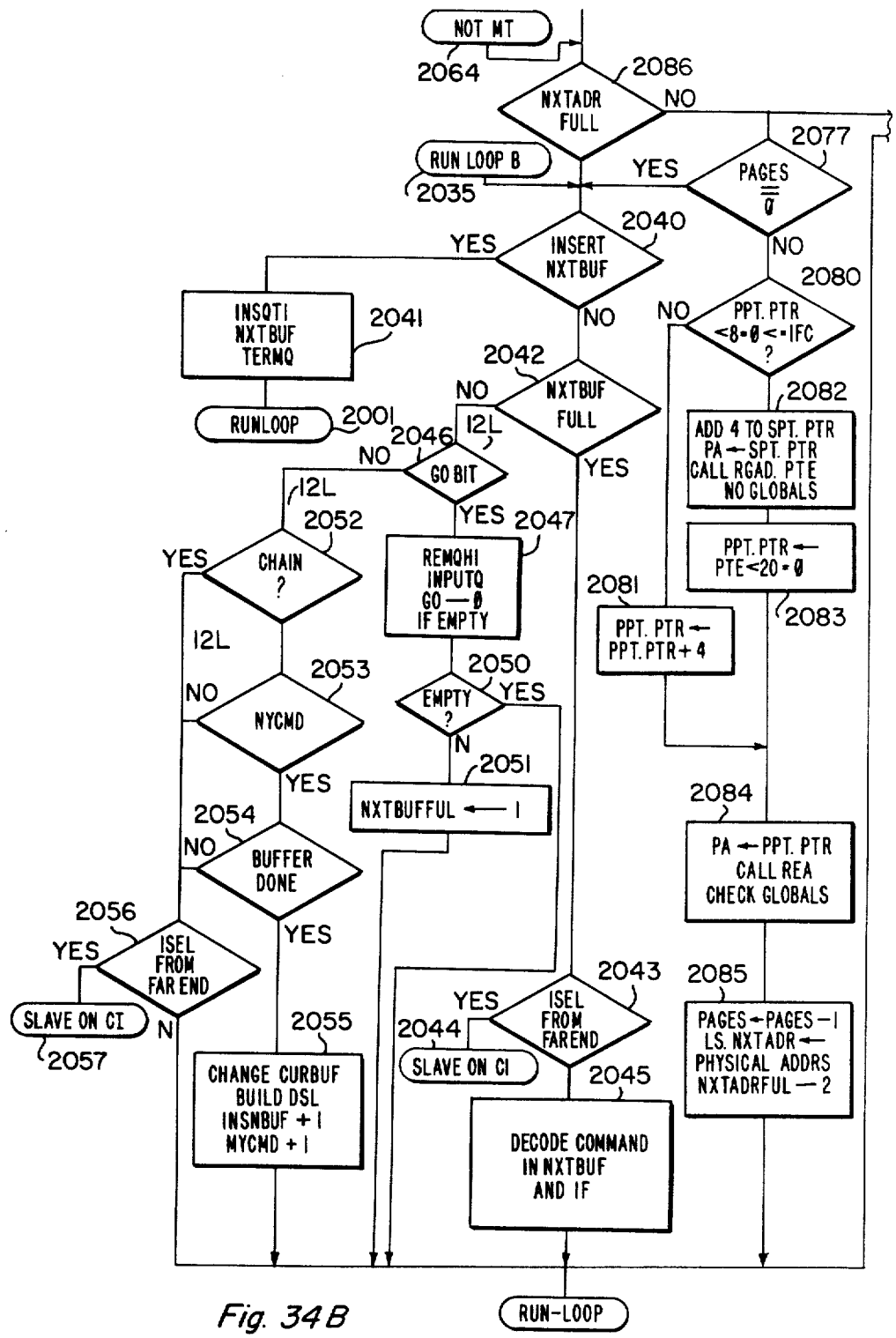
Figure 34C:
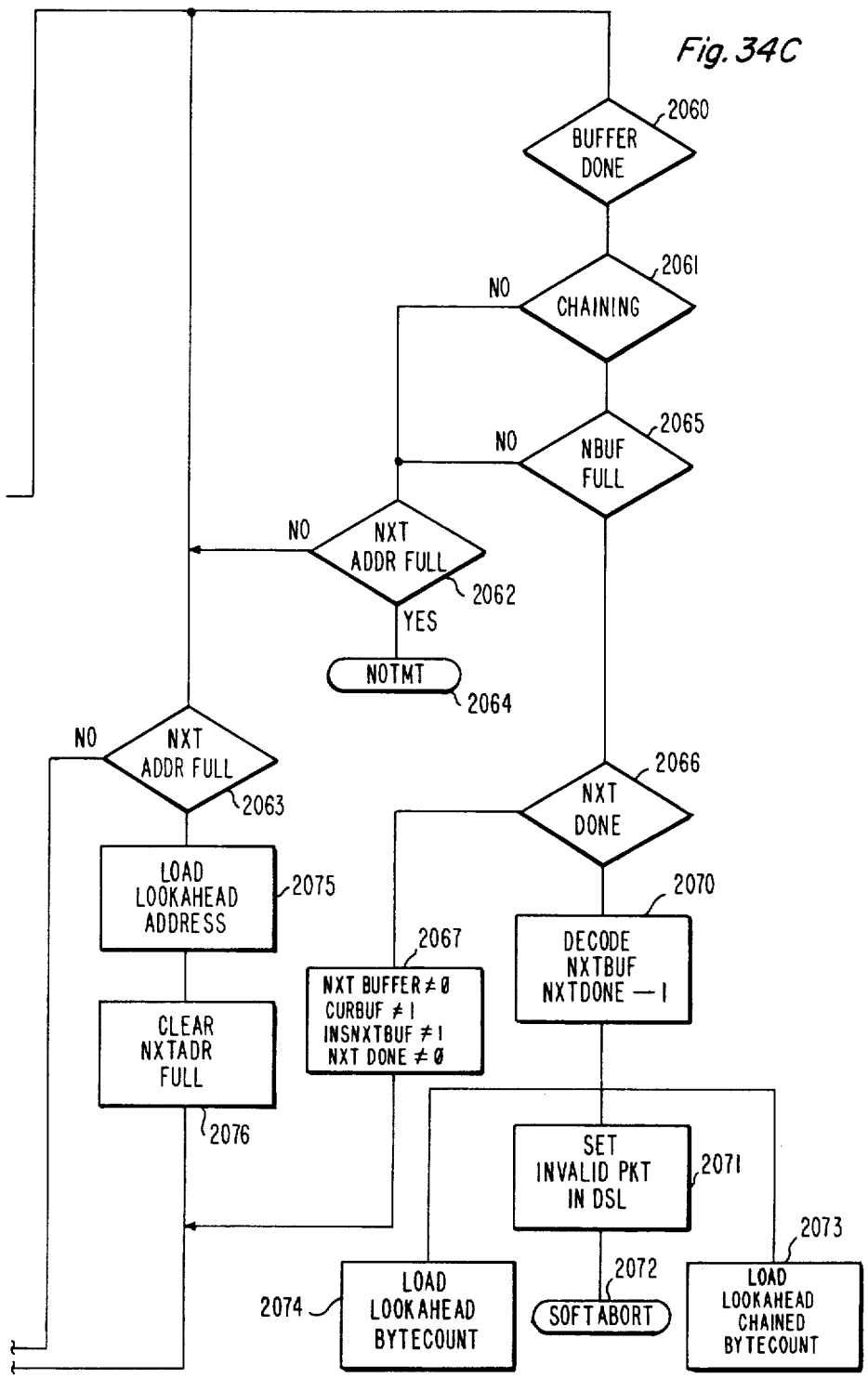
Figure 34D:
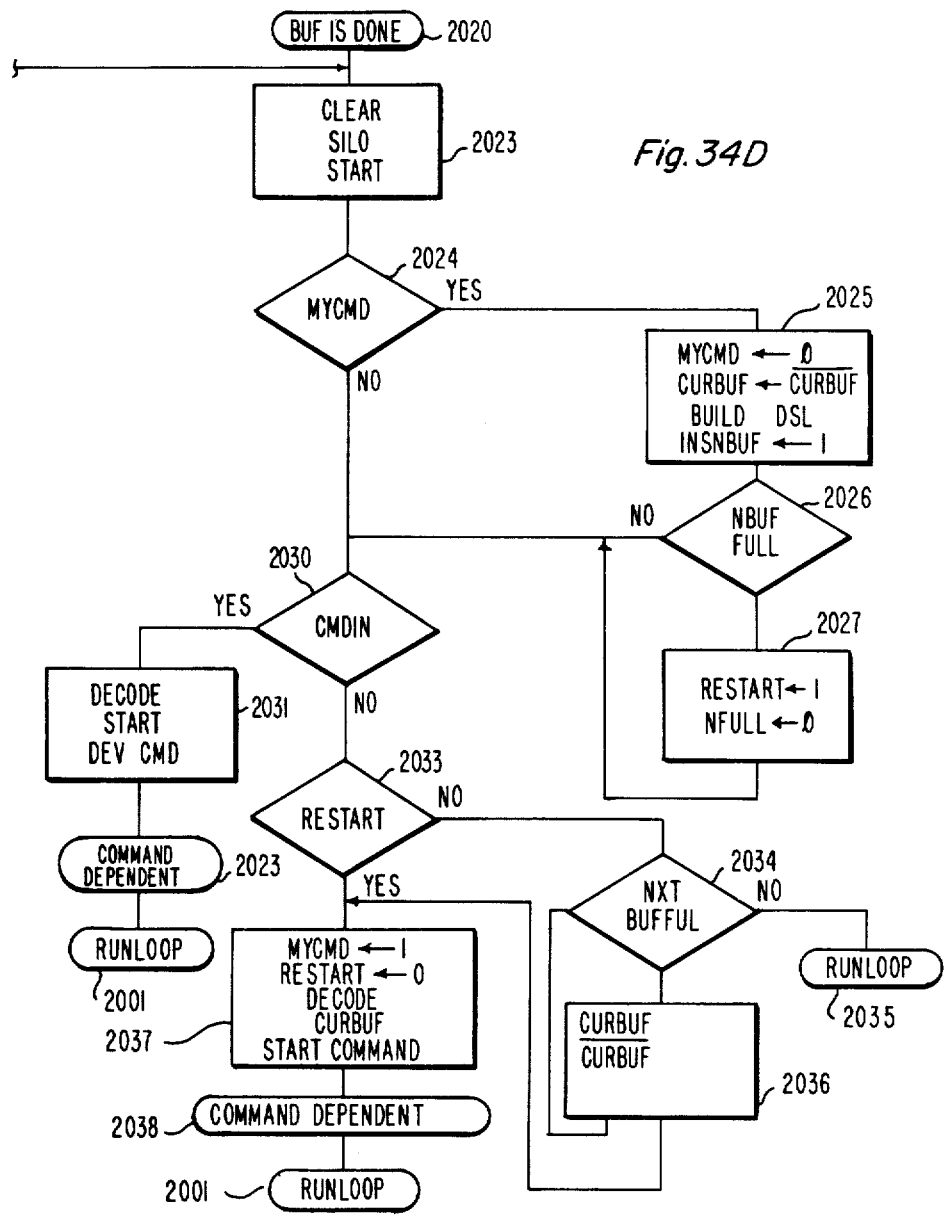

FIGS. 21C and 21D depict circuitry for generating signals indicating the number of bytes being transferred over the data interconnection 51, for generating silo byte count signals, for generating silo transfer request signals, and for generating mask signals couples to the SBI during transfer over the SBI. A DDI BC≧4 signal from OR gate 1025 on FIG. 33 is received in an inverter 1100 and to provide one input to an AND gate 1102, which is energized if an AND gate 1104 is also energized. AND gate 1104 is energized when DDI CTR 00 and DDI CTR 01 signals from the DDI byte counter on FIG. 32B are not asserted. AND gate 1102 generates a DDI BC=0 signal. Inverter 1100 also provides an input to one stage of a three-stage multiplexer 1106, and to AND gates 1108 and 1110. AND gate 1108 is then energized when DDI CTR 01 is asserted, and AND gate 1110 is asserted when DDI CTR 00 is asserted. AND gate 1108 generates the DI VB OUT 1 signal, and AND gate 1110 generates the DI VB OUT 1 signal. The output signals from AND gates 1108 and 1110 are coupled to second and third stages of multiplexer 1106. The three stages of multiplexer 694 are also connected to receive the DDI VB IN 2-0 signals, and the select input is controlled by the DI WRITE signal, the lower input of each stage being coupled to the outputs if the DI WRITE signal is asserted. The output signals of multiplexer 1106 constitute DI BT 2-0 signals, which indicate the number of bytes transferred over the data interconnection 51.

The SBI CTR 00 and SBI CTR 01 signals from the SBI byte counters on FIG. 32B, when asserted, energize an OR gate 1112, which in turn energizes OR gates 1114 and 1116. The SBI BC≧4 signal also energizes OR gate 1114, which generates SBI BC≧0 signal. An SBI CTR 02 signal also energizes OR gate 1116, which generates an SBI BC≧0 signal.

A SILO DATA EN signal from latch 953 on FIG. 31C is received in buffer 1118 and coupled to one of four inputs of a two-stage multiplexer 1120. A SILO RD DATA signal is coupled to a second input of multiplexer 1120 and also conditions both set and reset inputs of a flip-flop 1122. Flip-flop 1122 is clocked by the SILO T2 clocking signal, and when set asserts an IN TRANS signal which provides one input to a programmable logic array 1124 and when set indicates a longword of data that is in transit to the SBI. The flip-flop 1122 has an overriding reset input conditioned by a SILO INIT signal.

Two other input signals to one stage of multiplexer 703 are provided by a CLKIN SYNC signal from flip-flop 710 shown on FIG. 23A, an EN SBC UPDATE from AND gate 734 on FIG. 23A. The output of this first stage of multiplexer 1120 provides an SBC LD EN signal, which enables the load inputs of shift registers 1126. This stage is enabled if the DIAG DDI diagnostic flag of Flag 0 register 326D on FIG. 14B is not set.

The second stage of multiplexer 1120 receives the DI VB IN 2 signal and SBI VB 2 signal (at the second and third inputs) and a DDI BC≧4 signal from OR gate 1025 on FIG. 33. This stage generates a VAL SBC 2 signal.

A second multiplexer 1128 also has four inputs in each of two stages. The DI VB IN 1, SBI VB 1 (connected to the second and third inputs) and DI VB OUT 1 are coupled in a first stage. The output of this stage provides a VAL SBC 1 signal. The second four input stage receives the DI VB IN 0, SBI VB 0 (in the second and third inputs) and DI VB OUT 0 signals to produce a VAL SBC 0 signal. The VAL SBC 2-0 signals identify the number of valid bytes transferred during a particular transmission.

Multiplexers 1120 and 1128 each have two SEL selection inputs. A first selection input receives signals from the output of an OR gate 1130 as explained hereinafter. A second selection input is governed by the DI WRITE signal.

The VAL SBC 2-0 signals are connected to the lower three stages of an arithmetic logic unit (ALU) 1132. The output signals from the four stages of ALU 1132 are received in respective stages of a shift register 1126, the outputs of which constitute SBC 0-3 silo byte count signals. The SBC 0-3 signals are returned to the four stages of ALU 1132. A C IN carry signal is provided to ALU 1132 by OR gate 1130. OR gate 1130 is energized if AND gates 1134 or 1136 are energized or if OR gate 1138 is not energized. AND gate 1134 is energized by the DI READ signal, if the SILO T0+T2 and the SILO T0 signals are asserted. AND gate 1136 is asserted if DI READ is not asserted, if the SILO T0+T2 and SILO T2 signals are asserted.

OR gate 1138, which conditions the SEL input of ALU 1132 is energized when OR gate 1130 is not energized, and also when AND gates 1140 and 1142 are energized. AND gate 1140 is energized by DI READ, if SILO T0+T2, and SILO T2 are asserted. AND gate 1142 is asserted when DI READ is not asserted, if SILO T0+T2 and SILO T0 are asserted.

OR gate 1138 also conditions the SEL selection input of a three-stage ALU 1144, which receives a carry signal from an AND gate 720 at its C IN input. AND gate 1146 is energized by OR gates 1148 and 1150. OR gate 1148 is energized if the CG and CP output signals from ALU 1132 are asserted, and OR gate 1150 is energized by the SBC line from shift register 11 and by the CG output of ALU 1132.

The output signals from ALU 1144 are coupled to a shift register 1152, which generates SBC 4-6 signals. These signals are also coupled to provide input signals to the three stages of ALU 717.

Multiplexers 1120 and 1128, arithmetic logic units 1132 and 1144 and shift registers 1126 and 1152 maintain a count of the number of bytes stored in the silo. The silo control enables the silo to both receive data and transmit data (from the SBUS to the DI or from the DI to the SBUS) once during each SILO T0 to T3 timing sequence. In particular, the silo receives from the SBI or DI data when clocked by the SILO T0 clock signal, and transmits data on the SBI or the DI when clocked by the SILO T2 clock signal. Therefore, the SEL 1 inputs of multiplexers 1120 and 1128 are enabled by OR gate 1130 at time SILO T0, if DI READ is asserted, and at time SILO T2 if DI READ is not asserted.

The arithmetic logic units 1132 and 1144 update the silo byte count as data clocked into and out of the silo RAM. The selected signals from multiplexers 1120 and 1128, the signals coupled from the valid bytes in and out signals, constituting byte count updating information, which is added to or subtracted from the silo byte counts as contained in shift registers 1152 and 1126. The sum is then stored in the shift registers 1126 and 1152.

If, for example, the communications device is writing to the external device, DI WRITE is asserted. At time T0, the output signal from OR gate 1130 is low, and the multiplexers 1120 and 1128 couple the SBI VB 0-2 signals onto the respective VAL SBC 0-2 lines to arithmetic logic unit 1132, which may increment the silo byte count depending on whether any bytes were transferred over the SBI. Similarly, when the SILO T2 clock signal is asserted, OR gate 1130 is asserted, shifting multiplexers 1120 and 1128 to couple the DI VB OUT 0-1 signals and the DDI BC≧4 signal, onto the VAL SBC 2-0 lines, which are directed to arithmetic logic unit 1132, OR gate 1138 is also energized by AND gate 1140, which conditions the SEL input of ALU 1123 to decrement the silo byte count stored in shift registers 1126 and 1152.

The load input of shift registers 1126 and 1152 is enabled by the SILO LD EN signal from one stage of multiplexer 1120. The shift registers are clocked by the SILO T0+T2 signal.

The SBC 0-6 signals, which constitute a count of the number of bytes in the silo, are latched in a latch 1154, clocked by the SILO T3 signal. The output signals from latch 1154 are coupled to programmable logic array (array program) 1124, as are the SBI BC≧8, SBI BC≧=16, SBI BC=0, DI LEN ERR from flip-flop 748 on FIG. 23B, DI READ, and a REQ EN signal from AND gate 628 on FIG. 21B, and the complement of the DIAG INT signal. In one specific embodiment, array program 1124 is an 82S100 slice sold by Signetics Corporation of Menlo Park, Calif. The truth table for array program 1124 is set forth in FIG 22B. Three of the outputs from array program 1124 are received in latch 1156, clocked by the SILO T0 signal, to provide REQ 1 and 0 and SBC≧112 signals. Array program 1124 also provides, through inverters 1158 and 1160, SBC≧4 and SBC≧96 signals respectively.

Figure 31A:
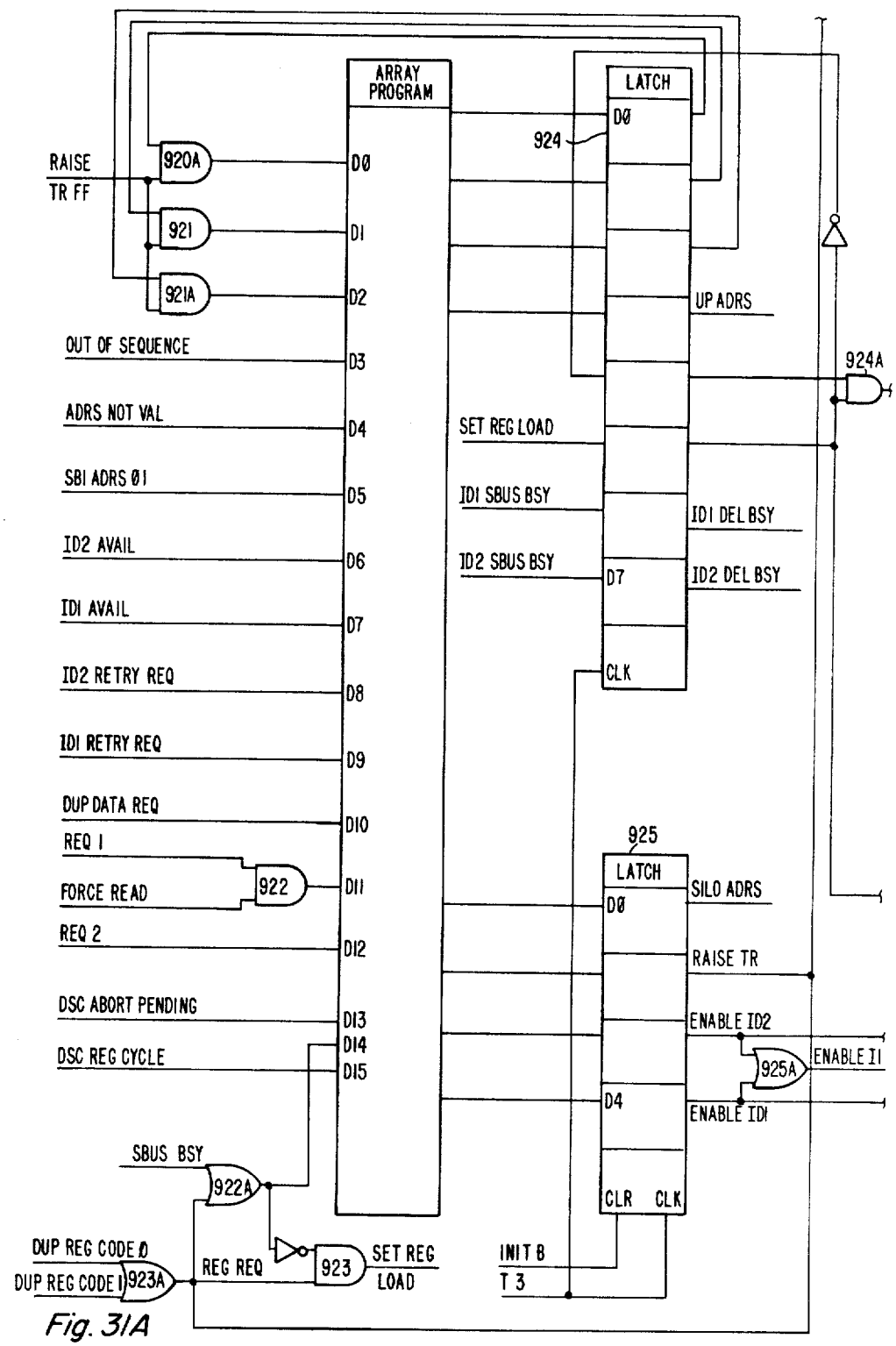

The REQ 1 and REQ 0 signals generated by latch 1156 are coupled to the memory reference controller 52, specifically to AND gate 922 and array program 920, both on FIG. 31A, to indicate the number of transfers the process data path is requesting. If the REQ 1,0 signals are (0,1), that is, not asserted and asserted respectively, the process data path is requesting at least one transfer. If the REQ 1,0 signals are (1,1), the process data path is requesting at least two transfers over the SBI.

The silo control also includes a latch 1162 which receives a CLKOUT SYNC signal from flip-flop 713, the VA TRACK 0-2 signals from multiplexer 672, SBI CTR 00-02 signals from FIG. 32B, and SBI BC≧8 signal from the SBI byte count decoder on FIG. 33. The latch 1162 is clocked by the SBI T0 signal.

The stage of latch 1162 receiving the CLKOUT SYNC input provides a DLYD SYNC signal. The remaining stages of latch 730 provide seven of the nine input signals to a three state ROM 1164. An eighth input is provided by the SILO DATA EN signal, and the ninth input is provided by the FR(1) signal from flip-flop 680 on FIG. 21A. The output signals from the three state ROM 1164 are coupled to a driver network 1166 which connects to the SBUS to provide BUS S M (0:3) mask signals. Driver network 1166 is enabled when an AND gate 1168 is energized by a TO SBI signal from clock decode circuit 371 on FIG. 9, if an OR gate 1170 is energized. OR gate 1170, in turn, is energized by the SILO DATA EN signal and the SILO ADRS EN signal.

Figure 24A:
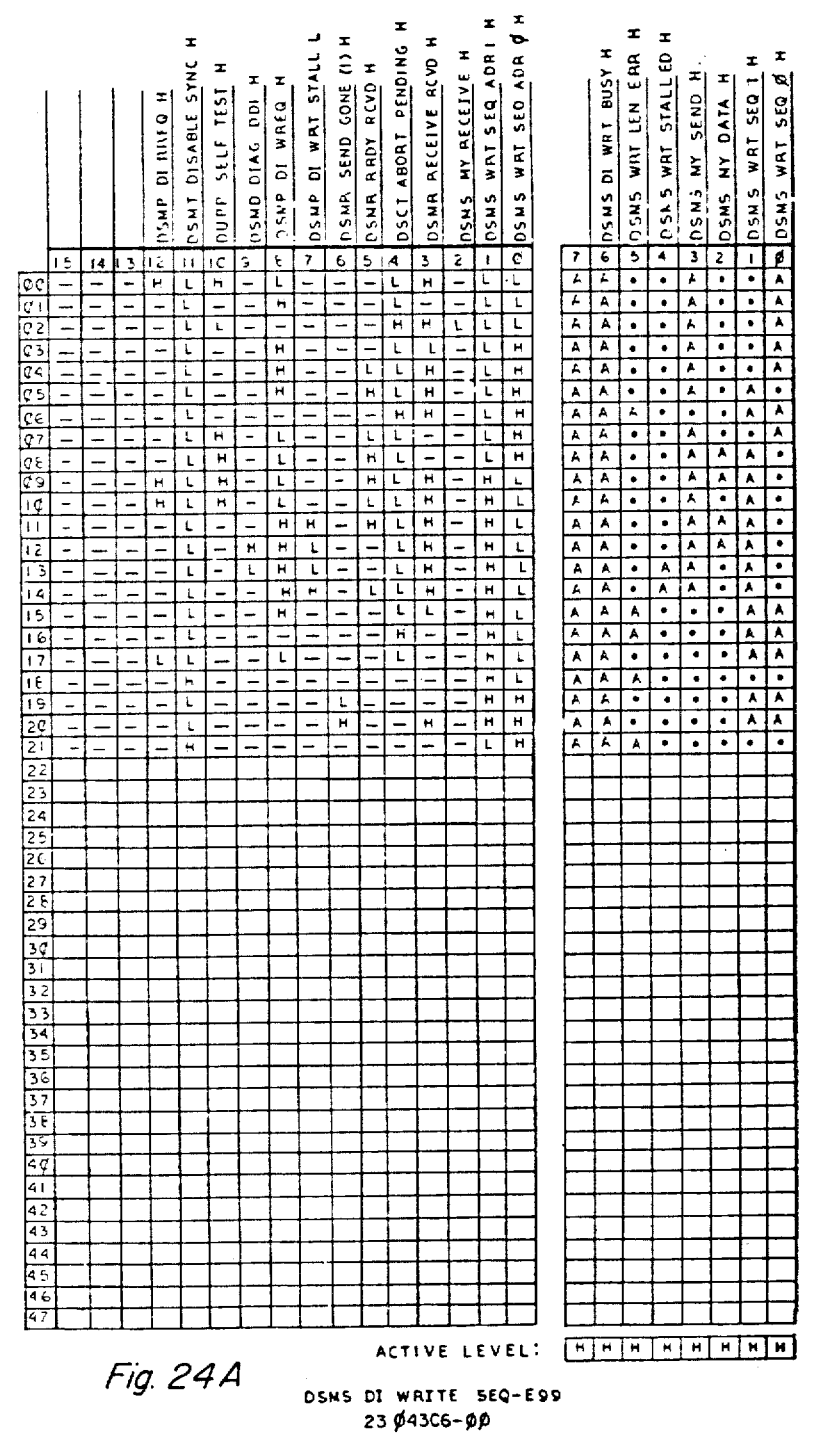
Figure 24B:
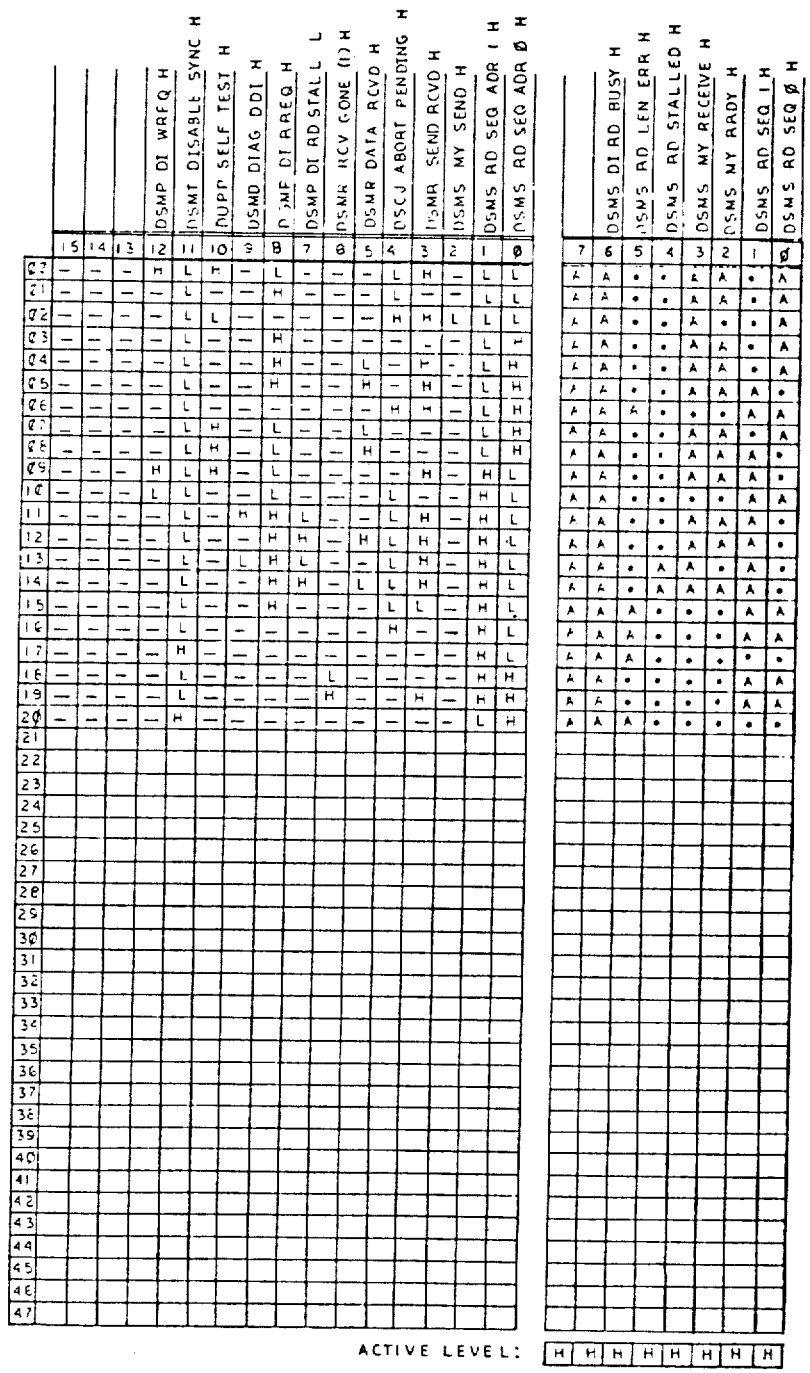

FIGS. 23A and B illustrate a portion of the data interconnection control 556, which generates the control signals for the data interconnection 51 and also generates the DI VB IN signals for the data path control that identifies the valid bytes being transferred over the DI during a read operation. A latch 690, clocked by the CLKIN signal from multiplexer 560 on FIG. 20, receives and latches the RCVR REC, RCVR RRDY, RCVR SEND 2-0 signals from FIG. 20. A latch 692 receives the latched RCVR REC, RCVR RRDY, and RCVR SEND 2 signals. The load input of latch 692 is conditioned by a CLKIN SYNC signal, and the latch is clocked by the SILO T2 clocking signal. A latch 694 receives a MY RECEIVE signal by a MY SEND signal from programmable logic arrays (array programs) 696A and B. The load input of latch 694 is conditioned by a CLKOUT SYNC signal, and the latch is also clocked by SILO T2. Latches 692 and 694 provide certain inputs to array programs 696A and B. Array programs 696A and 696B also constitute 82S100 slices sold by Signetics Corporation of Menlo Park, Calif. The truth table of array program 696A and B is set forth in FIGS. 24A and B.

The DI VB IN 2 signal is generated by an AND gate 698 which is energized when the output of the latch corresponding to RCVR SEND 2 is asserted, if neither latch stage receiving the RCVR SEND 1 or RCVR SEND 0 signals are set. The DI VB IN 1 signal is asserted by AND gate 700, which is energized when the RCVR SEND 2 latch stage is set, if the latch stage corresponding to RCVR SEND 1 is set. The DI VB IN 0 signal is asserted by AND gate 702, which is energized when the latch stages corresponding to the RCVR SEND 2 and RCVR SEND 0 are both set.

In one specific embodiment, SEND 1 and SEND 0 signals are not asserted and asserted, respectively, that is, they equal (0,1) if the lowest byte is valid. The SEND 1,0 signals equal (1,0) if the lowest two bytes are valid, equal (1,1) if the lower three bytes are valid, and equal (0,0) if all four bytes are valid. Therefore, the DI VB IN (2:0) signals equal (1,0,0) if all four bytes are valid, (0,0,1) if only the lowest byte is valid, (0,1,0) if only the lower two bytes are valid, and (0,1,1) if only the lower three bytes are valid.

A fourth input signal to latch 692 is provided by an OR gate 704 energized by either the latch stage receiving the RCVR SEND 2 signal or by OR gate 706, which is energized by either the stage of latch 690 receiving the RCVR SEND 1 or by the stage receiving the RCVR SEND 0 signal.

A CLKIN SYNC signal enables the load enable input of latch 692. The CLKIN SYNC signal is generated by DC flip-flops 708, 709 and 710. Flip-flop 708 has a constantly asserted D input, and is clocked by the CLKIN signal. The set output signal is coupled to the D input of flip-flop 709, which is clocked by a SILO T1+T3 signal. The set output signal of flip-flop 709 is coupled to the D input of flip-flop 710, which is also clocked by the SILO T1+T3 signal. The set output of flip-flop 710, the CLKIN SYNC signal, is coupled to the reset input of flip-flop 708.

Similarly, flip-flops 711, 712 and 713 generate a CLKOUT SYNC signal, which is coupled to the load input of latch 694.

The CLKOUT SYNC signal, when asserted, also sets a flip-flop 716, when clocked by the SILO T3 signal. The reset input of flip-flop 716 kept at ground level. An AND gate 718, energized by the coincidence of the set output signals of flip-flop 711 and the reset output of flip-flop 713, corresponding to the complement of the CLKOUT SYNC signal, energizes an OR gate 720, which is also energized by a DI WRITE signal. The output signal from of OR gate 720 conditions the overriding reset input of flip-flop 716. Flip-flop 716, when reset, energizes AND gates 722 and 724 when the SILO T3 clocking signal is asserted. AND gates 722 and 724 assert an LE HIGH and an LE LOW latch enable signal, respectively, latch enable output latches for the respective high and low banks of the silo RAM.

On a transfer from the external device to the communications device, the assertion of the CLKIN SYNC, DI READ and DI RREQ signals energize an AND gate 726, which energizes an OR gate 728 to assert a DEC DDI CTR signal, which energizes an AND gate 987 in FIG. 32A in the byte counter controller to decrement the DI byte counter. If the transfer is from the communications device to the external device, a second AND gate 730 provides energizes OR gate 728. AND gate 730 is enabled by the assertion of a MY DATA signal, if a DLYD SYNC signal from latch 1162 on FIG. 21C is asserted and the DI READ signal is not asserted. When the MY DATA signal and DLYD SYNC signal are asserted, an AND gate 732 asserts a DATA SENT signal. The asserted MY DATA and CLKOUT SYNC signals also energize an AND gate 734 to assert the EN SBC UPDATE signal for multiplexer 1120 on FIG. 21C.

The MY SEND and MY DATA outputs of array program 696A condition the select and enable inputs respectively of a multiplexer 736. The output signals from multiplexer 736 are coupled to a flip-flop 738, which also latches the MY RECEIVE and MY READY signal from array program 696B to provide the SEND 2-0 signals and the REC and RRDY signals. The input signals to multiplexer 736 are arranged to condition the latch stage to assert the SEND 2 line, and to couple the DI VB OUT 1 and 0 signals when MY SEND is asserted, and to de-assert the SEND 2 line and to assert both stages SEND 1 and 0 when MY SEND is not asserted. Latch 738 is clocked by an AND gate 740 energized by the DLYD SYNC signal and SILO T2 clocking signal. An OR gate 742 receives the DI WRT BSY and DI RD BSY signals from array program 696A and B to generate a DI BSY signal.

A latch 743 latches signals from the array program to generated WRT SEQ ADR 0 and 1 signals and RD SEQ ADR 0 and 1 signals, which are coupled to. Latch 743 is clocked by the SILO T2 signal, and has a load input conditioned by the CLKIN SYNC signal.

The DI control also generates various error signals, including a DI PAR ERR parity error signal, a DI LEN ERR length error signal and DI STALLED stall signal. The DI PAR ERR signal is generated by a DC flip-flop 744, and is asserted when an AND gate 746 is asserted by the coincidence of the DI PE signal and the DI READ signal, when the flip-flop is clocked by the CLKIN DATA signal. Flip-flop 744 is reset by a SILO INIT A initialization signal.

The DI LEN ERR signal is asserted when a flip-flop 748 is set. The DI LEN ERR signal is asserted when fewer bytes are transferred over the data interconnection 51 than the number called for in the SBI and DDI byte counters at the beginning of the transfer. The flip-flop 748 is set when an OR gate 750 is energized, when clocked by the CLKOUT SYNC signal. The OR gate 750 is energized by either the RD LEN ERR signal or the WRT LEN ERR signals from array programs 696A and B. The reset input of flip-flop 748 is grounded and the flip-flop is clocked by a CLKOUT SYNC signal. An overriding reset input is conditioned by an OR gate 752 energized by either the NEW BUFFER signal or a SILO INIT signal.

The DI STALLED signal is asserted by the setting of a flip-flop 754 by an OR gate 756, clocked by the CLKOUT SYNC clocking signal. OR gate 756 is energized by either the RD STALLED signal or the WRT STALLED signal from the array program 696A and B. The reset input is grounded and an overriding reset input is conditioned by a SILO INIT signal.

FIG. 25 illustrates timing control circuitry for producing the clocking signals for controlling the silo RAM 354 and the associated silo control and DI control circuitry.

The timing control circuit includes a converter 760 that receives the certain timing signals from the clock decoder 371 in SBI interface 40 and buffers them to provide the indicated clocking signals. The timing of the output clocking signals is the same as the timing of the indicated input signals.

To generate certain other timing signals, the OAR B CRY signals from output address register OAR 356 are latched in latch 762. The latch is initialized by a SILO INIT signal and clocked by a CLK OAR signal generated by AND gate 764, which is energized by the coincidence of the EN OAR UPDATE signal and the CLK OAR T2 signal from converter 760. The OAR B CRY signal is also coupled to one input of a multiplexer 766, the other input signal being from the output signals of latch 762. The select input of multiplexer 762 is controlled by the DI WRITE signal from OR gate 768, which is energized by the SBI T0 DI signal from clocking circuit 371 on FIG. 9, or the DIAG DDI flag from FLAG 0 register 326D on FIG. 14B. The output signals from multiplexer 766 are coupled to one input of an exclusive OR gate network 770, the output of which is received in latch 772. The output of latch 772, which is clocked by the CLK OAR signal from AND gate 764, constitutes the EN OUT B H/L signal, which is also coupled to provide the second input to exclusive OR gate 770.

An OR gate 774, energized by the setting of the DIAG DDI flag or by the non-assertion of the SBI T0 DI signal, generates a DI READ signal, which when asserted sets a flip-flop 776 when clocked by the SILO T2 clocking signal. Flip-flop 776, when set, asserts an EN DDI RCVRS signal, which enables receiver latch 352. When reset, the flip-flop 776 asserts an EN SBI IROT signal to enable input byte rotator 351. An OR gate 778, energized by a UP INIT initialization signal, a DIAG INIT initialization signal, and a DSC INIT initialization signal from the silo control, generates a signal for conditioning the reset input to flip-flop 776.

The WE(B0-B3) H/L signal which energizes the write enable input of the high and low banks of the silo RAM is generated by an exclusive OR gate network 780, a latch 782 and a latch 784. The IAR B CRY signal from input address register 357 are coupled to exclusive OR gate network 780. The output of the exclusive OR gate network are latched in latch 782, which is clocked by a CLK IAR T2 clocking signal from converter 760. The output signals from latch 782 are coupled to the second inputs of the exclusive OR gate network 780 and are also coupled to an input of latch 784. Latch 784 is clocked by the SILO T3 clock signal and its output constitutes the WE(B0-B3) H/L signal.

7. Memory Reference Controller and Address Generator

Figure 26A:
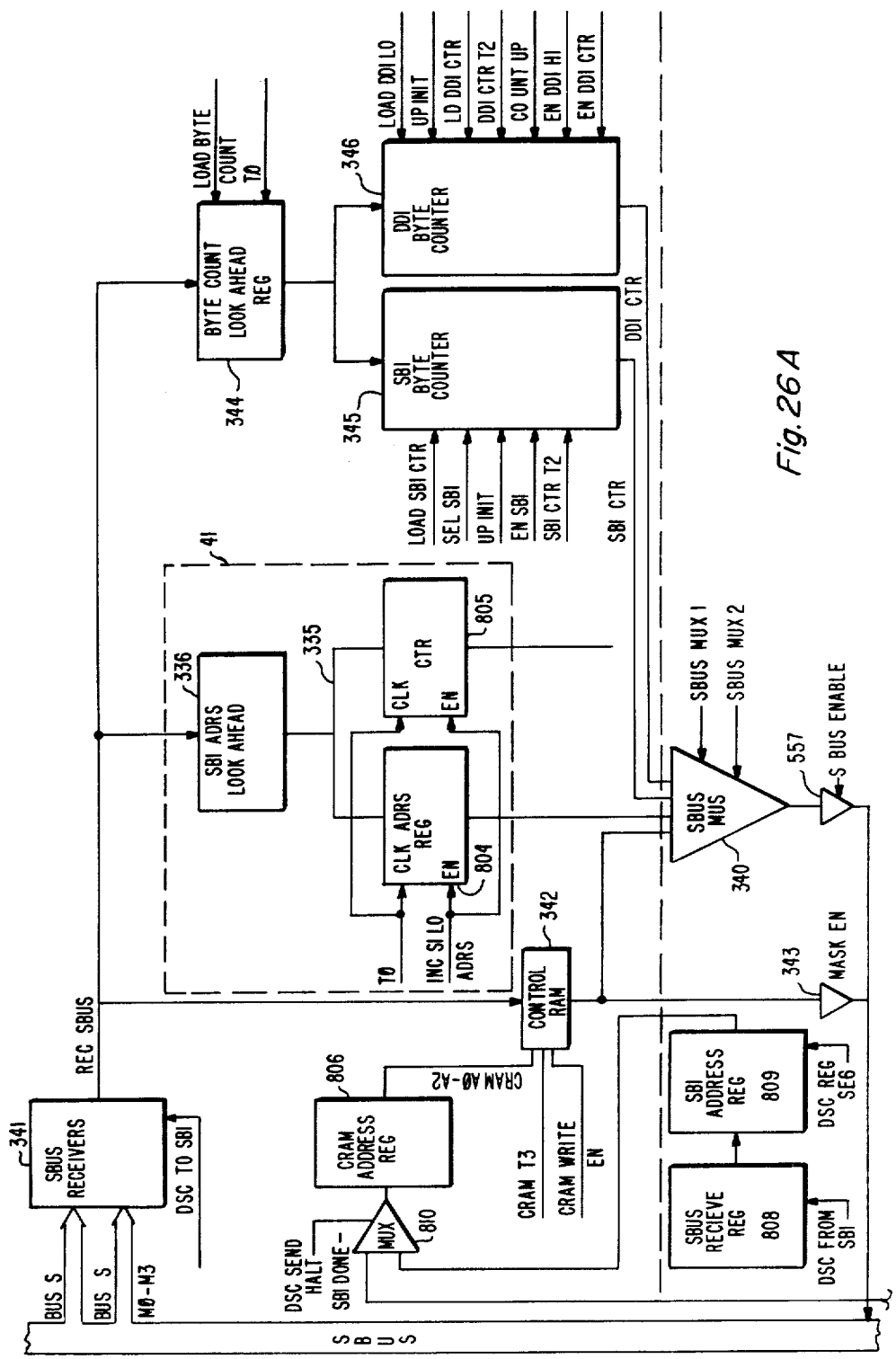
FIGS. 26A and 26B constitute a detailed block diagram of the memory reference controller and address generator shown in FIG. 8.
Figure 26B:
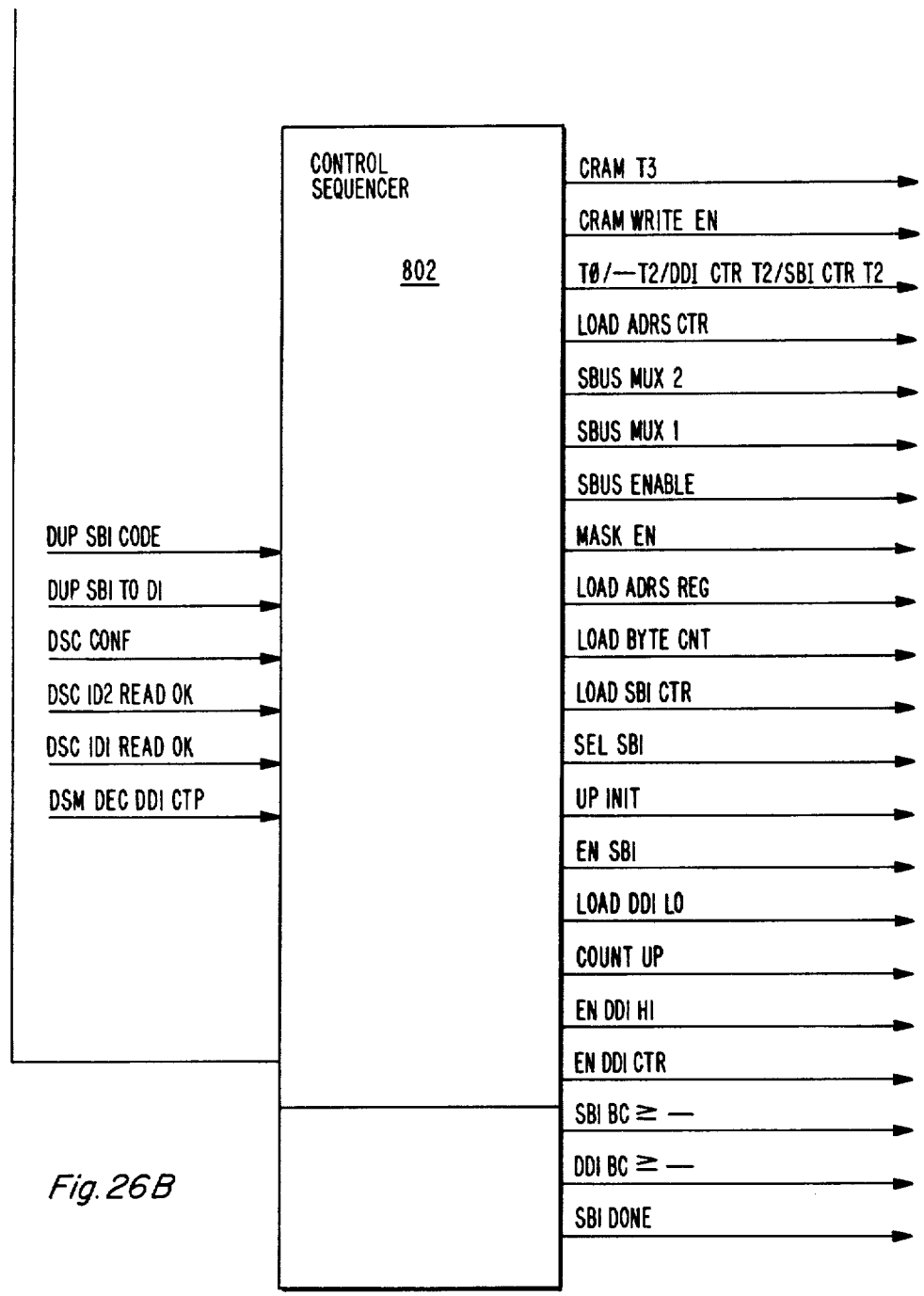

FIGS. 26A and 26B illustrate a detailed block diagram of one specific embodiment of the memory reference controller 52 and address generator 41 shown in FIG. 8. The memory reference controller includes a control sequencer that receives and generates a number of control signals indicated on FIG. 26B.

The address generator 41 includes the SBI address lookahead register 336, and the address counter 335 including an address register 804 and a counter 805. As mentioned previously, the SBI address lookahead register 336 receives and address from the next address register in local store 323. This address includes a page frame number constituting the high order bits, and the low order bits which specify the particular address within the page. When address counter 335 requires an address from the SBI address lookahead register 336, as described previously (in the Address Translation and Generation section), the address register 804 receives the page frame number portion of the address from the SBI address lookahead register 336, and the counter 805 receives and counts through successive addresses in each page. The address register 804 and counter 805 are both clocked by the T0 clock signal and are enabled to load the address from the SBI lookahead register 336 by a LOAD ADRS CTR signal from the control sequencer. The counter 805 is enabled to increment by an INC SILO ADRS signal from the control sequencer.

If an attempted transfer from the communications device over the SBI is not successful, the control RAM 342 stores certain signals in registers that permit a later attempt, that is, a retry, at making the transfer. Certain registers in the control RAM, store command/address information while other registers store the associated one or two longwords of process data to be transferred if the transfer is a write operation. The control RAM 342 write enable input is conditioned by a CRAM WRITE EN signal from control sequencer 802. The addressing of the control RAM is governed by a CRAM address register by means of signals on address lines CRAM A0-A2. The control RAM is clocked by a CRAM T3 clock signal, which has the same timing as the T3 clock signal, from control sequencer 802. The address signals from CRAM address register 806 are coupled from S BUS 303 through an SBUS RECEIVE register 808 and SBI address register 809 through a multiplexer 810, which provides address signals from the S BUS 303. Control sequencer 802 can also address the control RAM directly through multiplexer 810 and address register 806.

The SBI byte counter 345 and DDI byte counter 346 contain the number of bytes of data to be transferred over the SBI and DDI respectively. The counters are initially loaded with the byte count longword 72 on FIG. 3 from the command packet. The counters are decremented when data is transferred, the DDI byte counter being decremented on each transfer between the process data path and the external device, and the SBI Byte counter being decremented on each transfer between the SBI and the process data path. The absolute value of the difference between the count in the SBI byte counter and the count in the DDI byte counter at any given time is the number of bytes then in the process data path. The byte count lookahead register 344 is used during data chaining, as explained below.

Normally, a device on the SBI cannot begin a second transaction sequence over the SBI, that is, transmit a transfer request, transfer command/address or data information and receive a confirmation, until a prior, or first transaction sequence has ended. FIGS. 27A, 27B, 27C, and 31A show details of certain circuitry in the memory reference controller 52 that permits two transaction sequences to be overlapped so that the communications device may begin a second transaction sequence before the first transaction sequence has ended.

The communications device includes circuitry that generally alternates between two transfer sequences identified as an ID 1 sequence and an ID 2 sequence and also includes circuitry that, for each sequence, establishes a sequence of six states. As explained below, in each state the communications device performs a particular operation in connection with the SBI transaction sequence then being performed. The circuitry for each transfer sequence can initiate and respond to transfers over the SBI independently of the other.

An eight-stage latch 812 latches certain ID1 NXT SILO, ID1 NXT 0-2, ID2 NXT SILO and ID2 NXT 0-2 signals which identify the next state of the ID1 and ID2 sequencing circuitry from latches 825 and 854, on FIG. 27B. The output signals from latch 812 constitute ID1 ST 0-2, ID1 SILO, ID2 0-2 and ID2 SILO signals which identify the current state of the respective circuitry.

The communications device also includes circuitry that receives address signals over the S BUS 303 and decodes them to identify one of the registers in the memory reference controller or the address generator. A latch 813, clocked by the FROM SBI signal from clock circuit 371 on FIG. 9, latches certain signals from lines 00-03, 07 and 08 of S BUS 303, the signals from lines 03-00 constituting address signals. The signals from latch 813, and an ID2 RD PENDING signal and an ID1 RD PENDING signal from shift register 828, are received in an eight-stage latch 814 if the REG SEL signal from SBI interface 40 is not asserted, when the T2 clock signal is asserted. The signals from the latch stages corresponding to S BUS lines 02-00 control the select (SEL) inputs of multiplexer 815. If the address signals refer to the address register 335, the DDI Byte counter 346 or the SBI byte counter 345, inputs 5-7 of multiplexer 815, which are constantly energized by +V are coupled to the multiplexer output to assert the MY ADRS signal. If the control RAM is addressed, S BUS line 03 is asserted, and the select inputs of multiplexer 815 couple one of inputs 0-4 to generate the MY ADRS signal. In either event, the MY ADRS signal is asserted, indicating that a register in the memory reference controller of address generator is being addressed.

Figure 31B:
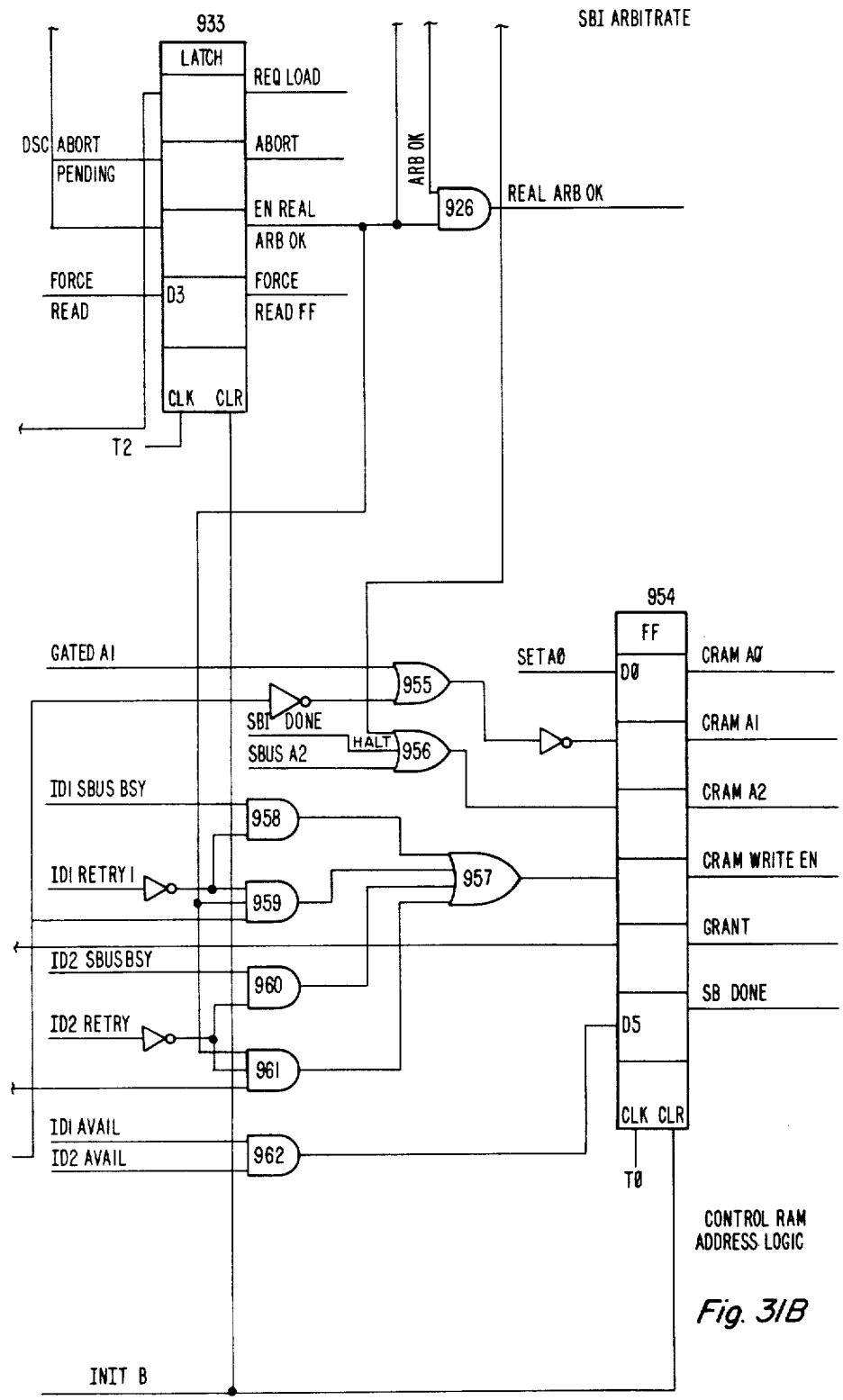

Certain signals from latch 814 are also coupled to a multiplexer 817, which with OR gates 819 and 820 generates the SBUS MUX 1 and 2 signals which control S BUS MUX output multiplexer 340 on FIG. 26A. The multiplexer 817 also receives the signals UP DATA EN from latch 953 in FIG. 31C, WRITE CODE 0 from Flag 0 register 326D and ENABLE ID 2 from latch 925 in FIG. 31A. The select (SEL) input of multiplexer is conditioned by an AND gate 818, which is energized to assert an SBI DONE HALT signal if a SEND HALT signal from interface 40 and an SBI DONE signal from latch 954 on FIG. 31C are both asserted. The upper two stages of multiplexer 817, when not set, enable OR gate 819 to assert the SBUS MUX 1 signal and the upper and third stages of multiplexer 817, when not asserted, enables OR gate 820 to assert the SBUS MUX 2 signal. The SBUS MUX 1 signal conditions one input of each of AND gates 821 and 822, which assert the SBUS MUX 1A and SBUS MUX 1B signals if a SILO ADRS EN signal from latch 953 in FIG. 31B is not asserted. The SBUS MUX 1A and 1B signals are both either asserted or not asserted, and each enables a portion of the stages of SBUS MUX 340. If none of the SBUS MUX 2, SBUS MUX 1A or SBUS MUX 1B signals are set, that is, if they correspond to (0,0,0) the DDI CTR lines are selected by SBUS MUX 340 to be coupled to SBUS 303. If the signals correspond to (0,1,1), the SBI CTR lines are selected. If the signals correspond to (1,0,0) the address register lines are selected, and if they correspond to (1,1,1) the lines from the control RAM are selected.

Figure 28A:
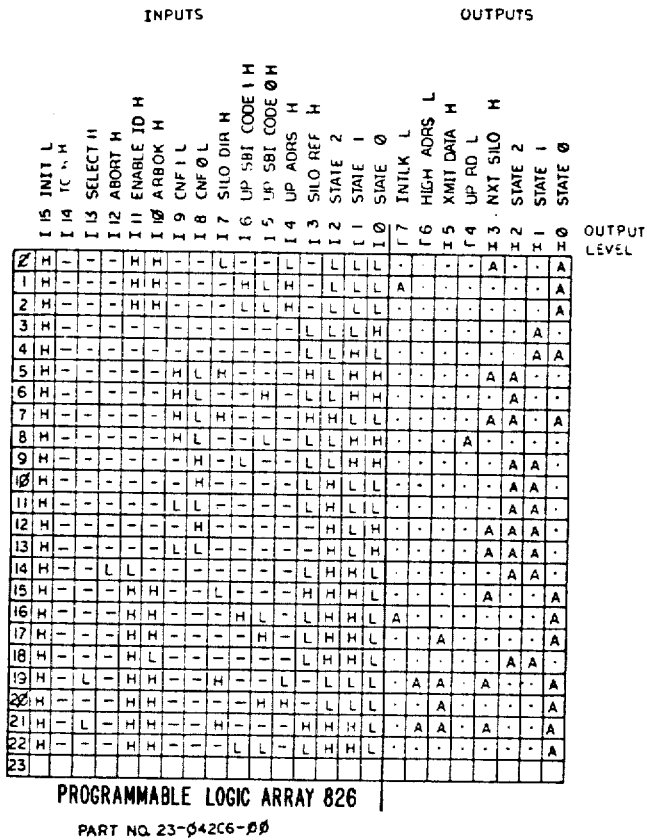
Figure 29A:
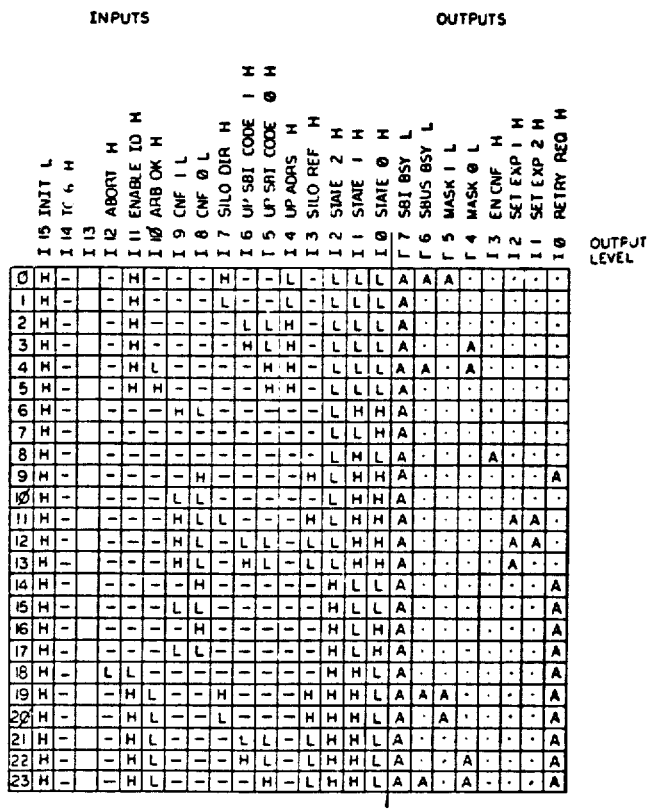

The output signals from the stages of latch 812 receiving the ID1 NXT 0-2 and ID1 NXT SILO signals are connected to programmable logic arrays (array programs) 823 and 824. In one specific embodiment array programs 823 and 824 are both 82S100 programmable logic arrays sold by Signetics Corporation of Menlo Park, Calif. FIGS. 28 and 29 contain the truth tables for the array programs. Other signals, including UP ADRS from a latch 924 in FIG. 31A, SBI CODE 0 and 1 from Flag 0 register 326D, CNF 0 and 1 from SBI XCVR 370C in FIG. 9, REAL ARB OK from AND gate 926 in FIG. 31B, ENABLE ID1 from latch 925 in FIG. 31A, and ABORT and INIT signals are also connected to array programs 823 and 824. The output signals from array program 824 are received in latch 825, which has, as output signals, the ID1 NXT 0, 1, and 2 and ID1 NXT SILO signals which are returned to latch 812, and an ID1 XMIT transmit signal, ID1 CLK PANIC clock panic signal and ID1 INTLK interlock signal.

The output signals from array program 823 are received in a latch 826, when clocked by the T1 clock pulse. Certain of the output signals from array program 823, including ID1 EXP 1 and ID1 EXP 2 signals, which indicate the number of longwords expected to be returned during a read operation, and an ID1 UP RD microprocessor read request signal from array program 824, are received in a shift register 828 clocked by the T1 clocking signal, the shift being controlled by the ID1 UP EN microprocessor enable signal. A RETRY signal from array program 823 conditions a set input of a flip-flop 830 and clocked by the T1 clock signal. If an ID1 BSY signal from array program 823, which when asserted indicates that the ID1 sequencer circuitry is already engaged in a transaction, is not asserted, the set output asserts an ID1 RETRY signal.

The ID1 BSY signal from array program 823 is also received in one stage of latch 826, which generates an ID1 SBI BSY signal. This signal and an ID1 RD PENDING signal from shift register 828, the output signal generated by the shift register stage receiving the ID1 EXP 1 signal, enables an OR gate 831 to generate an ID1 AVAIL signal. The complement of the ID RD PENDING signal from shift register 828 also enables one stage of latch 814.

An ID1 SET EXP signal from latch 826, when asserted, energizes an OR gate 832 to energize the load input of a time-out counter 833. The ID1 AVAIL signal from AND gate 831 enables a second input of OR gate 832. The time-out counter is clocked by the T3 clock signal and enabled by the TIMEOUT CLK signal from latch 813. The TIMEOUT CLK signal changes state when latch 813 is clocked by the FROM SBI signal from clock decoder 371. The FROM SBI signal corresponds to the complement of the T3 clocking signal.

The ID1 CLK PANIC signal from latch 825, when asserted, clocks a flip-flop 834, which asserts an ID1 PANIC signal when the CNF 1 signal is asserted. The CNF 1 signal is asserted when a confirmation is received over SBI 14. The complement of the CNF 1 signal conditions flip-flop 834 to deassert the ID1 PANIC signal when ID1 CLK PANIC is asserted. The complement of the CNF 1 signal, when asserted, indicates either an error on the SBI or a busy condition.

When the CNF 1 signal and the CNF 0 signal are asserted, an error condition is indicated, and an AND gate 835 asserts an ERR CNF signal. This signal energizes an AND gate 836 to assert an ID1 SET ERR signal when an ID1 EN CNF signal from latch 826 is asserted. The assertion of the CNF 0 signal also enables an AND gate 837 to provide an ACK signal when CNF 1 is not asserted.

The ID1 RD PENDING signal, ID1 SET ERR signal, and the ID1 CARRY signal from counter 833 are received in a shift register 838 when OR gate 839 is energized, to enable the counter's LOAD input. Shift register 838 generates ID1 T/0 STAT 0 and ID1 T/0 STAT 1 timeout status signals, and an ID1 ERR CNF signal that are connected to the SBI output multiplexer in the SBI interface. OR gate 839 is energized by the UP INIT FF initialization signal, ID1 SET ERR error signal, and an ID1 CARRY signal from time-out counter 833. The time-out status signals are transmitted over the SBI to indicate the time-out status of the ID1 sequencer. If T/O STAT 1 and T/O STAT 0 are not asserted, that is, if they correspond to (0,0) the transfer was completed without a time-out error. If T/O STAT 1 and 0 correspond to (1,0) an interface time-out is indicated and if they correspond to (1,1) a read data time-out is indicated. No meaning is assigned to T/O STAT corresponding to (0,1) in this embodiment.

Latch 826 also generates mask signals ID1 MASK 0, and ID1 MASK 1, and an ID1 SBUS BSY signal, each of which energizes OR gates 840, 841 and 842. OR gate 840 is also energized by an ID2 MASK 0 input signal and generates a MASK CODE 0 signal. OR gate 841 is also energized by an ID2 MASK 1 input signal and has a MASK CODE 1 output signal. OR gate 842 is also energized by and ID1 SBI BSY input signal from latch 826 and generates an SBUS BSY signal. The MASK CODE 0 and MASK CODE 1 signals are transmitted onto the SBI 14 by the interface 40.

The ID1 EN CNF signal from latch 826 also energizes an AND gate 843, if the ACK signal from AND gate 837 is also asserted. AND gate 843 when energized, in turn energizes OR gates 844 and 845, which provide shift control signals for shift register 828. OR gate 844 is also energized by the ID1 CARRY and INIT signals, and OR gate 845 is also energized by an ID1 RD OK signal from FIG. 10A, the SBI interface.

Programmable logic arrays 848 and 850 receive corresponding ID2 NXT ST 0-2 and ID2 NXT SILO from latch 812, and the UP ADRS, SBI CODE 0 and 1, CONF 0 and 1, REAL ARB OK, ENABLE ID1 and 2, ABORT and INIT signals. In one specific embodiment, arrays 848 and 850 are also 82S100 arrays sold by Signetics Corporation of Menlo Park, Calif. The truth tables for array programs 848 and 850 are shown in FIGS. 28 and 29 respectively. The circuitry in the ID2 sequencer is similar to that of the ID1 sequencer shown in FIG. 27B, except for certain circuitry shown in FIG. 27B. The output signals from array programs 848 and 850 are received in latches 852 and 854. Latch 852 also latches the EN ID2 signal, and the outputs include DEL EN ID2, and ID2 EN CNF. The ID2 EN CNF signal, which is similar to the ID1 EN CNF signal, clocks a flip-flop 856, which asserts an ID2 PANIC signal when the CNF 1 signal is asserted. When the CNF1 signal is not asserted flip-flop 856 deasserts ID2 PANIC when clocked by the ID2 EN CNF signal. The DEL EN ID2 signal and an ID2 XMIT signal, when asserted, energizes an OR gate 858 to assert an XMIT ID2 signal.

Figure 27A:
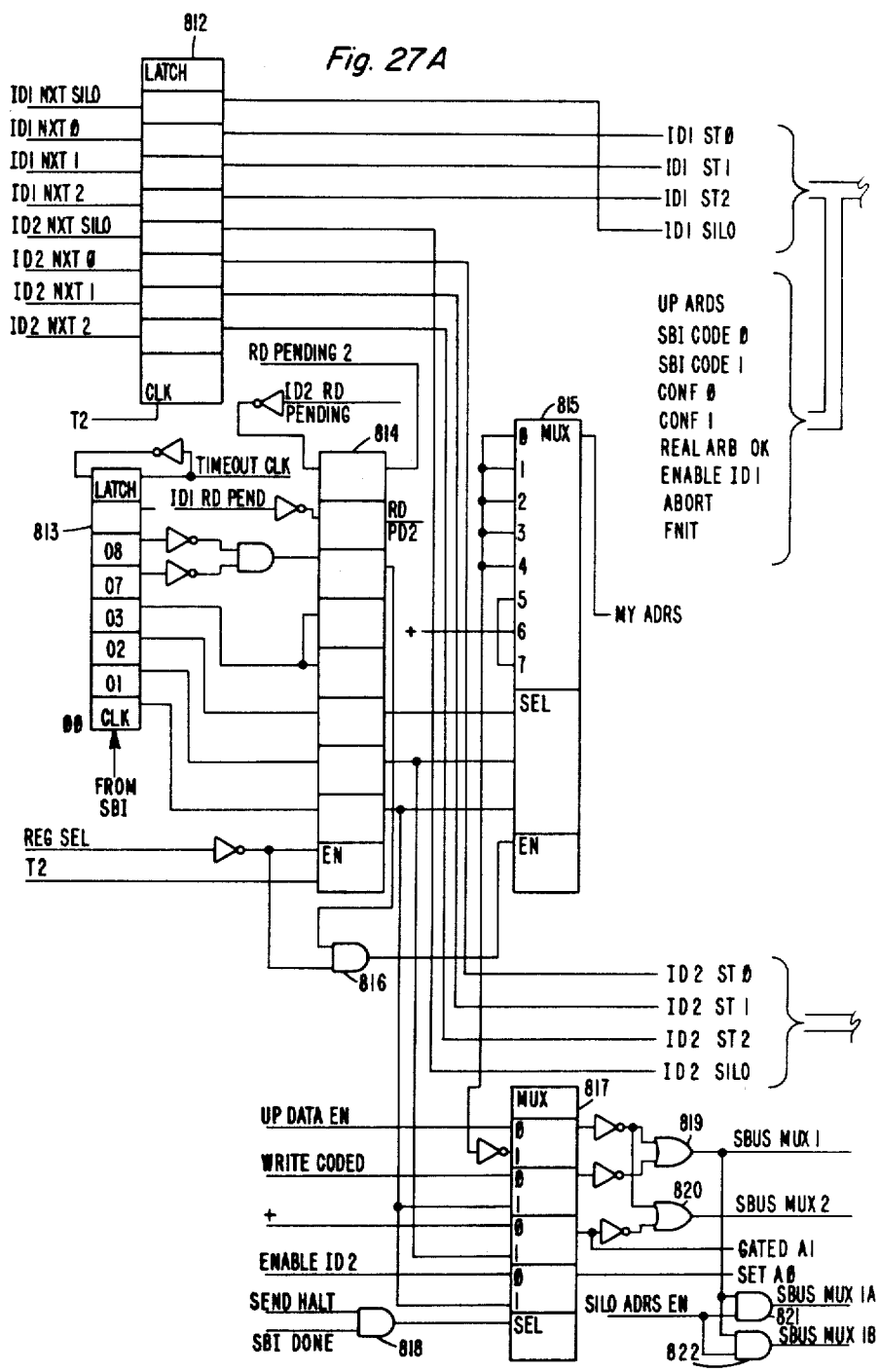
Figure 27B:
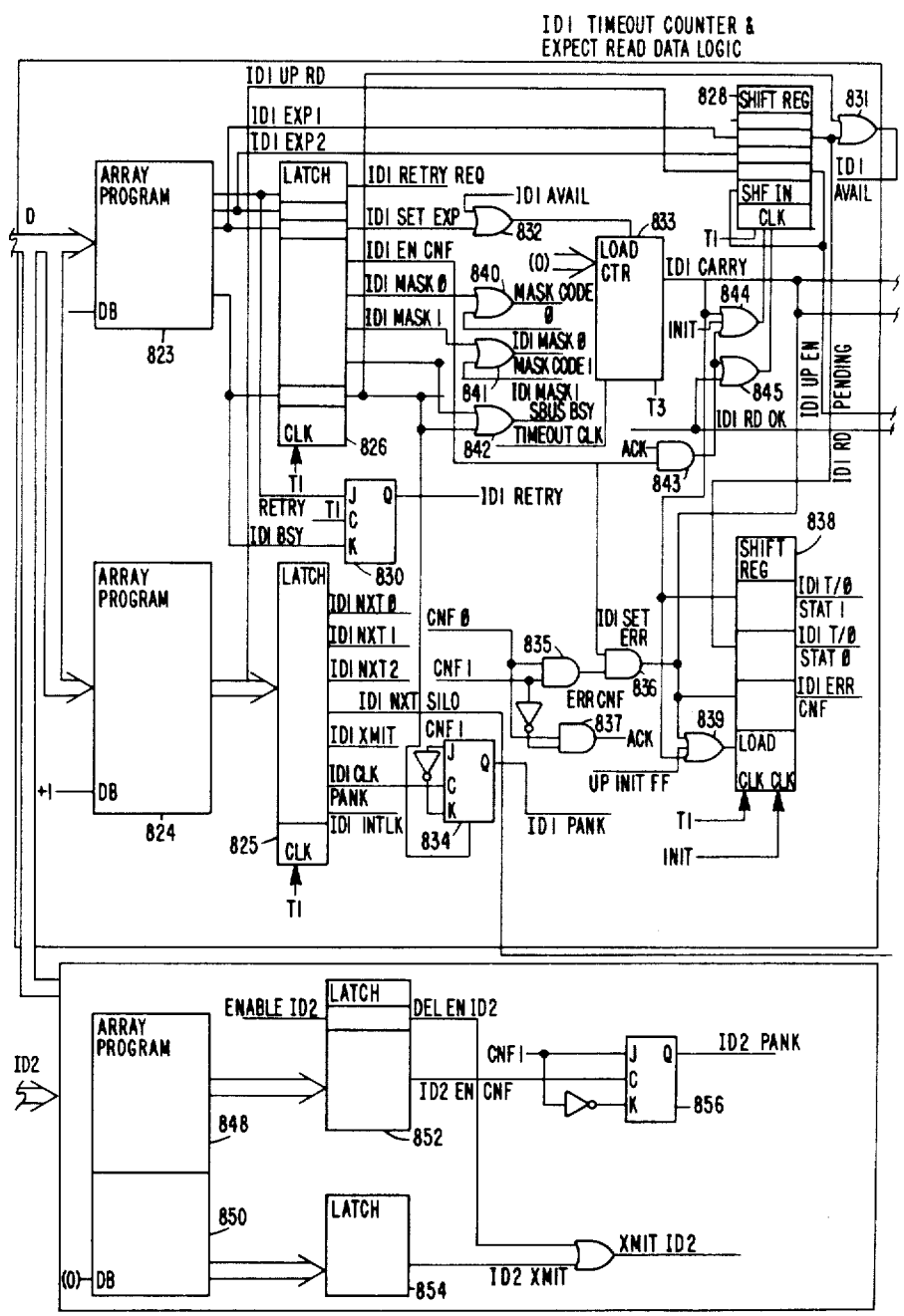
Figure 27C:
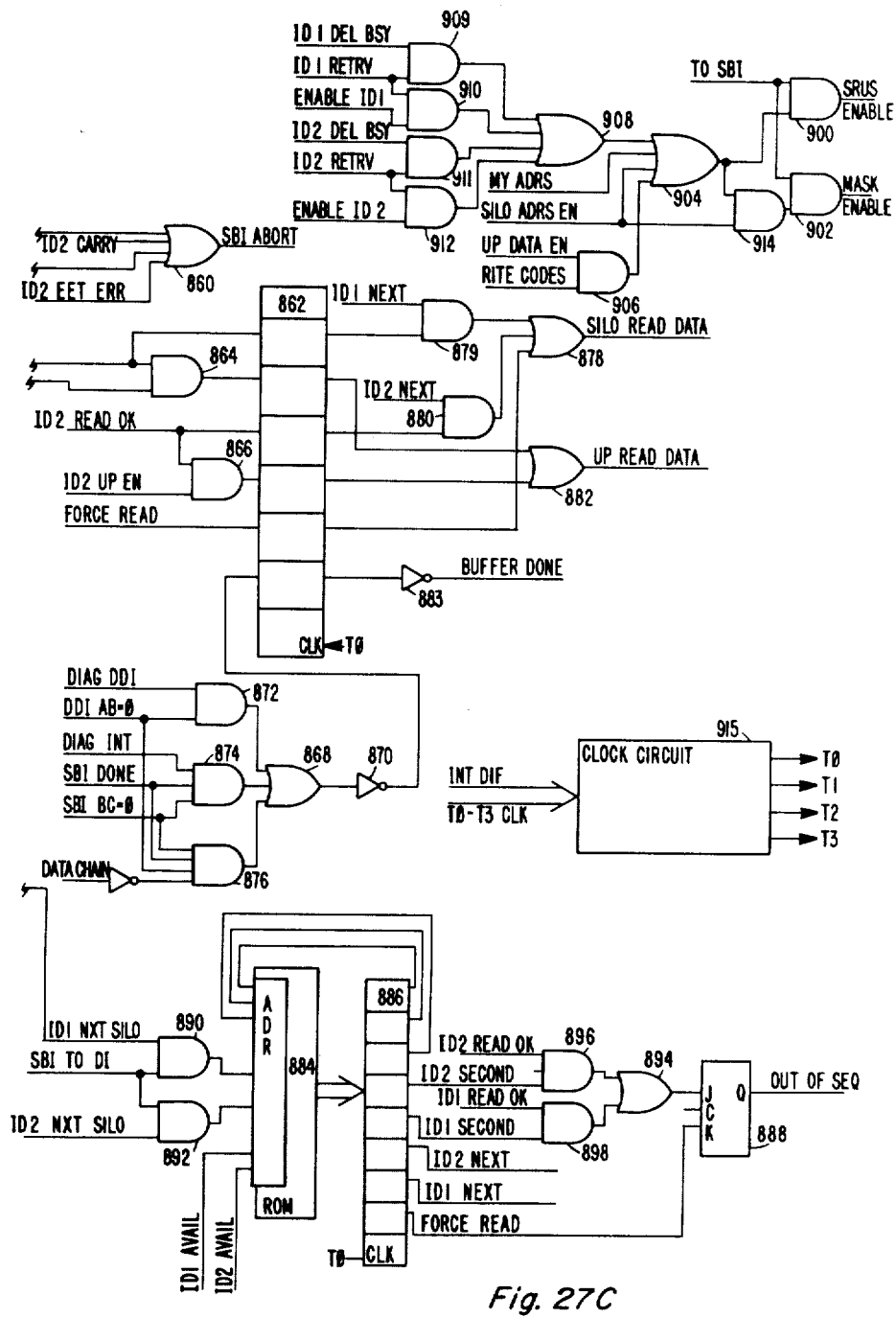

With reference to FIG. 27C, an OR gate 860, energized by the ID1 CARRY and ID2 CARRY signals and ID1 SET ERR and ID2 SET ERR signals, asserts an SBI ABORT signal. The SBI ABORT signal, when asserted, conditions a flip-flop (not shown) in the interface 40, clocked by the T1 clock signal to assert an ABORT PENDING signal. A latch 862, clocked by the T0 clocking signal, latches signals from AND gates 864 and 866, and the ID1 UP EN, ID2 RD OK, and FORCE READ signals. AND gate 864 passes the ID1 RD OK signal when the ID1 UP EN signal is asserted, and AND gate 866 passes the ID2 RD OK signal when the ID2 UP EN signal is asserted. Latch 862 also latches the complement of a signal from OR gate 868 through an inverter 870. OR gate 868, when energized, indicates that the communications device has completed transferring data. OR gate 868 is enabled by AND gates 872, 874 and 876. AND gate 872 is asserted by a DDI BC=0 signal if the DIAG DDI flag is set. AND gate 874 is asserted by the SBI BC=0 signal, if the SBI DONE signal is asserted and the DIAG INT flat is set. AND gate 876 is asserted if the DDI BC=0, SBI DONE, SBI BC=0 signals are all asserted and the DATA CHAIN signal is not asserted. Thus, if neither of the diagnostic flags are set in Flag 0 register 326D, as is the case in normal operation, AND gate 876 energizes OR gate 868 at the end of a data transmission.

Latch 862 generates several signals that energize OR gate 878 if ID1 NEXT or ID2 NEXT are asserted to generate a SILO READ DATA signal. An AND gate 879 is energized by the coincidence of the signal from the stage of latch 862 receiving to the ID1 RD OK signal and the ID1 NEXT signal to energize OR gate 878. An AND gate 880 is energized by the coincidence of the assertion of the signal from the stage of latch 862 receiving the ID2 RD OK signal and the ID2 NEXT signal. Or gate 878 is also energized by the stage of latch 862 set by the FORCE READ signal. An OR gate 882 receives signals from the stages of latch 862 set by AND gates 864 and 866 to generate a UP RD DATA signal. A BUFFER DONE signal generated by an inverter 883, constitutes the complement of the output signal from the latch stage which in turn receives the signals from inverter 868.

The memory reference controller also includes circuitry for generating an OUT OF SEQUENCE signal for the SBI interface 40. This circuitry includes a read only memory ROM 884, the output signals of which set stages of latch 886 clocked by the T0 clock signal. ROM 884 receives addressing signals from three stages of latch 886, from AND gates 890 and 892 and from. The ID1 AVAIL and ID2 AVAIL signals. The truth table for ROM 884 is set forth in FIG. 30. AND gates 890 and 892 are energized by ID1 NXT SILO and ID2 NXT SILO, respectively if the SBI TO DI signal is asserted. A flip-flop 888 generates the OUT OF SEQUENCE signal when clocked by the T1 clock signal if an OR gate 894 is energized by AND gate 896 or 898, if the FORCE READ signal from latch 866 is not asserted. AND gate 896 is energized by the ID2 RD OK signal from the SBI interface 40 if the ID2 SECOND signal from latch 886 is asserted. AND gate 898 is energized by the ID1 RD OK signal from SBI interface 40 if the ID1 SECOND signal from latch 886 is not asserted.

The OUT OF SEQ signal from flip-flop 888, and the associated out of sequence logic 363 and latches 364 and 365 on FIG. 9, avoids confusion in the event both ID1 and ID2 perform a read operation on the SBI, and the read information associated with the second ID1 or ID2 is returned first. Each of ID1 and ID2 has a distinct ID that is transmitted and received over the SBI. Therefore, when the communications device is the commanding nexus it transmits one of the ID1 or ID2 identification codes on the SBI ID lines. When the responding nexus in a read operation responds over the SBI, it responds with the identification code, either ID1 or ID2, associated with the particular read operation. The other of ID1 and ID2 can also issue a read instruction before the responding nexus responded to the prior request. However, if the responding nexus responds with the information requested in the later request, that information is clocked into the OSEQ 1 and 2 latches 364 and 365, until the information requested earlier is received. The two latches are provided, each receiving one longword, in the event an extended read operation is performed. The last arriving information, corresponding to the earlier transmitted request, is placed on the SBUS, and then the information in the OSEQ 1 and OSEQ 2 latches is placed on the SBUS.

The memory reference controller also includes AND gates 900 and 902 which assert the SBUS ENABLE and MASK ENABLE signals respectively to enable drivers 337 and 343 shown on FIG. 26A. The TO SBI signal from interface 40, which corresponds to the T1 clock signal provides one enabling input for each AND gate 900 and 902. AND gate 900 is energized, if TO SBI is asserted, by an OR gate 904 which is energized by the MY ADRS signal, the SILO ADRS EN signal, or by AND gate 906. AND gate 906, in turn, is energized by an UP DATA EN signal if WRITE CODE 1 is asserted. WRITE CODE 1 indicates a write to the DDI byte counter or the SBI byte counter, depending on the state of WRITE CODE 0. OR gate 908 in turn is energized by AND gates 909 through 912. AND gate 909 is energized by the coincidence of the ID1 DEL BSY signal, from latch 924 on FIG. 31A, and the ID1 RETRY signal. AND gate 910 energized by the coincidence ID1 RETRY and ENABLE ID1 signals. AND gate 911 is energized by the coincidence of the ID2 DEL RETRY and ID2 DEL BSY signals, and AND gate 912 is energized by the ID2 RETRY and ENABLE ID2 signals. AND gate 914 provides the second input to AND gate 902. AND gate 914 is energized by the energization of OR gate 904 when the SILO ADRS EN signal is asserted.

The clock circuit 915 receives the INT DIF T0-T3 CLK clock signals from SBI interface 40 and buffers them to assert the respective T0-T3 clock signals. The T0-T3 clocking signals have the same timing as the INT DIF T0-T3 CLK signals.

Figure 27D:
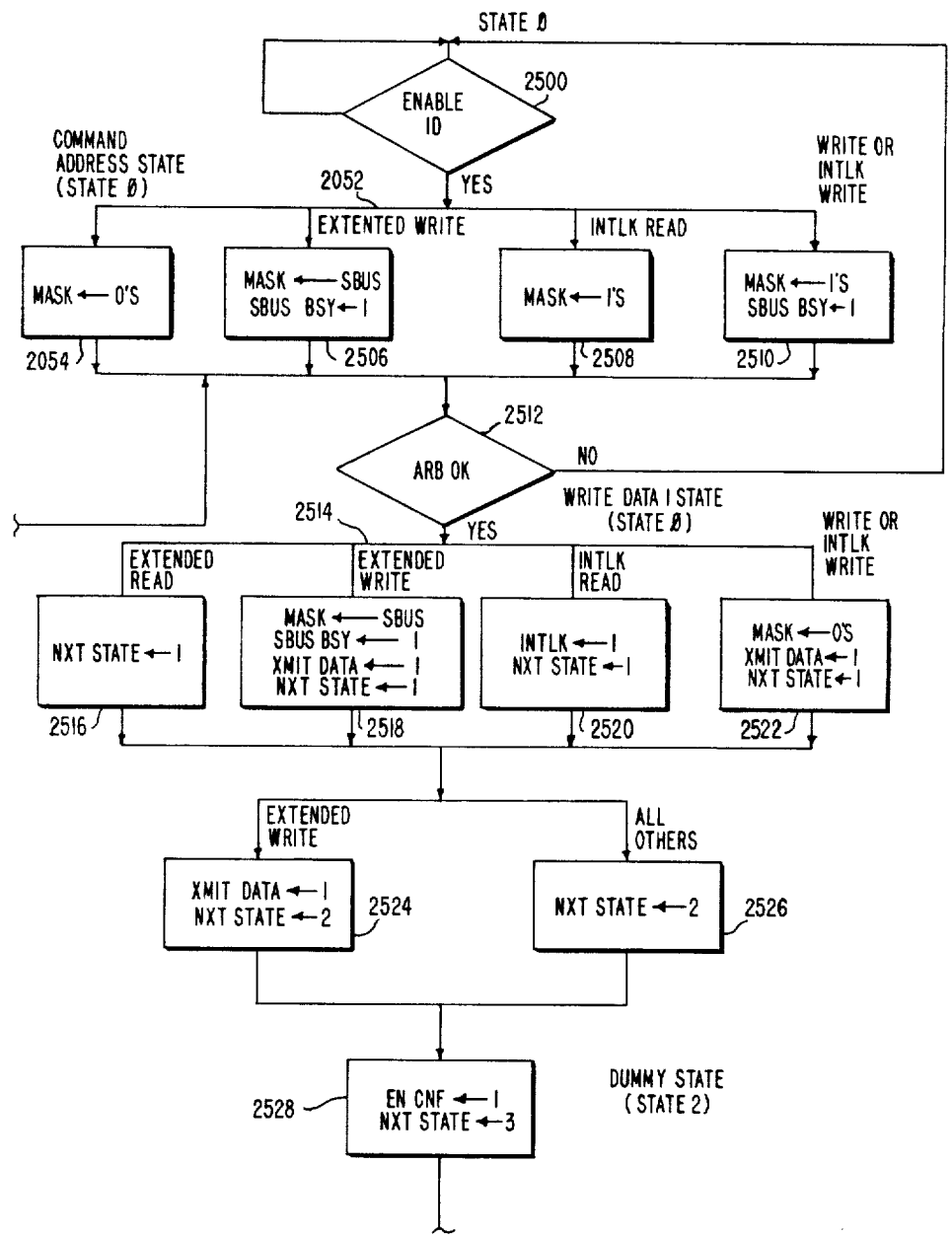
Figure 27E:
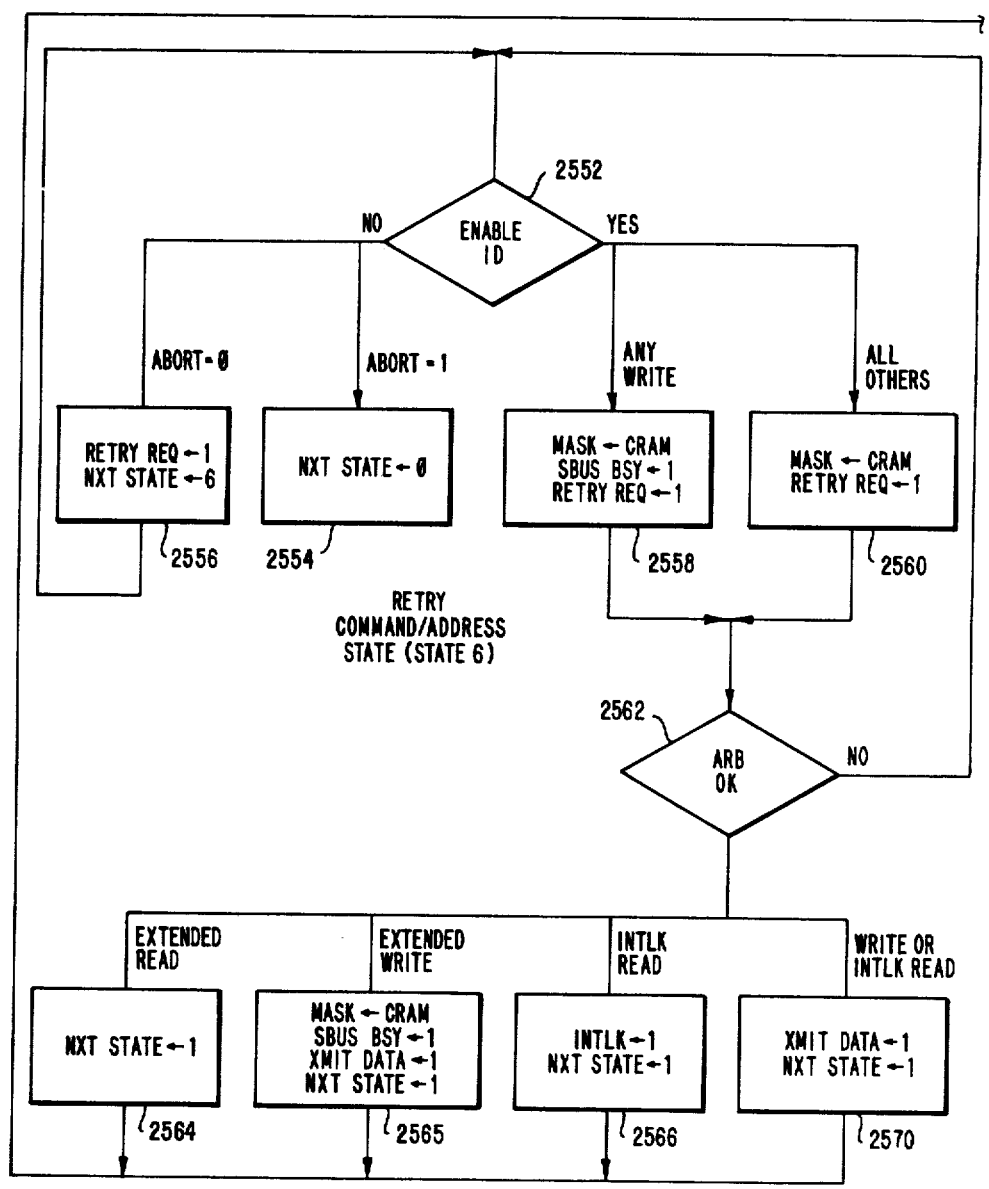

FIG. 27D is a flow diagram showing the sequence of operations performed by each of the ID1 and ID2 sequencers during a transfer. Since the sequence of steps is identical for both sequencers the identification of ID1 or ID2 is not shown in the flow diagram. The sequence is governed by the ID NXT 2-0 signals, which identify the next state of the transfer sequence. The ID ST 2-0 signals in turn identify the current state of the sequence, which signals as processed in array programs 824 and 850 to provide the ID NXT 2-0 next state signals. The ID1 SILO and ID1 NEXT SILO signals, when asserted, identify the current transfer and the next transfer, respectively, as being a transfer with the process data path.

In the following, it will be assumed that the sequencer is the ID1 sequencer in FIGS. 27A-C. At the beginning of a transfer sequence, all of the ID1 ST 2-0 lines are not asserted, that is the sequencer is in STATE 0. When the ENABLE ID1 signal from latch 925 on FIG. 31A is asserted (step 2500), the sequencer steps to a four-way branch at step 2502 depending on the type of transfer. The type of transfer is determined by the SBI CODE 1 and SBI CODE 0 flags from the FLAG 0 register 326D. If the SBI CODE 1 and SBI CODE 0 flags are both cleared, indicating that the transfer is an extended read, (step 2504) both the ID1 MASK 1 and ID1 MASK 0 output signals from latch 826 are asserted, energizing AND gate 840 and 841 to assert the MASK CODE 1 and MASK CODE 0 signals. If the transfer operation is an extended write, (step 2506) the MASK CODE 1 signal is asserted, and the SBUS BSY signal is also asserted by OR gate 842. If the transfer operation is an interlock read operation, as indicated by the SBI CODE 1 flag being set and the SBI CODE 0 flag being cleared, in step 2508, the MASK CODE 1 signal is asserted and the MASK CODE 0 signal is not asserted. If the transfer operation is a write, as indicated by the SBI CODE 1 and SBI CODE 0 flags being cleared and set respectively, or an interlock write, in which the SBI CODE 1 and SBI CODE 0 flags are both cleared, the MASK CODE 1 signal is asserted, the MASK CODE 0 signal is not asserted, and the SBUS BSY signal is not asserted. Contemporaneously with step 2404, 2506, 2508 or 2510, if the communications device is the commanding nexus of the SBI, as explained in conjunction with FIGS. 31A through 31C, the command and address are transferred over the SBI.

If the communications device is not the commanding nexus, the REAL ARB OK signal is not asserted, and (step 2512 the sequencer returns to the beginning of the sequence (step 2500). If the REAL ARB OK signal is asserted, the sequencer proceeds to (step 2514), another four-way branch depending on the type of transfer operation. The sequencer is still in STATE 0, and none of the ID1 ST 2-0 lines are as yet asserted. During this portion of STATE 0, if the transfer operation is a write operation, interlock write or an extended write operation, one longword of data is transferred over the SBI. If the transfer operation is an extended read, (step 2516) the ID1 NXT 0 signal is asserted, and the ID1 NXT 2 and ID1 NXT 1 signals remain not asserted. This indicates the next state of the ID1 sequencer is STATE 1.

If (step 2514) the transfer operation is an extended write, (step 2518) the MASK CODE 1 and MASK CODE 0 signals are both not asserted, and the SBUS BSY signal and the ID1 XMIT signals are asserted, and the ID1 NXT 0 signal is asserted. At this point the first longword of data is transferred.

If (step 2514) the transfer operation is an interlock read, (step 2520) the ID1 INTLK and ID1 NXT 0 signals from latch 825 are both asserted.

If the transfer operation (step 2514) is an interlock write or a write operation, (step 2522) both the MASK CODE 1 and MASK CODE 0 signals are asserted, and the ID1 XMIT and ID1 NXT 0 signals are both asserted.

At the next T2 clock pulse, latch 812 latches the ID1 NXT 2-0 signals, ID1 ST 0 is asserted, and the sequencer is in STATE 1, in which, if the transfer operation is an extended write operation, the second longword of data is transferred. The ID1 XMIT signal is asserted (step 2524), the ID1 NXT 1 signal is asserted and the ID1 NXT 0 signal is deasserted, indicating that the next state is STATE 2. If the transfer operation is not an extended write, (step 2526) the ID1 NXT 1 signal is asserted and the ID1 NXT 0 signal is not asserted, and after the ID1 NXT 2-0 signals are latched in latch 812, the sequencer is in STATE 2.

In STATE 2, certain AND gates are enabled to assert confirmation signals. The ID1 EN CNF signal, is asserted by latch 826 (step 2528), enabling AND gates 843 and 836. The ID1 NXT 0 and 1 signals are also asserted, indicating the next state as STATE 3.

In STATE 3, the sequencer receives the confirmation signals from the SBI interface 40 relating to the SBI command/address transfer sequence. If the CNF 1 and CNF 0 confirmation signals are both asserted, an error is indicated. The ID1 ERR CNF signal is asserted by AND gate 835 (step 2530), the ID1 NXT 1 and ID1 NXT 0 signals are deasserted and the sequencer returns to STATE 0.

If the confirmation signals indicate an acknowledgement, that is, if CNF 1 is asserted and CNF 0 is not asserted, if the command was an extended read operation, (step 2532) the ID1 NXT 1 and ID1 NXT 0 signals are deasserted, returning the sequencer to STATE 0, and the ID1 EXP 1 and ID1 EXP 2 signals are asserted. The ID1 EXP 1 signal, when asserted, enables the SBI interface 40 to receive a first longword of read data, and the ID2 EXP 2 signal, when asserted, enables the interface to receive a second longword returned in response to an extended read. The asserted ID1 EXP 1 and ID1 EXP 2 signals set adjacent stages of shift register 828. The upper of the two stages of the shift register, which receives the ID1 EXP 1 signal, when set, asserts to ID1 RD PENDING signal, the complement of which is received in latch 814 in FIG. 27A to assert a RD PENDING 1 signal. The complement of the RD PENDING 1 signal is received in one input of AND gate 414 in FIG. 10A of SBI interface 40, which, when energized by the comparator 374 receiving the ID1 identification code over the SBI, energizes AND gate 416 when the other inputs, which indicate no error in the received information. And gate 416 asserts ID1 READ OK, which, returning to FIG. 27B, when asserted ID1 RD OK signal causes shift register 828 to shift up one stage at the next T1 clocking signal. The stage of shift register 828 that generates the ID1 RD PENDING signal is still set, this time by the adjacent stage that was previously set by the ID1 EXP 2 signal, which also enabled AND gate 416. Thus, the SBI interface remains enabled to receive the second longword.

If, on the other hand, in STATE 3 the command was an interlock read, in which only one longword is transferred, only the ID1 EXP 1 signal is asserted, and the ID1 NXT 0 and ID1 NXT 1 signals are deasserted (step 2534). Since ID1 EXP 2 is not asserted, only the one stage of shift register 828 receiving the ID1 EXP 2 and ID1 EXP 1 signals is set, and the SBI interface 40 is enabled to receive only the one longword of read data.

If the confirmation signals indicate an acknowledgement was received to the SBI command/address sequence, and the transfer operation was any of the write operations, (step 2536) the ID1 NXT 2 signal is asserted and the ID1 NXT 1 and ID1 NXT 0 signals are deasserted indicating the next state as STATE 4. In STATE 4 and STATE 5 the sequencer receives the confirmation signals from the device to which the data was transferred during the write operation.

If the confirmation signals indicate that the device on the SBI was busy, as indicated by the CNF 1 signal being de-asserted and CNF 0 signal being asserted, or if there is no response, indicated by both the CNF 1 and CNF 0 signals being asserted, a retry sequence is enterred in which the transfer is repeated (step 2538). The ID1 RETRY REQ signal is asserted, the ID1 NXT 2 and ID1 NXT 1 signals are asserted, and the ID1 NXT 0 signal is deasserted, indicating that the next state is STATE 6. STATE 6 is the beginning of the retry sequence.

Following step 2536, in STATE 4, if the transfer was a write operation, but not an extended write operation, and if the CNF 1 and CNF 0 signals indicate an acknowledgement, the ID1 NXT 2 signal would be deasserted (step 2538), indicating a return to STATE 0 and the end of the transfer sequence. If the transfer operation was an extended write operation, and if the CNF 1 and CNF 0 signals indicate an acknowledgement, the ID1 NXT 2 and ID1 NXT 0 signals are asserted (step 2540), indicating that the confirmation for the transfer of the first longword was received, and that the next state is STATE 5, in which the confirmation of the transfer of the second longword is received. If the confirmation is an acknowledgement, the transfer is complete, and the ID1 NXT 2 and ID1 NXT 0 signals are cleared (step 2542), returning the sequencer to STATE 0 and indicating the end of the transfer.

If in STATE 4 or STATE 5, the CNF 1 and CNF 0 signals indicate a busy response, no response, or an error, the RETRY REQ signal is asserted (steps 2544, 2546, 2548 and 2550), and the ID1 NXT 2 and ID1 NXT 1 signals are asserted, indicating entry into the retry sequence. In the retry sequence, the sequencer retrieves the command/address and, if the transfer is a write operation, the write data from the control RAM. The memory reference controller stores the command/address and write information in the control RAM at the same time that they are being transferred during normal operation during STATES 0-3.

In the retry sequence, the ENABLE ID1 signal is tested (step 2552). If it is not asserted, the ABORT bit in the DCR is tested (step 2554) and if it is set the ID1 NXT 2, ID 1 NXT 1 and ID1 NXT 0 lines are not asserted, returning the sequencer to STATE 0. If the ABORT bit in the DCR is clear, the RETRY REQ signal is asserted (step 2556), as are the ID1 NXT 2 and ID1 NXT 1 signals. Following step 2556, the sequencer returns to step 2552.

If (in step 2552) the ENABLE ID1 signal is asserted, the sequencer proceeds to step 2558 if the transfer operation is any of the write operations, or to step 2560 if the transfer operation is any of the read operations. During steps 2558 or 2560 the command and address are transferred from the register in the control RAM onto the SBI if the communications device becomes commander of the SBI.

In step 2558, a deasserted MASK CODE 1 signal and an asserted MASK CODE 0 signal are transferred over the SBI indicating that the transfer is a retry, and the information is being retrieved from the control RAM. The SBUS BSY signal and RETRY REQ signals are also asserted.

If (in step 2560), the transfer operation is a reading operation, the MASK CODE 1 and MASK CODE 0 signals are also deasserted and asserted respectively to identify the control RAM as the source of the signals being transferred, and the RETRY REQ signal is asserted.

Following steps 2558 or 2560, the REAL ARB OK signal is tested (step 2562). If that signal is asserted, indicating that the communications device is the commanding nexus of the SBI and the command and address were transferred, the sequencer proceeds to the second portion of STATE 6, in which if the transfer is one of the writing operations one longword of data is transferred. This portion of STATE 6 includes steps 2564 and 2566, which are identical to steps 2516 and 2520, and further includes step 2568, which differs from step 2518 only in that MASK CODE 1 and MASK CODE 0 identify the control RAM instead of the S BUS, as in step 2518, and step 2570, which differs from step 2522 only in that neither the MASK CODE 1 signal nor the MASK CODE 0 signal changes state.

Following step 2564, 2566, 2568 or 2570, the sequencer proceeds to step 2574 or 2526 in STATE 1.

FIGS. 31A through 31C illustrate further circuitry in one specific embodiment of the communications device, including a master state generator for generating signals for enabling the ID1 and ID2 sequencers, circuitry for generating address signals for addressing the control RAM 342, and for asserting transmit request signals on lines therefor in the SBI. The master state generator also generates signals for enabling the process data path and command interpreter to transfer signals over the SBI through the SBI interface. The master state generator includes a programmable logic array (array program) 920 that receives the indicated input signals, including the microprocessor and process data path transfer request signals DUP DATA REQ and REQ 1 and REQ 2 signals. Array program 920 is also an 82S100 array, sold by Signetics Corporation of Menlo Park, Calif., and has a truth table shown in FIG. 31D. The AND gates are energized by respective inputs from a latch 924 if a RAISE TR FF internal transmit request signal from flip-flop 932 on FIG. 31C is asserted by flip-flop 932. A further input signal to array program 920 is generated by AND gate 922, energized by the FORCE READ signal if a REQ 1 signal from FIG. 21D is asserted by the process data path. Another input signal to array program 920 is generated by an OR gate 922A, which is energized by the SBUS BSY signal and a RAISE TR signal from a latch 925. OR gate 922A, when not energized, conditions one input of an AND gate 923 if a REG REQ signal from an OR gate 923A is asserted. The REG REQ signal is asserted if either REG CODE 0 or 1 is asserted, which identifies one of the lookahead byte count register or the lookahead address register. AND gate 923, when energized, asserts a SET REG LOAD signal, which provides an input to latch 924.

The output signals generated by array program 920 are received in an eight-stage latch 924 and a four-stage latch 925, which are clocked by the T3 clock signal. Signals from the upper three stages of latch 924 are returned to energize AND gates 920A, 921 and 921A when the RAISE TR FF signal is asserted. Latch 924 also receives the SET REG LOAD signal from AND gate 923, and the ID1 SBUS BSY and ID2 SBUS BSY signals from the ID1 and ID2 sequencers. Latch 924 generates a UP ADRS signal, and ID1 DEL BSY and ID2 DEL BSY signals. Certain output signals from latch 924 energize an AND gate 924A if the SET REG LOAD signal is not asserted when latch 924 is clocked by a first T3 clocking signal and is asserted when latch 924 is clocked by a next subsequent clock signal.

Latch 925 generates a SILO ADRS signal, and RAISE TR and ENABLE ID1 and ENABLE ID2 signals. The last two of these signals each enable an OR gate 925A to produce an ENABLE ID signal.

The RAISE TR signal from latch 925 energizes an AND gate 927, if a REAL ARB OK signal from an AND gate 926 is not asserted and if a flip-flop 928 is set. Flip-flop 928 is clocked by the T2 clock signal, and has a positively conditioned set input and grounded reset input, and an overriding reset input provided by the T1 clock signal. Flip-flop 928 is thus set by every T2 clock signal and reset by each succeeding T1 clocking signal. AND gate 927 enables a priority arbitration circuit 930, through OR gate 931, to assert a MY BUS TR transmit request signal on its SBI arbitration line. The T0 clock signal energizes the priority arbitration circuit, if the OR gate 931 is energized, to transmit a priority request on the SBI. The priority arbitration circuit enabled by the T2 clock signal receives transmit request signals from other nexuses on their respective SBI TR lines.

The priority level of the communications device indicated by the particular SBI TR line on which its transmit request signal is transmitted can be selected by the TR SEL signals. If the communication device has the highest priority of the SBI, the priority arbitration circuit generates an ARB OK signal. OR gate 931, which enables priority arbitration circuit 930, is also enabled by the ID1 PANIC and ID2 PANIC signals from FIG. 27B.

The RAISE TR signal, when asserted also enables a set input of a flip-flop 932, which is clocked by the T1 clocking signal to assert a RAISE TR FF signal if an OR gate 932A is not energized. OR gate 932A, is energized if the REAL ARB OK signal is asserted or if the the RAISE TR signal is not asserted.

The RAISE TR FF signal when asserted energizes one stage of a latch 933 on FIG. 31B, clocked by the T2 clocking signal, which also receives the output of AND gate 925A, the ABORT PENDING signal from the SBI interface 40, and the FORCE READ signal. The output of latch 933 from the stage that receives the RAISE TR FF signal constitutes an EN REAL ARB OK enabling signal which, when it and the ARB OK signal from priority arbitration circuit 930 are both asserted, energizes the AND gate 926 to assert the REAL ARB OK signal.

The RAISE TR FF signal also enables AND gate 934 to assert the C/A TAG signal when the ENABLE ID signal from OR gate 925A is asserted, and AND gate 935 to assert an XMIT READ signal when ENABLE ID is not asserted. An AND gate 936 is energized to assert a REG ARB OK signal when RAISE TR FF is not asserted, if the REAL ARB OK signal is asserted. The C/A TAG and XMIT READ signals provide enabling signals to the tag encoder in the SBI interface 40. If the C/A TAG signal is not asserted, and the XMIT READ signal is asserted, the tag identifies the information as read data. If neither signal is asserted, the information is identified as write data, and if C/A TAG is asserted and XMIT READ is not asserted, the data is command/address data.

RAISE TR FF and SBUS BSY from AND gate 824 in FIG. 27B, when asserted, energize an AND gate 938 to assert a SEND HOLD signal through an OR gate 939. OR gate 939 is also energized by an AND gate 940 which itself is energized by the EN REAL ARB OK signal from latch 933 if the SBUS BSY signal is asserted. The SEND HOLD signal from OR gate 939 enables the the SEND HOLD input of priority arbitration circuit 930, to assert the HOLD line in the SBI TR arbitration lines. The HOLD line is asserted during one or two SBI bus cycles after a command/address bus cycle if the transfer is a write, an interlocked write, an extended write to permit the communications device to receive the write data or to return the second longword of an extended read over the SBI.

The coincidence of the assertion of ARB OK from priority arbitration circuit 930 and EN REAL ARB OK, and the non-assertion of INIT energizes an AND gate 942, which in turn energizes an OR gate 944 to assert a BUS XMIT signal. The BUS XMIT signal enables the SBI XCVR 370A-C on interface 40 to transmit information signals on the respective conductors. OR gate 944 is also energized by AND gates 945 and 946, which are in turn energized by the ID1 XMIT and ID2 XMIT signals respectively from FIG. 27B, if the INIT signal is not asserted.

Four AND gates 947 through 950 and two OR gates 951 and 952 generate signals which are received in latch 953 when clocked by the T0 clock signal to generate the SILO ADRS EN, UP ADRS EN, UP DATA EN, SILO DATA EN enabling signals and the UP INIT FF initialization signal. AND gate 947 is energized by a SILO ADRS signal if the REAL ARB OK signal is not asserted. AND gate 948 is also energized if REAL ARB OK is not asserted, when UP ADRS is asserted. AND gate 949 is energized if UP ADRS, REAL ARB OK, and SBUS BSY are all asserted. AND gate 950 is energized if SBUS BSY, REAL ARB OK, and SILO ADRS are asserted. OR gate 951 is energized by the coincidence of the energization of AND gate 950 and the assertion of the stage of latch 953 receiving the output of AND gate 950. OR gate 952 is energized by the assertion of the UNJAM/INIT and DUP UP INIT initialization signals.

A latch 954 clocked by the T0 clock signal latches the address signals and a write enabling signal for the control RAM 342, including CRAM A0 through A2, CRAM WRITE EN, and a GRANT signal and an SBI DONE signal. The latch stage that generates the CRAM A0 signal is set by the assertion of the SET A0 signal from latch 817 on FIG. 27B. The latch stage that generates the CRAM A1 signal is set when an OR gate 955 is not energized. OR gate 955 is energized by a GATED A1 signal from latch 817 on FIG. 27B, and the assertion of the ENABLE ID1 signal from latch 925.

The stage of latch 954 that generates CRAM A2 is set by the energization of an OR gate 956 by the REAL ARB OK from AND gate 926 or by the SBI DONE HALT signal from AND gate 818 and SBUS A2 signal from latch 814 on FIG. 27A.

The stage of flip-flop 954 that generates the CRAM WRITE EN signal is set by the energization of an OR gate 957, which in turn is energized by any of AND gates 958 through 961. AND gates 959 and 961 are energized during the respective ID sequencer's command/address cycle, and AND gates 958 and 960 are energized during the respective sequencer's data transfer cycle, if the cycle is not a retry cycle. AND gate 958 therefore is energized by the assertion of ID1 SBUS BSY if ID1 RETRY is not asserted. AND gate 959 is energized by the assertion of ENABLE ID1 and EN REAL ARB OK if ID1 RETRY is not asserted. AND gate 960 is energized by the assertion of ID2 SBUS BSY if ID2 RETRY is not asserted. Similarly, AND gate 961 is energized by the assertion of ENABLE ID2 if EN REAL ARB OK is asserted and ID2 RETRY is not asserted.

The GRANT stage of flip-flop 954 is set by the T0 clock signal if the stage of latch 924 receiving the SET REG LOAD signal is set.

The SBI DONE stage of flip-flop 954 is set by the energization of AND gate 962 by the coincidence of the ID1 AVAIL and ID2 AVAIL signals, from FIG. 27.

FIGS. 32A and 32B show circuitry relating to the loading and decrementing of SBI byte counter 345, and the DDI byte counter 346, and the loading and incrementing of address counter 335. Circuitry for decoding signals generated by the byte counters is shown in FIG. 33.

Latch 965, is clocked by an SBI CTR T2 clock signal, (which is identical to the T2 clock signal) latches the complement of the ADRS CARRY signal from address counter 335, EN SBI LO signal from AND gate 1006 signal in FIG. 32B, and SBI 07-04=0 signal from counter 970 in FIG. 32B, and the LARGE COUNT signal. Latch 965, through inverters 965A-C, generates the signals ADRS CRY FF, COUNT SBI, and through AND gate 967, EN SBI HI, and LARGE COUNT FF signals. EN SBI HI is asserted when the latch stages receiving to the EN SBI LO and SBI 07-04=0 signals are not set.

The EN SBI HI signal enables a counter 969 which, with counter 970 and shifter 1001, constitute the SBI byte counter 345. A LOAD ENABLE input on each of counters 969 and 970 is energized by a LOAD SBI CTR signal. The LOAD SBI CTR signal also conditions a reset input of flip-flop 971, which is set when clocked by the T0 clock signal if an AND gate 972 is energized and the LOAD SBI CTR signal is not asserted. AND gate 972, in turn, is energized by the coincidence of the REG CODE 0 signal from the command interpreter, which identifies the byte count registers, and the REG LOAD signal from latch 933 on FIG. 31B. Flip-flop 971, when set, enables one input to an AND gate 974, the output of which constitutes the LOAD SBI CTR signal. AND gate 973 when energized conditions the set input of a flip-flop 974. If an AND gate 975 is not asserted, the T0 clock signal sets flip-flop 974 to assert an SEL SBI signal. The reset output of flip-flop 974 provides the second input to AND gate 973. AND gate 973 is thus energized to assert LOAD SBI CTR signal if flip-flop 974 is reset, resulting in the SEL SBI not being asserted, when the flip-flop 971 is set. If AND gate 973 is energized, asserting the LOAD SBI CTR counter, when the T0 clock signal is next asserted, flip-flop 974 is set if AND gate 975 is not energized, thereby asserting SEL SBI, but deasserting LOAD SBI CTR.

AND gate 975 is energized by an SBI BC=0 signal from AND gate 1043 on FIG. 33, if an INHIBIT BC=0 signal from flip-flop 976 is not asserted. Flip-flop 976 is clocked by the T2 clock signal, and both the set and reset inputs are conditioned by an OR gate 977 which is energized by either the SILO DATA EN signals or the SILO READ DATA signal. If OR gate 977 is energized, flip-flop 976 sets and resets alternatively at each T2 clock signal. A UP CLR clearing signal enables an overriding reset input for flip-flop 976.

Flip-flops 978 and 980, and AND gate 981 generate a LOAD DDI CTR signal in a manner similar to flip-flops 971 and 974 and AND gate 973. The complement of the LOAD DDI CTR signal, when asserted, enables the LOAD inputs of counters 982 and 983. Flip-flop 980 is reset by the T0 clock signal if an OR gate 984 is energized by AND gate 985 or AND gate 986, and AND gate 981 is not asserted. AND gate 985 is energized by the assertion of the DDI REG VAL signal, by the set flip-flop 978, if a DDI BC≧8 signal from AND gate 1026 on FIG. 33 and a DECR CYCLE signal from latch 1020 on FIG. 33 are both asserted. AND gate 986 is energized if the DECR CYCLE signal and a DDI BC≧4 signal are both not asserted. The LOAD DDI CTR signal also energizes an OR gate 987 to assert a LD DDI signal. OR gate 987 is also energized by a DEC DDI CTR signal from OR gate 728 on FIG. 23A of the process data path. Flip-flops 971 and 978, when set, energize an OR gate 988 to assert a BYTE CNT FULL signal to indicate that the byte count registers are full. Flip-flop 978, when set, asserts a DDI REG VAL signal.

The LD SBI CTR signal from AND gate 973 also sets a flip-flop 990, clocked by the T2 clock signal, if a flip-flop 991 is set. Flip-flop 990, when set, asserts a NEW BUFFER signal, which identifies that the communications device is now to transmit into a new buffer in the memory data block. Flip-flop 991, a second flip-flop 992 and an AND gate 993 provide signals that load the address counter from the address lookahead register and that indicate that the address lookahead register is full. Flip-flop 992 is set by the T1 clock signal, if an AND gate 992A is energized by the coincidence of the REG LOAD signal being asserted and the REG CODE 0 flag from the command interpreter 45 being clear, to assert an ADRS REG FULL signal. The REG CODE 0 flag being clear identifies the address register, if the REG CODE 1 flag is also set. Flip-flop 992 being set conditions one input of AND gate 993, which if asserted sets flip-flop 991, clocked by the T1 clock signal, if OR gate 994 is not energized. Flip-flop 991, when clear, conditions the second input of AND gate 993. AND gate 993, when energized, asserts a LOAD ADRS CTR signal, which resets flip-flop 992 if AND gate 992A is not energized. OR gate 994, is energized by AND gate 995 or AND gate 996. AND gate 995 is energized by the SBI BC=0 signal if the COUNT SBI signal from inverter 965B is also asserted, which indicates that the SBI byte count is zero but the process data path is requesting a further transfer over the SBI. AND gate 996 is energized by the ADRS CRY FF signal from latch 965 and inverter 465, if an INC SILO ADRS signal from AND gate 997 is also asserted. AND gate 996, when asserted, indicates that the address counter has stepped through the physical addresses in the particular page and that the process data path is attempting a further transfer over the SBI. In either event, the address counter must be provided with the next address in the SBI address lookahead register. The INC SILO ADRS signal, which enables address counter 334, is asserted by AND gate 997 if the SILO ADRS signal and the REAL ARB OK from FIG. 31C are both asserted.

The SBI byte counter 345 includes counters 969 and 970, and a shifter 1001. The DDI byte counter 346 includes counters 982, 983 and shifter 1002. Shifter 1001 receives byte count signals from multiplexer 1003 through adder 1004. The multiplexer couples signals from either the byte count 03-00 lines, which signals are received over the SBUS, or from the SBI BT (00-02) signals from ROM 670 on FIG. 21B, which indicate the number of bytes transferred over the SBI during each particular transfer, to one input of adder 1004. The select (SEL) inputs of the multiplexer is conditioned by the SEL SBI signal from flip-flop 974, the BYTE COUNT (03-00) being passed through when LOAD SBI CTR is asserted when the next T0 clock signal is asserted. The second input to adder 1004 is provided by the output of shifter 1001. The sum generated by adder 1004 is then stored in shifter 1001. Adder 1004 also generates an SBI CARRY 3-0 carry signal and an SBI NEW CT 03 signal. Counters 969, 970 and shifter 1001 are all clocked by the SBI CTR T2 signal, which is contemporaneous with the T2 clock signal. The LOAD input of shifter 1001 is enabled by an LD SBI 3-0 signal from an OR gate 1005 which is energized by the LD SBI CTR signal from AND gate 973, by the SILO DATA EN signal and by the SILO READ DATA signal. Counter 970 is enabled by the EN SBI LO signal from AND gate 1006, which in turn is energized if the signal generated by OR gate 977 is asserted, if the NEW CT 03 signal from adder 1004 is asserted and the SBI CTR 03 signal is not asserted.

Similarly, DDI byte counters 982, 983 and shifter 1002 are loaded by multiplexer 1010, which couples the BYTE COUNT (00-03) signals from the SBI or the DDI BT 00-02 signals from the process data path circuitry shown in FIG. 21C to adder 1011. The select (SEL) input of multiplexer 1010 is energized if the LD DDI CTR signal from AND gate 981 is not asserted. The output signals from multiplexer 1010 are connected to one input of adder 1011 which also receives the output signals from shifter 1002. The sum of the two signals is returned to the shifter. Adder 1011 also generates a DDI CRY (3-0) carry signal and a NEW CT 03 signal. A COUNT UP signal, when asserted, by latch 1020 disables DOWN inputs to counters 982 and 983 to force the counters to count upwardly to load the respective counters. Counter 982 generates a DDI LARGE COUNT signal and also the DDI byte count output on DDI CTR lines 08-31. Counter 983 generates a DDI 07-04=0 signal when the DI counter output lines 4 to 7 are not asserted, and also byte count signals on DDI CTR lines 04-07. The shifter 1002 generates certain DDI byte count signals on DDI CTR lines 00-03.

With reference to FIG. 33, the DDI byte count decode logic includes a latch 1020 which latches the COUNT UP signal, the DDI LARGE COUNT signal from counter 982, a signal corresponding to the coincidence of DDI NEW CT 03 from adder 1011 and DDI CTR 03 from shifter 1002, DEC DDI CTR from the process data path, LD DDI from OR gate 987, and DDI CARRY 03 from adder 1011. The latch outputs include a COUNT NOT VAL signal from the latch stage receiving the COUNT UP signal, a DECR CYCLE signal from the stage receiving the DEC DDI CTR, and a COUNT UP signal from the stage receiving to the LD DDI input.

The output signals generated by the DDI byte count decoder circuits include a DDI BC≧32 generated by OR gate 1021. The OR gate 1021 is energized by OR gates 1022 and 1023, and an AND gate 1024. OR gate 1022 is energized by the COUNT NOT VAL signal and the DDI LARGE COUNT FF signal. Or gate 1023 is energized by the COUNT UP signal and the complement of the DDI (07-04=0) signal. AND gate 1024 is energized by the DDI CTR 03 and DDI CTR 02 lines, from shifter 1002.

A DDI BC≧4 signal is generated by an OR gate 1025 which is energized by OR gates 1022 and 1023, by the DDI CTR 03 line, or by the DDI CTR 02 line.

A DDI BC≧8 signal is generated by an OR gate 1026 which is energized by the OR gate 1022 and 1023 and the DDI CTR 03 line. A DDI BC=0 signal is provided by an AND gate 1027 which is enabled when the DDI BC≧4 signal is not asserted if an OR gate 1028 is not asserted, indicating that neither the DDI CTR 00 line nor the DDI CTR 01 line from shifter 1002 on FIG. 32B is asserted. An EN DDI HI signal, which enables counter 982 on FIG. 32B, is generated by AND gate 1030, which is energized by the DDI (07-04=0) signal from counter 983 is asserted, and if OR gate 1031 is energized. OR gate 1031 in turn is energized by AND gates 1032 and 1033. AND gate 1032 is energized by the DECR CYCLE signal and by the latch stage set by the coincidence of the DDI NEW CT 03 signal being asserted and the DDI CTR 03 line not being asserted. AND gate 1033 is energized by the COUNT UP signal and the latch stage receiving the DDI CARRY 03 line.

The COUNT UP signal, when set, also energizes one input of each of AND gates 1035 and 1036. AND gate 1035 is energized by a flip-flop 1037 being set, and AND gate 1036, and the reset is energized by a flip-flop 1037 being reset. Flip-flop 1037 is set by the T1 clock signal if an AND gate 1038 is energized by the coincidence of the LOAD BYTE CNT signal from AND gate 972 and the REG CODE 1 signal both being asserted. Flip-flop 1037 is cleared by the T1 clock signal if AND gate 1038 is not energized. A flip-flop 1039, is set by the T3 clock signal, when AND gate 1035 is energized, and reset when AND gate 1036 is energized. Flip-flop 1039 when set asserts the DATA CHAIN signal. The coincidence of the assertion of REG CODE 1 and 0 indicates that execution of a write chain or a read chain command is in progress. The LOAD BYTE CNT signal constitutes the coincidence of the REG LOAD signal with REG CODE 0, hence AND gate 1038 provides the necessary coincidence of REG CODE 0 and 1.

The SBI byte count decode signals are generated by OR gates 1040-1042 and 1044 and AND gate 1043. The SBI BC≧16 signal is generated by OR gate 1040, which is energized by the LARGE COUNT FF signal from latch 965 if the SBI 07-04=0 signal is not asserted. The SBI BC≧8 signal is generated by OR gate 1041, which is energized by the LARGE COUNT FF signal, if the SBI CTR 03 line is asserted, and the SBI 07-04=0 signal is not asserted. The SBI BC≧4 signal is generated by OR gate 1042, which in turn is energized by the LARGE COUNT FF signal, the SBI CTR 02 line or the SBI CTR 03 line being asserted. The SBI BC≧4 signal is generated by OR gate 1042 which is energized by the assertion of the LARGE COUNT FF signal, the SBI CTR 02 line, and the SBI CTR 03 line. The SBI BC=0 signal is generated by AND gate 1043, which is energized by the coincidence of the SBI BC≧4 signal not being asserted signal and an OR gate 1044 not being energized. OR gate 1044 is energized by the assertion of the SBI CTR 00 line or the SBI CTR 01 line.

C. Operation

In operation, the processor first initializes the communications device by loading the local store registers identified in FIG. 13 with information required by the communications device to perform address translations to obtain physical addresses from virtual addresses supplied to it in command packets by the user process. In one specific embodiment the central processor input-/output driver, under control of the operating system, loads the microcode into the writable control store, if this has not been done before, and loads the local store with privileged address parameters assigned to the user process using the communications device. When a user process is changed, the local store must be loaded with new privileged address parameters, but the microcode need not be reloaded. The privileged address parameters stored in local store permit the communications device to directly write to or read from buffers in the data block and the command block without having to request addressing information from the operations system. The ability to access the command block directly enables the communications device to access command packets in the command block. After the microcode and privileged parameters are loaded, the input/output driver does a write operation to the DCR to clear the HALT bit.

The local store also includes buffers for storing two command packets from the user process and one external device command packet from the external device as set forth below, a command packet from the external device consists solely of a command byte, four bytes specifying the byte count, and four bytes specifying the base of the data block buffer with respect to which the transfer will occur. A pointer, CURBUF, points to the one of the two buffers containing the command packets from the user process that is currently being processed, or, if the communications device is not currently processing a command packet from the user process, it points to the next command packet from the user process to be processed. The other user process command buffer, not pointed to by CURBUF, is the next buffer NXTBUF, which has space for storing a command packet that has been processed or that will be processed after the packet in the buffer pointed to by CURBUF is processed.

After the HALT bit is cleared, the microsequencer, which is forced to the first address location by the halt bit being set, begins addressing the writable control store. The command interpreter initially clears the STATE register 326B, the SBI and DDI byte counters 345 and 346, the GO bit in the DCR control register 381, and the device status longword 387 shown on FIG. 13, and then proceeds to a Runloop sequence shown on FIG. 34. The microsequencer steps through the Runloop, processing command packets from the command block and from the external device, branching on certain conditions identified by the flags in the Flag 0, Flag 1 and state registers 326B, 326C, and 326D, and other flags in a microcode status register in the data pathing circuit 322 which includes the following flags:

A RESTART flag, that is set when a command the execution of which required the communications device to become master of the control interconnection was interrupted because the external device was master on the control interconnection.

A next address NXTADR flag, that is set when a new physical address is loaded in a next address register in the local store. When the SBI lookahead address register 336 is empty, the address is removed from the next address register in the local store 323 to the SBI lookahead address register. The removal of the address from local store clears the NXTADR flag.

A my command MYCMD flag that, when set, indicates that the command being executed is a command that was removed from the Input Queue from the user process. When the MYCMD flag is clear, the command being processed is supplied to the communications device by the external device.

A my command or restart MYCMD+RESTART flag is tested during an abort sequence. When set, the MYCMD+RESTART flag indicates that the command currently being processed came from the Input Queue and may have been interrupted and not restarted. This flag is set when either the MYCMD flag or the RESTART flag is set.

An insert next buffer INSNBUF flag, when set, indicates that the command packet in the NXTBUF buffer in local store 323 has been processed and can be inserted into the Termination Queue.

A next buffer ful NXTBUFFUL flag, when set, indicates that the buffer in local store which is not pointed to by the CURBUF pointer, contains a valid command which has not been processed.

An external device command buffer full flag, DEVCMDFUL, is set, when a command has been received from the external device and stored in an external device command buffer in local store. The DEVCMDFUL flag is cleared when the command has been executed.

A next buffer done flag, NXTDONE, is a flag used in a data chaining operation. When the NXTBUFFUL flag is set and the communications device has received a READ CHAIN or WRITE CHAIN command, this flag, when set, indicates that the command in NXTBUF is valid in the chain.

The Runloop is a sequence performed by the command interpreter. At each step in the sequence, the communications device is performing diverse operations, including transfers over the SBI with respect to the memory reference controller, process data path and address generator. In brief, the command interpreter at various steps in the Runloop, receives, keeps track of, decodes and returns several command packets from the user process and one command from the external device. It also ensures that if additional pages of process data are to be transferred, sufficient addresses are provided to permit the process data to be transferred. The memory reference controller and address generator then initiate the transfers based on the type of transfer as decoded by the command interpreter and the process data path stores sufficient process data to permit the transfers to continue.

Thus, after the local store registers are loaded and the state register 326B, and the SBI and DDI byte counters 345 and 346 are initialized, and the GO bit and device status longwords are initially cleared, in step 2001 the communications device enters the Runloop. In step 2002, the ABORT PENDING flag in the state register 326B is checked. If the ABORT PENDING flag is set, the communications device stores the registers of the data pathing circuit 222 in the local store (step 2003) and sets the HALT bit and ABORT bit in the DCR control register 381 (step 2004).

If the ABORT flag is not set, in step 2005 the EXT ABORT flag in the DCR is tested. This flag can be set by a register write to the DCR by the input/output driver. If it is set, an abort sequence is entered wherein a device status longword 327 is constructed and inserted into each user process command packet, which are then stored in the Termination Queue. The process of contructing a device status longword is described below. The EXT ABORT flag in the device status longword is set (step 2006), and the SILO START flag in the Flag 0 register 326D is cleared (step 2007). The insert next buffer flag INSNBUF in the microcode status register is tested (step 2010), and, if it is set, the contents of the next buffer, the buffer not pointed to by the CURBUF pointer, NXTBUF are inserted into the Termination Queue (step 2011).

If the insert next buffer flag INSNBUF is not set, or following step 2011 the communications device proceeds to step 2012 whereupon the MYCMD+RESTART flag in the microcode status register is tested. If that flag is set, the communications device builds a device status longword 327 (step 2013), and inserts it and the byte counts from the SBI byte counter 345 and DDI byte counter 346, into the command packet in the buffer pointed to by CURBUF. The communications device then inserts the contents of the buffer pointed to by CURBUF into the Termination Queue. If the MYCMD+RESTART bit is not set (step 2012), or following step 2013, the communications device then tests the next buffer full NXTBUFFUL flag in the microcode status register (step 2014). If this flag is set, the next buffer, NXTBUF, in the local store contains a command that has not been processed. A CMD.STD bit in the device status longword, is cleared to indicate that execution of the command has not been started. A device status longword 327 is built including this bit. The device status longword is inserted into the command packet in the NXTBUF buffer, and the contents of the NXTBUF buffer are inserted into the Termination Queue. If the NXTBUFFUL flag is not set (step 2014), or following step 2015 the communications device proceeds to the step 2016, which leads in turn to steps 2003 and 2004.

If the EXT ABORT flag is not set (step 2005), the length error flag LEN ERR is tested. If it is set, indicating that a transfer ended (as indicated by the Send 2-0 lines or REC line being deasserted) before both of the byte count registers 345 and 346 were zero, the communications device checks to see if a suppress length error bit in the Packet Control field PKT CTRL (step 2018) is set. Specifically bit 29 of the control longword 67 of the command packet on FIG. 3, is tested. If that bit is set, length errors are to be ignored. If the suppress length error bit is not set, and the length error flag is set, the length error bit in the device status longword is set, and the abort sequence is entered at step 2007. In this case, the residual SBI and DI byte count longwords 74 and 75 in FIG. 3 are loaded in the command packet with the byte counts from the SBI byte count and DDI byte count registers 345 and 346. In the absence of a length .error, unless an abort occurs before a transmission has ended, the residual byte counts are normally zero.

If the suppress length error bit is set, the communications device enters a BUFFER IS DONE sequence (step 2020), which processes the command packet after execution of the command has been completed.

If the length error flat is not set (step 2017), the communications device proceeds to (step 2022), a four-way branch based on the state of the SBI lookahead address register 336 and the lookahead byte count register 344.

If the lookahead address register and lookahead byte count registers are both empty, the communications device has completed executing the command presently in the buffer pointed to by CURBUF, and it proceeds to BUFFER IS DONE sequence (step 2020). This condition is indicated by the assertion of the BUFFER DONE signal from inverter 883 on FIG. 27C. In the BUFFER IS DONE sequence, the SILO START flag in the FLAG 0 register 326D is cleared (step 2023). The SILO START flag, when set, enables the process data path 47 to transfer data between the SBI 14 and data interconnection 51. Following step 2023, in step 2024 the my command flag MYCMD in the microcode status register is tested to determine if the command that has just been completed was from the Input Queue or from the external device. If MYCMD is set, the command was from the Input Queue, and the communications device (step 2025), clears the MYCMD flag, changes the CURBUF pointer to point to the buffer that was previously the next buffer NXTBUF, builds a device status longword inserts it into the just executed command packet, and sets the insert next buffer flag INSNBUF.

In step 2026, the next buffer full NXTBUFFUL flag is tested to determine if there is a command packet in the buffer that is currently being pointed to CURBUF pointer. If there is a command packet in that buffer, (step 2027) the RESTART flag in the microcode status register is set, and the next buffer full NXTBUFFUL flag is cleared, which indicates that the command packet which has just been executed and which, is now in NXTBUF can be inserted into the Termination Queue. (The command packet is actually inserted into the Termination Queue in step 2041.) The cleared NXTBUFFUL flag indicates that the buffer currently identified as NXTBUF, contains an executed command packet.

Next, the CMDIN bit in the device status longword is tested (step 2030). If the CMDIN bit is set, a command has been received from the external device over the control interconnection 46 and stored in the appropriate buffer in local store. The process by which the communications device receives commands from the external device is described below. If the CMDIN bit is set, the command is decoded (step 2031) and executed (step 2032). If the command is a transfer command (READ DEVICE, READ DEVICE CHAINED, WRITE DEVICE, WRITE DEVICED CHAINED or WRITE DEVICE CONTROL MESSAGE), the communications device returns to the beginning of the Runloop (step 2001), to execute the command and perform the transfer.

If (step 2030) the CMDIN bit is not set, the RESTART flag is tested (step 2033). If the RESTART flag is not set, the NXTBUFFUL flag is tested again (step 2034), and if that is also not set, a Runloop B sequence is entered (starting with step 2035). If the next buffer full flag NXTBUFFUL was set (step 2034), state of the CURBUF pointer is changed and the NXTBUFFUL flag is cleared (step 2036). The MYCMD flag is set and the RESTART flag is cleared (step 2037), and the command in the buffer pointed to by CURBUF is decoded and executed (step 2038). If the command is a transfer command, the communications device returns to the beginning of the Runloop (step 2001) to execute the command and perform the transfer.

If in step 2034, the next buffer full flag NXTBUFFUL is not set, the communications device enters Runloop B (step 2035), which begins with testing the insert next buffer flag INSNBUF (step 2040). If the INSNBUF flag is set, the command packet in NXTBUF is inserted into the Termination Queue (step 2041) and the communications device returns to the beginning of the Runloop.

If the INSNBUF flag is not been set, the next buffer full flag NXTBUFFUL is tested (step 2042). If the NXTBUFFUL flag is set, indicating that there is currently a command in the buffer pointed to by the CURBUF pointer that can be executed, the ISEL line in control interconnection 46 is tested (step 2043) to determine if the external device is the master of the control interconnection 46. If it is, a sequence is entered, described below in which the communications device is the slave on the control interconnection (step 2024). If ISEL is not asserted by the external device, the external device is not master on the control interconnection and the command is decoded (step 2045). Following this, the communications device returns to the beginning of the Runloop to execute the command.

If in step 2042 the NXTBUFFUL flag is not set, the GO bit in the DCR control register 381 is tested (step 2046). The GO bit is cleared in the first instance during the initialization sequence prior to entering the Runloop. If the GO bit is set, a sequence is entered (step 2047) wherein a command packet is removed from Input Queue. The procedure by which the communications device removes a command packet from Input Queue is described below. If the Input Queue is empty, the GO bit is cleared. The communications device then checks to see if a command packet was actually removed from Input Queue (step 2050). If a command packet was not removed, the communications device returns to the beginning of the Runloop. If a command packet was removed, the Input Queue was not empty, and in step 2051 the next buffer full NXTBUFFUL flag is set to indicate that there is a command to be processed in the next buffer. The communications device then returns to the beginning of the Runloop.

If the GO bit in the control register DCR 381 is clear (step 2046), the CHAIN flag in the state register 326B is tested (step 2052). If the CHAIN flag is not set, the MYCMD flag is tested (step 2053). If the MYCMD flag is set, indicating that the command currently being processed was from Input Queue, then the BUFFER IS DONE flag is tested (step 2054). The BUFFER IS DONE flag is set by the assertion of the BUFFER DONE signal by inverter 883 on FIG. 27C. If the MYCMD and BUFFER IS DONE flags are both set the CURBUF pointer is changed to point to the command in NXTBUF (step 2055), a device status longword 327 is built as described below, the insert next buffer INSNBUF flag, which indicates that the command being processed was from Input Queue, is set, and the MYCMD flag is cleared, and the communications device returns to the beginning of the Runloop.

Figure 35A:
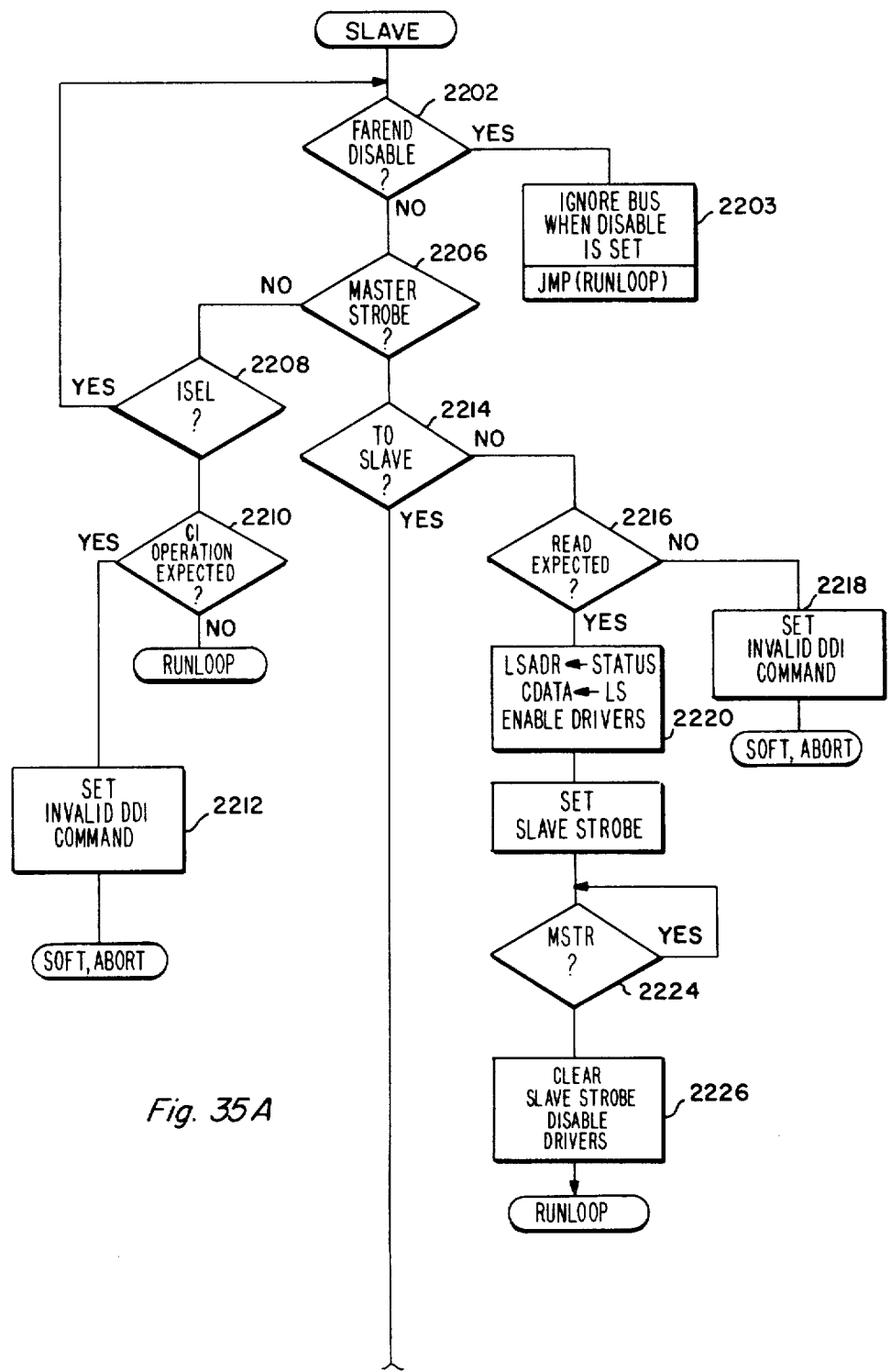
FIGS. 35A and 35B shows a flow diagram that is useful in understanding other phases of the operation of the circuitry shown in FIG. 8.
Figure 35B:
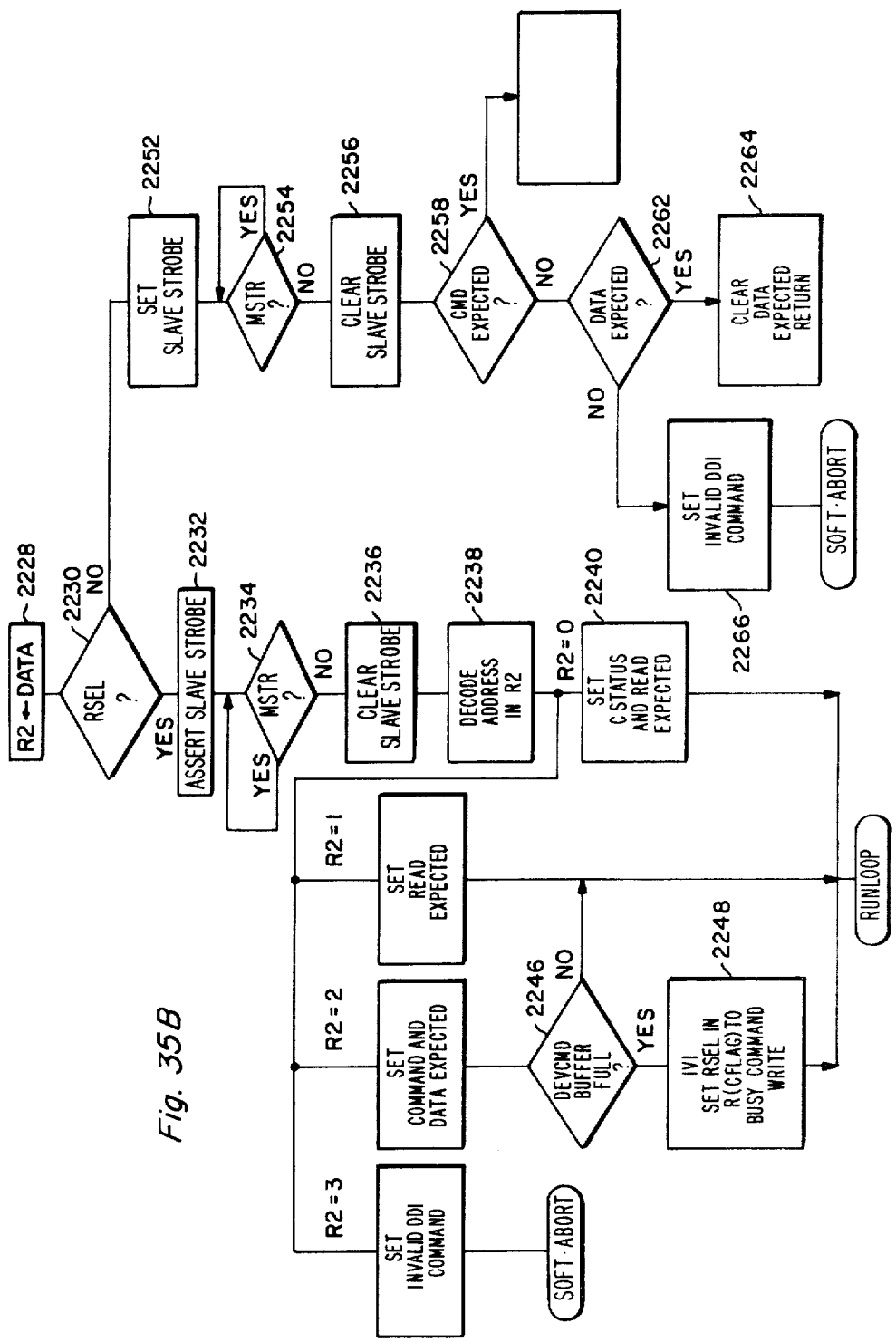

If (step 2052) the CHAIN flag in state register 326B is set, or (steps 2053 or 2054) either of the MYCMD or BUFFER IS DONE flags are not set, (step 2056) the ISEL line in control interconnection 46 is tested to determine if the external device is the master on the control interconnection 46. If it is, then (step 2057) the communications device enters the slave sequence described below (FIGS. 35A, 35B and 36. If (step 2056) the external device is not asserting the ISEL line, the communications device returns to the beginning of the Runloop.

Returning to step 2022 (the four-way branch on the state of the SBI lookahead address register 336 and the byte count lookahead register 344), if the SBI lookahead address register is full and the lookahead byte count register is empty, as determined in step 2060, the CHAIN flag in state register 326B is tested (step 2061). If the CHAIN flag is not set, a command packet is being processed in which the command byte of control word 67 (FIG. 3) is neither a READ DEVICE CHAINED command nor a WRITE DEVICE CHAINED command. The lookahead byte count register is always empty if the command being processed is not a READ DEVICE CHAINED or a WRITE DEVICE CHAINED command. The lookahead byte count register stores the byte count from a next succeeding command packet which is stored in the next buffer NXTBUF in local store 323, if the command currently being executed, the command in the buffer pointed to by CURBUF, is a READ DEVICE CHAINED or a WRITE DEVICE CHAINED command.

If the CHAIN flag in state register 326B is not set, the SBI lookahead address register 336 is tested (step 2062), and if that register is empty the communications device proceeds to step 2063.

If the SBI lookahead address register 336 is full, then a "Not Empty" sequence is entered (step 2064).

If in step 2061 the CHAIN flag is set, then (step 2065) the next buffer full flag NXTBUFFUL is tested. If the NXTBUFFUL flag is not set, indicating that the next buffer in local store 323 does not contain a command packet to be executed, the communications device also proceeds to step 2062. If the next buffer full NXTBUFFUL flag is set, indicating that there is a command in NXTBUF that has not been executed, the next done NXTDONE flag is tested (step 2066) to determine if the command stored in the next buffer NXTBUF is valid in the chain. If a READ DEVICE CHAINED command is currently being executed, the command in the next buffer NXTBUF must be a READ DEVICE CHAINED command or a READ DEVICE command. The packet containing the READ DEVICE command is the last command packet of a read chained sequence. Similarly, if a WRITE DEVICE CHAINED command currently being executed, the command in the next buffer in local store 323 must be a WRITE DEVICE CHAINED command or a WRITE DEVICE command. If another type of command is received during a read chain or a write chain sequence that violates these requirements, the command is invalid and the next done flag NXTDONE is clear and an abort occurs. Conversely, if the command packet in the next buffer NXTBUF satisfies these requirements, the next done flag NXTDONE is set. If the NXTDONE flag is set (step 2066), then the next buffer full flag NXTBUFFUL is cleared (step 2067), the CURBUF pointer is changed to point to the next buffer NXTBUF, the INSNBUF flag is set to indicate that the previously executed command packet can be inserted into Termination Queue, and NXTDONE is cleared. The communications device then returns to the beginning of the Runloop.

If in step 2066 NXTDONE was clear, indicating that the command in the next buffer NXTBUF is valid in the chain and has not been executed, then the command in the next buffer NXTBUF is decoded, and NXTDONE is set in step 2070. If the decoded command is an invalid command in the chain, (step 2071) the invalid packet bit in the device status longword is set, and (step 2072) a software abort sequence is begun, which enters the abort sequence at step 2007.

If the command in the next buffer NXTBUF is a valid command in the middle of the chain, that is, if the command in the command byte of control word 67 on FIG. 3 is a READ DEVICE CHAINED or a WRITE DEVICE CHAINED command following a similar command, the lookahead byte count register 344 is loaded (step 2073), and the communications device returns to the beginning of the Runloop.

If the command is a valid command at the end of the chain, that is, a READ DEVICE command following a READ DEVICE CHAINED command or a WRITE DEVICE command following a WRITE DEVICE CHAINED command, then the lookahead byte count register 344 is loaded (step 2074) and the communications device returns to the beginning of the Runloop to execute the command.

Returning to step 2022, the four-way branch on state of the SBI lookahead address register 336 and the lookahead byte count register 344, if the lookahead byte count register is full and the SBI lookahead address register is empty, (step 2063) the next address flag NXTADR in the microcode status register is tested. When that flag is set, the next address register in local store 323 contains an address. If the next address flag NXTADR is set, (step 2075) the SBI lookahead address register is loaded with the address from the next address register in the local store, and (step 2076) the next address flag NXTADR in the microcode status register is cleared. The communications device then returns to the beginning of the Runloop.

If (step 2063) the next address flag NXTADR is clear, indicating that the next address register in the local store 323 is empty, a new address is generated for the next address register in the local store. In steps 2077 through 2085 the data pathing circuit 322 proceeds through an address generation routine to provide a new address to the next address location, as described above (Section B.4. Address Translation and Generation). When the next address location in local store 323 is loaded, the next address NXTADR flag is set and the communications device returns to the beginning of the Runloop.

With reference again to step 2022, if the lookahead address register and the lookahead byte count register are both full, the next address flag NXTADR is tested (step 2086). If the next address flag NXTADR is set, the communications device proceeds to step 2040, and if the flag is cleared it proceeds to step 2077.

As has been mentioned previously, several times in the Runloop the communications device tests the condition of the ISEL line in the control interconnection is to determine if it is the slave on the control interconnection 46. If the communications device is the slave on the control interconnection and if a command has been received from the external device, the execution of that command takes precedence over the execution of a command from the user process. If, however, the communications device has already received a command from the external device, it asserts the RSEL line to prevent the external device from transferring a command to it until this command has been started.

If the control interconnection ISEL line is asserted in steps 2044 or 2057 of the Runloop, a slave sequence is entered as shown in FIG. 35. The communications device first tests the external device disable line (step 2202). If the external device disable line is asserted, then all signals on the control interconnection are ignored, including the assertion of the ISEL line by the external device, and (in step 2203) the communications device returns to the Runloop.

If the external device disable line is not asserted, the master strobe MSTR line is tested (step 2206). If the master strobe MSTR line is not yet asserted, the ISEL line is tested again (step 2208) and if that line is still asserted the communications device returns to step 2202. If (in step 2208) ISEL is not asserted, a CI OPERATION EXPECTED flag is tested (step 2210), and if it is clear then the communications device returns to the beginning of the Runloop. If the CI OPERATION EXPECTED flag is set (in step 2210), but ISEL is not asserted (in step 2208), an INVALID DDI COMMAND flag in the device status longword is set (step 2212) and the communications device proceeds to the software abort entry point of the abort sequence (step 2007) of the Runloop.

The communications device continues looping through steps 2206, 2208 and 2202 until the master strobe line MSTR is asserted, and then the TOSV direction line is tested (step 2214). If the direction line TOSV is not asserted, the communications device is expected to assert the control data CD (7:0) lines to the external device, that is, the external device is reading the communications device. A READ EXPECTED flag is tested (step 2216,), and if that flag is not set the INVALID DDI COMMAND flag is set (step 2218) and the communications device proceeds to the software abort entry in the Runloop. The READ EXPECTED flag is set in step 2240 below.

If (in step 2216) the READ EXPECTED flag is set, status bytes from the device status longword in the local store are transferred to the CDATA register 492 on FIG. 14B (step 2220), a parity bit is generated, and the control interconnection 46 drivers are enabled to place the status information on the control data CD (7:0) and parity C(P) lines. The slave strobe line SSTR is asserted (step 2220), and the communications device waits for the MSTR line to be deasserted (step 2224, indicating that the information has been received by the external device. When the MSTR line is deasserted, the slave strobe line is deasserted (step 2226), the CDATA drivers are disabled, and the communications device returns to the beginning of the Runloop.

If (in step 2214) the TOSV direction line is asserted, indicating that the transmission is to be from the external device to the communications device, the information received in the CDATA register, from the external device, is clocked into a storage register, R2, in a random access memory RAM in data pathing circuit 322. The RSEL line is tested in step 2230. If the RSEL line is asserted, the information now in R2 is identified as being address information identifying the register in the communications device with respect to which a subsequent transfer will occur. The slave strobe SSTR line is asserted (step 2232), and (step 2234) the communications device waits for the deassertion of the MSTR line. After MSTR is deasserted, (step 2236), the slave strobe SSTR line is deasserted and (step 2238) the address in R2 is decoded.

If the decoded address in R2 is a "zero", the C STATUS and READ EXPECTED flags are set (step 2240), indicating that a read is expected of a status register in local store 323. The only registers in the communications device that can be read by the external device are two status registers in the local store.

If the address stored in R2 is a "one", the READ EXPECTED flag alone is set (step 2242). If address stored in R2 is "two", a DATA EXPECTED flag and a COMMAND EXPECTED flag are both set (step 2244). The device command buffer full flag DEVCMDFUL in the microcode status register is tested (step 2246) to determine whether an unexecuted command from the external device is stored in the device command buffer in local store. If the device command buffer full flag DEVCMDFUL is set, the RSEL line is asserted (step 2248) to prevent the external device from transmitting another command.

After the respective flags are set in steps 2240, 2242, or 2244, the communications device returns to the beginning of the Runloop.

If the decoded address in R2 is a "three" or higher, the INVALID DDI COMMAND flag is set (step 2250), and the communications device proceeds to the software abort entry point in the Runloop (step 2007).

If the RSEL line was not asserted (in step 2230), indicating that the information in R2 is not address information, the slave strobe SSTR line is asserted (step 2252), indicating that information on the CD(7:0) lines has been received. The communications device waits for the MSTR to be asserted step 2254, after which the slave strobe SSTR line is deasserted (step 2256). The COMMAND EXPECTED flag is then tested step 2258, and, if that flag is set, the communications device proceeds step 2260 to the CMDIN "command in" sequence described below. If the COMMAND EXPECTED flag is not set, the DATA EXPECTED flag is tested (step 2262). If that flag is set, then (step 2264) the flag is cleared and the communications device executes a subroutine that stores the data in a register R3 in the random access in the data path circuit 322, and executes a return from subroutines to return to the slave on control interconnect routine. If (step 2262) the DATA EXPECTED flag was also not set, the INVALID DDI COMMAND flag is asserted (step 2266) and the communications device proceeds to the software abort entry point in the Runloop (step 2007).

Figure 36:
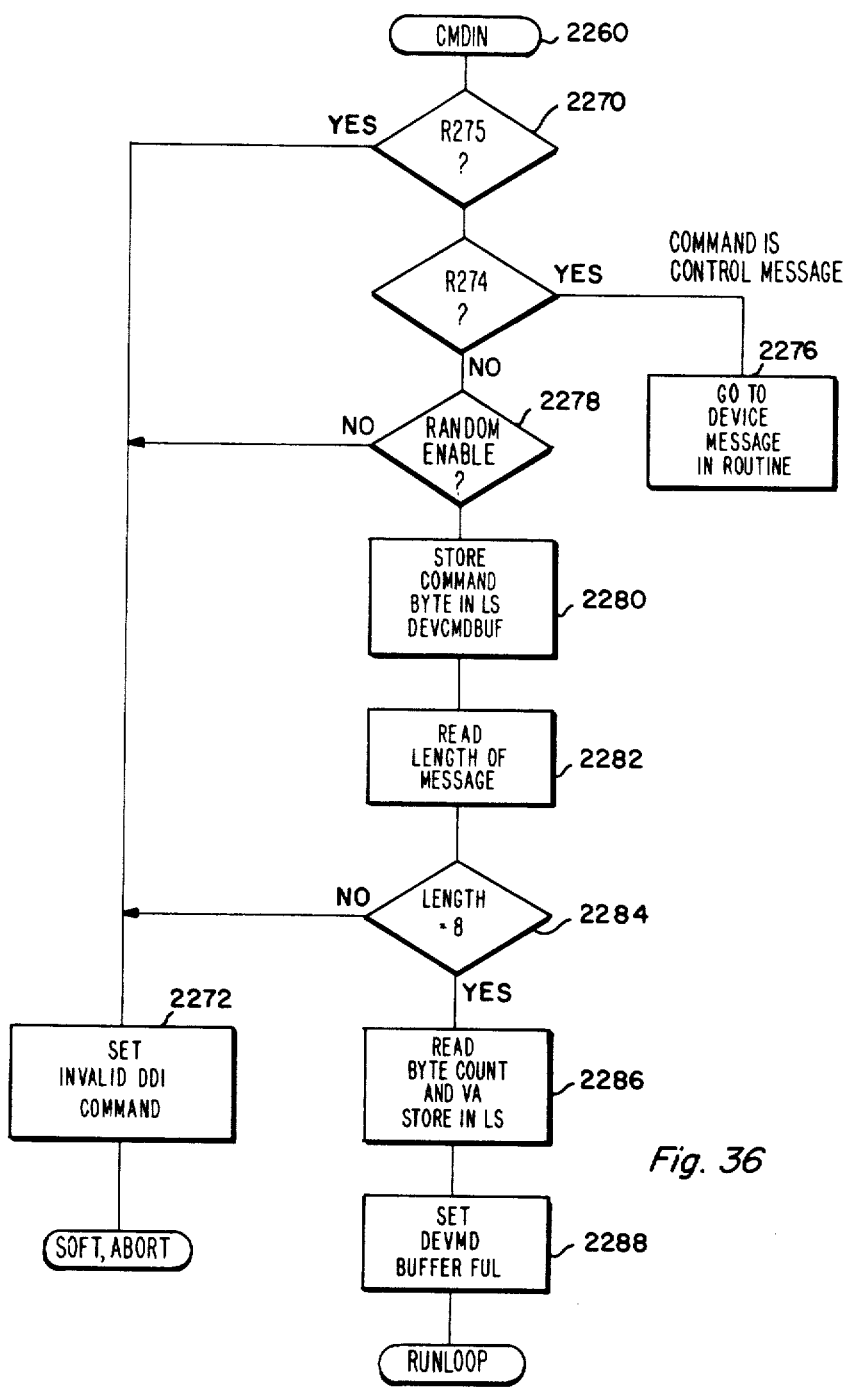
FIG. 36 is a flow diagram that is useful in understanding still other phases of the operation of the circuitry shown in FIG. 8.

As shown in FIG. 36, the command receiving sequence CMDIN begins at step 2260. In the CMDIN sequence the communications device receives a transfer from the external device constituting a either command or a device message, which is stored in the local store and transferred to the user process Termination Queue in a command packet obtained from Free Queue. In step 2270 the contents of the R2 register is decoded, and if it is greater than or equal to "five" (hexadecimal) the INVALID DDI COMMAND flag is (step 2272) set and the communications device proceeds to the software abort entry point in the Runloop (step 2007). If the contents of R2 equals "four" (hexadecimal) (step 2274), the succeeding transfer from the external device is a control message and the device message is received (step 2276) and stored in local store. The device message is in the form of a command byte, a byte identifying the length of the succeeding transmission, and the message, which may be a virtual address of a buffer in the user process data block. The transmission length is specified as the length of the message. The command byte is in the form of a command control byte from a command packet.

If the contents of R2 is less than "4" (hexadecimal), a command is being received from the external device, and a RANDOM ENABLE flag is tested (step 2278). The RANDOM ENABLE flag is set in the communications device by a command packet from its user process specifying same, in which the lower four bits of the command byte of the control longword 67 on FIG. 3 equals thirteen ("D" in hexadecimal). The RANDOM ENABLE flag enables the communications device to perform random accesses of the user process data block. If the RANDOM ENABLE flag is clear, the communications device proceeds to step 2272 and to the software abort entry (step 2007) of the Runloop.

If the RANDOM ENABLE flag is set, the command byte is stored in the local store's device command buffer. The length of the subsequent transmission is read (step 2282), and if the transmission length is not equal to eight bytes, representing four bytes for the byte count of the transfer and four bytes for the virtual address of the beginning of the transfer, then the communications device proceeds to step 2272 and the software abort entry in the Runloop (step 2007). If the transmission length is equal to eight (step 2284), the byte count and virtual address are received and stored in the local store external device command buffer. The DEVCMDFUL flag is set (step 2288), and the communications device returns to the Runloop to process the command.

Reference has been made previously to removing a command packet from Input Queue or Free Queue and inserting a command packet into the Termination Queue. Both Input Queue and Termination Queue, plus the Free Queue, which includes command-type packets that are empty except for space into which the communications device can insert a device status longword and a message, are defined by a header including a forward link and a backward link. The forward link in each queue header points to the first command packet in the respective queue, specifically to the forward link of the first command packet in the queue. The backward link points to the forward link of the last command packet in the queue. Specifically, the contents of the header's forward link constitutes an offset, which, when added to the virtual address of the header's forward link, gives the virtual address of the forward link of the first command packet in the queue. Similarly, the virtual address of the forward link of the second command packet in the queue is the sum of the virtual address of the forward link of the first command packet in the queue and the contents thereof, the forward link of the first command packet in the queue constituting an offset to the forward link of the second command packet in the queue. The forward link of the last command packet in the queue points back to the forward link of the header of the queue.

The backward link of the header and of each command packet in the queue points to the preceeding command packet, specifically to the forward link of the preceeding command packet. The backward link of the header points to the forward link of the last command packet of the queue. Each backward link also constitutes an offset which when added to its virtual addresses, results in the virtual address of the forward link of the preceeding command packet. Furthermore, since the forward link and backward link of each command packets are adjacent in memory and quadword aligned, the offset contained in the backward link, when added to the virtual address of the forward link, gives the virtual addresses of the forward link of the preceeding command packet. Therefore, the backward link of the first command packet, when added to the virtual address of the forward link of the first command packet, gives the virtual address of the forward link of the header. Similarly, the backward link of the header of the queue, when added to the virtual address of the forward link of the header of the queue, gives the address of the forward link of the last command packet in the queue.

The Input Queue, Termination Queue and Free Queue therefore are defined by their headers. The address of the forward link of the header of input queue is the base virtual address of the command block, BVA of the command block, which is loaded into the local store by the processor prior to operation by the communications device. The address of the backward link of the header of Input Queue is the base virtual address, BVA, plus four. The address of the Termination Queue header is the base virtual address, BVA, plus eight, with the address of the backward link being the base virtual address, BVA, plus twelve. Similarly, the address of the Free Queue is the base virtual address, BVA, plus sixteen, and the address of the backward link is the base virtual address of the command block, BVA, plus twenty.

Therefore, the locations of the queues are known to the communications device based on the BVA of the command block stored in local store 323. The communications device directly accesses any of the longwords comprising the forward and backward links of the queue headers by translating the address of the respective links, as described above, and performing a memory read operation over the SBI. Both longwords comprising each header can be retrieved by translating the address of the forward link and performing an extended read operation, which retrieves the contents of two sequential longwords from memory.

If a command packet is to be removed from Input Queue or the Free Queue, the communications device determines the location in memory of the command packet, reads it and stores it in local store. If a command packet is to be inserted into the Termination Queue, the communications device writes the command packet including the device status longword and the residual byte count, if any, from local store and the byte register into the same location in memory. The respective headers of the queues, and the forward and backward links of the adjacent command packet are altered so as to point to the second command packet, in the case of a removal from Input Queue or Free Queue, or to the newly inserted command packet in the case of the Termination Queue. This procedure is set forth in FIGS. 37A through 37D. A command packet is always removed from the beginning of a queue and inserted at the tail of a queue.

Figure 37A:
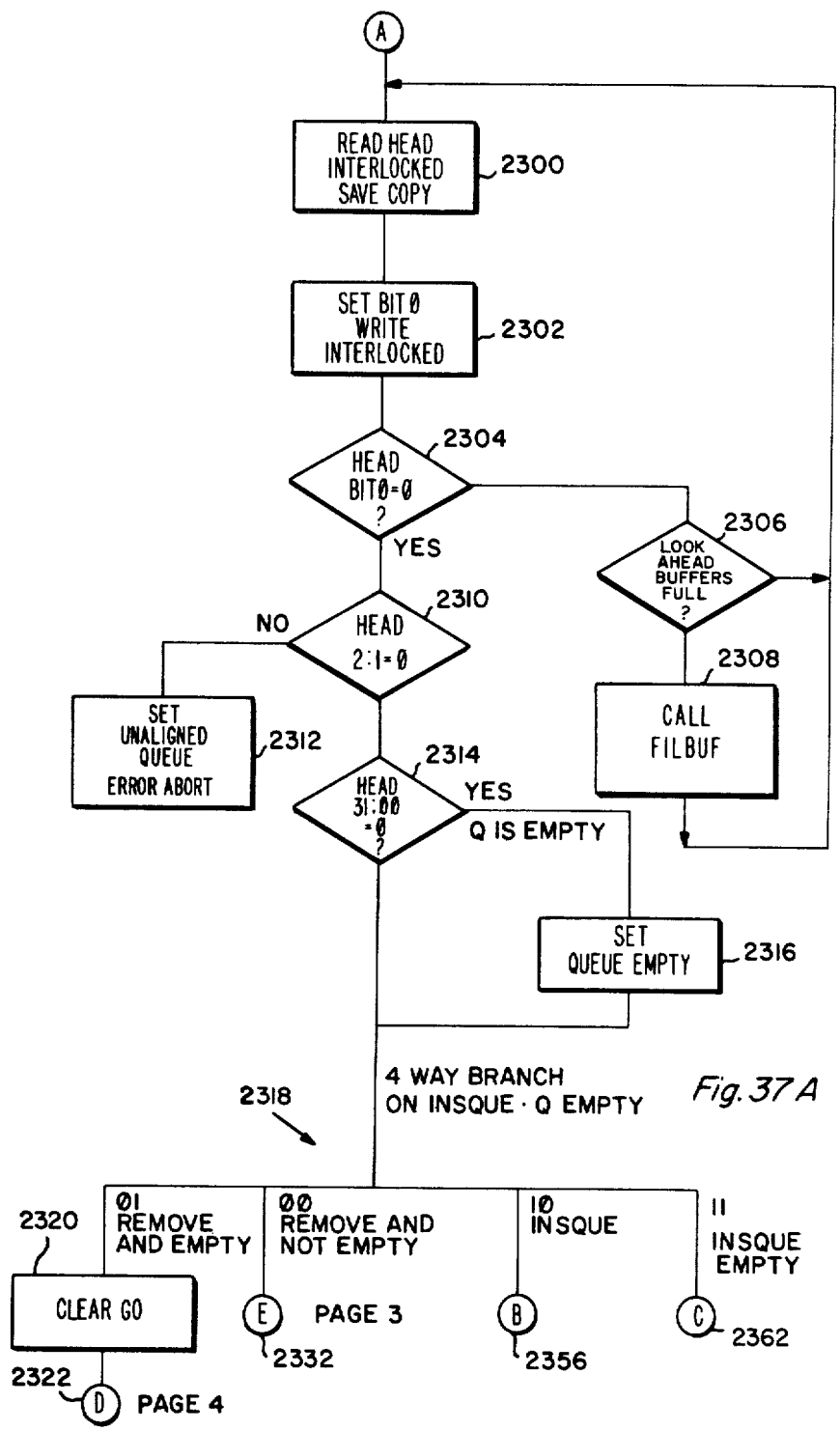
FIGS. 37A through 37D constitute a detailed flow diagram that is useful in understanding certain of the operations in FIG. 34.
Figure 37B:
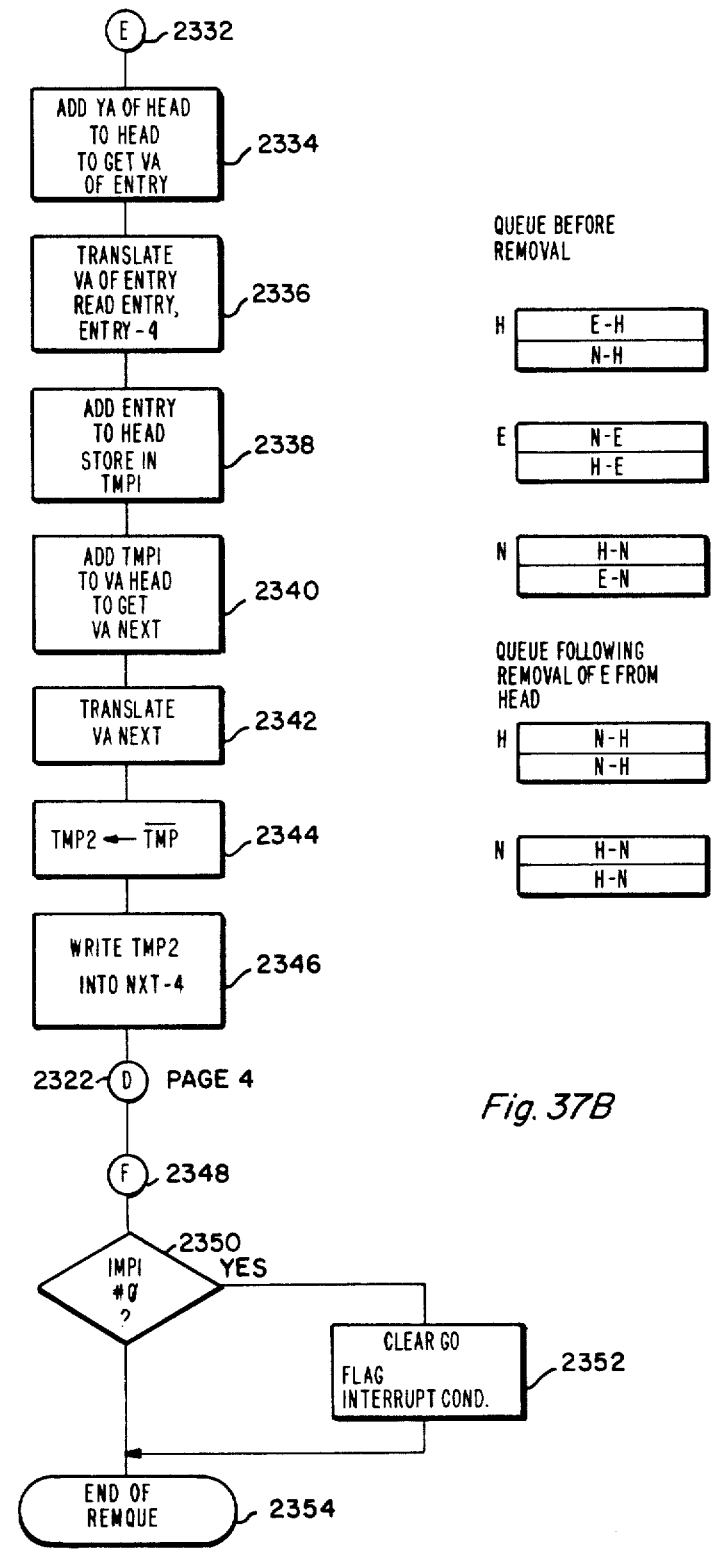
Figure 37C:
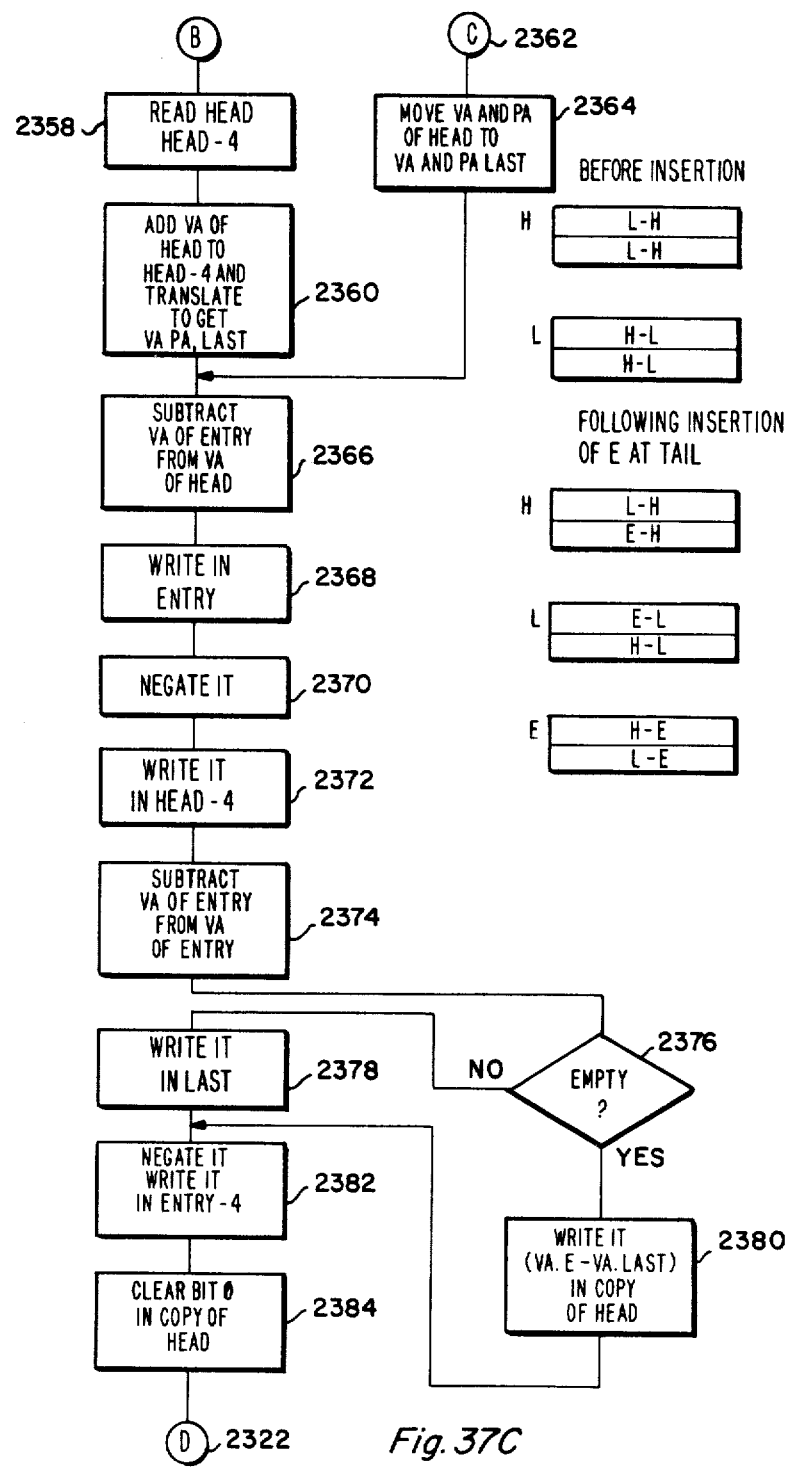
Figure 37D:
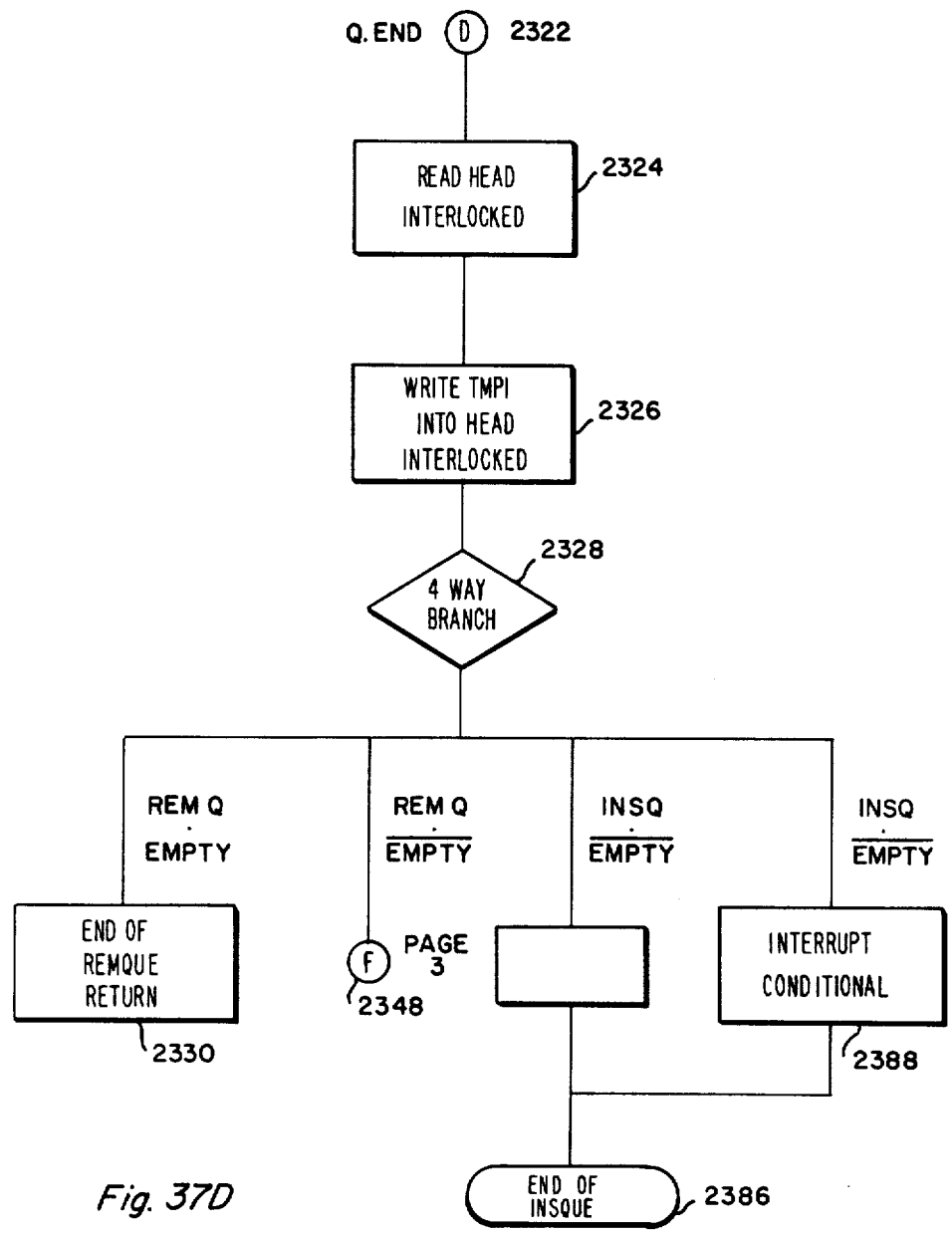

With reference to FIG. 37A, the forward link of the header of the queue, whether Input Queue, Termination Queue, or Free Queue is read with an interlock read operation, and a copy is saved in the local store (step 2300). The least significant bit of the forward link in memory is set (step 2302) by means of a write interlock operation. Setting the least significant bit in the forward link operates as a secondary interlock to prevent any other unit on he SBI from changing the queue. The least significant bit of the copy of the forward link in local store is read (step 2304). If this bit is not zero, which indicates that the queue is currently in the process of being changed, the communications device determines if it is currently processing a command packet (steps 2306 and 2308). If it is processing a command packet, the communications device returns to step 2300.

If (step 2304) the least significant bit of the queue header forward link is zero, the communications device determines if the command packet is quadword aligned (step 2310), that is, if it begins at a quadword boundary. If the command packet is quadword aligned, the three least significant bits of the forward link will all be zero. If these bits are not zero, (step 2312) an unaligned queue error flag UNAL QERR is set in the device status longword and the communications device proceeds to the Runloop abort sequence (step 2003).

If the forward link is properly quadword aligned, all of the bits of the forward link are tested (step 2314) and if they are all zero, a QUEUE EMPTY flag is set (step 2316). If the queue header is zero then the queue is empty.

Following steps 2314 and 2316, a branch is made (step 2318) based on the state of the QUEUE EMPTY flag and the nature of the command, that is, whether the command is to insert a command packet into a queue or to remove a command packet from a queue.

If the command is to remove a packet from a queue, and the QUEUE EMPTY flag is set, the GO bit is cleared (step 2320) and the communications device proceeds to a termination sequence step 2322. The header is again read on an interlocked basis (step 2324), and the copy of the header (made in step 2300) is written into the head of the queue (step 2326). In step 2328 there is a second four-way branch, which in this case proceeds to which is the end of the removal sequence step 2330, and the communications device returns to the Runloop.

If in the four-way branch in step 2318 the QUEUE EMPTY flag is set and the command is to remove a command packet from the queue, the communications device proceeds to step 2332. In the subsequent procedure, the communications device must (1) obtain the forward link and the backward link of the first command packet in the queue, (2) change the forward link of the header to point to the second command packet, and (3) change the backward link of the second command packet to point to the header. For (2) and (3), it is useful to recognize that the forward link of the header is the negative of the backward link of the second command packet.

Starting with step 2334, the virtual address of the forward link of the head is added to the contents of the forward link to get the virtual address of the forward link of the command packet being removed. The virtual address of the forward link of the command packet to be removed is translated (step 2336), as described above (Section B.3. Address Translation and Generation) to obtain the physical address thereof, and the communications device performs an extended memory read to obtain the forward and backward links of the command packet to be removed, which are two consecutive longwords in memory.

The forward link of the command packet is added to the forward link of the head (step 2338), and the sum is stored in a temporary register (TMP 1) in the local store. The contents of the temporary register (TMP 1) therefore constitute the sum of the offset of the first command packet from the header and the offset of the second command packet from the first command packet, which sum constitutes the offset of the second command packet from the header.

The address of the forward link and backward link of the second command packet must now be obtained so that the backward link of the second command packet can be altered to point to the header. The contents of the temporary register (TMP 1) are added to the virtual address of the header (step 2340) to get the virtual address of the forward link of the second command packet, and this virtual address is translated to obtain the physical address (step 2342). (step 2344) The negative of the temporary register (TMP 1), which constitutes the backward link offset from the second command packet to the queue header, is written into a second temporary register (TMP 2) in local store. (step 2346) The contents of the second temporary register (TMP 2) are written into the memory location of the backward link of the second command packet. The communications device then proceeds to the termination sequence beginning with step 2322. The head is read on an interlocked basis (step 2324), and the contents of the first temporary register (TMP 1) are written into the forward link of the queue header (step 2326), to point to the second command packet. Following this, (step 2348), the communications device tests the contents of the TMP 1 temporary register to determine if it is zero, which determines whether the command packet that was removed was the last command packet in the queue. If the contents of the TMP 1 temporary register are zero, the GO bit is cleared (step 2352) and a conditional interrupt flag is set. The communications device proceeds to the end of the remove from queue procedure (step 2354).

When a command packet is removed from the Input Queue or the Free Queue, it is removed from the beginning of the queue. If the command packet is to be inserted at the Termination Queue, the insertion is made into the tail of the queue. If the QUEUE EMPTY flag is not set, indicating that there is at least one command packet presently in the Termination Queue, the communications device must alter the forward link of the last command packet in the queue and the backward link of the header of the queue. If the QUEUE EMPTY flag is set, the forward and backward links of the header must be altered. In either event, the forward and backward links are changed to point to the respective links in the new command packet being added to the Queue. The communication device proceeds to step 2356, and (in step 2358) the forward link and the backward link of the header of the queue are read. The backward link of the header points to the last command packet in the queue. The virtual address of the forward link of the header is added to the contents of the backward link contained in the header (step 2360) to get the virtual address of the forward link of the last command packet in the queue. This virtual address is translated to get the physical address of the last command packet of the queue, specifically its forward link, which currently points to the header of the queue. The virtual address and the physical address of the forward link of the last command packet are stored in two registers in local store 323, identified as VA.LAST and PA.LAST.

With reference to step 2318 again, if the command packet is being inserted into an empty queue, (in step 2362) the communications device obtains the physical address and the virtual address of the forward link of the header of the queue and stores them in the VA.LAST and PA.LAST registers in local store (step 2364).

After the new command packet is inserted into the end of the Termination Queue, the virtual address of the new command packet is subtracted from the virtual address of the header (step 2366), which gives the offset of the new command packet from the head of the Termination Queue. This is written into the forward link of the new command packet (step 2368). This offset is negated (step 2370) written into the backward link of the header to point to the new last command packet.

Next, the virtual address of the last command packet is subtracted from the virtual address of the new command packet (step 2374). The QUEUE EMPTY flag is tested again (step 2376). If the queue empty flag is not set, the difference is written into the forward link of the last command packet (step 2378). If the QUEUE EMPTY flag is set (step 2376), indicating that the queue was emtpy prior to inserting this new command packet, the difference generated in step 2374 is written into the copy of the header in local store (step 2380). The difference obtained in step 2374 is negated (step 2382) and written into the backward link of the new command packet. The least significant bit in the copy of the header is cleared (step 2384), and the communications device proceeds to step 2322. The copy of the header (generated in step 2384) is then written into the header on an interlocked basis, and the four-way branch condition is entered again (step 2328). If the queue was empty, and a conditional interrupt flag is raised in 2388, whether or not the queue is empty the end of the insert queue operation is reached and the communications device proceeds to the Runloop again.

After the respective links have been changed, the communications device can then read the command packets from Input Queue or Free Queue or insert them into Termination Queue. The virtual address of the forward link of the command packet in Input Queue is stored in local store, and the addresses of all other longwords in the command packet can be determined therefrom, as they are stored in subsequent address locations in memory. A command packet includes at least six longwords, plus the forward and backward links, constituting the packet control longwords, byte count, virtual address of the buffer in the data buffer, and space for the residual SBI and DDI byte counts and the device status longword. A device message, which is transmitted to the external device, may be added, as may a log area; the length of these areas is specified in the packet control longword. All of these fields may be read directly by the communications device based on the virtual address of the forward link of the command packet, by translating the virtual address of the respective longword as set forth above to obtain the physical address, and doing a memory read or extended read over the SBI.

As has been mentioned previously, the Free Queue contains command packets with empty space into which the communications device can insert a status longword and a device message from the external device. The length of the message field of each command packet in Free Queue is specified in the length of the device message field in the packet control longword 67 of the command packet.

If the user process desires to monitor the status of the communications device and external device, it can do so by inserting a command into Input Queue specifying NO-OP, wherein bits 19-16 of the command control field contain an "8" (hexadecimal). With a NO-OP command, no operation is performed, but the device status longword is inserted into the command packet and the command packet is returned to Termination Queue.

As has been mentioned previously, prior to inserting a command packet into Termination Queue, a device status longword is built and inserted into the packet as status longword 76 on FIG. 3. With reference to FIG. 13, in one specific embodiment the device status longword consists of fifteen low-order bits provided by the communications device and eight bits provided from a status register in the external device. The remaining bits in the longword are not defined in this embodiment.

The following fifteen low-order bits are provided by the communication device:

A SUCCESS bit is set if the command in the packet control longword 67 on FIG. 3 was executed without error.

A command started bit CMD.START is set if the communications device had started to execute the command in the packet control longword 67. The command started bit is set if the command was fully executed.

An invalid page table entry bit INV.PTE is set if a page table entry read by the communications device during address translation or generation is not in the format accepted by the communications device. If the invalid page table entry bit is set, the communications device aborts further execution of the command.

A command in bit CMDIN is set if the command packet was obtained from Free Queue and contains a control message from the external device. This can occur, as has been mentioned previously, if the external device is another communications device that is ececuting a WRITE DEVICE CONTROL MESSAGE command from its user process.

A data interconnection disable bit DDI DISABLE is set if the external device is asserting the DISABLE line in control interconnection 46.

A self-test bit SELF TEST is set if the SELF TEST flag in the FLAG 0 register 326D is set. The SELF TEST flag is set if a command packet has been received in which the command byte of the packet control longword 67 on FIG. 3 contains a SET SELF TEST command, that is, if bits nineteen through sixteen are "0110" ("6" in hexadecimal). The SET SELF TEST command is a diagnostic command that causes the communications device to become master on control interconnection 46 and to assert its DDI DISABLE line. As long as the SELF TEST flag is set, the communications device will execute the succeeding command packet, but the external device will ignore signals on the data interconnection 51. The SELF TEST flag is cleared by a command packet having a CLEAR SELF TEST command byte in which bits nineteen through sixteen of the packet control longword 67 are "0111" ("7" hexadecimal).

A range error bit RANGE ERR is set if during a range checking operation following an address translation or generation, the calculated address is outside the range specified for the user process.

An unaligned queue error bit UNAL Q ERR is set if the command packet is not quadword aligned, that is, if during the remove from queue or insert into queue operations described previously with respect to FIGS. 37A through 37D the three least significant bits of a queue header forward link are not all zero.

An invalid command packet bit INV CMD PKT is set if the command byte in the packet control longword 67 on FIG. 3 is not a valid command. In one specific embodiment, the four most significant bits are all zero.

A Free Queue empty bit FREE Q EMPTY is set if a device message is received from the external device over the control interconnection 46, and there are no command packets available in Free Queue. This condition causes an abort to occur.

A random enable bit RAN EN is set if the communications device RANDOM ENABLE flag in Flag 0 register 326D is set. The RANDOM ENABLE flag is set by a SET RANDOM ENABLE command byte in packet control longword 67 on FIG. 3, that is, a command byte in which the least significant bits nineteen through sixteen, are "1101" ("D" in hexadecimal). The RANDOM ENABLE flag, when set, permits the external device to perform random accesses of the user process through the communications device. The RANDOM ENABLE flag is cleared by a command packet specifying CLEAR RANDOM ENABLE, in which bits nineteen through sixteen of the packet control longword are "1110" ("E" in hexadecimal).

An invalid external device command bit INV DDI CMD is set if a command is transferred to the communications device over control interconnection 46 that is an invalid command, that is a random access command (READ DEVICE, READ DEVICE CHAINED, WRITE DEVICE, or WRITE DEVICE CHAINED command from the external device) when the RANDOM ENABLE flag is not set. The invalid external device command bit is whenever a SET INVALID DDI COMMAND block is encountered on FIGS. 35A, 35B or 36.

A length error bit LEN ERR is set if a transfer over the data interconnection 51 is terminated before the SBI and DDI byte counters 345 and 346 are both zero and the suppress length error bit is not set in the packet control longword 67 on FIG. 3. The length error bit is also set if a device message is sent to the communications device and (1) the device message has fewer bytes than the number of bytes indicated by the byte length, or (2) Free Queue is not empty but the device message does not fit into the command packet obtained from Free Queue.

A driver abort bit DRIV ABRT is set if the communications device is in an abort sequence that was started by the input/output driver setting the SET ABORT bit in the DCR control register 381.

A parity error bit DDI PAR ERR is set if a parity error occurred during a transfer over the data interconnection 51 or the control interconnection 46.

Reference has been made hereinabove to a CHAIN flag. The CHAIN flag is in state register 326B on FIG. 14B, and is set by the assertion of the DATA CHAIN signal by flip-flop 1039 on FIG. 33. When the CHAIN flag is set, a command has been received that specifies a chaining sequence. In a chaining sequence, consecutive command packets are received from Input Queue that requires either a READ DEVICE CHAINED or a WRITE DEVICE CHAINED. Each command packet specifies a byte count and a virtual address in the data block with respect to which the transfer is to occur. The communications device effects a transfer of the number of bytes specified in the byte count between the external device and the identified buffer. After the number of bytes specified in a common packet is transferred, subsequent bytes are transferred to or from the buffer identified in the next command packet, until the number of bytes are transferred that is specified in the byte count in that command packet. This process continues until a READ DEVICE or WRITE DEVICE command is received and executed. A READ DEVICE or WRITE DEVICE command following a READ DEVICE CHAINED or WRITE DEVICE CHAINED command identifies the end of the chain.

At this point it will be helpful to describe how the various portions of the communications device interact to transfer data or information.

When the command interpreter 45 requires a transfer over the SBI, it sets the UP REQ flag in the FLAG 0 register 336D. The T0 clocking signal sets flip-flop 487 on FIG. 15 to assert the DATA REQ signal. With reference to FIG. 31A, the DATA REQ signal is coupled to one input to array program 920. When certain other signals coupled to array program 920 are asserted, latch 925 and AND gate 927 energize priority arbitration circuit 930 to assert the transfer request line assigned to the communications device. An UP ADRS signal is also asserted by one stage of latch 924. When the communications device is the commanding nexus of the SBI, the READ ARB OK signal is asserted by AND gate 926, which, with the UP ADRS signal, energizes AND gate 948 on FIG. 31C. When the T0 clocking signal is next asserted, latch 953 asserts the UP ADRS EN signal which, at the next T0 clocking signal, resets flip-flop 487.

If ID1 AVAIL is asserted, flip-flop 480 on FIG. 15 is set by the assertion of UP ADRS EN, clocked at T2, to assert EN DATA PATH.UP ADRS EN also sets a flip-flop latch on FIG. 17 at T2 to assert UP ADR EN SYNC. The EN DATA PATH signal enables data pathing circuit 322 to place an address on data bus 425. Driver 333 on FIG. 14A, enabled by the coincidence of UP ADRS EN and T0 SBI from the interface, places the address on the SBUS. T0 SBI is asserted by the T1 clock signal. The interface 40 receives the address and places it on the SBI.

UP ADRS also energizes latch 953 to assert UP DATA EN when SBUS BSY from OR gate 842 is asserted. UP DATA EN energizes AND gate 449 when both WRITE CODE 0 and 1 are not asserted, indicating a write operation. AND gate 449 enables OR gate 450 to assert EN DATA DRVRS, which, with T0 SBI from the interface 40, enables driver 334.

In performing a read operation, the ID1 and ID2 sequencers also receive the UP ADRS signals, and the SBI CODE 0 and 1 flags, which identify the SBI function, extended read, write masked, interlock read masked and interlock write masked. Array program 823 aserts an ID1 UP RD signal if the SBI function is a read. Shift register 828 then asserts, at T1, the ID1 UP EN signal. When the ID1 RD OK signal from interface 40 is asserted, AND gate 864 on FIG. 27C is enabled. At the next T0, latch 862 energizes OR gate 882 to assert UP READ DATA, which in turn energizes OR gate 446 on FIG. 15. When the SBI function is a read, the SBI CODE 0 is zero. When UP ADRS EN is deasserted, AND gate 483 is asserted. Since UP ADRS EN SYNC is still asserted at when the T2 clocking signal is asserted, flip-flop 480 is reset, asserting EN SBUS RCVRS for SBUS latch 331 on FIG. 14A. At the next T1, AND gate 447 asserts the WRT LS signal to enable the local store to receive the data from the SBUS latch.

For all transfers between the command interpreter and the SBI, the address is calculated by the data pathing circuit 322 based on the privileged parameters contained in the local store. Thus, the address is taken from the OUTPUT MUX of the data paths and placed on the SBUS through drivers 333. If a new address is needed, if for instance several longwords of a command packet are to be read, the addresses are generated by the data paths.

With respect to transfers with the process data path, if the silo byte count, SBC 6-0, reaches a predetermined number, REQ 1 and/or REQ 0 are asserted by latch 1156 on FIG. 21D. These signals are received in array program 920. Certain output signals from array program 920 are received in latch 925 when clocked by the T3 clocking signal, to assert the SILO ADRS and RAISE TR signals. After the communications device obtains control of the SBI, AND gate 997 asserts the INC SILO ADRS signal to increment the address counter 805, and latch 953 asserts the SILO ADRS EN signal. This enables OR gate 1170 on FIG. 21C AND gate 1168 is asserted when T0 SBI from interface 40, to enable SBUS mask drivers 1166 to place the mask signals on the S BUS. Furthermore, with reference to FIG. 27A, since UPDATA EN is not asserted, multiplexer 817 asserts SBUS MUX 1 and SBUS MUX 2. Since SILO ADRS EN is asserted, the SBUS MUX 1A and SBUS MUX 1B signals are not asserted, and SBUS MUX 340 on FIG. 26A selects the address counter and address register signals to be placed on the SBUS. Silo ADRS EN also energizes OR gate 904, which energizes AND gate 900 when the T0 SBI signal is asserted to assert SBUS ENABLE for driver 337.

Latch 953 also asserts the SILO DATA EN signal, which energizes OR gate 678, which in turn enables the select input of multiplexer 674 and one stage of latch 672, on FIGS. 21A and B. Latch 672 in turn energizes several inputs to ROM 670, which identifies the number of valid bytes transferred, SBI VB 2-0. The SBI BT 2-0 signals, the complements of the SBI VB 2-0 signals, decrement the byte count in SBI byte counter 345 is shown in FIG. 32B, enabled by the SILO DATA EN signal if data is transferred to the process data path from the SBI, or by the SILO READ DATA signal if the transfer is from the external device to the process data path.

Then, if data is received for the process data path, OR gate 878 asserts the SILO READ DATA signal, energized by AND gate 879, if the read data is to be received in conjunction with the ID1 sequencer, or AND gate 880 if the read data is to be received in conjunction with the ID2 sequencer. The SILO READ DATA signal energizes multiplexer 630 to assert the EN IAR UPDATE signal to update the input address register. When data is received from the external device over the data interconnection 51, the CLKIN signal is coupled by multiplexer 630 as the EN IAR UPDATE signal. The SILO READ DATA signal also enables the silo byte count register to load, being coupled by multiplexer 1120 on FIG. 21C as the SBC LD EN signal when DI WRITE is asserted.

Transfers over the data interconnection are governed by array programs 696A and 696B, partially under control of the DI RREQ read request signal and DI WREQ write request signal, from flip-flops 610 and 620, respectively. Both the DI RREQ and DI WREQ signals require that the SILO START flag from the Flag 0 register 326D in the command interpreter be set.

The foregoing description is limited to a specific ebodiment of this invention. It will be apparent, however, that this invention can be practiced in systems having diverse basic construction or in systems that use different internal circuitry than is described in this specification with the attainment of some or all of the foregoing objects and advantages of this invention. Therefore, it is the object of the appended claims to cover all such variations and modifications as come within the true spirit and scope of this invention.

What we claim as new and desire to secure by Letters Patent of the United States is:

1. A communications device for connecting an external device, that transfers process data, and a data processing system that includes a memory including a plurality of addressable storage locations for storing privileged operating system programs including privileged addressing parameters, and a non-privileged user process composed of a user process program, a comman buffer for storing commands including addressing information and a data buffer for storing process data to be transferred to or from the external device, the memory locations assigned to the user process being identified by the privileged addressing parameters, said data processing system further comprising a central processor for processing the operating system and the user process programs, and communications device comprising:
A. interfacing means that connect to the memory and to the central processor for transferring information, including commands and process data, with the memory and the central processor,
B. command interpretation means connected to said interfacing means including
  (i) means for storing privileged addressing parameters for the user process;
  (ii) means for processing information from the memory corresponding to commands from the user process, and
  (iii) means for translating the addressing information from the commands into translated physical addresses,
C. address generating means connected to said interfacing means and to said command interpretation means for receiving the translated physical addresses from said command interpretation means and for generating valid physical addresses of locations in the memory that correspond only to the physical addresses of the user process,
D. process data path means connected to said interfacing means and the external device for transferring process data between the interfacing means and the external device, and
E. memory reference means connected to said interfacing means, said address generating means, said command interpretation means and said process data path means for initiating transfer of information between a location in the memory identified by said address generating means and one of said address generating means, command interpretation means and process data means whereby user process commands and process data are transferred directly between the user process and the external device independently of the operating system programs.

2. A communications device as set forth in claim 1 in which the external device includes means for transferring commands including addressing information to said communications device, said communications device including means for receiving commands from the external device, and said command interpretation means further including means for processing the commands from the external device and means connected to said address generating means for translating the addressing information from the external device into translated physical addresses.

3. A communication device as set forth in claim 1 in which the communications device includes a control register that in one state enables said communications device to commence transferring commands, the central processor under control of the user process placing said control register in the one state.

4. A communications device as set forth in claim 1 in which said command interpretation means further includes means for enabling said interfacing means to retrieve unprocessed commands from the command buffer and returning processed commands to the command buffer.

5. A communications device as set forth in claim 4 in which the command buffer includes a first queue comprising commands that have not been processed and a second queue comprising commands that have been processed, each of the first and second queue including header means for identifying a command in the queue, said command interpretation means enabling means including means for altering the header means of said first queue when retrieving a command to identify the next command in the queue, and for altering the header means of said second queue when returning the processed command to the command buffer to identify the last command returned to the command buffer.

6. A communications device as set forth in claim 1 in which said command interpretation means further includes means for verifying that the translated physical addresses correspond to memory locations assigned to the user process.

7. A communications device as set forth in claim 1 in which said address generating means includes a buffer means for storing translated physical addresses from said command interpretation means, and counter means for retrieving the translated physical address from said buffer means and generating a series of physical addresses from the translated physical address, said command interpretation means being responsive to the translated physical address from said buffer means for translating a new translated physical address for storage in said buffer means.

8. A communications device as defined in claim 1 wherein said memory reference means further includes a first counter means for counting the number of bytes of process data transferred between the user process and said communications device and a second counter means for counting the number of bytes of process data transferred between the external device and said communications device, each command including a value defining the number of bytes to be transferred between the user process and the external device, and said command interpretation means including means for storing the value in both said first and second byte counter means prior to a transfer of process data.

* * * * *